United States Patent
Lasang et al.

(10) Patent No.: US 11,856,207 B2
(45) Date of Patent: Dec. 26, 2023

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Pongsak Lasang, Singapore (SG); Zheng Wu, Singapore (SG); Chi Wang, Singapore (SG); Chung Dean Han, Singapore (SG); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/105,910

(22) Filed: Nov. 27, 2020

(65) Prior Publication Data
US 2021/0084312 A1 Mar. 18, 2021

Related U.S. Application Data

(63) Continuation of application No. PCT/JP2019/021634, filed on May 30, 2019.
(Continued)

(51) Int. Cl.
*H04N 19/17* (2014.01)
*H04N 19/159* (2014.01)
(Continued)

(52) U.S. Cl.
CPC .......... *H04N 19/17* (2014.11); *G01B 11/002* (2013.01); *H04N 19/159* (2014.11); *H04N 19/184* (2014.11); *H04N 19/593* (2014.11)

(58) Field of Classification Search
CPC .... H04N 19/17; H04N 19/159; H04N 19/184; H04N 19/593; G01B 11/002
(Continued)

(56) References Cited

U.S. PATENT DOCUMENTS

2004/0176925 A1 9/2004 Satoh et al.
2014/0300775 A1* 10/2014 Fan ...................... G06T 19/006
348/222.1
(Continued)

FOREIGN PATENT DOCUMENTS

JP 2004-233334 8/2004
JP 2017-36970 2/2017
(Continued)

OTHER PUBLICATIONS

International Search Report (ISR) dated Jul. 9, 2019 in International (PCT) Application No. PCT/JP2019/021634.
(Continued)

*Primary Examiner* — On S Mung
(74) *Attorney, Agent, or Firm* — Wenderoth, Lind & Ponack, L.L.P.

(57) ABSTRACT

A three-dimensional data encoding method of encoding three-dimensional points obtained by a sensor includes: encoding local coordinate information indicating sets of local coordinates that are coordinates of the three-dimensional points and are dependent on a location of the sensor; and generating an encoded bitstream including the local coordinate information encoded and global coordinate information indicating global coordinates that are coordinates of
(Continued)

a reference point or at least one of the three-dimensional points and are independent from the location of the sensor.

16 Claims, 86 Drawing Sheets

Related U.S. Application Data

(60) Provisional application No. 62/679,397, filed on Jun. 1, 2018.

(51) Int. Cl.
  *H04N 19/184* (2014.01)
  *G01B 11/00* (2006.01)
  *H04N 19/593* (2014.01)

(58) Field of Classification Search
  USPC .................................................. 375/240.01
  See application file for complete search history.

(56) References Cited

U.S. PATENT DOCUMENTS

| | | |
|---|---|---|
| 2014/0375638 A1 | 12/2014 | Tomaru et al. |
| 2017/0039718 A1 | 2/2017 | Kotake et al. |
| 2018/0218534 A1* | 8/2018 | Sato .................. G01B 11/24 |

FOREIGN PATENT DOCUMENTS

| | | |
|---|---|---|
| JP | 2017-201261 | 11/2017 |
| WO | 2014/020663 | 2/2014 |
| WO | 2017/057362 | 4/2017 |

OTHER PUBLICATIONS

George P. Gerdan, et al., "Transforming Cartesian coordinates X,Y,Z to Geographical coordinates $\varphi$, $\lambda$, h", The Australian Surveyor, Vol. 44, No. 1, Jun. 1999

* cited by examiner

GOS INDEX NUMBER (ENCODING ORDER)

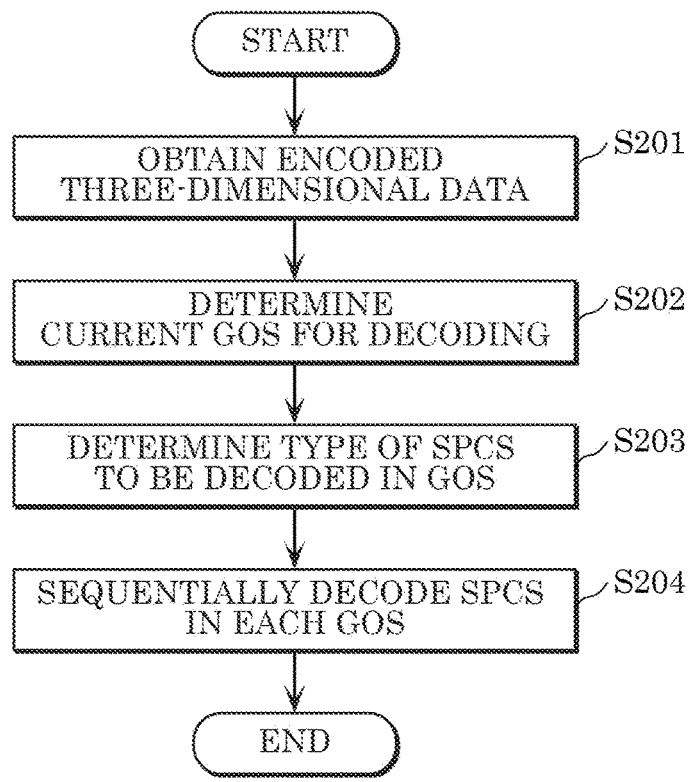

FIG. 41

A : BIT SEQUENCE WHEN SCANNING NODES AND LEAVES BREADTH-FIRST : 10010000 10000001 00000010 leaf1 leaf2 leaf3

B : BIT SEQUENCE WHEN SCANNING NODES AND LEAVES DEPTH-FIRST : 10010000 10000001 leaf1 leaf2 00000010 leaf3

FIG. 46

```
space_header() {
    ...
    for (i=0; i<MaxRefSpc_l0;i++) {
        RT_flag_l0[i]
        if (RT_flag_l0[i]) {
            R_l0[i]
            T_l0[i]
        }
    }
    ...
    for (i=0; i<MaxRefSpc_l1;i++) {
        RT_flag_l1[i]
        if (RT_flag_l1[i]) {
            R_l1[i]
            T_l1[i]
        }
    }
    ...
}
```

| ELLIPSOID | SEMI-MAJOR AXIS a | FLATTENING f | SEMI-MINOR AXIS b = a (1 - f) |
|---|---|---|---|
| WGS84 | 6378137 m | 1/298.257223563 | 6356752.3142 m |

FIG. 104

EPSG:3414

```
PROJCS["SVY21 / Singapore TM",
   GEOGCS["SVY21",
     DATUM["SVY21",
       SPHEROID["WGS 84",6378137,298.257223563,
         AUTHORITY["EPSG","7030"]],
       AUTHORITY["EPSG","6757"]],
     PRIMEM["Greenwich",0,
       AUTHORITY["EPSG","8901"]],
     UNIT["degree",0.01745329251994328,
       AUTHORITY["EPSG","9122"]],
     AUTHORITY["EPSG","4757"]],
   UNIT["metre",1,
     AUTHORITY["EPSG","9001"]],
   PROJECTION["Transverse_Mercator"],
   PARAMETER["latitude_of_origin",1.3666666666666667],
   PARAMETER["central_meridian",103.83333333333333],
   PARAMETER["scale_factor",1],
   PARAMETER["false_easting",28001.642],
   PARAMETER["false_northing",38744.572],
   AUTHORITY["EPSG","3414"],
   AXIS["Easting",EAST],
   AXIS["Northing",NORTH]]
```

FIG. 105

EPSG:4947

```
GEOGCS["JGD2000",
   DATUM["Japanese Geodetic Datum 2000",
     SPHEROID["GRS 1980",6378137.0,298.257222101,
       AUTHORITY["EPSG","7019"]],
     TOWGS84[0.0,0.0,0.0,0.0,0.0,0.0,0.0],
     AUTHORITY["EPSG","6612"]],
   PRIMEM["Greenwich",0.0,
     AUTHORITY["EPSG","8901"]],
   UNIT["degree",0.017453292519943295],
   AXIS["Geodetic latitude",NORTH],
   AXIS["Geodetic longitude",EAST],
   AXIS["Ellipsoidal height",UP],
   AUTHORITY["EPSG","4947"]]
```

| POINT<br>CLOUD | GEOMETRIC<br>COORDINATES | GEOGRAPHIC<br>COORDINATES |
|---|---|---|
| $P_1$ | $X_1, Y_1, Z_1$ | $\varphi_1, \lambda_1, h_1$ |
| $P_2$ | $X_2, Y_2, Z_2$ | $\varphi_2, \lambda_2, h_2$ |
| ⋮ | ⋮ | ⋮ |
| $P_n$ | $X_n, Y_n, Z_n$ | $\varphi_n, \lambda_n, h_n$ |

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2019/021634 filed on May 30, 2019, claiming the benefit of priority of U.S. Provisional Patent Application Nos. 62/679,397 fled on Jun. 1, 2018, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point group in a three-dimensional space. In the point cloud scheme, the positions and colors of a point group are stored. While point cloud is expected to be a mainstream method of representing three-dimensional data, a massive amount of data of a point group necessitates compression of the amount of three-dimensional data by encoding for accumulation and transmission, as in the case of a two-dimensional moving picture (examples include MPEG-4 AVC and HEVC standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle is known (for example, see International Publication WO 2014/020663).

SUMMARY

In such a system using three-dimensional data, there has been a demand for reducing the code amount in a decoding device.

The present disclosure provides a three-dimensional data encoding method, a three-dimensional data decoding method, a three-dimensional data encoding device, and a three-dimensional data decoding device capable of reducing the amount of processing performed by a decoding device.

A three-dimensional data encoding method according to one aspect of the present disclosure is a three-dimensional data encoding method of encoding three-dimensional points obtained by a sensor, and includes: encoding local coordinate information indicating sets of local coordinates that are coordinates of the three-dimensional points and are dependent on a location of the sensor; and generating an encoded bitstream including the local coordinate information encoded and global coordinate information indicating global coordinates that are coordinates of a reference point or at least one of the three-dimensional points and are independent from the location of the sensor.

A three-dimensional data decoding method according to one aspect of the present disclosure is a three-dimensional data decoding method of decoding three-dimensional points obtained by a sensor, and includes: decoding, from an encoded bitstream, local coordinate information indicating sets of local coordinates that are coordinates of three-dimensional points and are dependent on a location of the sensor; and decoding, from the encoded bitstream, global coordinate information indicating global coordinates that are coordinates of a reference point or at least one of the three-dimensional points and are independent from the location of the sensor.

The present disclosure provides a three-dimensional data encoding method, a three-dimensional data decoding method, a three-dimensional data encoding device, and a three-dimensional data decoding device capable of reducing the amount of processing performed by a decoding device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 9 is a flowchart of decoding processes according to Embodiment 1;

FIG. 10 is a diagram showing an example of meta information according to Embodiment 1;

FIG. 41 is a diagram showing an example of bit sequences of the volume according to Embodiment 7;

FIG. 46 is a diagram showing an example syntax of an RT flag and RT information according to Embodiment 7;

FIG. 104 is a diagram illustrating EPSG: 3414 according to Embodiment 10;

FIG. 105 is a diagram illustrating EPSG: 4947 according to Embodiment 10;

FIG. 119 is a flowchart illustrating a process of encoding three-dimensional data according to Embodiment 10;

FIG. 120 is a flowchart illustrating a process of decoding three-dimensional data according to Embodiment 10;

FIG. 121 is a flowchart illustrating a process of encoding three-dimensional data according to Embodiment 10; and FIG. 122 is a flowchart illustrating a process of decoding three-dimensional data according to Embodiment 10.

DETAILED DESCRIPTION OF THE EMBODIMENTS

Figure 1:
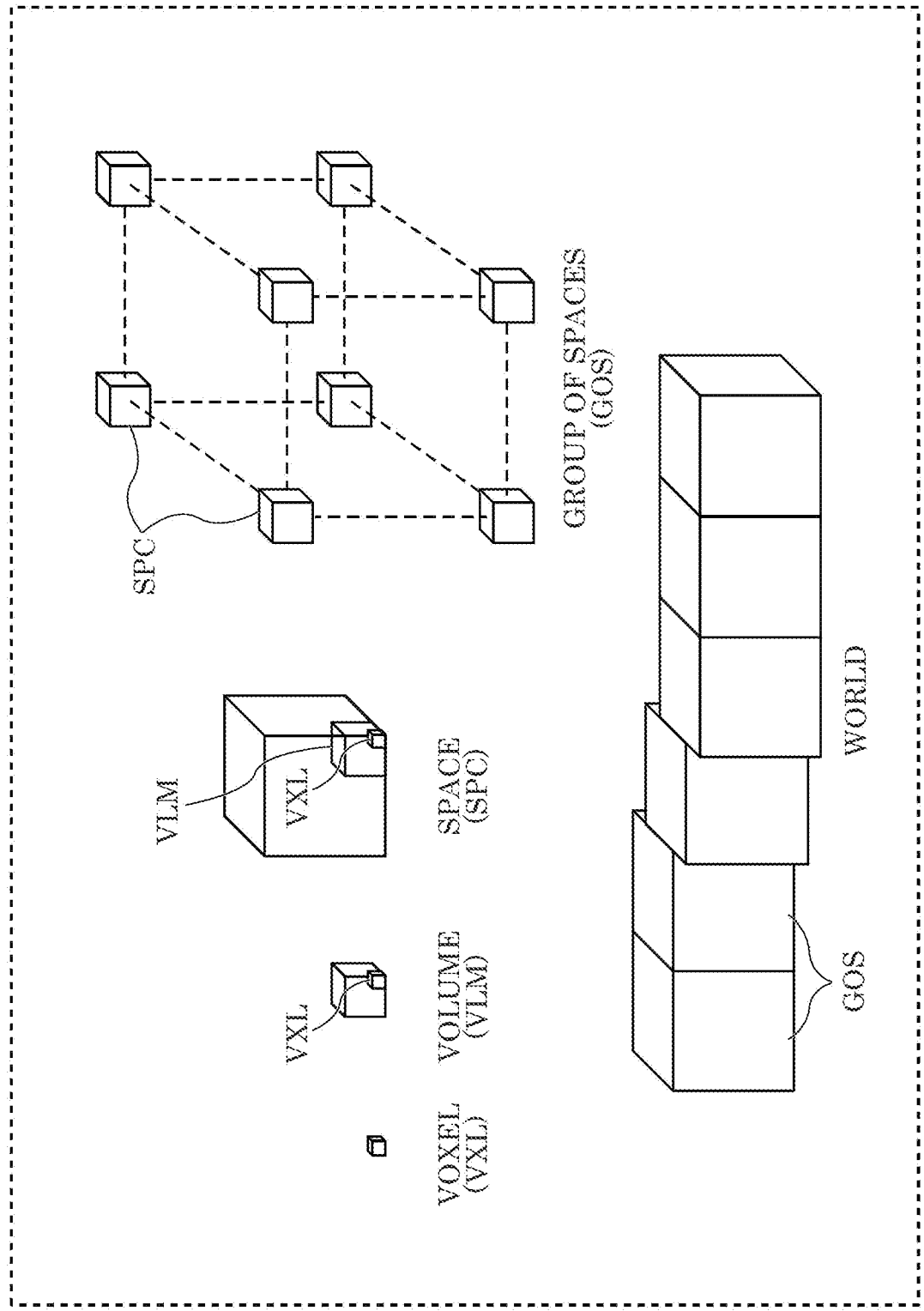
FIG. 1 is a diagram showing the structure of encoded three-dimensional data according to Embodiment 1.

A three-dimensional data encoding method according to an aspect of the present disclosure is a three-dimensional data encoding method of encoding three-dimensional points obtained by a sensor, and includes: encoding local coordinate information indicating sets of local coordinates that are coordinates of the three-dimensional points and are dependent on a location of the sensor; and generating an encoded bitstream including the local coordinate information encoded and global coordinate information indicating global coordinates that are coordinates of a reference point or at least one of the three-dimensional points and are independent from the location of the sensor.

Accordingly, since there is no need for the three-dimensional data decoding device to calculate global coordinates, it is possible to reduce the amount of processing performed by the three-dimensional data decoding device.

For example, the global coordinate information may indicate global coordinates of each of the three-dimensional points.

Accordingly, since there is no need for the three-dimensional data decoding device to calculate global coordinates, it is possible to reduce the amount of processing performed by the three-dimensional data decoding device.

For example, the global coordinate information may indicate a single set of global coordinates associated with the three-dimensional points.

Accordingly, since the data amount of the global coordinate information can be reduced, it is possible to reduce the data mount of an encoded bitstream.

For example, the global coordinate information may indicate global coordinates of an origin of a system of the local coordinates.

Accordingly, since the data amount of the global coordinate information can be reduced, it is possible to reduce the data mount of an encoded bitstream.

For example, the global coordinates may be expressed by latitude, longitude, and altitude.

For example, the global coordinates may be expressed by Cartesian coordinates.

For example, the encoded bitstream may further include information indicating whether the global coordinates are expressed by Cartesian coordinates.

For example, the encoded bitstream may further include information indicating a spatial reference of the global coordinates.

A three-dimensional data decoding method according to an aspect of the present disclosure is a three-dimensional data decoding method of decoding three-dimensional points obtained by a sensor, and includes: decoding, from an encoded bitstream, local coordinate information indicating sets of local coordinates that are coordinates of three-dimensional points and are dependent on a location of the sensor; and decoding, from the encoded bitstream, global coordinate information indicating global coordinates that are coordinates of a reference point or at least one of the three-dimensional points and are independent from the location of the sensor.

Accordingly, since there is no need for the three-dimensional data decoding device to calculate global coordinates, it is possible to reduce the amount of processing performed by the three-dimensional data decoding device.

For example, the global coordinate information may indicate global coordinates of each of the three-dimensional points.

Accordingly, since there is no need for the three-dimensional data decoding device to calculate global coordinates, it is possible to reduce the amount of processing performed by the three-dimensional data decoding device.

For example, the global coordinate information may indicate a single set of global coordinates associated with the three-dimensional points.

Accordingly, since the data amount of the global coordinate information can be reduced, it is possible to reduce the data mount of an encoded bitstream.

For example, the global coordinate information may indicate global coordinates of an origin of a system of the local coordinates.

Accordingly, since the data amount of the global coordinate information can be reduced, it is possible to reduce the data mount of an encoded bitstream.

For example, the global coordinates may be expressed by latitude, longitude, and altitude.

For example, the global coordinates may be expressed by Cartesian coordinates.

For example, the three-dimensional data decoding method may further include decoding, from the encoded bitstream, information indicating whether the global coordinates are expressed by Cartesian coordinates.

For example, the three-dimensional data decoding method may further include decoding, from the encoded bitstream, information indicating a spatial reference of the global coordinates.

A three-dimensional data encoding device according to an aspect of the present disclosure is a three-dimensional data encoding device that encodes three-dimensional points obtained by a sensor, and includes: a processor; and memory. Using the memory, the processor: encodes local coordinate information indicating sets of local coordinates that are coordinates of the three-dimensional points and are dependent on a location of the sensor; and generates an encoded bitstream including the local coordinate information encoded and global coordinate information indicating global coordinates that are coordinates of a reference point or at least one of the three-dimensional points and are independent from the location of the sensor.

Accordingly, since there is no need for the three-dimensional data decoding device to calculate global coordinates, it is possible to reduce the amount of processing performed by the three-dimensional data decoding device.

A three-dimensional data decoding device according to an aspect of the present disclosure is a three-dimensional data decoding device that decodes three-dimensional points obtained by a sensor, and includes: a processor; and memory. Using the memory, the processor: decodes, from an encoded bitstream, local coordinate information indicating sets of local coordinates that are coordinates of the three-dimensional points and are dependent on a location of the sensor; and decodes, from the encoded bitstream, global coordinate information indicating global coordinates that are coordinates of a reference point or at least one of the three-dimensional points and are independent from the location of the sensor.

Accordingly, since there is no need for the three-dimensional data decoding device to calculate global coordinates, it is possible to reduce the amount of processing performed by the three-dimensional data decoding device.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

First, the data structure of encoded three-dimensional data (hereinafter also referred to as encoded data) according to the present embodiment will be described. FIG. 1 is a diagram showing the structure of encoded three-dimensional data according to the present embodiment.

In the present embodiment, a three-dimensional space is divided into spaces (SPCs), which correspond to pictures in moving picture encoding, and the three-dimensional data is encoded on a SPC-by-SPC basis. Each SPC is further divided into volumes (VLMs), which correspond to macroblocks, etc. in moving picture encoding, and predictions and transforms are performed on a VLM-by-VLM basis. Each volume includes a plurality of voxels (VXLs), each being a minimum unit in which position coordinates are associated. Note that prediction is a process of generating predictive three-dimensional data analogous to a current processing unit by referring to another processing unit, and encoding a differential between the predictive three-dimensional data and the current processing unit, as in the case of predictions performed on two-dimensional images. Such prediction includes not only spatial prediction in which another prediction unit corresponding to the same time is referred to, but also temporal prediction in which a prediction unit corresponding to a different time is referred to.

When encoding a three-dimensional space represented by point group data such as a point cloud, for example, the three-dimensional data encoding device (hereinafter also referred to as the encoding device) encodes the points in the point group or points included in the respective voxels in a collective manner, in accordance with a voxel size. Finer voxels enable a highly-precise representation of the three-dimensional shape of a point group, while larger voxels enable a rough representation of the three-dimensional shape of a point group.

Note that the following describes the case where three-dimensional data is a point cloud, but three-dimensional data is not limited to a point cloud, and thus three-dimensional data of any format may be employed.

Also note that voxels with a hierarchical structure may be used. In such a case, when the hierarchy includes n levels, whether a sampling point is included in the n−1th level or lower levels (levels below the n-th level) may be sequentially indicated. For example, when only the n-th level is decoded, and the n−1th level or lower levels include a sampling point, the n-th level can be decoded on the assumption that a sampling point is included at the center of a voxel in the n-th level.

Also, the encoding device obtains point group data, using, for example, a distance sensor, a stereo camera, a monocular camera, a gyroscope sensor, or an inertial sensor.

As in the case of moving picture encoding, each SPC is classified into one of at least the three prediction structures that include: intra SPC (I-SPC), which is individually decodable; predictive SPC (P-SPC) capable of only a unidirectional reference; and bidirectional SPC (B-SPC) capable of bidirectional references. Each SPC includes two types of time information: decoding time and display time.

Furthermore, as shown in FIG. 1, a processing unit that includes a plurality of SPCs is a group of spaces (GOS), which is a random access unit. Also, a processing unit that includes a plurality of GOSs is a world (WLD).

The spatial region occupied by each world is associated with an absolute position on earth, by use of, for example, GPS, or latitude and longitude information. Such position information is stored as meta-information. Note that meta-information may be included in encoded data, or may be transmitted separately from the encoded data.

Also, inside a GOS, all SPCs may be three-dimensionally adjacent to one another, or there may be a SPC that is not three-dimensionally adjacent to another SPC.

Note that the following also describes processes such as encoding, decoding, and reference to be performed on three-dimensional data included in processing units such as GOS, SPC, and VLM, simply as performing encoding/to encode, decoding/to decode, referring to, etc. on a processing unit. Also note that three-dimensional data included in a processing unit includes, for example, at least one pair of a spatial position such as three-dimensional coordinates and an attribute value such as color information.

Next, the prediction structures among SPCs in a GOS will be described. A plurality of SPCs in the same GOS or a plurality of VLMs in the same SPC occupy mutually different spaces, while having the same time information (the decoding time and the display time).

A SPC in a GOS that comes first in the decoding order is an I-SPC. GOSs come in two types: closed GOS and open GOS. A closed GOS is a GOS in which all SPCs in the GOS are decodable when decoding starts from the first I-SPC. Meanwhile, an open GOS is a GOS in which a different GOS is referred to in one or more SPCs preceding the first I-SPC in the GOS in the display time, and thus cannot be singly decoded.

Note that in the case of encoded data of map information, for example, a WLD is sometimes decoded in the backward direction, which is opposite to the encoding order, and thus backward reproduction is difficult when GOSs are interdependent. In such a case, a closed GOS is basically used.

Each GOS has a layer structure in height direction, and SPCs are sequentially encoded or decoded from SPCs in the bottom layer.

Figure 2:
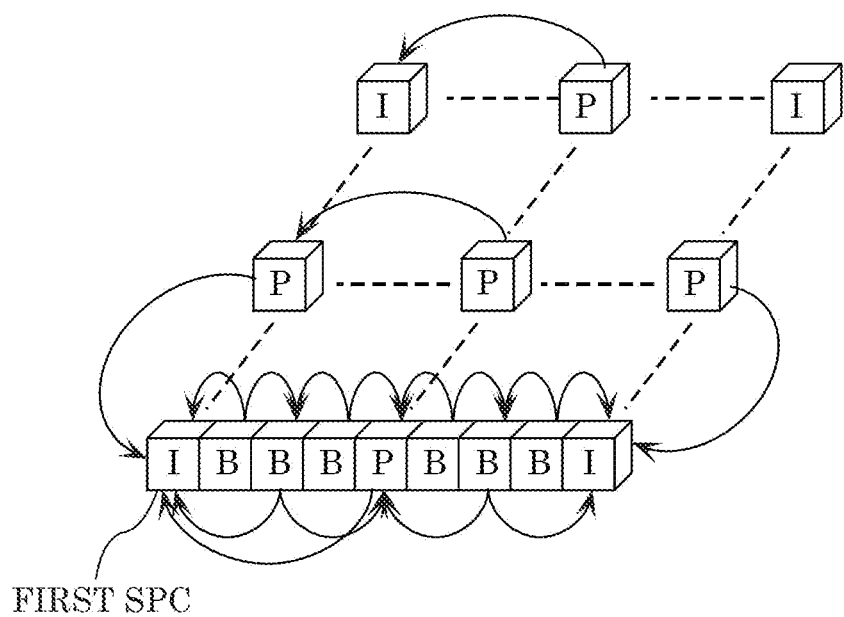
FIG. 2 is a diagram showing an example of prediction structures among SPCs that belong to the lowermost layer in a GOS according to Embodiment 1.
Figure 3:
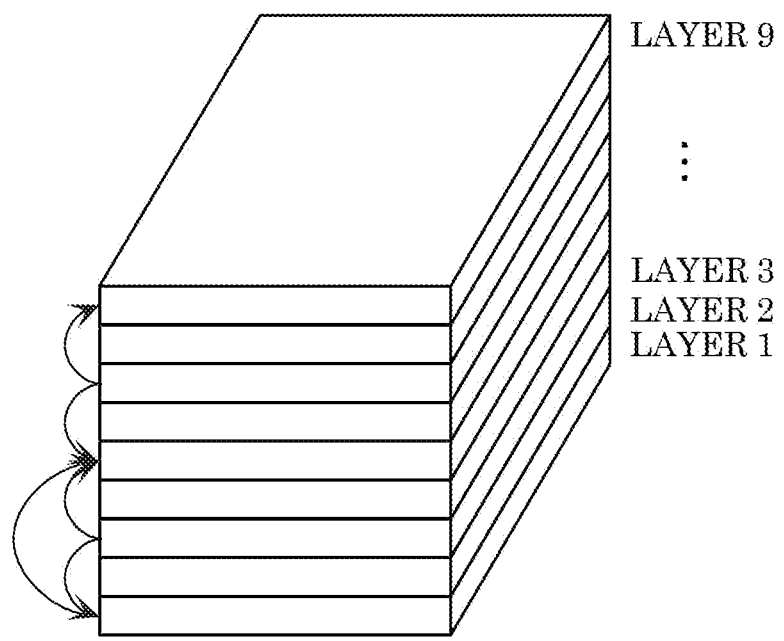
FIG. 3 is a diagram showing an example of prediction structures among layers according to Embodiment 1.

FIG. 2 is a diagram showing an example of prediction structures among SPCs that belong to the lowermost layer in a GOS. FIG. 3 is a diagram showing an example of prediction structures among layers.

A GOS includes at least one I-SPC. Of the objects in a three-dimensional space, such as a person, an animal, a car, a bicycle, a signal, and a building serving as a landmark, a small-sized object is especially effective when encoded as an I-SPC. When decoding a GOS at a low throughput or at a high speed, for example, the three-dimensional data decoding device (hereinafter also referred to as the decoding device) decodes only I-SPC(s) in the GOS.

The encoding device may also change the encoding interval or the appearance frequency of I-SPCs, depending on the degree of sparseness and denseness of the objects in a WLD.

In the structure shown in FIG. 3, the encoding device or the decoding device encodes or decodes a plurality of layers sequentially from the bottom layer (layer 1). This increases the priority of data on the ground and its vicinity, which involve a larger amount of information, when, for example, a self-driving car is concerned.

Regarding encoded data used for a drone, for example, encoding or decoding may be performed sequentially from SPCs in the top layer in a GOS in height direction.

The encoding device or the decoding device may also encode or decode a plurality of layers in a manner that the decoding device can have a rough grasp of a GOS first, and then the resolution is gradually increased. The encoding device or the decoding device may perform encoding or decoding in the order of layers 3, 8, 1, 9 . . . , for example.

Next, the handling of static objects and dynamic objects will be described.

A three-dimensional space includes scenes or still objects such as a building and a road (hereinafter collectively referred to as static objects), and objects with motion such as a car and a person (hereinafter collectively referred to as dynamic objects). Object detection is separately performed by for example, extracting keypoints from point cloud data, or from video of a camera such as a stereo camera. In this description, an example method of encoding a dynamic object will be described.

A first method is a method in which a static object and a dynamic object are encoded without distinction. A second method is a method in which a distinction is made between a static object and a dynamic object on the basis of identification information.

For example, a GOS is used as an identification unit. In such a case, a distinction is made between a GOS that includes SPCs constituting a static object and a GOS that includes SPCs constituting a dynamic object, on the basis of identification information stored in the encoded data or stored separately from the encoded data.

Alternatively, a SPC may be used as an identification unit. In such a case, a distinction is made between a SPC that includes VLMs constituting a static object and a SPC that includes VLMs constituting a dynamic object, on the basis of the identification information thus described.

Alternatively, a VLM or a VXL may be used as an identification unit. In such a case, a distinction is made between a VLM or a VXL that includes a static object and a VLM or a VXL that includes a dynamic object, on the basis of the identification information thus described.

The encoding device may also encode a dynamic object as at least one VLM or SPC, and may encode a VLM or a SPC including a static object and a SPC including a dynamic object as mutually different GOSs. When the GOS size is variable depending on the size of a dynamic object, the encoding device separately stores the GOS size as meta-information.

The encoding device may also encode a static object and a dynamic object separately from each other, and may superimpose the dynamic object onto a world constituted by static objects. In such a case, the dynamic object is constituted by at least one SPC, and each SPC is associated with at least one SPC constituting the static object onto which the each SPC is to be superimposed. Note that a dynamic object may be represented not by SPC(s) but by at least one VLM or VXL.

The encoding device may also encode a static object and a dynamic object as mutually different streams.

The encoding device may also generate a GOS that includes at least one SPC constituting a dynamic object. The encoding device may further set the size of a GOS including a dynamic object (GOS_M) and the size of a GOS including a static object corresponding to the spatial region of GOS_M at the same size (such that the same spatial region is occupied). This enables superimposition to be performed on a GOS-by-GOS basis.

SPC(s) included in another encoded GOS may be referred to in a P-SPC or a B-SPC constituting a dynamic object. In the case where the position of a dynamic object temporally changes, and the same dynamic object is encoded as an object in a GOS corresponding to a different time, referring to SPC(s) across GOSs is effective in terms of compression rate.

The first method and the second method may be selected in accordance with the intended use of encoded data. When encoded three-dimensional data is used as a map, for example, a dynamic object is desired to be separated, and thus the encoding device uses the second method. Meanwhile, the encoding device uses the first method when the separation of a dynamic object is not required such as in the case where three-dimensional data of an event such as a concert and a sports event is encoded.

The decoding time and the display time of a GOS or a SPC are storable in encoded data or as meta-information. All static objects may have the same time information. In such a case, the decoding device may determine the actual decoding time and display time. Alternatively, a different value may be assigned to each GOS or SPC as the decoding time, and the same value may be assigned as the display time. Furthermore, as in the case of the decoder model in moving picture encoding such as Hypothetical Reference Decoder (HRD) compliant with HEVC, a model may be employed that ensures that a decoder can perform decoding without fail by having a buffer of a predetermined size and by reading a bitstream at a predetermined bit rate in accordance with the decoding times.

Figure 4:
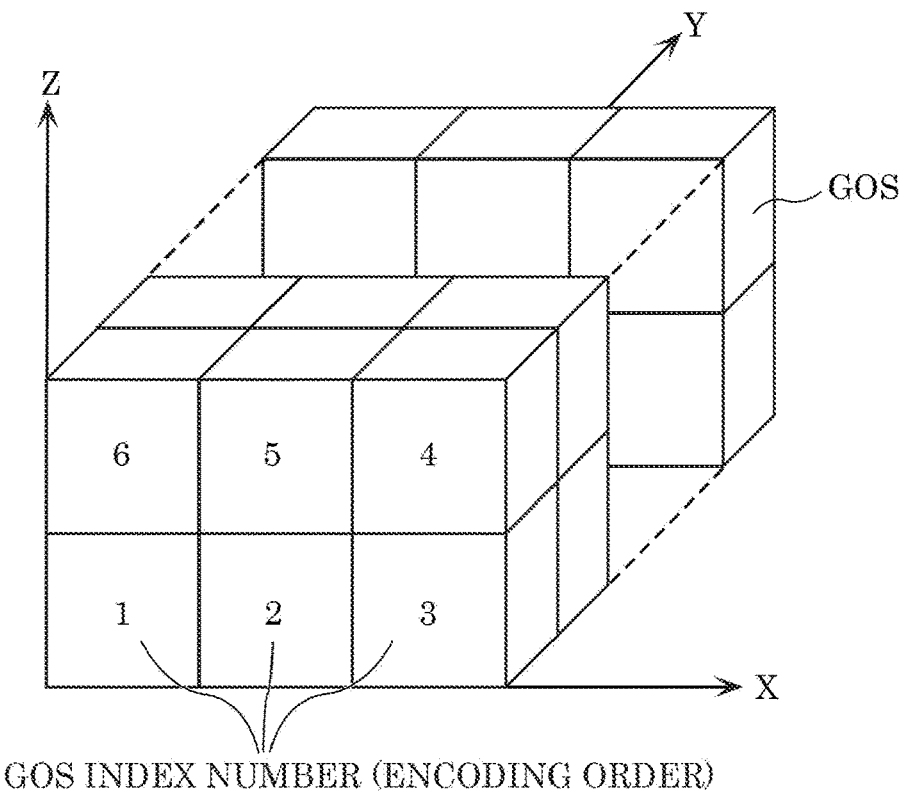
FIG. 4 is a diagram showing an example order of encoding GOSs according to Embodiment 1.

Next, the topology of GOSs in a world will be described. The coordinates of the three-dimensional space in a world are represented by the three coordinate axes (x axis, y axis, and z axis) that are orthogonal to one another. A predetermined rule set for the encoding order of GOSs enables encoding to be performed such that spatially adjacent GOSs are contiguous in the encoded data. In an example shown in FIG. 4, for example, GOSs in the x and z planes are successively encoded. After the completion of encoding all GOSs in certain x and z planes, the value of the y axis is updated. Stated differently the world expands in the y axis direction as the encoding progresses. The GOS index numbers are set in accordance with the encoding order.

Here, the three-dimensional spaces in the respective worlds are previously associated one-to-one with absolute geographical coordinates such as GPS coordinates or latitude/longitude coordinates. Alternatively, each three-dimensional space may be represented as a position relative to a previously set reference position. The directions of the x axis, the y axis, and the z axis in the three-dimensional space are represented by directional vectors that are determined on the basis of the latitudes and the longitudes, etc. Such directional vectors are stored together with the encoded data as meta-information.

GOSs have a fixed size, and the encoding device stores such size as meta-information. The GOS size may be changed depending on, for example, whether it is an urban area or not, or whether it is inside or outside of a room. Stated differently, the GOS size may be changed in accordance with the amount or the attributes of objects with information values. Alternatively, in the same world, the encoding device may adaptively change the GOS size or the interval between I-SPCs in GOSs in accordance with the object density, etc. For example, the encoding device sets the GOS size to smaller and the interval between I-SPCs in GOSs to shorter, as the object density is higher.

Figure 5:
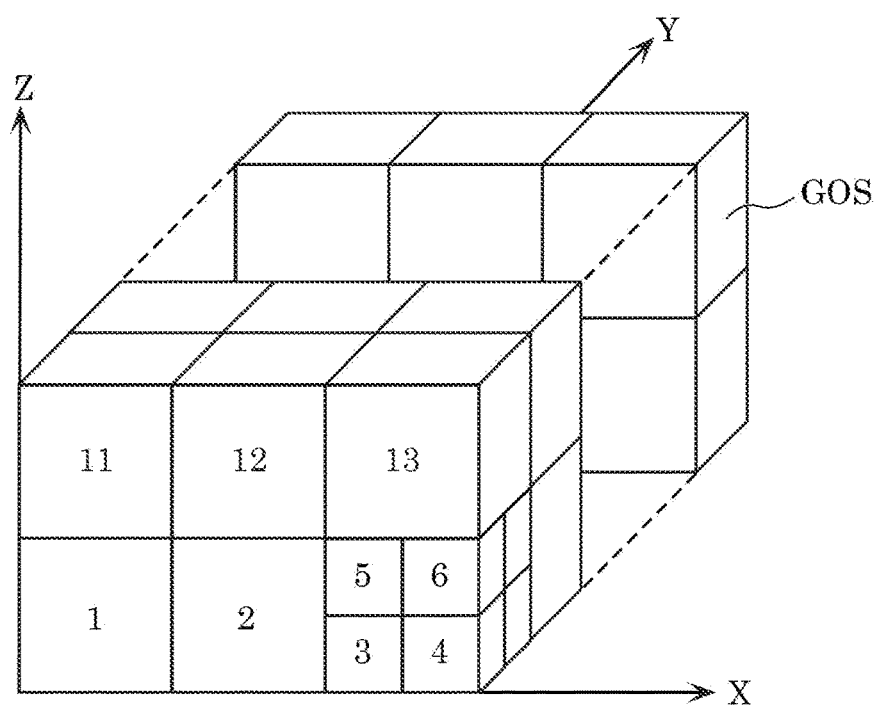
FIG. 5 is a diagram showing an example order of encoding GOSs according to Embodiment 1.

In an example shown in FIG. 5, to enable random access with a finer granularity, a GOS with a high object density is partitioned into the regions of the third to tenth GOSs. Note that the seventh to tenth GOSs are located behind the third to sixth GOSs.

Figure 6:
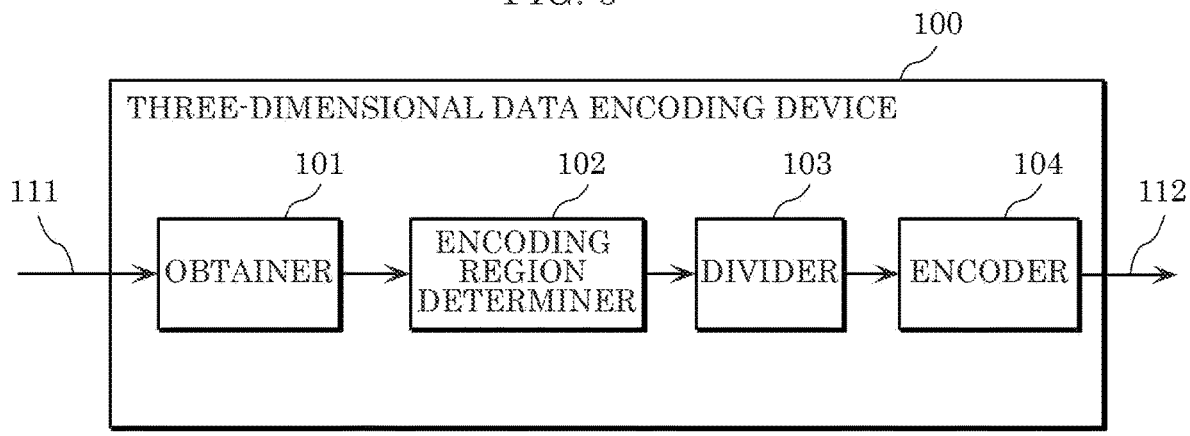
FIG. 6 is a block diagram of a three-dimensional data encoding device according to Embodiment 1.
Figure 7:
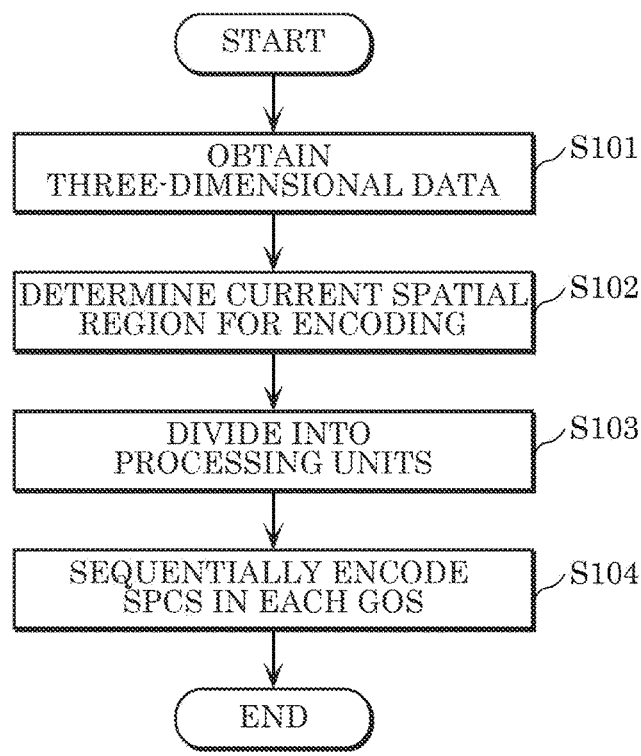
FIG. 7 is a flowchart of encoding processes according to Embodiment 1.

Next, the structure and the operation flow of the three-dimensional data encoding device according to the present embodiment will be described. FIG. 6 is a block diagram of three-dimensional data encoding device 100 according to the present embodiment. FIG. 7 is a flowchart of an example operation performed by three-dimensional data encoding device 100.

Three-dimensional data encoding device 100 shown in FIG. 6 encodes three-dimensional data 111, thereby generating encoded three-dimensional data 112. Such three-dimensional data encoding device 100 includes obtainer 101, encoding region determiner 102, divider 103, and encoder 104.

As shown in FIG. 7, first, obtainer 101 obtains three-dimensional data 111, which is point group data (S101).

Next, encoding region determiner 102 determines a current region for encoding from among spatial regions corresponding to the obtained point group data (S102). For example, in accordance with the position of a user or a vehicle, encoding region determiner 102 determines, as the current region, a spatial region around such position.

Next, divider 103 divides the point group data included in the current region into processing units. The processing units here means units such as GOSs and SPCs described above. The current region here corresponds to, for example, a world described above. More specifically, divider 103 divides the point group data into processing units on the basis of a predetermined GOS size, or the presence/absence/size of a dynamic object (S103). Divider 103 further determines the starting position of the SPC that comes first in the encoding order in each GOS.

Next, encoder 104 sequentially encodes a plurality of SPCs in each GOS, thereby generating encoded three-dimensional data 112 (S104).

Note that although an example is described here in which the current region is divided into GOSs and SPCs, after which each GOS is encoded, the processing steps are not limited to this order. For example, steps may be employed in which the structure of a single GOS is determined, which is followed by the encoding of such GOS, and then the structure of the subsequent GOS is determined.

As thus described, three-dimensional data encoding device 100 encodes three-dimensional data 111, thereby generating encoded three-dimensional data 112. More specifically three-dimensional data encoding device 100 divides three-dimensional data into first processing units (GOSs), each being a random access unit and being associated with three-dimensional coordinates, divides each of the first processing units (GOSs) into second processing units (SPCs), and divides each of the second processing units (SPCs) into third processing units (VLMs). Each of the third processing units (VLMs) includes at least one voxel (VXL), which is the minimum unit in which position information is associated.

Next, three-dimensional data encoding device 100 encodes each of the first processing units (GOSs), thereby generating encoded three-dimensional data 112. More specifically, three-dimensional data encoding device 100 encodes each of the second processing units (SPCs) in each of the first processing units (GOSs). Three-dimensional data encoding device 100 further encodes each of the third processing units (VLMs) in each of the second processing units (SPCs).

When a current first processing unit (GOS) is a closed GOS, for example, three-dimensional data encoding device 100 encodes a current second processing unit (SPC) included in such current first processing unit (COS) by referring to another second processing unit (SPC) included in the current first processing unit (GOS). Stated differently three-dimensional data encoding device 100 refers to no second processing unit (SPC) included in a first processing unit (GOS) that is different from the current first processing unit (GOS).

Meanwhile, when a current first processing unit (GOS) is an open GOS, three-dimensional data encoding device 100 encodes a current second processing unit (SPC) included in such current first processing unit (OS) by referring to another second processing unit (SPC) included in the current first processing unit (GOS) or a second processing unit (SPC) included in a first processing unit (GOS) that is different from the current first processing unit (GOS).

Also, three-dimensional data encoding device 100 selects, as the type of a current second processing unit (SPC), one of the following: a first type (I-SPC) in which another second processing unit (SPC) is not referred to; a second type (P-SPC) in which another single second processing unit (SPC) is referred to; and a third type in which other two second processing units (SPC) are referred to. Three-dimensional data encoding device 100 encodes the current second processing unit (SPC) in accordance with the selected type.

Figure 8:
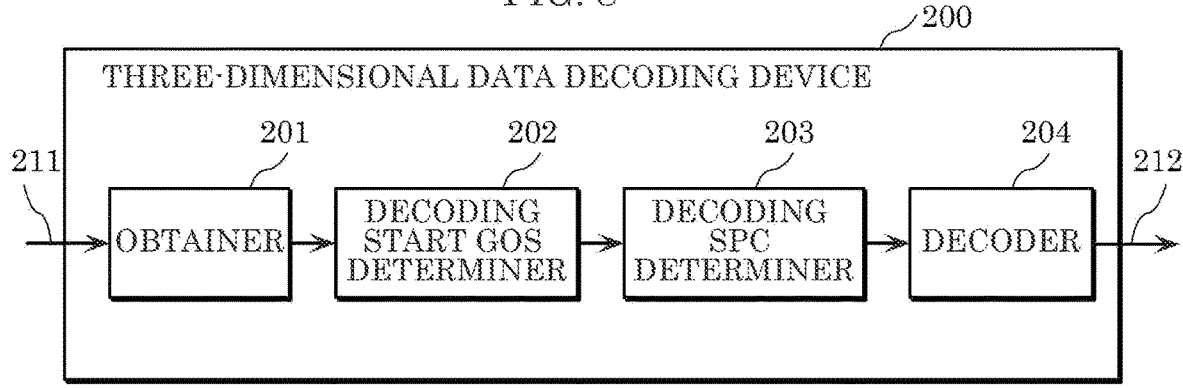
FIG. 8 is a block diagram of a three-dimensional data decoding device according to Embodiment 1.

Next, the structure and the operation flow of the three-dimensional data decoding device according to the present embodiment will be described. FIG. 8 is a block diagram of three-dimensional data decoding device 200 according to the present embodiment. FIG. 9 is a flowchart of an example operation performed by three-dimensional data decoding device 200.

Three-dimensional data decoding device 200 shown in FIG. 8 decodes encoded three-dimensional data 211, thereby generating decoded three-dimensional data 212. Encoded three-dimensional data 211 here is, for example, encoded three-dimensional data 112 generated by three-dimensional data encoding device 100. Such three-dimensional data decoding device 200 includes obtainer 201, decoding start GOS determiner 202, decoding SPC determiner 203, and decoder 204.

First, obtainer 201 obtains encoded three-dimensional data 211 (S201). Next, decoding start GOS determiner 202 determines a current GOS for decoding (S202). More specifically, decoding start GOS determiner 202 refers to meta-information stored in encoded three-dimensional data 211 or stored separately from the encoded three-dimensional data to determine, as the current GOS, a GOS that includes a SPC corresponding to the spatial position, the object, or the time from which decoding is to start.

Next, decoding SPC determiner 203 determines the type(s) (I, P, and/or B) of SPCs to be decoded in the GOS (S203). For example, decoding SPC determiner 203 determines whether to (1) decode only I-SPC(s), (2) to decode I-SPC(s) and P-SPCs, or (3) to decode SPCs of all types. Note that the present step may not be performed, when the type(s) of SPCs to be decoded are previously determined such as when all SPCs are previously determined to be decoded.

Next, decoder 204 obtains an address location within encoded three-dimensional data 211 from which a SPC that comes first in the GOS in the decoding order (the same as the encoding order) starts. Decoder 204 obtains the encoded data of the first SPC from the address location, and sequentially decodes the SPCs from such first SPC (204). Note that the address location is stored in the meta-information, etc.

Three-dimensional data decoding device 200 decodes decoded three-dimensional data 212 as thus described. More specifically, three-dimensional data decoding device 200 decodes each encoded three-dimensional data 211 of the first processing units (GOSs), each being a random access unit and being associated with three-dimensional coordinates, thereby generating decoded three-dimensional data 212 of the first processing units (GOSs). Even more specifically, three-dimensional data decoding device 200 decodes each of the second processing units (SPCs) in each of the first processing units (GOSs). Three-dimensional data decoding device 200 further decodes each of the third processing units (VLMs) in each of the second processing units (SPCs).

The following describes meta-information for random access. Such meta-information is generated by three-dimensional data encoding device 100, and included in encoded three-dimensional data 112 (211).

In the conventional random access for a two-dimensional moving picture, decoding starts from the first frame in a random access unit that is close to a specified time. Meanwhile, in addition to times, random access to spaces (coordinates, objects, etc.) is assumed to be performed in a world.

To enable random access to at least three elements of coordinates, objects, and times, tables are prepared that associate the respective elements with the GOS index numbers. Furthermore, the GOS index numbers are associated with the addresses of the respective first I-SPCs in the GOSs. FIG. 10 is a diagram showing example tables included in the meta-information. Note that not all the tables shown in FIG. 10 are required to be used, and thus at least one of the tables is used.

The following describes an example in which random access is performed from coordinates as a starting point. To access the coordinates (x2, y2, and z2), the coordinates-GOS table is first referred to, which indicates that the point corresponding to the coordinates (x2, y2, and z2) is included in the second GOS. Next, the GOS-address table is referred to, which indicates that the address of the first I-SPC in the second GOS is addr(2). As such, decoder 204 obtains data from this address to start decoding.

Note that the addresses may either be logical addresses or physical addresses of an HDD or a memory. Alternatively, information that identifies file segments may be used instead of addresses. File segments are, for example, units obtained by segmenting at least one GOS, etc.

When an object spans across a plurality of GOSs, the object-GOS table may show a plurality of GOSs to which such object belongs. When such plurality of GOSs are closed GOSs, the encoding device and the decoding device can perform encoding or decoding in parallel. Meanwhile, when such plurality of GOSs are open GOSs, a higher compression efficiency is achieved by the plurality of GOSs referring to each other.

Example objects include a person, an animal, a car, a bicycle, a signal, and a building serving as a landmark. For example, three-dimensional data encoding device 100 extracts keypoints specific to an object from a three-dimensional point cloud, etc., when encoding a world, and detects the object on the basis of such keypoints to set the detected object as a random access point.

As thus described, three-dimensional data encoding device 100 generates first information indicating a plurality of first processing units (GOSs) and the three-dimensional coordinates associated with the respective first processing units (GOSs). Encoded three-dimensional data 112 (211) includes such first information. The first information further indicates at least one of objects, times, and data storage locations that are associated with the respective first processing units (GOSs).

Three-dimensional data decoding device 200 obtains the first information from encoded three-dimensional data 211. Using such first information, three-dimensional data decoding device 200 identifies encoded three-dimensional data 211 of the first processing unit that corresponds to the specified three-dimensional coordinates, object, or time, and decodes encoded three-dimensional data 211.

The following describes an example of other meta-information. In addition to the meta-information for random access, three-dimensional data encoding device 100 may also generate and store meta-information as described below, and three-dimensional data decoding device 200 may use such meta-information at the time of decoding.

When three-dimensional data is used as map information, for example, a profile is defined in accordance with the intended use, and information indicating such profile may be included in meta-information. For example, a profile is defined for an urban or a suburban area, or for a flying object, and the maximum or minimum size, etc. of a world, a SPC or a VLM, etc. is defined in each profile. For example, more detailed information is required for an urban area than for a suburban area, and thus the minimum VLM size is set to small.

The meta-information may include tag values indicating object types. Each of such tag values is associated with VLMs, SPCs, or GOSs that constitute an object. For example, a tag value may be set for each object type in a manner, for example, that the tag value "0" indicates "person," the tag value "1" indicates "car," and the tag value "2" indicates "signal". Alternatively, when an object type is hard to judge, or such judgment is not required, a tag value may be used that indicates the size or the attribute indicating, for example, whether an object is a dynamic object or a static object.

The meta-information may also include information indicating a range of the spatial region occupied by a world.

The meta-information may also store the SPC or VXL size as header information common to the whole stream of the encoded data or to a plurality of SPCs, such as SPCs in a GOS.

The meta-information may also include identification information on a distance sensor or a camera that has been used to generate a point cloud, or information indicating the positional accuracy of a point group in the point cloud.

The meta-information may also include information indicating whether a world is made only of static objects or includes a dynamic object.

The following describes variations of the present embodiment.

The encoding device or the decoding device may encode or decode two or more mutually different SPCs or GOSs in parallel. GOSs to be encoded or decoded in parallel can be determined on the basis of meta-information, etc. indicating the spatial positions of the GOSs.

When three-dimensional data is used as a spatial map for use by a car or a flying object, etc. in traveling, or for creation of such a spatial map, for example, the encoding device or the decoding device may encode or decode GOSs or SPCs included in a space that is identified on the basis of GPS information, the route information, the zoom magnification, etc.

The decoding device may also start decoding sequentially from a space that is close to the self-location or the traveling route. The encoding device or the decoding device may give a lower priority to a space distant from the self-location or the traveling route than the priority of a nearby space to encode or decode such distant place. To "give a lower priority" means here, for example, to lower the priority in the processing sequence, to decrease the resolution (to apply decimation in the processing), or to lower the image quality (to increase the encoding efficiency by, for example, setting the quantization step to larger).

When decoding encoded data that is hierarchically encoded in a space, the decoding device may decode only the bottom layer in the hierarchy.

The decoding device may also start decoding preferentially from the bottom layer of the hierarchy in accordance with the zoom magnification or the intended use of the map.

For self-location estimation or object recognition, etc. involved in the self-driving of a car or a robot, the encoding device or the decoding device may encode or decode regions at a lower resolution, except for a region that is lower than or at a specified height from the ground (the region to be recognized).

The encoding device may also encode point clouds representing the spatial shapes of a room interior and a room exterior separately. For example, the separation of a GOS representing a room interior (interior GOS) and a GOS representing a room exterior (exterior GOS) enables the decoding device to select a GOS to be decoded in accordance with a viewpoint location, when using the encoded data.

The encoding device may also encode an interior GOS and an exterior GOS having close coordinates so that such GOSs come adjacent to each other in an encoded stream. For example, the encoding device associates the identifiers of such GOSs with each other, and stores information indicating the associated identifiers into the meta-information that is stored in the encoded stream or stored separately. This enables the decoding device to refer to the information in the meta-information to identify an interior GOS and an exterior GOS having close coordinates.

The encoding device may also change the GOS size or the SPC size depending on whether a GOS is an interior GOS or an exterior GOS. For example, the encoding device sets the size of an interior GOS to smaller than the size of an exterior GOS. The encoding device may also change the accuracy of extracting keypoints from a point cloud, or the accuracy of detecting objects, for example, depending on whether a GOS is an interior GOS or an exterior GOS.

The encoding device may also add, to encoded data, information by which the decoding device displays objects with a distinction between a dynamic object and a static object. This enables the decoding device to display a dynamic object together with, for example, a red box or letters for explanation. Note that the decoding device may display only a red box or letters for explanation, instead of a dynamic object. The decoding device may also display more particular object types. For example, a red box may be used for a car, and a yellow box may be used for a person.

The encoding device or the decoding device may also determine whether to encode or decode a dynamic object and a static object as a different SPC or GOS, in accordance with, for example, the appearance frequency of dynamic objects or a ratio between static objects and dynamic objects. For example, when the appearance frequency or the ratio of dynamic objects exceeds a threshold, a SPC or a GOS including a mixture of a dynamic object and a static object is accepted, while when the appearance frequency or the ratio of dynamic objects is below a threshold, a SPC or GOS including a mixture of a dynamic object and a static object is unaccepted.

When detecting a dynamic object not from a point cloud but from two-dimensional image information of a camera, the encoding device may separately obtain information for identifying a detection result (box or letters) and the object position, and encode these items of information as part of the encoded three-dimensional data. In such a case, the decoding device superimposes auxiliary information (box or letters) indicating the dynamic object onto a resultant of decoding a static object to display it.

The encoding device may also change the sparseness and denseness of VXLs or VLMs in a SPC in accordance with the degree of complexity of the shape of a static object. For example, the encoding device sets VXLs or VLMs at a higher density as the shape of a static object is more complex. The encoding device may further determine a quantization step, etc. for quantizing spatial positions or color information in accordance with the sparseness and denseness of VXLs or VLMs. For example, the encoding device sets the quantization step to smaller as the density of VXLs or VLMs is higher.

As described above, the encoding device or the decoding device according to the present embodiment encodes or decodes a space on a SPC-by-SPC basis that includes coordinate information.

Furthermore, the encoding device and the decoding device perform encoding or decoding on a volume-by-volume basis in a SPC. Each volume includes a voxel, which is the minimum unit in which position information is associated.

Also, using a table that associates the respective elements of spatial information including coordinates, objects, and times with GOSs or using a table that associates these elements with each other, the encoding device and the decoding device associate any ones of the elements with each other to perform encoding or decoding. The decoding device uses the values of the selected elements to determine the coordinates, and identifies a volume, a voxel, or a SPC from such coordinates to decode a SPC including such volume or voxel, or the identified SPC.

Furthermore, the encoding device determines a volume, a voxel, or a SPC that is selectable in accordance with the elements, through extraction of keypoints and object recognition, and encodes the determined volume, voxel, or SPC, as a volume, a voxel, or a SPC to which random access is possible.

SPCs are classified into three types: I-SPC that is singly encodable or decodable; P-SPC that is encoded or decoded by referring to any one of the processed SPCs; and B-SPC that is encoded or decoded by referring to any two of the processed SPCs.

At least one volume corresponds to a static object or a dynamic object. A SPC including a static object and a SPC including a dynamic object are encoded or decoded as mutually different GOSs. Stated differently, a SPC including a static object and a SPC including a dynamic object are assigned to different GOSs.

Dynamic objects are encoded or decoded on an object-by-object basis, and are associated with at least one SPC including a static object. Stated differently a plurality of dynamic objects are individually encoded, and the obtained encoded data of the dynamic objects is associated with a SPC including a static object.

The encoding device and the decoding device give an increased priority to I-SPC(s) in a GOS to perform encoding or decoding. For example, the encoding device performs encoding in a manner that prevents the degradation of I-SPCs (in a manner that enables the original three-dimensional data to be reproduced with a higher fidelity after decoded). The decoding device decodes, for example, only I-SPCs.

The encoding device may change the frequency of using I-SPCs depending on the sparseness and denseness or the number (amount) of the objects in a world to perform encoding. Stated differently, the encoding device changes the frequency of selecting I-SPCs depending on the number or the sparseness and denseness of the objects included in the three-dimensional data. For example, the encoding device uses I-SPCs at a higher frequency as the density of the objects in a world is higher.

The encoding device also sets random access points on a GOS-by-GOS basis, and stores information indicating the spatial regions corresponding to the GOSs into the header information.

The encoding device uses, for example, a default value as the spatial size of a GOS. Note that the encoding device may change the GOS size depending on the number (amount) or the sparseness and denseness of objects or dynamic objects. For example, the encoding device sets the spatial size of a GOS to smaller as the density of objects or dynamic objects is higher or the number of objects or dynamic objects is greater.

Also, each SPC or volume includes a keypoint group that is derived by use of information obtained by a sensor such as a depth sensor, a gyroscope sensor, or a camera sensor. The coordinates of the keypoints are set at the central positions of the respective voxels. Furthermore, finer voxels enable highly accurate position information.

The keypoint group is derived by use of a plurality of pictures. A plurality of pictures include at least two types of time information: the actual time information and the same time information common to a plurality of pictures that are associated with SPCs (for example, the encoding time used for rate control, etc.).

Also, encoding or decoding is performed on a GOS-by-GOS basis that includes at least one SPC.

The encoding device and the decoding device predict P-SPCs or B-SPCs in a current GOS by referring to SPCs in a processed GOS.

Alternatively, the encoding device and the decoding device predict P-SPCs or B-SPCs in a current GOS, using the processed SPCs in the current GOS, without referring to a different GOS.

Furthermore, the encoding device and the decoding device transmit or receive an encoded stream on a world-by-world basis that includes at least one GOS.

Also, a GOS has a layer structure in one direction at least in a world, and the encoding device and the decoding device start encoding or decoding from the bottom layer. For example, a random accessible GOS belongs to the lowermost layer. A GOS that belongs to the same layer or a lower layer is referred to in a GOS that belongs to an upper layer. Stated differently, a GOS is spatially divided in a predetermined direction in advance to have a plurality of layers, each including at least one SPC. The encoding device and the decoding device encode or decode each SPC by referring to a SPC included in the same layer as the each SPC or a SPC included in a layer lower than that of the each SPC.

Also, the encoding device and the decoding device successively encode or decode GOSs on a world-by-world basis that includes such GOSs. In so doing, the encoding device and the decoding device write or read out information indicating the order (direction) of encoding or decoding as metadata. Stated differently, the encoded data includes information indicating the order of encoding a plurality of GOSs.

The encoding device and the decoding device also encode or decode mutually different two or more SPCs or GOSs in parallel.

Furthermore, the encoding device and the decoding device encode or decode the spatial information (coordinates, size, etc.) on a SPC or a GOS.

The encoding device and the decoding device encode or decode SPCs or GOSs included in an identified space that is identified on the basis of external information on the self-location or/and region size, such as GPS information, route information, or magnification.

The encoding device or the decoding device gives a lower priority to a space distant from the self-location than the priority of a nearby space to perform encoding or decoding.

The encoding device sets a direction at one of the directions in a world, in accordance with the magnification or the intended use, to encode a GOS having a layer structure in such direction. Also, the decoding device decodes a GOS having a layer structure in one of the directions in a world that has been set in accordance with the magnification or the intended use, preferentially from the bottom layer.

The encoding device changes the accuracy of extracting keypoints, the accuracy of recognizing objects, or the size of spatial regions, etc. included in a SPC, depending on whether an object is an interior object or an exterior object. Note that the encoding device and the decoding device encode or decode an interior GOS and an exterior GOS having close coordinates in a manner that these GOSs come adjacent to each other in a world, and associate their identifiers with each other for encoding and decoding.

Embodiment 2

When using encoded data of a point cloud in an actual device or service, it is desirable that necessary information be transmitted/received in accordance with the intended use to reduce the network bandwidth. However, there has been no such functionality in the structure of encoding three-dimensional data, nor an encoding method therefor.

The present embodiment describes a three-dimensional data encoding method and a three-dimensional data encoding device for providing the functionality of transmitting/receiving only necessary information in encoded data of a three-dimensional point cloud in accordance with the intended use, as well as a three-dimensional data decoding method and a three-dimensional data decoding device for decoding such encoded data.

Figure 11:
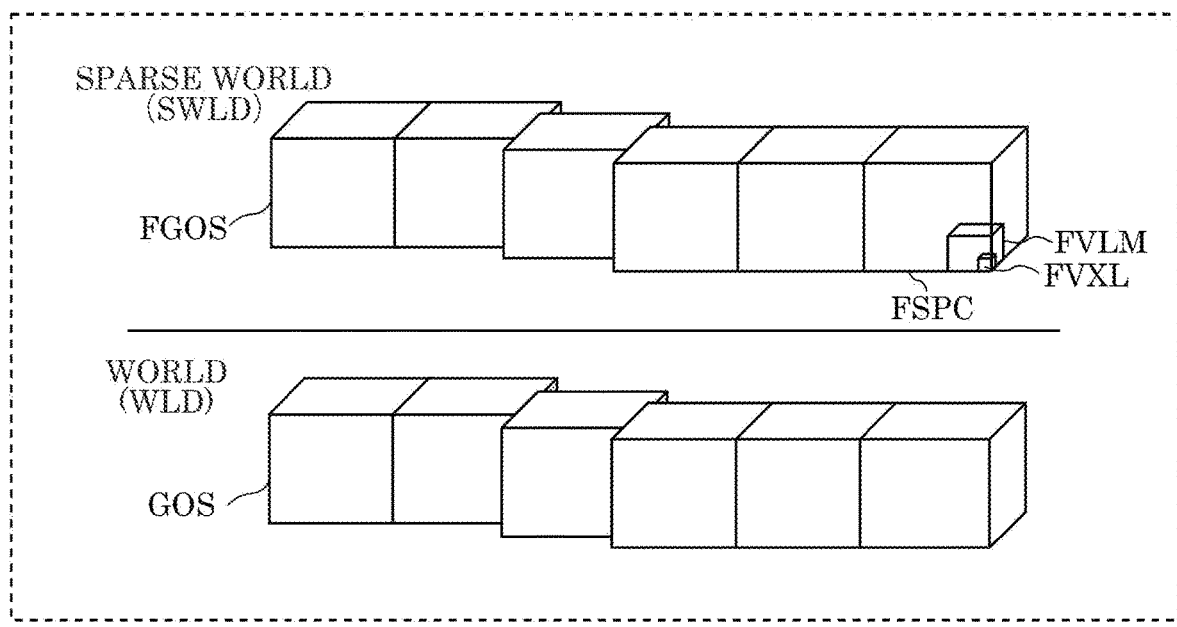
FIG. 11 is a diagram showing an example structure of a SWLD according to Embodiment 2.

A voxel (VXL) with a feature greater than or equal to a given amount is defined as a feature voxel (FVXL), and a world (WLD) constituted by FVXLs is defined as a sparse world (SWLD). FIG. 11 is a diagram showing example structures of a sparse world and a world. A SWLD includes: FGOSs, each being a GOS constituted by FVXLs; FSPCs, each being a SPC constituted by FVXLs; and FVLMs, each being a VLM constituted by FVXLs. The data structure and prediction structure of a FGOS, a FSPC, and a FVLM may be the same as those of a GOS, a SPC, and a VLM.

A feature represents the three-dimensional position information on a VXL or the visible-light information on the position of a VXL. A large number of features are detected especially at a corner, an edge, etc. of a three-dimensional object. More specifically, such a feature is a three-dimensional feature or a visible-light feature as described below, but may be any feature that represents the position, luminance, or color information, etc. on a VXL.

Used as three-dimensional features are signature of histograms of orientations (SHOT) features, point feature histograms (PFH) features, or point pair feature (PPF) features.

SHOT features are obtained by dividing the periphery of a VXL, and calculating an inner product of the reference point and the normal vector of each divided region to represent the calculation result as a histogram. SHOT features are characterized by a large number of dimensions and high-level feature representation.

PFH features are obtained by selecting a large number of two point pairs in the vicinity of a VXL, and calculating the normal vector, etc. from each two point pair to represent the calculation result as a histogram. PFH features are histogram features, and thus are characterized by robustness against a certain extent of disturbance and also high-level feature representation.

PPF features are obtained by using a normal vector, etc. for each two points of VXLs. PPF features, for which all VXLs are used, has robustness against occlusion.

Used as visible-light features are scale-invariant feature transform (SIFT), speeded up robust features (SURF), or histogram of oriented gradients (HOG), etc. that use information on an image such as luminance gradient information.

A SWLD is generated by calculating the above-described features of the respective VXLs in a WLD to extract FVXLs. Here, the SWLD may be updated every time the WLD is updated, or may be regularly updated after the elapse of a certain period of time, regardless of the timing at which the WLD is updated.

A SWLD may be generated for each type of features. For example, different SWLDs may be generated for the respective types of features, such as SWLD1 based on SHOT features and SWLD2 based on SIFT features so that SWLDs are selectively used in accordance with the intended use. Also, the calculated feature of each FVXL may be held in each FVXL as feature information.

Next, the usage of a sparse world (SWLD) will be described. A SWLD includes only feature voxels (FVXLs), and thus its data size is smaller in general than that of a WLD that includes all VXLs.

In an application that utilizes features for a certain purpose, the use of information on a SWLD instead of a WLD reduces the time required to read data from a hard disk, as well as the bandwidth and the time required for data transfer over a network. For example, a WLD and a SWLD are held in a server as map information so that map information to be sent is selected between the WLD and the SWLD in accordance with a request from a client. This reduces the network bandwidth and the time required for data transfer. More specific examples will be described below.

Figure 12:
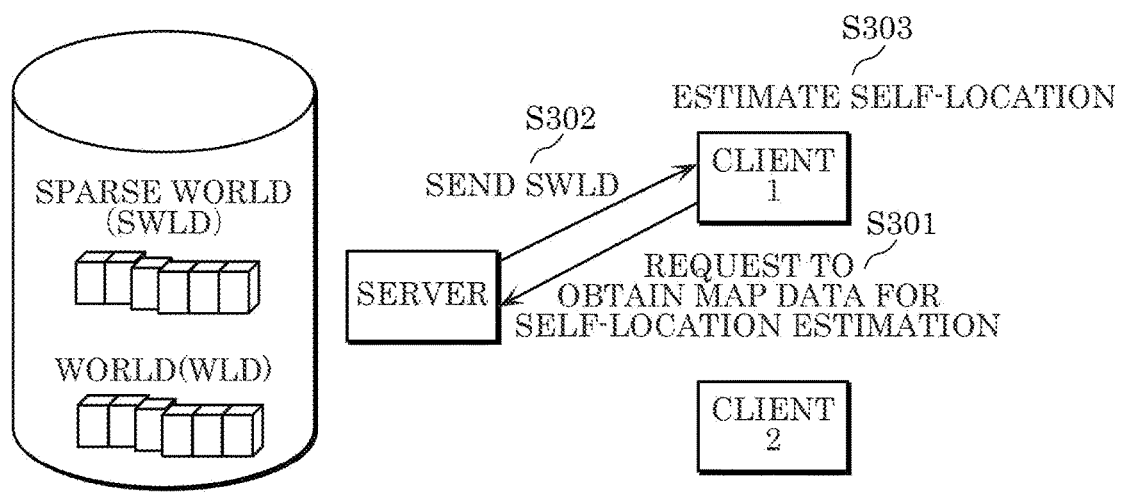
FIG. 12 is a diagram showing example operations performed by a server and a client according to Embodiment 2.
Figure 13:
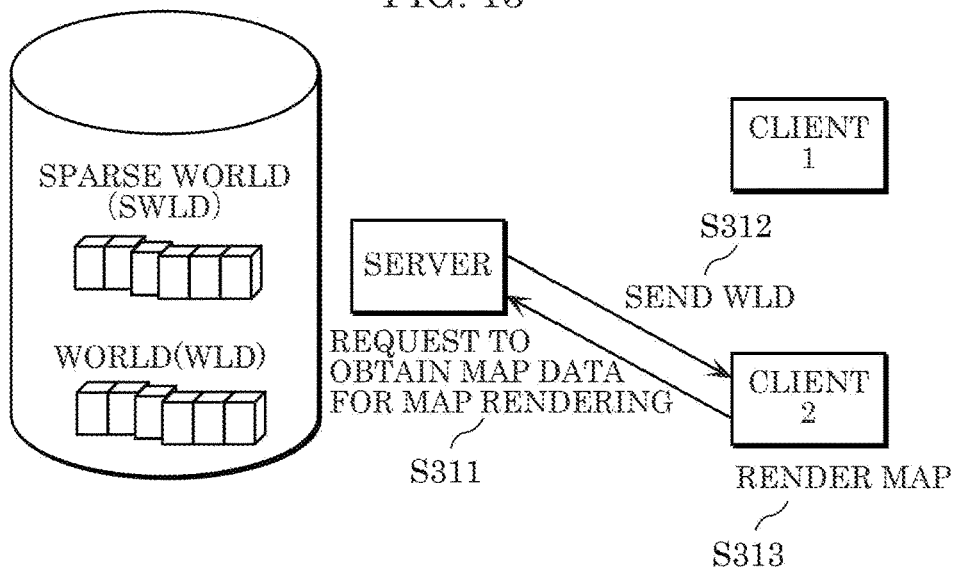
FIG. 13 is a diagram showing example operations performed by the server and a client according to Embodiment 2.

FIG. 12 and FIG. 13 are diagrams showing usage examples of a SWLD and a WLD. As FIG. 12 shows, when client 1, which is a vehicle-mounted device, requires map information to use it for self-location determination, client 1 sends to a server a request for obtaining map data for self-location estimation (S301). The server sends to client 1 the SWLD in response to the obtainment request (S302). Client 1 uses the received SWLD to determine the self-location (S303). In so doing, client 1 obtains VXL information on the periphery of client 1 through various means including a distance sensor such as a rangefinder as well as a stereo camera and a combination of a plurality of monocular cameras. Client 1 then estimates the self-location information from the obtained VXL information and the SWLD. Here, the self-location information includes three-dimensional position information, orientation, etc. of client 1.

As FIG. 13 shows, when client 2, which is a vehicle-mounted device, requires map information to use it for rendering a map such as a three-dimensional map, client 2 sends to the server a request for obtaining map data for map rendering (S311). The server sends to client 2 the WLD in response to the obtainment request (S312). Client 2 uses the received WLD to render a map (S313). In so doing, client 2 uses, for example, an image client 2 has captured by a visible-light camera, etc. and the WLD obtained from the server to create a rendering image, and renders such created image onto a screen of a car navigation system, etc.

As described above, the server sends to a client a SWLD when the features of the respective VXLs are mainly required such as in the case of self-location estimation, and sends to a client a WLD when detailed VXL information is required such as in the case of map rendering. This allows for an efficient sending/receiving of map data.

Note that a client may self-judge which one of a SWLD and a WLD is necessary, and request the server to send a SWLD or a WLD. Also, the server may judge which one of a SWLD and a WLD to send in accordance with the status of the client or a network.

Next, a method will be described of switching the sending/receiving between a sparse world (SWLD) and a world (WLD).

Figure 14:
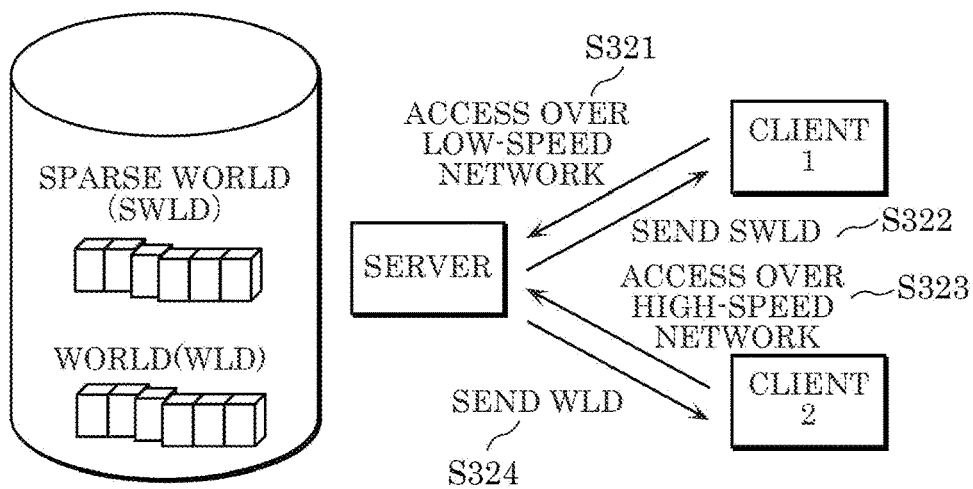
FIG. 14 is a diagram showing example operations performed by the server and the clients according to Embodiment 2.

Whether to receive a WLD or a SWLD may be switched in accordance with the network bandwidth. FIG. 14 is a diagram showing an example operation in such case. For example, when a low-speed network is used that limits the usable network bandwidth, such as in a Long-Term Evolution (LTE) environment, a client accesses the server over a low-speed network (S321), and obtains the SWLD from the server as map information (S322). Meanwhile, when a high-speed network is used that has an adequately broad network bandwidth, such as in a WiFi environment, a client accesses the server over a high-speed network (S323), and obtains the WLD from the server (S324). This enables the client to obtain appropriate map information in accordance with the network bandwidth such client is using.

More specifically, a client receives the SWLD over an LTE network when in outdoors, and obtains the WLD over a WiFi network when in indoors such as in a facility. This enables the client to obtain more detailed map information on indoor environment.

As described above, a client may request for a WLD or a SWLD in accordance with the bandwidth of a network such client is using. Alternatively, the client may send to the server information indicating the bandwidth of a network such client is using, and the server may send to the client data (the WLD or the SWLD) suitable for such client in accordance with the information. Alternatively, the server may identify the network bandwidth the client is using, and send to the client data (the WLD or the SWLD) suitable for such client.

Figure 15:
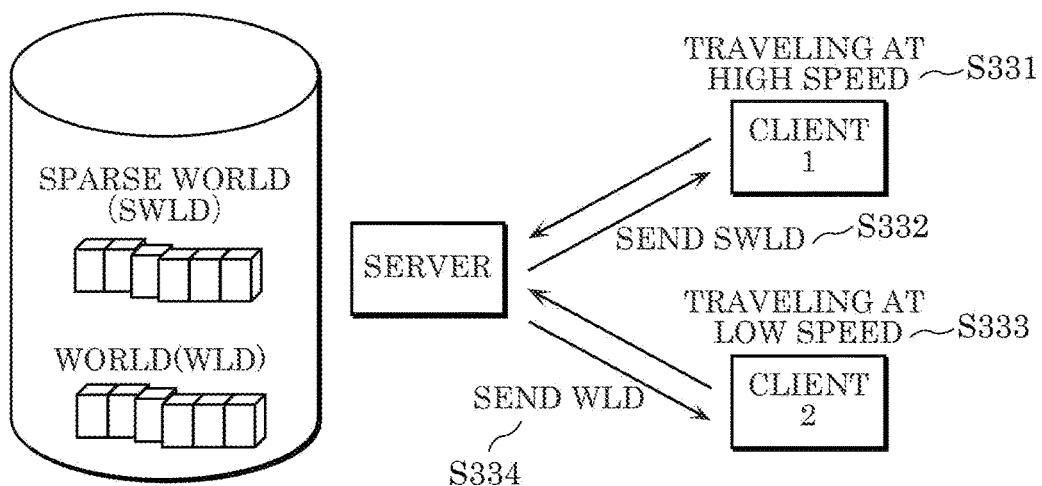
FIG. 15 is a diagram showing example operations performed by the server and the clients according to Embodiment 2.

Also, whether to receive a WLD or a SWLD may be switched in accordance with the speed of traveling. FIG. 15 is a diagram showing an example operation in such case. For example, when traveling at a high speed (S331), a client receives the SWLD from the server (S332). Meanwhile, when traveling at a low speed (S333), the client receives the WLD from the server (S334). This enables the client to obtain map information suitable to the speed, while reducing the network bandwidth. More specifically, when traveling on an expressway, the client receives the SWLD with a small data amount, which enables the update of rough map information at an appropriate speed. Meanwhile, when traveling on a general road, the client receives the WLD, which enables the obtainment of more detailed map information.

As described above, the client may request the server for a WLD or a SWLD in accordance with the traveling speed of such client. Alternatively, the client may send to the server information indicating the traveling speed of such client, and the server may send to the client data (the WLD or the SWLD) suitable to such client in accordance with the information. Alternatively, the server may identify the traveling speed of the client to send data (the WLD or the SWLD) suitable to such client.

Also, the client may obtain, from the server, a SWLD first, from which the client may obtain a WLD of an important region. For example, when obtaining map information, the client first obtains a SWLD for rough map information, from which the client narrows to a region in which features such as buildings, signals, or persons appear at high frequency so that the client can later obtain a WLD of such narrowed region. This enables the client to obtain detailed information on a necessary region, while reducing the amount of data received from the server.

The server may also create from a WLD different SWLDs for the respective objects, and the client may receive SWLDs in accordance with the intended use. This reduces the network bandwidth. For example, the server recognizes persons or cars in a WLD in advance, and creates a SWLD of persons and a SWLD of cars. The client, when wishing to obtain information on persons around the client, receives the SWLD of persons, and when wising to obtain information on cars, receives the SWLD of cars. Such types of SWLDs may be distinguished by information (flag, or type, etc.) added to the header, etc.

Figure 16:
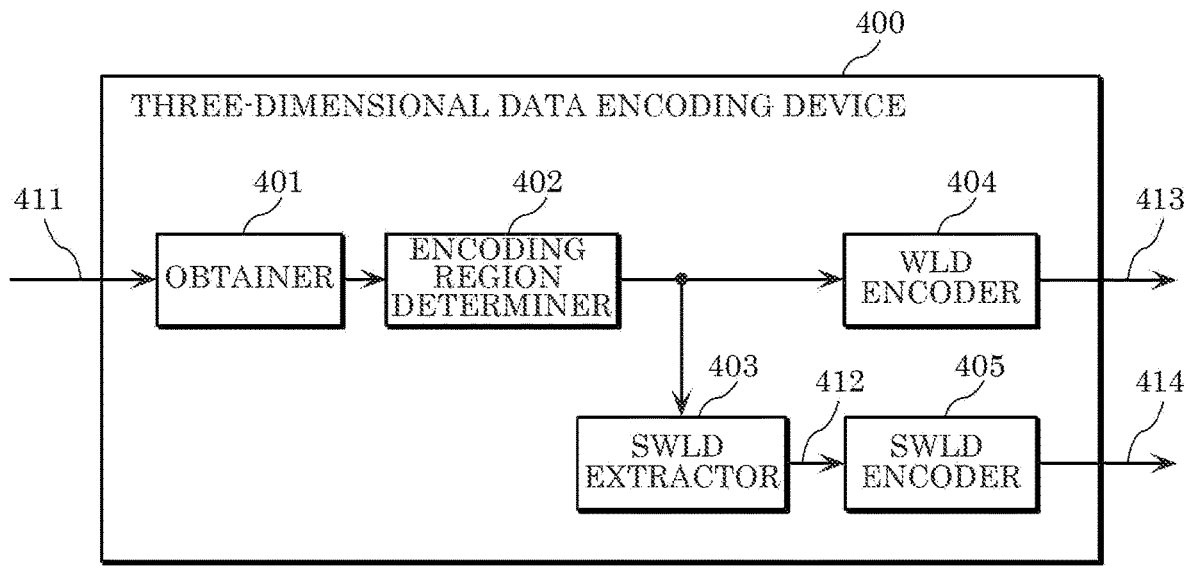
FIG. 16 is a block diagram of a three-dimensional data encoding device according to Embodiment 2.
Figure 17:
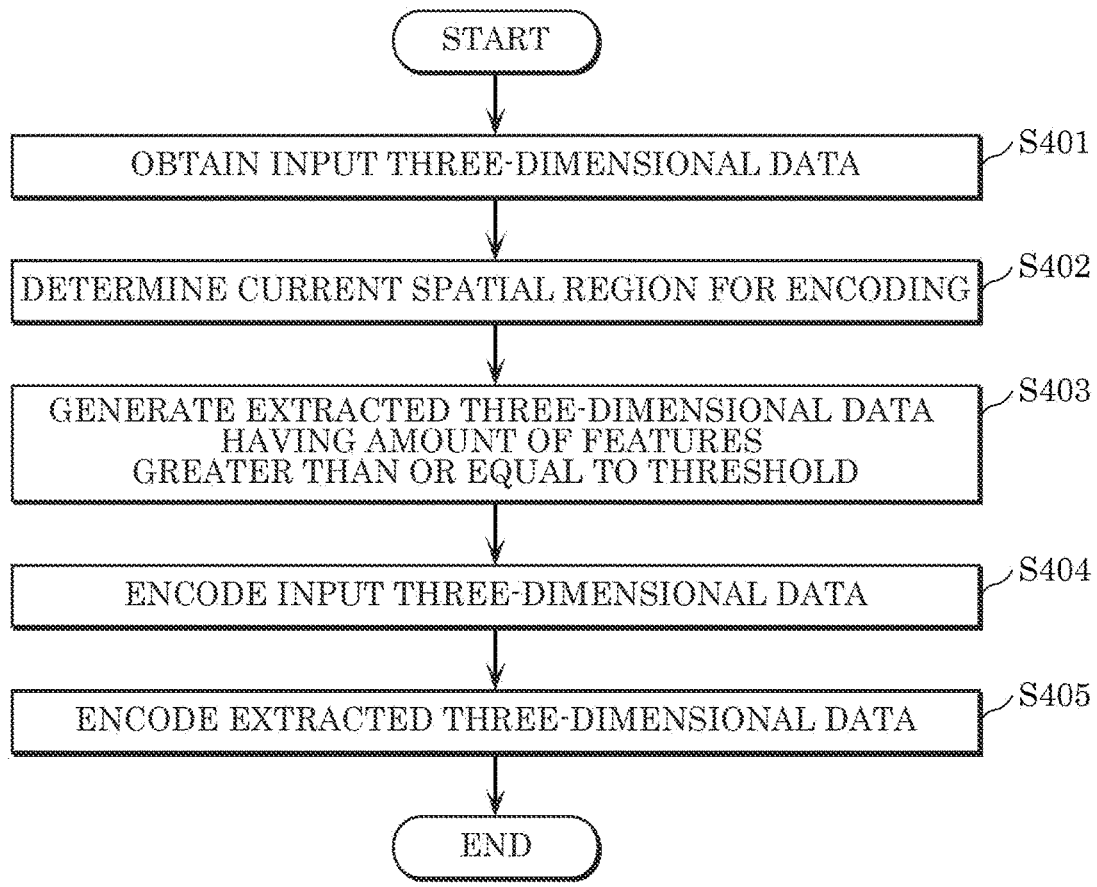
FIG. 17 is a flowchart of encoding processes according to Embodiment 2.

Next, the structure and the operation flow of the three-dimensional data encoding device (e.g., a server) according to the present embodiment will be described. FIG. 16 is a block diagram of three-dimensional data encoding device 400 according to the present embodiment. FIG. 17 is a flowchart of three-dimensional data encoding processes performed by three-dimensional data encoding device 400.

Three-dimensional data encoding device 400 shown in FIG. 16 encodes input three-dimensional data 411, thereby generating encoded three-dimensional data 413 and encoded three-dimensional data 414, each being an encoded stream. Here, encoded three-dimensional data 413 is encoded three-dimensional data corresponding to a WLD, and encoded three-dimensional data 414 is encoded three-dimensional data corresponding to a SWLD. Such three-dimensional data encoding device 400 includes, obtainer 401, encoding region determiner 402, SWLD extractor 403, WLD encoder 404, and SWLD encoder 405.

First, as FIG. 17 shows, obtainer 401 obtains input three-dimensional data 411, which is point group data in a three-dimensional space (S401).

Next, encoding region determiner 402 determines a current spatial region for encoding on the basis of a spatial region in which the point cloud data is present (S402).

Next, SWLD extractor 403 defines the current spatial region as a WLD, and calculates the feature from each VXL included in the WLD. Then. SWLD extractor 403 extracts VXLs having an amount of features greater than or equal to a predetermined threshold, defines the extracted VXLs as FVXLs, and adds such FVXLs to a SWLD, thereby generating extracted three-dimensional data 412 (S403). Stated differently, extracted three-dimensional data 412 having an amount of features greater than or equal to the threshold is extracted from input three-dimensional data 411.

Next, WLD encoder 404 encodes input three-dimensional data 411 corresponding to the WLD, thereby generating encoded three-dimensional data 413 corresponding to the WLD (S404). In so doing, WLD encoder 404 adds to the header of encoded three-dimensional data 413 information that distinguishes that such encoded three-dimensional data 413 is a stream including a WLD.

SWLD encoder 405 encodes extracted three-dimensional data 412 corresponding to the SWLD, thereby generating encoded three-dimensional data 414 corresponding to the SWLD (S405). In so doing, SWLD encoder 405 adds to the header of encoded three-dimensional data 414 information that distinguishes that such encoded three-dimensional data 414 is a stream including a SWLD.

Note that the process of generating encoded three-dimensional data 413 and the process of generating encoded three-dimensional data 414 may be performed in the reverse order. Also note that a part or all of these processes may be performed in parallel.

A parameter "world_type" is defined, for example, as information added to each header of encoded three-dimensional data 413 and encoded three-dimensional data 414. world_type=0 indicates that a stream includes a WLD, and world_type=1 indicates that a stream includes a SWLD. An increased number of values may be further assigned to define a larger number of types, e.g., world_type=2. Also, one of encoded three-dimensional data 413 and encoded three-dimensional data 414 may include a specified flag. For example, encoded three-dimensional data 414 may be assigned with a flag indicating that such stream includes a SWLD. In such a case, the decoding device can distinguish whether such stream is a stream including a WLD or a stream including a SWLD in accordance with the presence/absence of the flag.

Also, an encoding method used by WLD encoder 404 to encode a WLD may be different from an encoding method used by SWLD encoder 405 to encode a SWLD.

For example, data of a SWLD is decimated, and thus can have a lower correlation with the neighboring data than that of a WLD. For this reason, of intra prediction and inter prediction, inter prediction may be more preferentially performed in an encoding method used for a SWLD than in an encoding method used for a WLD.

Also, an encoding method used for a SWLD and an encoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Also, SWLD encoder 405 performs encoding in a manner that encoded three-dimensional data 414 of a SWLD has a smaller data size than the data size of encoded three-dimensional data 413 of a WLD. A SWLD can have a lower inter-data correlation, for example, than that of a WLD as described above. This can lead to a decreased encoding efficiency, and thus to encoded three-dimensional data 414 having a larger data size than the data size of encoded three-dimensional data 413 of a WLD. When the data size of the resulting encoded three-dimensional data 414 is larger than the data size of encoded three-dimensional data 413 of a WLD. SWLD encoder 405 performs encoding again to re-generate encoded three-dimensional data 414 having a reduced data size.

For example, SWLD extractor 403 re-generates extracted three-dimensional data 412 having a reduced number of keypoints to be extracted, and SWLD encoder 405 encodes such extracted three-dimensional data 412. Alternatively, SWLD encoder 405 may perform more coarse quantization. More coarse quantization is achieved, for example, by rounding the data in the lowermost level in an octree structure described below.

When failing to decrease the data size of encoded three-dimensional data 414 of the SWLD to smaller than the data size of encoded three-dimensional data 413 of the WLD, SWLD encoder 405 may not generate encoded three-dimensional data 414 of the SWLD. Alternatively, encoded three-dimensional data 413 of the WLD may be copied as encoded three-dimensional data 414 of the SWLD. Stated differently, encoded three-dimensional data 413 of the WLD may be used as it is as encoded three-dimensional data 414 of the SWLD.

Figure 18:
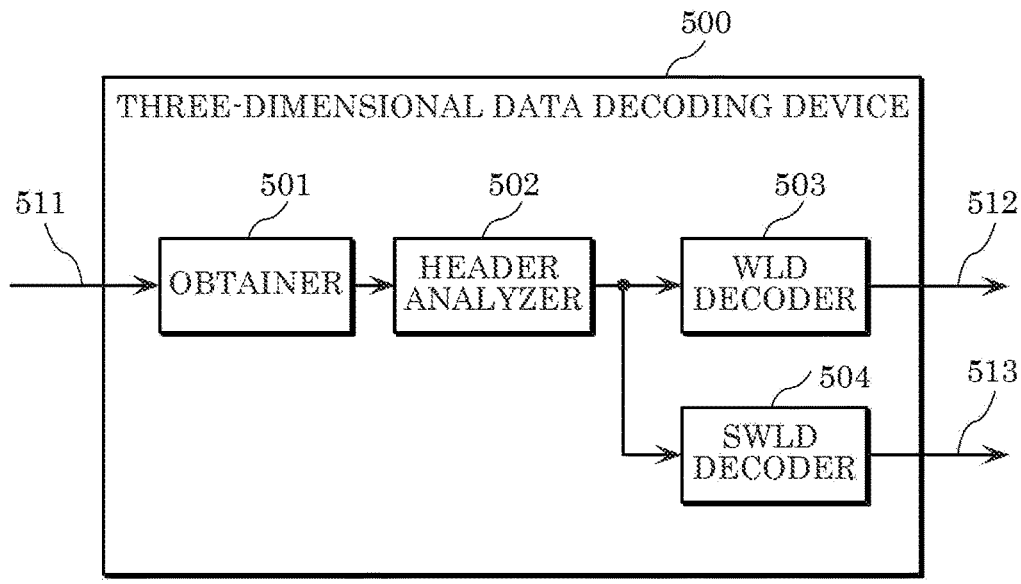
FIG. 18 is a block diagram of a three-dimensional data decoding device according to Embodiment 2.
Figure 19:
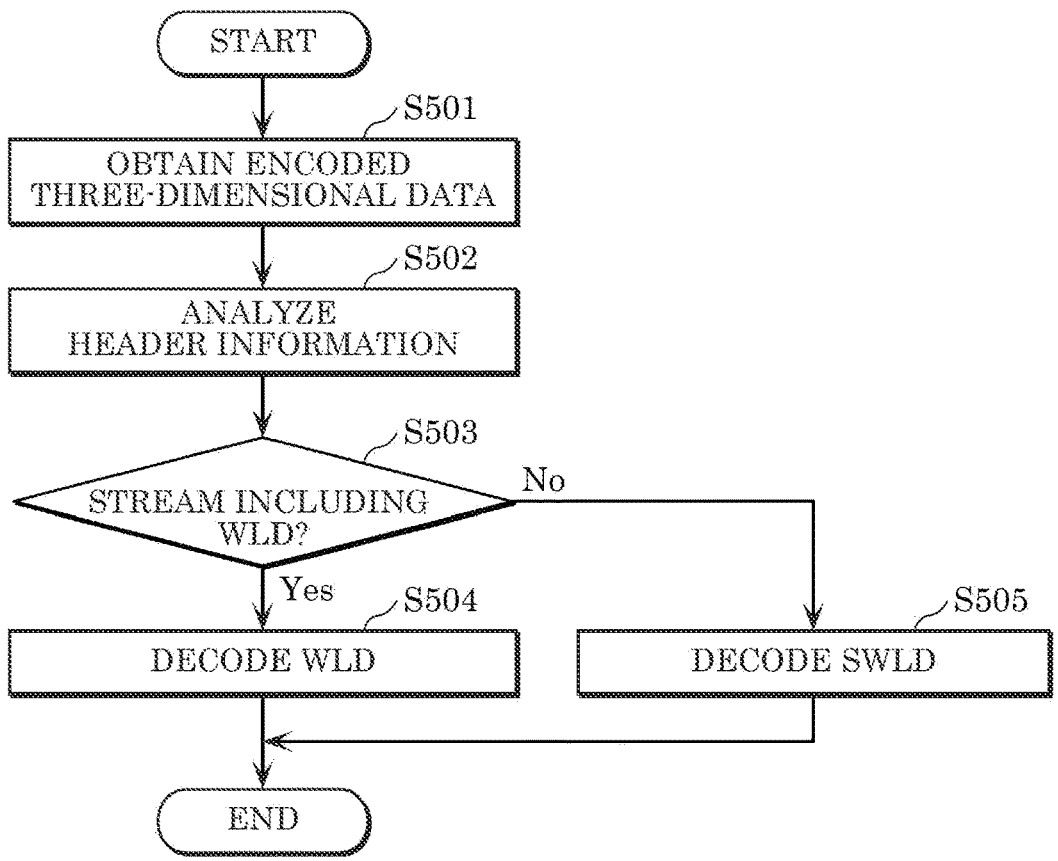
FIG. 19 is a flowchart of decoding processes according to Embodiment 2.

Next, the structure and the operation flow of the three-dimensional data decoding device (e.g., a client) according to the present embodiment will be described. FIG. 18 is a block diagram of three-dimensional data decoding device 500 according to the present embodiment. FIG. 19 is a flowchart of three-dimensional data decoding processes performed by three-dimensional data decoding device 500.

Three-dimensional data decoding device 500 shown in FIG. 18 decodes encoded three-dimensional data 511, thereby generating decoded three-dimensional data 512 or decoded three-dimensional data 513. Encoded three-dimensional data 511 here is, for example, encoded three-dimensional data 413 or encoded three-dimensional data 414 generated by three-dimensional data encoding device 400.

Such three-dimensional data decoding device 500 includes obtainer 501, header analyzer 502, WLD decoder 503, and SWLD decoder 504.

First, as FIG. 19 shows, obtainer 501 obtains encoded three-dimensional data 511 (S501). Next, header analyzer 502 analyzes the header of encoded three-dimensional data 511 to identify whether encoded three-dimensional data 511 is a stream including a WLD or a stream including a SWLD (S502). For example, the above-described parameter world_type is referred to in making such identification.

When encoded three-dimensional data 511 is a stream including a WLD (Yes in S503), WLD decoder 503 decodes encoded three-dimensional data 511, thereby generating decoded three-dimensional data 512 of the WLD (S504). Meanwhile, when encoded three-dimensional data 511 is a stream including a SWLD (No in S503), SWLD decoder 504 decodes encoded three-dimensional data 511, thereby generating decoded three-dimensional data 513 of the SWLD (S505).

Also, as in the case of the encoding device, a decoding method used by WLD decoder 503 to decode a WLD may be different from a decoding method used by SWLD decoder 504 to decode a SWLD. For example, of intra prediction and inter prediction, inter prediction may be more preferentially performed in a decoding method used for a SWLD than in a decoding method used for a WLD.

Also, a decoding method used for a SWLD and a decoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Figure 20:
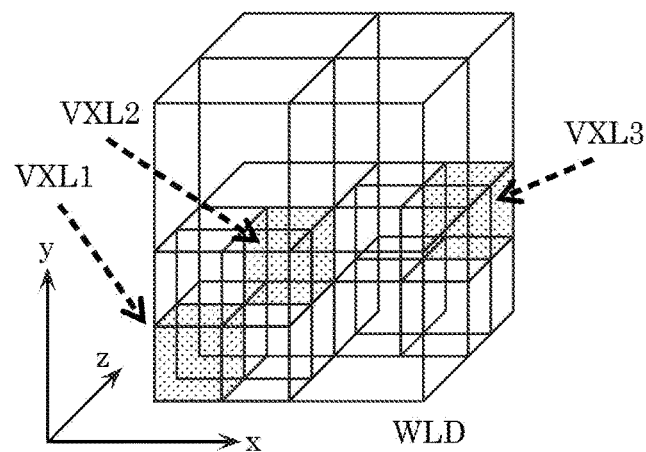
FIG. 20 is a diagram showing an example structure of a WLD according to Embodiment 2.
Figure 21:
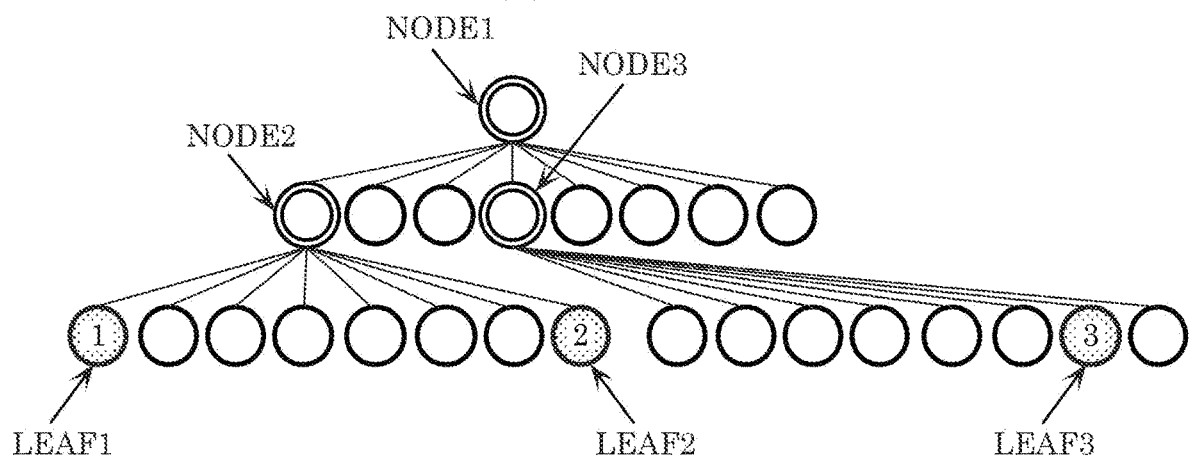
FIG. 21 is a diagram showing an example octree structure of the WLD according to Embodiment 2.

Next, an octree representation will be described, which is a method of representing three-dimensional positions. VXL data included in three-dimensional data is converted into an octree structure before encoded. FIG. 20 is a diagram showing example VXLs in a WLD. FIG. 21 is a diagram showing an octree structure of the WLD shown in FIG. 20. An example shown in FIG. 20 illustrates three VXLs 1 to 3 that include point groups (hereinafter referred to as effective VXLs). As FIG. 21 shows, the octree structure is made of nodes and leaves. Each node has a maximum of eight nodes or leaves. Each leaf has VXL information. Here, of the leaves shown in FIG. 21, leaf 1, leaf 2, and leaf 3 represent VXL1, VXL2, and VXL3 shown in FIG. 20, respectively.

More specifically, each node and each leaf correspond to a three-dimensional position. Node 1 corresponds to the entire block shown in FIG. 20. The block that corresponds to node 1 is divided into eight blocks. Of these eight blocks, blocks including effective VXLs are set as nodes, while the other blocks are set as leaves. Each block that corresponds to a node is further divided into eight nodes or leaves. These processes are repeated by the number of times that is equal to the number of levels in the octree structure. All blocks in the lowermost level are set as leaves.

Figure 22:
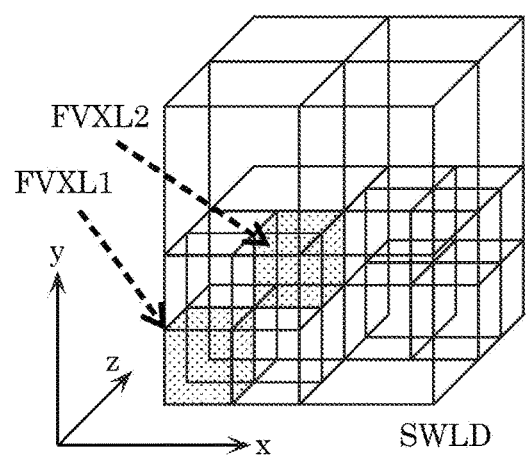
FIG. 22 is a diagram showing an example structure of a SWLD according to Embodiment 2.
Figure 23:
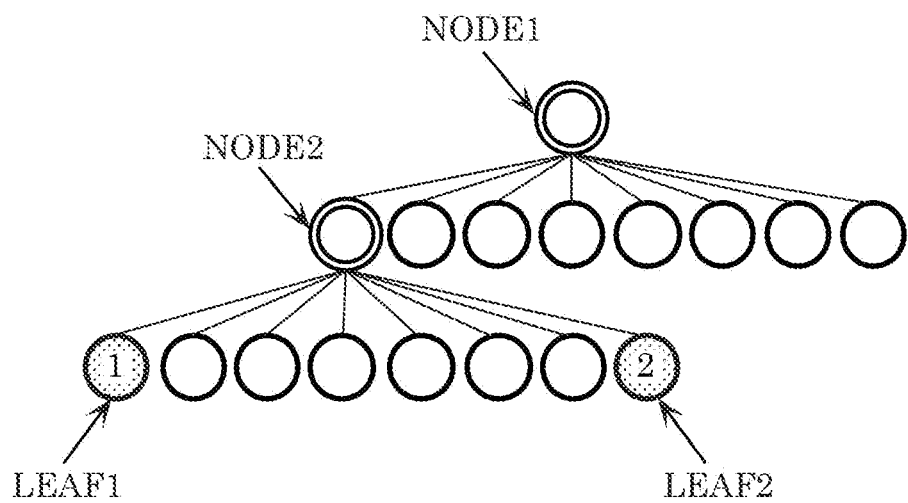
FIG. 23 is a diagram showing an example octree structure of the SWLD according to Embodiment 2.

FIG. 22 is a diagram showing an example SWLD generated from the WLD shown in FIG. 20. VXL1 and VXL2 shown in FIG. 20 are judged as FVXL1 and FVXL2 as a result of feature extraction, and thus are added to the SWLD. Meanwhile, VXL3 is not judged as a FVXL, and thus is not added to the SWLD. FIG. 23 is a diagram showing an octree structure of the SWLD shown in FIG. 22. In the octree structure shown in FIG. 23, leaf 3 corresponding to VXL3 shown in FIG. 21 is deleted. Consequently node 3 shown in FIG. 21 has lost an effective VXL, and has changed to a leaf. As described above, a SWLD has a smaller number of leaves in general than a WLD does, and thus the encoded three-dimensional data of the SWLD is smaller than the encoded three-dimensional data of the WLD.

The following describes variations of the present embodiment.

For self-location estimation, for example, a client, being a vehicle-mounted device, etc., may receive a SWLD from the server to use such SWLD to estimate the self-location. Meanwhile, for obstacle detection, the client may detect obstacles by use of three-dimensional information on the periphery obtained by such client through various means including a distance sensor such as a rangefinder, as well as a stereo camera and a combination of a plurality of monocular cameras.

In general, a SWLD is less likely to include VXL data on a flat region.

As such, the server may hold a subsample world (subWLD) obtained by subsampling a WLD for detection of static obstacles, and send to the client the SWLD and the subWLD. This enables the client to perform self-location estimation and obstacle detection on the client's part, while reducing the network bandwidth.

When the client renders three-dimensional map data at a high speed, map information having a mesh structure is more useful in some cases. As such, the server may generate a mesh from a WLD to hold it beforehand as a mesh world (MWLD). For example, when wishing to perform coarse three-dimensional rendering, the client receives a MWLD, and when wishing to perform detailed three-dimensional rendering, the client receives a WLD. This reduces the network bandwidth.

In the above description, the server sets, as FVXLs, VXLs having an amount of features greater than or equal to the threshold, but the server may calculate FVXLs by a different method. For example, the server may judge that a VXL, a VLM, a SPC, or a GOS that constitutes a signal, or an intersection, etc. as necessary for self-location estimation, driving assist, or self-driving, etc., and incorporate such VXL, VLM, SPC, or GOS into a SWLD as a FVXL, a FVLM, a FSPC, or a FGOS. Such judgment may be made manually. Also, FVXLs, etc. that have been set on the basis of an amount of features may be added to FVXLs, etc. obtained by the above method. Stated differently SWLD extractor 403 may further extract, from input three-dimensional data 411, data corresponding to an object having a predetermined attribute as extracted three-dimensional data 412.

Also, that a VXL, a VLM, a SPC, or a GOS is necessary for such intended usage may be labeled separately from the features. The server may separately hold, as an upper layer of a SWLD (e.g., a lane world), FVXLs of a signal or an intersection, etc. necessary for self-location estimation, driving assist, or self-driving, etc.

The server may also add an attribute to VXLs in a WLD on a random access basis or on a predetermined unit basis. An attribute, for example, includes information indicating whether VXLs are necessary for self-location estimation, or information indicating whether VXLs are important as traffic information such as a signal, or an intersection, etc. An attribute may also include a correspondence between VXLs and features (intersection, or road, etc.) in lane information (geographic data files (GDF), etc.).

A method as described below may be used to update a WLD or a SWLD.

Update information indicating changes, etc. in a person, a roadwork, or a tree line (for trucks) is uploaded to the server as point groups or meta data. The server updates a WLD on the basis of such uploaded information, and then updates a SWLD by use of the updated WLD.

The client, when detecting a mismatch between the three-dimensional information such client has generated at the time of self-location estimation and the three-dimensional information received from the server, may send to the server the three-dimensional information such client has generated, together with an update notification. In such a case, the server updates the SWLD by use of the WLD. When the SWLD is not to be updated, the server judges that the WLD itself is old.

In the above description, information that distinguishes whether an encoded stream is that of a WLD or a SWLD is added as header information of the encoded stream. However, when there are many types of worlds such as a mesh world and a lane world, information that distinguishes these types of the worlds may be added to header information. Also, when there are many SWLDs with different amounts of features, information that distinguishes the respective SWLDs may be added to header information.

In the above description, a SWLD is constituted by FVXLs, but a SWLD may include VXLs that have not been judged as FVXLs. For example, a SWLD may include an adjacent VXL used to calculate the feature of a FVXL. This enables the client to calculate the feature of a FVXL when receiving a SWLD, even in the case where feature information is not added to each FVXL of the SWLD. In such a case, the SWLD may include information that distinguishes whether each VXL is a FVXL or a VXL.

As described above, three-dimensional data encoding device 400 extracts, from input three-dimensional data 411 (first three-dimensional data), extracted three-dimensional data 412 (second three-dimensional data) having an amount of a feature greater than or equal to a threshold, and encodes extracted three-dimensional data 412 to generate encoded three-dimensional data 414 (first encoded three-dimensional data).

This three-dimensional data encoding device 400 generates encoded three-dimensional data 414 that is obtained by encoding data having an amount of a feature greater than or equal to the threshold. This reduces the amount of data compared to the case where input three-dimensional data 411 is encoded as it is. Three-dimensional data encoding device 400 is thus capable of reducing the amount of data to be transmitted.

Three-dimensional data encoding device 400 further encodes input three-dimensional data 411 to generate encoded three-dimensional data 413 (second encoded three-dimensional data).

This three-dimensional data encoding device 400 enables selective transmission of encoded three-dimensional data 413 and encoded three-dimensional data 414, in accordance, for example, with the intended use, etc.

Also, extracted three-dimensional data 412 is encoded by a first encoding method, and input three-dimensional data 411 is encoded by a second encoding method different from the first encoding method.

This three-dimensional data encoding device 400 enables the use of an encoding method suitable for each of input three-dimensional data 411 and extracted three-dimensional data 412.

Also, of intra prediction and inter prediction, the inter prediction is more preferentially performed in the first encoding method than in the second encoding method.

This three-dimensional data encoding device 400 enables inter prediction to be more preferentially performed on extracted three-dimensional data 412 in which adjacent data items are likely to have low correlation.

Also, the first encoding method and the second encoding method represent three-dimensional positions differently. For example, the second encoding method represents three-dimensional positions by octree, and the first encoding method represents three-dimensional positions by three-dimensional coordinates.

This three-dimensional data encoding device 400 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Stated differently, such identifier indicates whether the encoded three-dimensional data is encoded three-dimensional data 413 of a WLD or encoded three-dimensional data 414 of a SWLD.

This enables the decoding device to readily judge whether the obtained encoded three-dimensional data is encoded three-dimensional data 413 or encoded three-dimensional data 414.

Also, three-dimensional data encoding device 400 encodes extracted three-dimensional data 412 in a manner that encoded three-dimensional data 414 has a smaller data amount than a data amount of encoded three-dimensional data 413.

This three-dimensional data encoding device 400 enables encoded three-dimensional data 414 to have a smaller data amount than the data amount of encoded three-dimensional data 413.

Also, three-dimensional data encoding device 400 further extracts data corresponding to an object having a predetermined attribute from input three-dimensional data 411 as extracted three-dimensional data 412. The object having a predetermined attribute is, for example, an object necessary for self-location estimation, driving assist, or self-driving, etc., or more specifically, a signal, an intersection, etc.

This three-dimensional data encoding device 400 is capable of generating encoded three-dimensional data 414 that includes data required by the decoding device.

Also, three-dimensional data encoding device 400 (server) further sends, to a client, one of encoded three-dimensional data 413 and encoded three-dimensional data 414 in accordance with a status of the client.

This three-dimensional data encoding device 400 is capable of sending appropriate data in accordance with the status of the client.

Also, the status of the client includes one of a communication condition (e.g., network bandwidth) of the client and a traveling speed of the client.

Also, three-dimensional data encoding device 400 further sends, to a client, one of encoded three-dimensional data 413 and encoded three-dimensional data 414 in accordance with a request from the client.

This three-dimensional data encoding device 400 is capable of sending appropriate data in accordance with the request from the client.

Also, three-dimensional data decoding device 500 according to the present embodiment decodes encoded three-dimensional data 413 or encoded three-dimensional data 414 generated by three-dimensional data encoding device 400 described above.

Stated differently three-dimensional data decoding device 500 decodes, by a first decoding method, encoded three-dimensional data 414 obtained by encoding extracted three-dimensional data 412 having an amount of a feature greater than or equal to a threshold, extracted three-dimensional data 412 having been extracted from input three-dimensional data 411. Three-dimensional data decoding device 500 also decodes, by a second decoding method, encoded three-dimensional data 413 obtained by encoding input three-dimensional data 411, the second decoding method being different from the first decoding method.

This three-dimensional data decoding device 500 enables selective reception of encoded three-dimensional data 414 obtained by encoding data having an amount of a feature greater than or equal to the threshold and encoded three-dimensional data 413, in accordance, for example, with the intended use, etc. Three-dimensional data decoding device 500 is thus capable of reducing the amount of data to be transmitted. Such three-dimensional data decoding device 500 further enables the use of a decoding method suitable for each of input three-dimensional data 411 and extracted three-dimensional data 412.

Also, of intra prediction and inter prediction, the inter prediction is more preferentially performed in the first decoding method than in the second decoding method.

This three-dimensional data decoding device 500 enables inter prediction to be more preferentially performed on the extracted three-dimensional data in which adjacent data items are likely to have low correlation.

Also, the first decoding method and the second decoding method represent three-dimensional positions differently. For example, the second decoding method represents three-dimensional positions by octree, and the first decoding method represents three-dimensional positions by three-dimensional coordinates.

This three-dimensional data decoding device 500 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411.

Three-dimensional data decoding device 500 refers to such identifier in identifying between encoded three-dimensional data 413 and encoded three-dimensional data 414.

This three-dimensional data decoding device 500 is capable of readily judging whether the obtained encoded three-dimensional data is encoded three-dimensional data 413 or encoded three-dimensional data 414.

Three-dimensional data decoding device 500 further notifies a server of a status of the client (three-dimensional data decoding device 500). Three-dimensional data decoding device 500 receives one of encoded three-dimensional data 413 and encoded three-dimensional data 414 from the server, in accordance with the status of the client.

This three-dimensional data decoding device 500 is capable of receiving appropriate data in accordance with the status of the client.

Also, the status of the client includes one of a communication condition (e.g., network bandwidth) of the client and a traveling speed of the client.

Three-dimensional data decoding device 500 further makes a request of the server for one of encoded three-dimensional data 413 and encoded three-dimensional data 414, and receives one of encoded three-dimensional data 413 and encoded three-dimensional data 414 from the server, in accordance with the request.

This three-dimensional data decoding device 500 is capable of receiving appropriate data in accordance with the intended use.

Embodiment 3

The present embodiment will describe a method of transmitting/receiving three-dimensional data between vehicles. For example, the three-dimensional data is transmitted/received between the own vehicle and the nearby vehicle.

Figure 24:
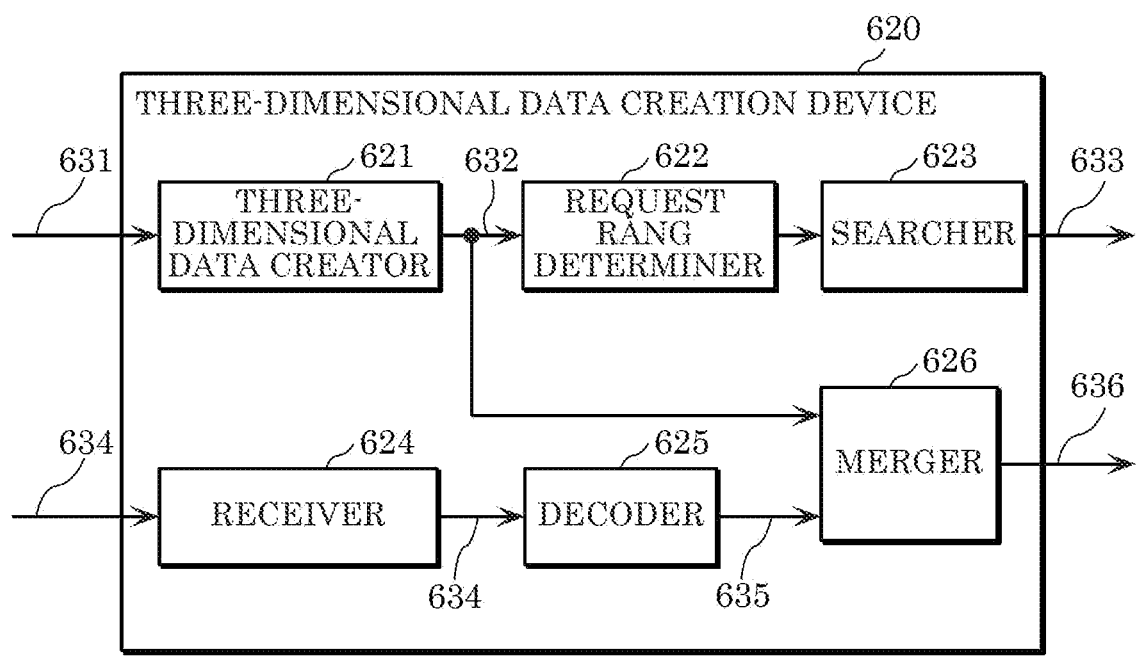
FIG. 24 is a block diagram of a three-dimensional data creation device according to Embodiment 3.

FIG. 24 is a block diagram of three-dimensional data creation device 620 according to the present embodiment. Such three-dimensional data creation device 620, which is included, for example, in the own vehicle, mergers first three-dimensional data 632 created by three-dimensional data creation device 620 with the received second three-dimensional data 635, thereby creating third three-dimensional data 636 having a higher density.

Such three-dimensional data creation device 620 includes three-dimensional data creator 621, request range determiner 622, searcher 623, receiver 624, decoder 625, and merger 626.

First, three-dimensional data creator 621 creates first three-dimensional data 632 by use of sensor information 631 detected by the sensor included in the own vehicle. Next, request range determiner 622 determines a request range, which is the range of a three-dimensional space, the data on which is insufficient in the created first three-dimensional data 632.

Next, searcher 623 searches for the nearby vehicle having the three-dimensional data of the request range, and sends request range information 633 indicating the request range to nearby vehicle 601 having been searched out (S623). Next, receiver 624 receives encoded three-dimensional data 634, which is an encoded stream of the request range, from nearby vehicle 601 (S624). Note that searcher 623 may indiscriminately send requests to all vehicles included in a specified range to receive encoded three-dimensional data 634 from a vehicle that has responded to the request. Searcher 623 may send a request not only to vehicles but also to an object such as a signal and a sign, and receive encoded three-dimensional data 634 from the object.

Next, decoder 625 decodes the received encoded three-dimensional data 634, thereby obtaining second three-dimensional data 635. Next, merger 626 merges first three-dimensional data 632 with second three-dimensional data 635, thereby creating three-dimensional data 636 having a higher density.

Figure 25:
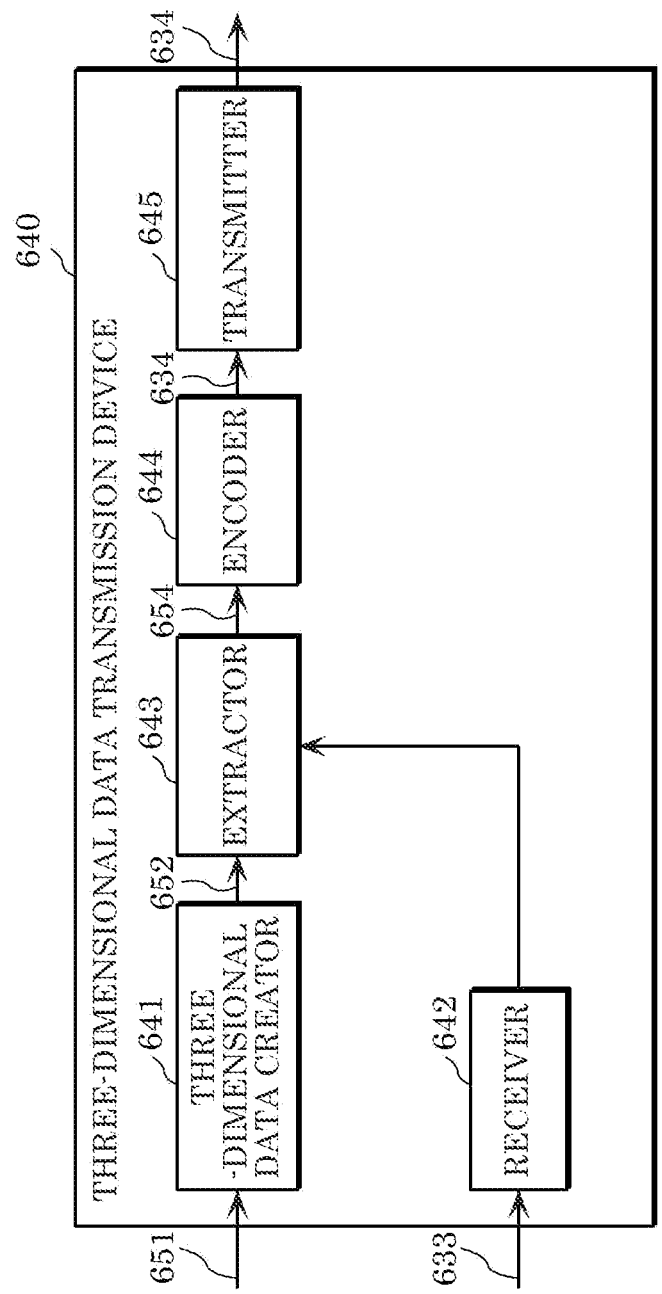
FIG. 25 is a block diagram of a three-dimensional data transmission device according to Embodiment 3.

Next, the structure and operations of three-dimensional data transmission device 640 according to the present embodiment will be described. FIG. 25 is a block diagram of three-dimensional data transmission device 640.

Three-dimensional data transmission device 640 is included, for example, in the above-described nearby vehicle. Three-dimensional data transmission device 640 processes fifth three-dimensional data 652 created by the nearby vehicle into sixth three-dimensional data 654 requested by the own vehicle, encodes sixth three-dimensional data 654 to generate encoded three-dimensional data 634, and sends encoded three-dimensional data 634 to the own vehicle.

Three-dimensional data transmission device 640 includes three-dimensional data creator 641, receiver 642, extractor 643, encoder 644, and transmitter 645.

First, three-dimensional data creator 641 creates fifth three-dimensional data 652 by use of sensor information 651 detected by the sensor included in the nearby vehicle. Next, receiver 642 receives request range information 633 from the own vehicle.

Next, extractor 643 extracts from fifth three-dimensional data 652 the three-dimensional data of the request range indicated by request range information 633, thereby processing fifth three-dimensional data 652 into sixth three-dimensional data 654. Next, encoder 644 encodes sixth three-dimensional data 654 to generate encoded three-dimensional data 643, which is an encoded stream. Then, transmitter 645 sends encoded three-dimensional data 634 to the own vehicle.

Note that although an example case is described here in which the own vehicle includes three-dimensional data creation device 620 and the nearby vehicle includes three-dimensional data transmission device 640, each of the vehicles may include the functionality of both three-dimensional data creation device 620 and three-dimensional data transmission device 640.

Embodiment 4

The present embodiment describes operations performed in abnormal cases when self-location estimation is performed on the basis of a three-dimensional map.

A three-dimensional map is expected to find its expanded use in self-driving of a vehicle and autonomous movement, etc. of a mobile object such as a robot and a flying object (e.g., a drone). Example means for enabling such autonomous movement include a method in which a mobile object travels in accordance with a three-dimensional map, while estimating its self-location on the map (self-location estimation).

The self-location estimation is enabled by matching a three-dimensional map with three-dimensional information on the surrounding of the own vehicle (hereinafter referred to as self-detected three-dimensional data) obtained by a sensor equipped in the own vehicle, such as a rangefinder (e.g., a LiDAR) and a stereo camera to estimate the location of the own vehicle on the three-dimensional map.

As in the case of an HD map suggested by HERE Technologies, for example, a three-dimensional map may include not only a three-dimensional point cloud, but also two-dimensional map data such as information on the shapes of roads and intersections, or information that changes in real-time such as information on a traffic jam and an accident. A three-dimensional map includes a plurality of layers such as layers of three-dimensional data, two-dimensional data, and meta-data that changes in real-time, from among which the device can obtain or refer to only necessary data.

Point cloud data may be a SWLD as described above, or may include point group data that is different from keypoints. The transmission/reception of point cloud data is basically carried out in one or more random access units.

A method described below is used as a method of matching a three-dimensional map with self-detected three-dimensional data. For example, the device compares the shapes of the point groups in each other's point clouds, and determines that portions having a high degree of similarity among keypoints correspond to the same position. When the three-dimensional map is formed by a SWLD, the device also performs matching by comparing the keypoints that form the SWLD with three-dimensional keypoints extracted from the self-detected three-dimensional data.

Here, to enable highly accurate self-location estimation, the following needs to be satisfied: (A) the three-dimensional map and the self-detected three-dimensional data have been already obtained; and (B) their accuracies satisfy a predetermined requirement. However, one of (A) and (B) cannot be satisfied in abnormal cases such as ones described below.

1. A three-dimensional map is unobtainable over communication.
2. A three-dimensional map is not present, or a three-dimensional map having been obtained is corrupt.
3. A sensor of the own vehicle has trouble, or the accuracy of the generated self-detected three-dimensional data is inadequate due to bad weather.

The following describes operations to cope with such abnormal cases. The following description illustrates an example case of a vehicle, but the method described below is applicable to mobile objects on the whole that are capable of autonomous movement, such as a robot and a drone.

Figure 26:
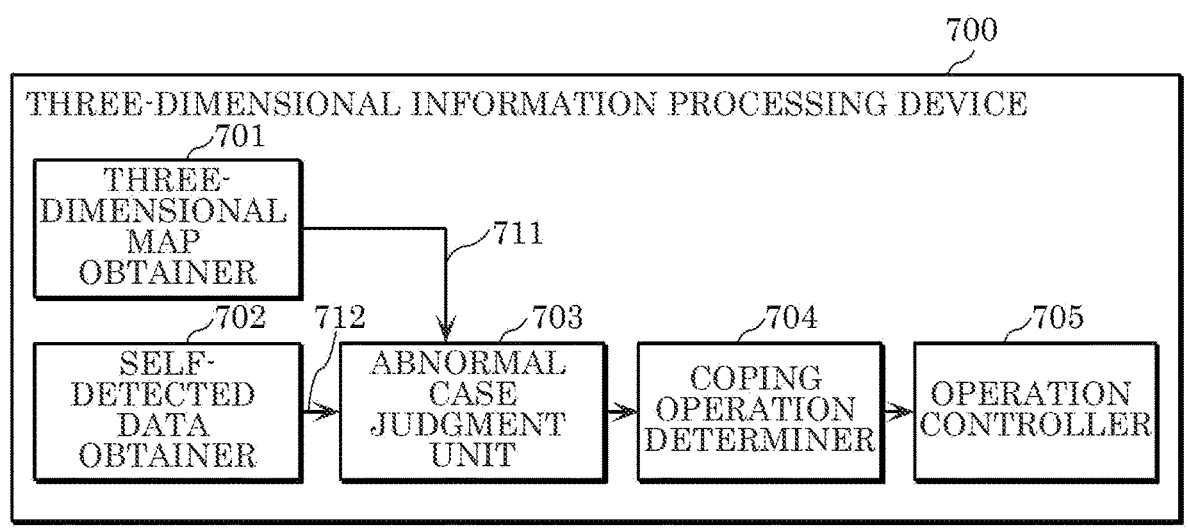
FIG. 26 is a block diagram of a three-dimensional information processing device according to Embodiment 4.

The following describes the structure of the three-dimensional information processing device and its operation according to the present embodiment capable of coping with abnormal cases regarding a three-dimensional map or self-detected three-dimensional data. FIG. 26 is a block diagram of an example structure of three-dimensional information processing device 700 according to the present embodiment.

Three-dimensional information processing device 700 is equipped, for example, in a mobile object such as a car. As shown in FIG. 26, three-dimensional information processing device 700 includes three-dimensional map obtainer 701, self-detected data obtainer 702, abnormal case judgment unit 703, coping operation determiner 704, and operation controller 705.

Note that three-dimensional information processing device 700 may include a non-illustrated two-dimensional or one-dimensional sensor that detects a structural object or a mobile object around the own vehicle, such as a camera capable of obtaining two-dimensional images and a sensor for one-dimensional data utilizing ultrasonic or laser. Three-dimensional information processing device 700 may also include a non-illustrated communication unit that obtains a three-dimensional map over a mobile communication network, such as 4G and 5G, or via inter-vehicle communication or road-to-vehicle communication.

Three-dimensional map obtainer 701 obtains three-dimensional map 711 of the surroundings of the traveling route. For example, three-dimensional map obtainer 701 obtains three-dimensional map 711 over a mobile communication network, or via inter-vehicle communication or road-to-vehicle communication.

Next, self-detected data obtainer 702 obtains self-detected three-dimensional data 712 on the basis of sensor information. For example, self-detected data obtainer 702 generates self-detected three-dimensional data 712 on the basis of the sensor information obtained by a sensor equipped in the own vehicle.

Next, abnormal case judgment unit 703 conducts a predetermined check of at least one of obtained three-dimensional map 711 and self-detected three-dimensional data 712 to detect an abnormal case. Stated differently, abnormal case judgment unit 703 judges whether at least one of obtained three-dimensional map 711 and self-detected three-dimensional data 712 is abnormal.

When the abnormal case is detected, coping operation determiner 704 determines a coping operation to cope with such abnormal case. Next, operation controller 705 controls the operation of each of the processing units necessary to perform the coping operation.

Meanwhile, when no abnormal case is detected, three-dimensional information processing device 700 terminates the process.

Also, three-dimensional information processing device 700 estimates the location of the vehicle equipped with three-dimensional information processing device 700, using three-dimensional map 711 and self-detected three-dimensional data 712. Next, three-dimensional information processing device 700 performs the automatic operation of the vehicle by use of the estimated location of the vehicle.

As described above, three-dimensional information processing device 700 obtains, via a communication channel, map data (three-dimensional map 711) that includes first three-dimensional position information. The first three-dimensional position information includes, for example, a plurality of random access units, each of which is an assembly of at least one subspace and is individually decodable, the at least one subspace having three-dimensional coordinates information and serving as a unit in which each of the plurality of random access units is encoded. The first three-dimensional position information is, for example, data (SWLD) obtained by encoding keypoints, each of which has an amount of a three-dimensional feature greater than or equal to a predetermined threshold.

Three-dimensional information processing device 700 also generates second three-dimensional position information (self-detected three-dimensional data 712) from information detected by a sensor. Three-dimensional information processing device 700 then judges whether one of the first three-dimensional position information and the second three-dimensional position information is abnormal by performing, on one of the first three-dimensional position information and the second three-dimensional position information, a process of judging whether an abnormality is present.

Three-dimensional information processing device 700 determines a coping operation to cope with the abnormality when one of the first three-dimensional position information and the second three-dimensional position information is judged to be abnormal. Three-dimensional information processing device 700 then executes a control that is required to perform the coping operation.

This structure enables three-dimensional information processing device 700 to detect an abnormality regarding one of the first three-dimensional position information and the second three-dimensional position information, and to perform a coping operation therefor.

Embodiment 5

The present embodiment describes a method, etc. of transmitting three-dimensional data to a following vehicle.

Figure 27:
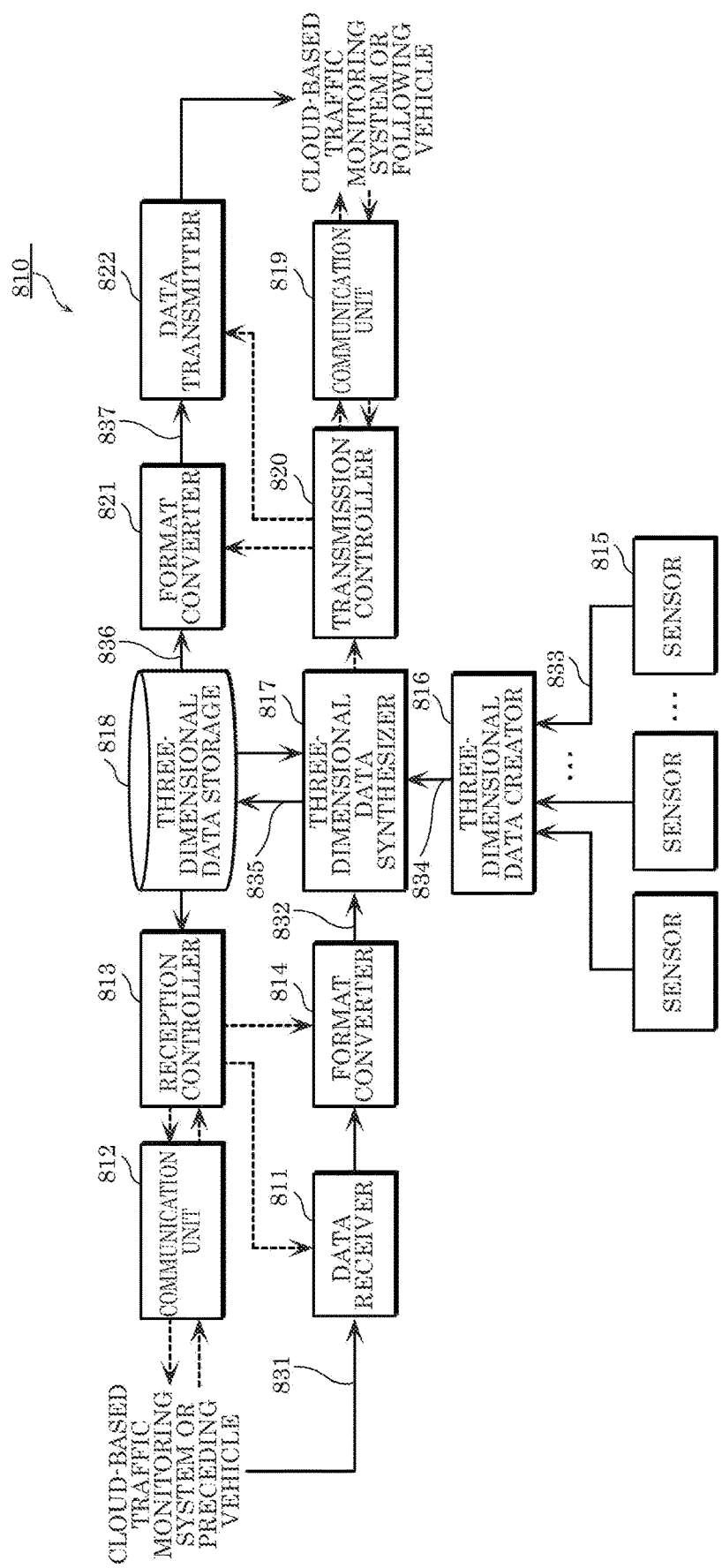
FIG. 27 is a block diagram of a three-dimensional data creation device according to Embodiment 5.

FIG. 27 is a block diagram of an exemplary structure of three-dimensional data creation device 810 according to the present embodiment. Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle.

Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point group data), when sensors 815 are laser sensors such as LiDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner.

Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Embodiment 6

In embodiment 5, an example is described in which a client device of a vehicle or the like transmits three-dimensional data to another vehicle or a server such as a cloud-based traffic monitoring system. In the present embodiment, a client device transmits sensor information obtained through a sensor to a server or a client device.

Figure 28:
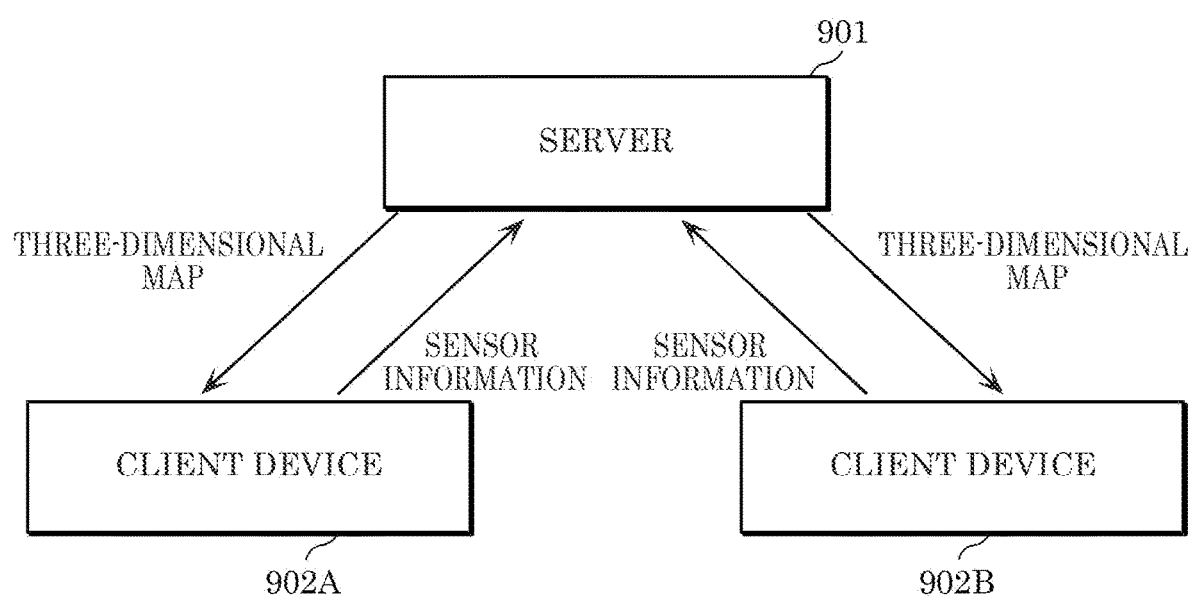
FIG. 28 is a diagram showing a structure of a system according to Embodiment 6.

A structure of a system according to the present embodiment will first be described. FIG. 28 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 29:
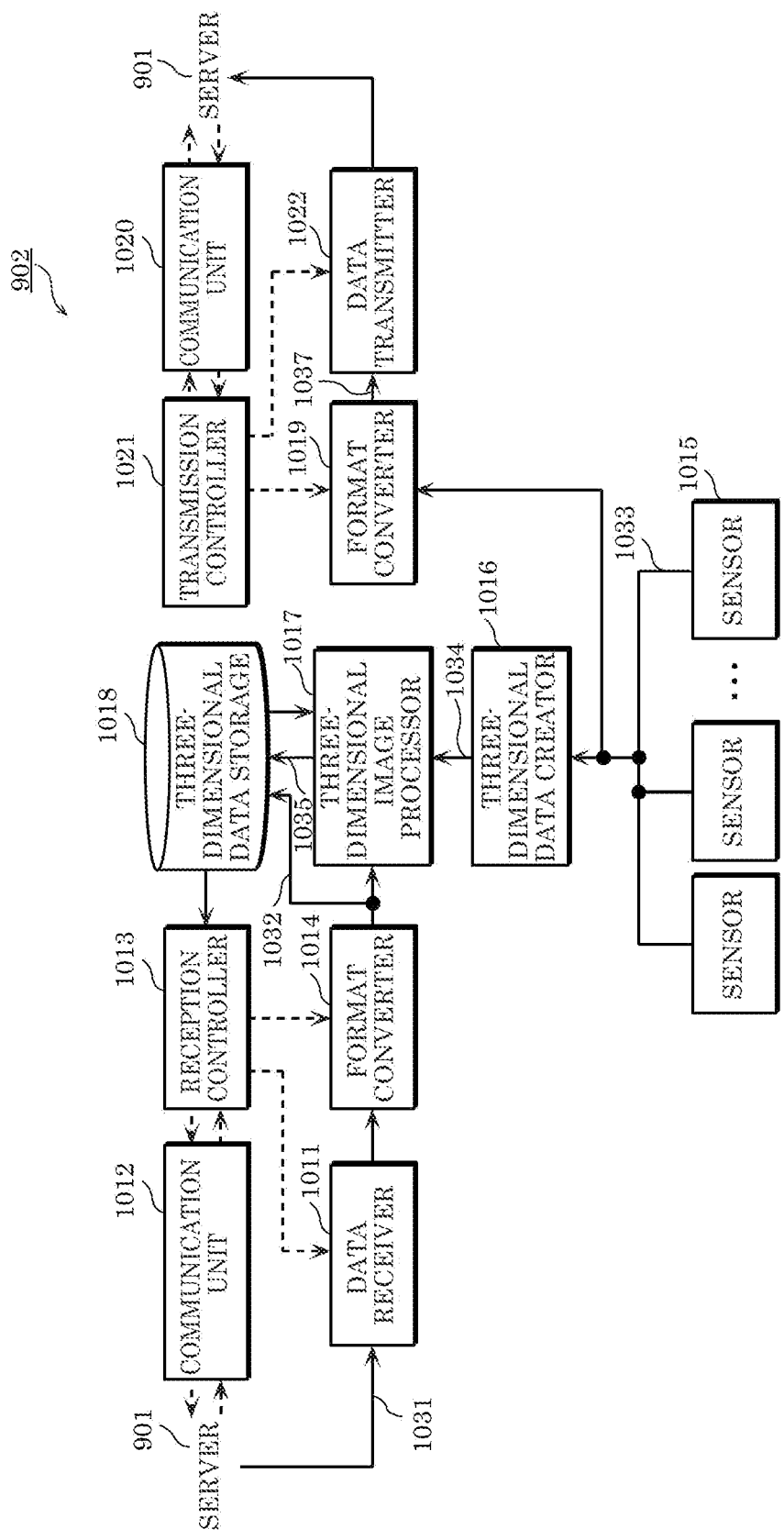
FIG. 29 is a block diagram of a client device according to Embodiment 6.

FIG. 29 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g. transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 815 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LiDAR, a luminance image obtained by a visible light camera, an infrared image obtained by an infrared camera, a depth image obtained by a depth sensor, sensor position information, and sensor speed information.

Figure 30:
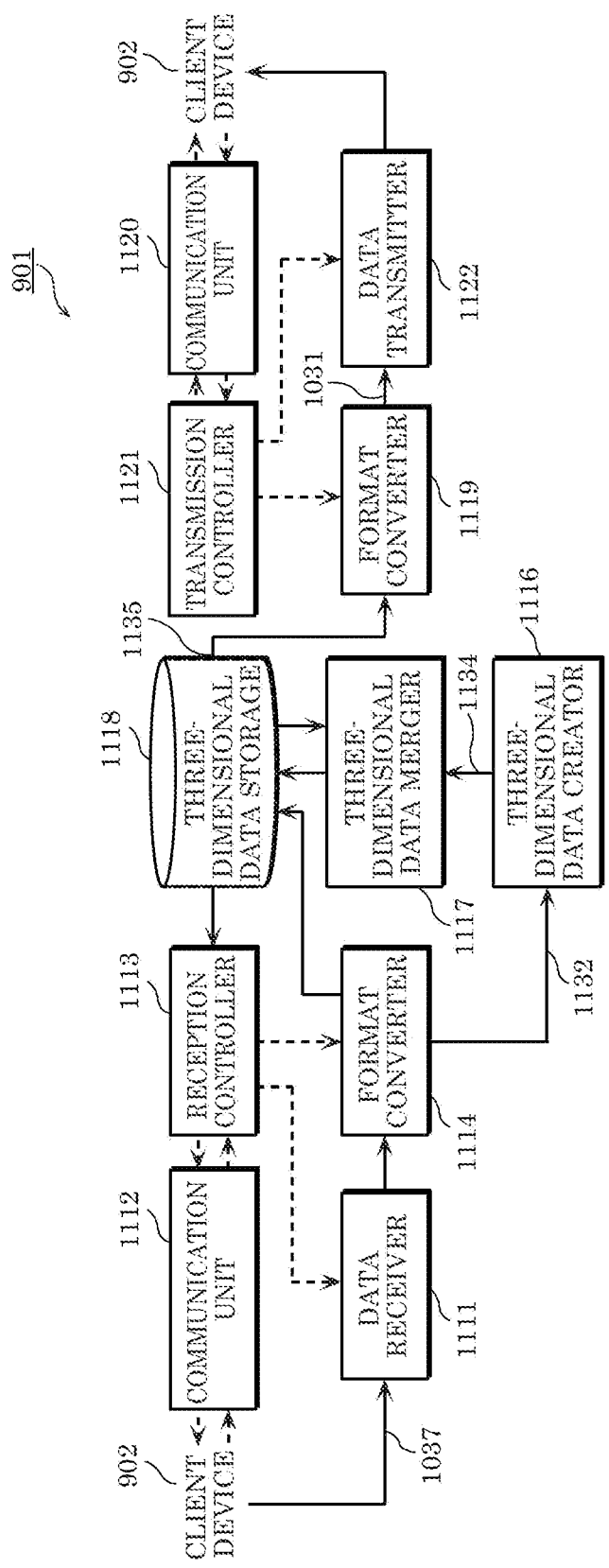
FIG. 30 is a block diagram of a server according to Embodiment 6.

A structure of server 901 will be described next. FIG. 30 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g. transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when the received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

Figure 31:
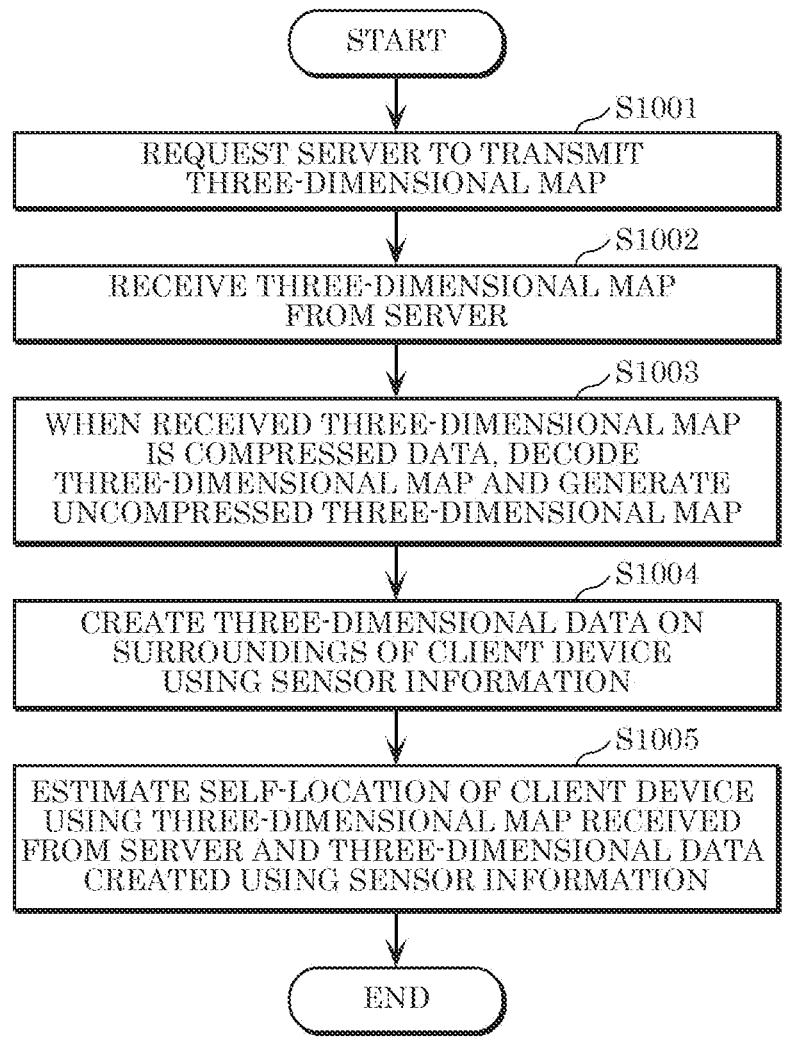
FIG. 31 is a flowchart of a three-dimensional data creation process performed by the client device according to Embodiment 6.

An operational flow of client device 902 will be described next. FIG. 31 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

Figure 32:
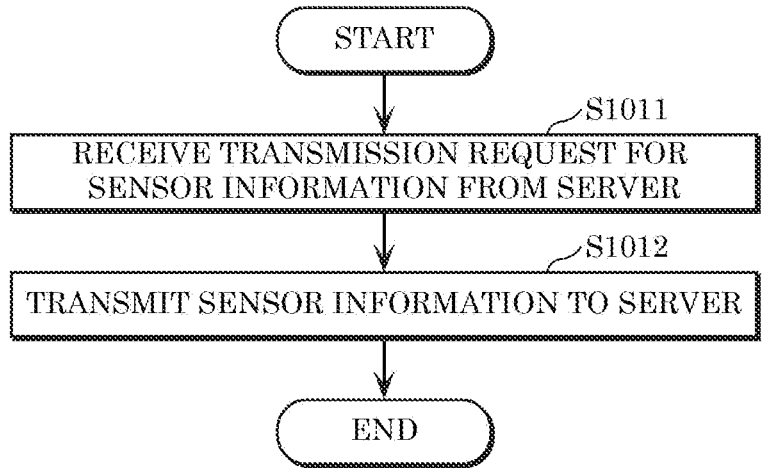
FIG. 32 is a flowchart of a sensor information transmission process performed by the client device according to Embodiment 6.

FIG. 32 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

Figure 33:
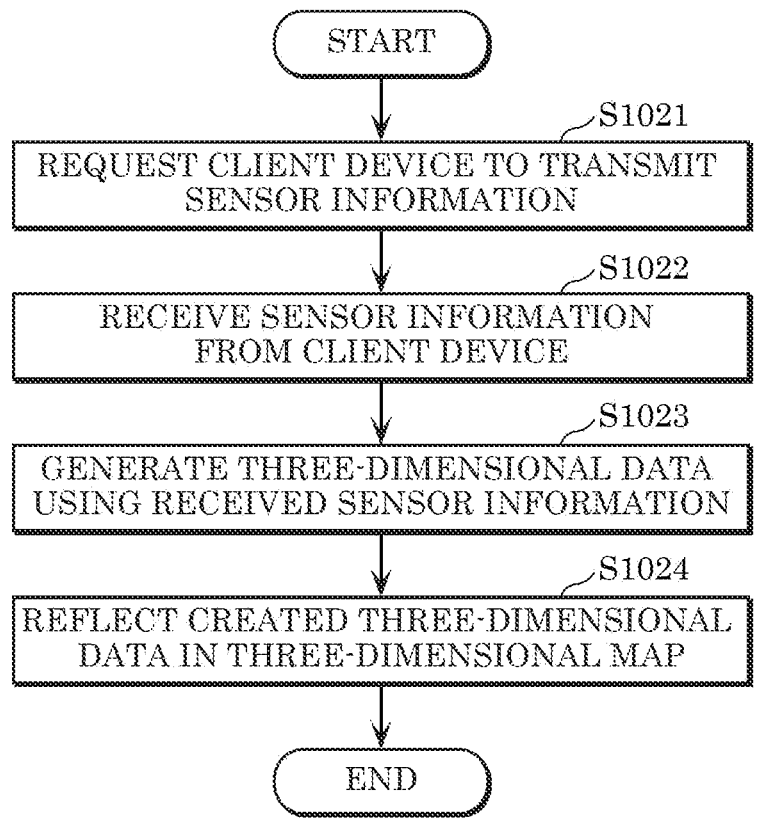
FIG. 33 is a flowchart of a three-dimensional data creation process performed by the server according to Embodiment 6.

An operational flow of server 901 will be described next. FIG. 33 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

Figure 34:
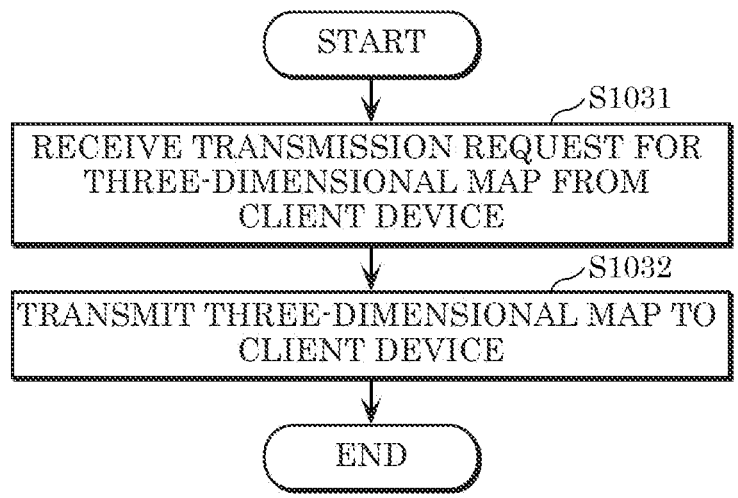
FIG. 34 is a flowchart of a three-dimensional map transmission process performed by the server according to Embodiment 6.

FIG. 34 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

Hereinafter, variations of the present embodiment will be described.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037 when land subsidence or the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LiDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using the obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Figure 35:
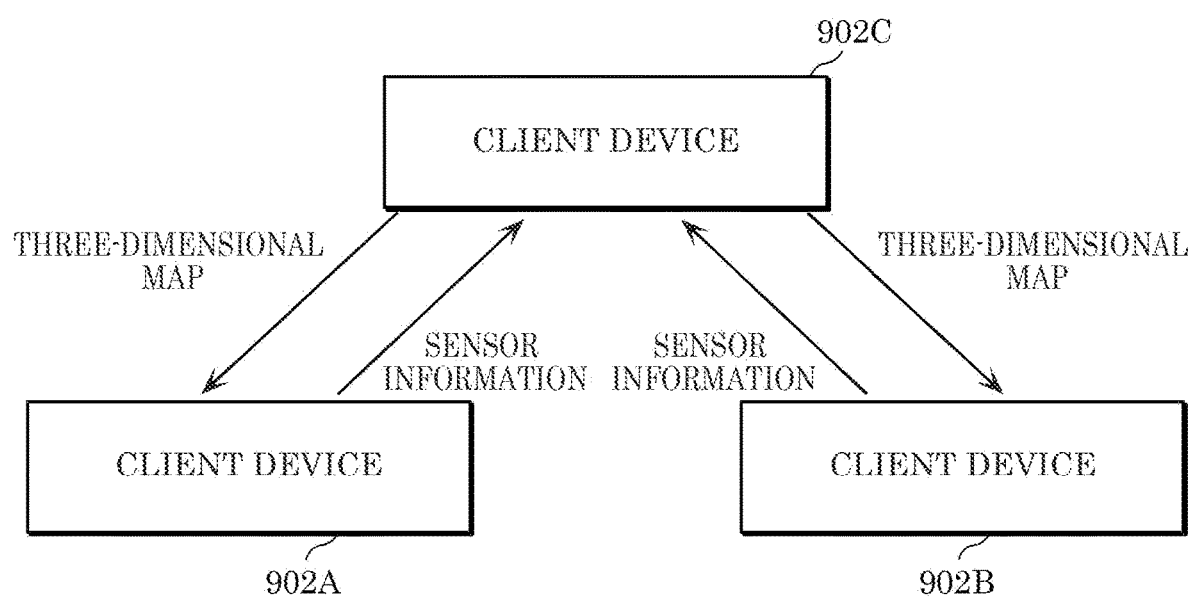
FIG. 35 is a diagram showing a structure of a variation of the system according to Embodiment 6.

Server 901 is not limited to only being a server such as a cloud-based traffic monitoring system, and may also be another (vehicle-mounted) client device. FIG. 35 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

Figure 36:
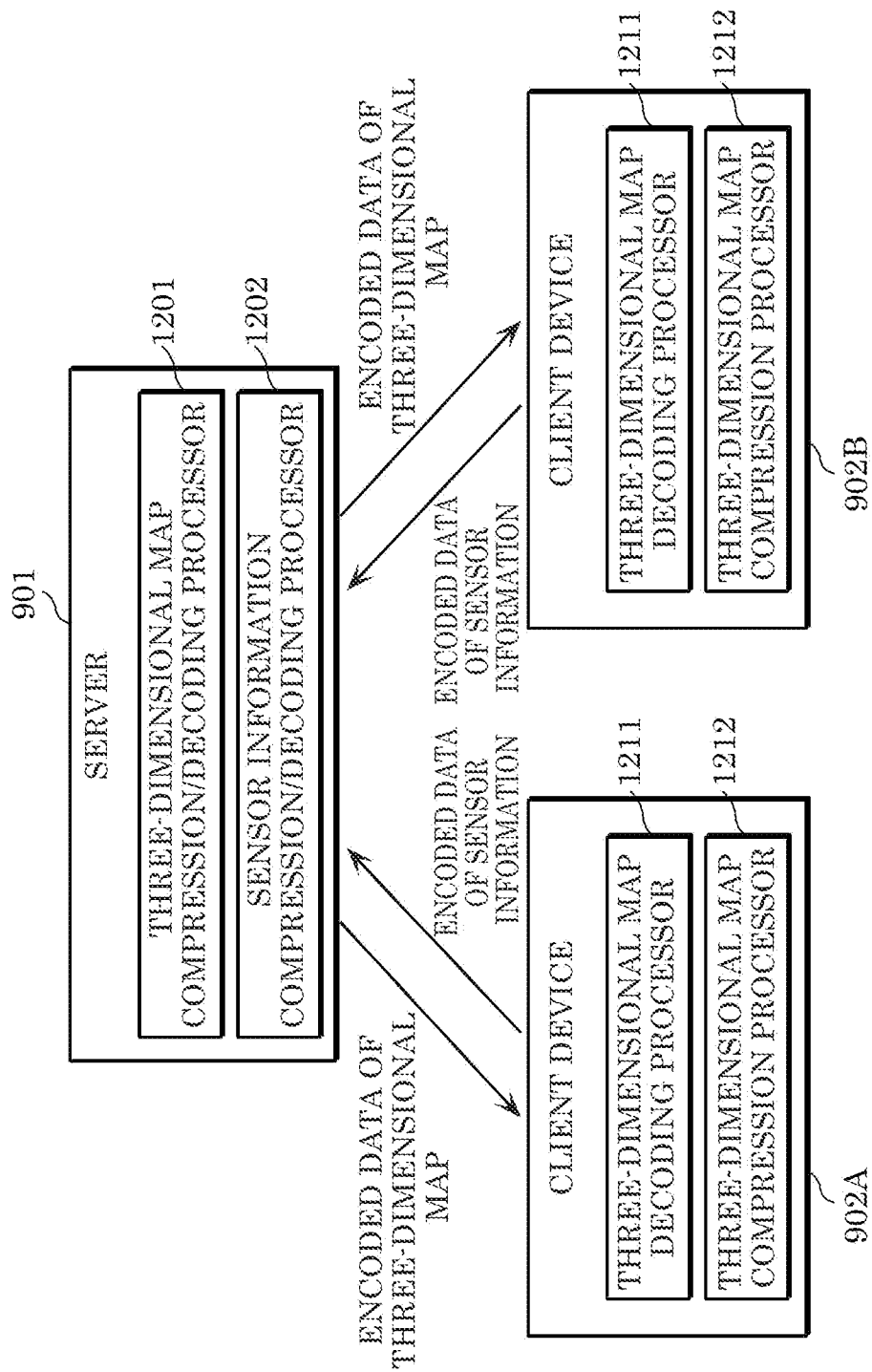
FIG. 36 is a diagram showing a structure of the server and client devices according to Embodiment 6.

FIG. 36 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits the obtained sensor information 1033 to server 901 or another mobile object.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1034 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another mobile object 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using the received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses the received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Embodiment 7

In the present embodiment, three-dimensional data encoding and decoding methods using an inter prediction process will be described.

Figure 37:
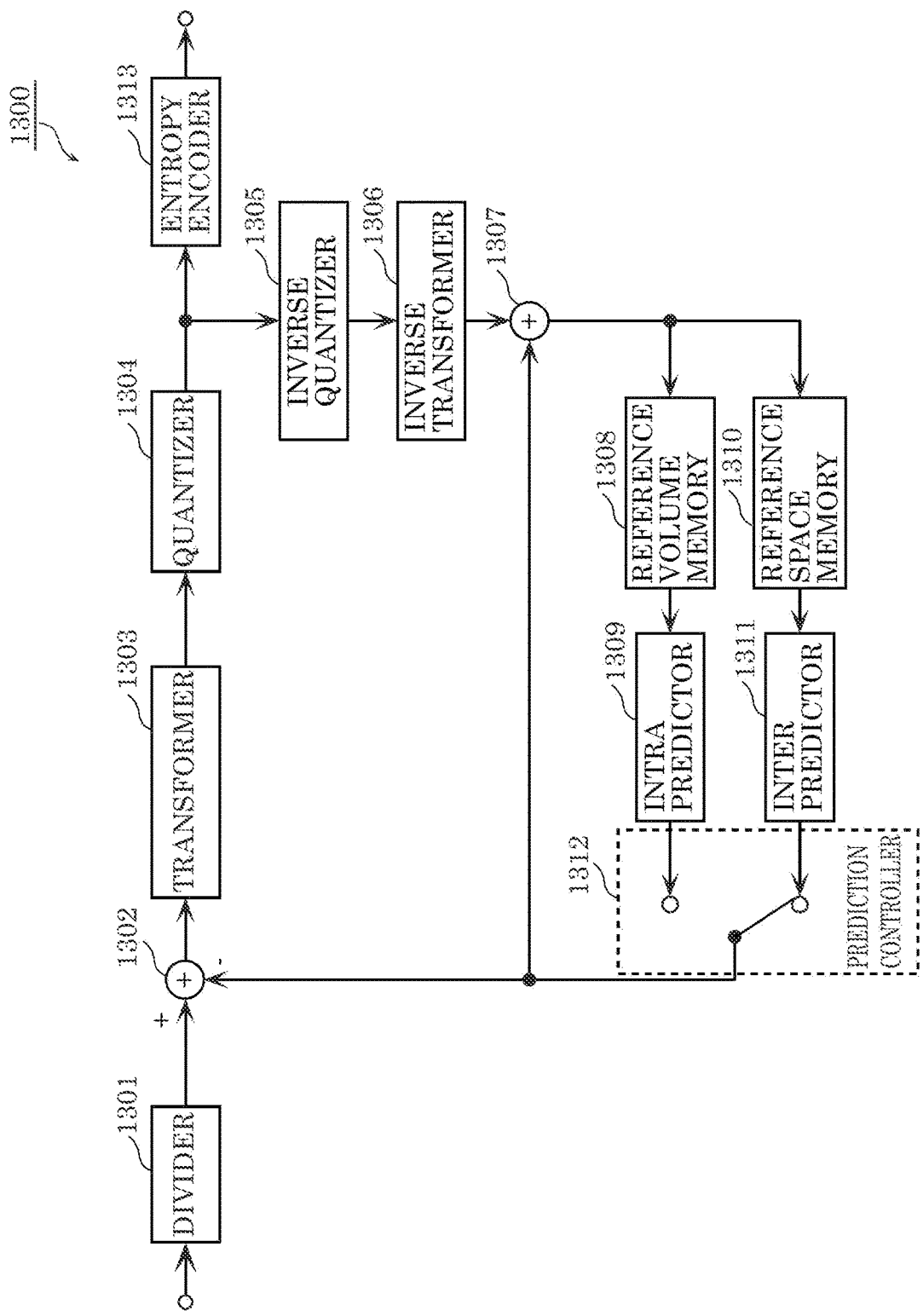
FIG. 37 is a block diagram of a three-dimensional data encoding device according to Embodiment 7.

FIG. 37 is a block diagram of three-dimensional data encoding device 1300 according to the present embodiment. This three-dimensional data encoding device 1300 generates an encoded bitstream (hereinafter, also simply referred to as bitstream) that is an encoded signal, by encoding three-dimensional data. As illustrated in FIG. 37, three-dimensional data encoding device 1300 includes divider 1301, subtractor 1302, transformer 1303, quantizer 1304, inverse quantizer 1305, inverse transformer 1306, adder 1307, reference volume memory 1308, intra predictor 1309, reference space memory 1310, inter predictor 1311, prediction controller 1312, and entropy encoder 1313.

Divider 1301 divides a plurality of volumes (VLMs) that are encoding units of each space (SPC) included in the three-dimensional data. Divider 1301 makes an octree representation (make into an octree) of voxels in each volume. Note that divider 1301 may make the spaces into an octree representation with the spaces having the same size as the volumes. Divider 1301 may also append information (depth information, etc.) necessary for making the octree representation to a header and the like of a bitstream.

Figure 38:
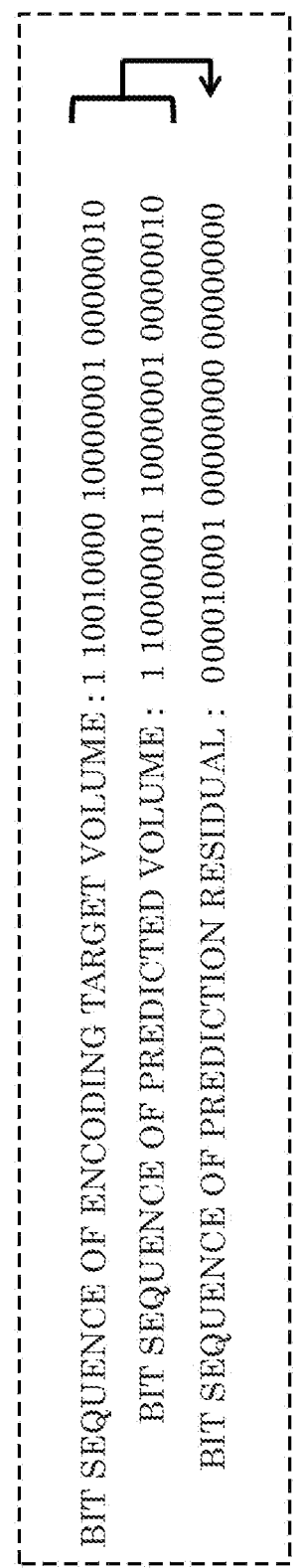
FIG. 38 is a diagram showing an example of a prediction residual according to Embodiment 7.

Subtractor 1302 calculates a difference between a volume (encoding target volume) outputted by divider 1301 and a predicted volume generated through intra prediction or inter prediction, which will be described later and outputs the calculated difference to transformer 1303 as a prediction residual. FIG. 38 is a diagram showing an example calculation of the prediction residual. Note that bit sequences of the encoding target volume and the predicted volume shown here are, for example, position information indicating positions of three-dimensional points included in the volumes.

Figure 39:
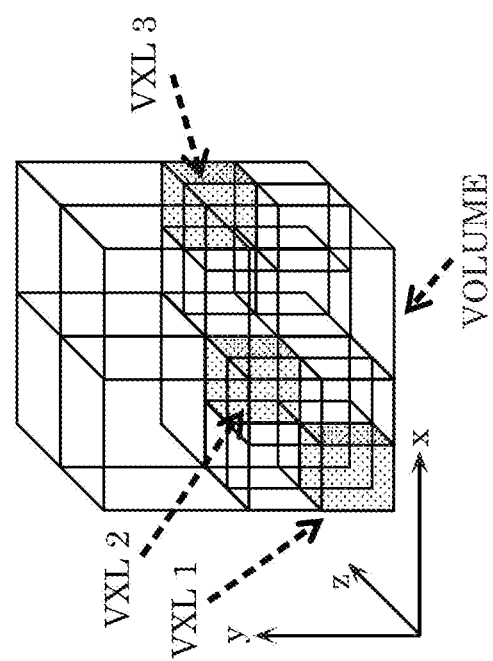
FIG. 39 is a diagram showing an example of a volume according to Embodiment 7.
Figure 40:
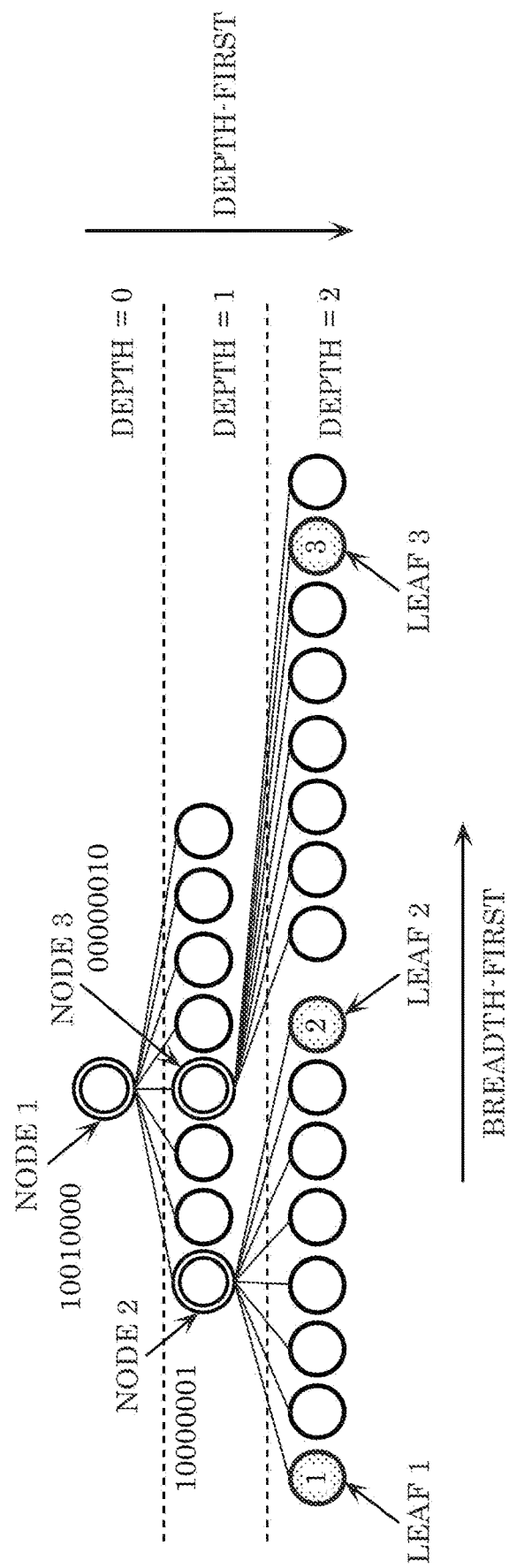
FIG. 40 is a diagram showing an example of an octree representation of the volume according to Embodiment 7.

Hereinafter, a scan order of an octree representation and voxels will be described. A volume is encoded after being converted into an octree structure (made into an octree). The octree structure includes nodes and leaves. Each node has eight nodes or leaves, and each leaf has voxel (VXL) information. FIG. 39 is a diagram showing an example structure of a volume including voxels. FIG. 40 is a diagram showing an example of the volume shown in FIG. 39 having been converted into the octree structure. Among the leaves shown in FIG. 40, leaves 1, 2, and 3 respectively represent VXL 1, VXL 2, and VXL 3, and represent VXLs including a point group (hereinafter, active VXLs).

An octree is represented by, for example, binary sequences of 1s and 0s. For example, when giving the nodes or the active VXLs a value of 1 and everything else a value of 0, each node and leaf is assigned with the binary sequence shown in FIG. 40. Thus, this binary sequence is scanned in accordance with a breadth-first or a depth-first scan order. For example, when scanning breadth-first, the binary sequence shown in A of FIG. 41 is obtained. When scanning depth-first, the binary sequence shown in B of FIG. 41 is obtained. The binary sequences obtained through this scanning are encoded through entropy encoding, which reduces an amount of information.

Depth information in the octree representation will be described next. Depth in the octree representation is used in order to control up to how fine a granularity point cloud information included in a volume is stored. Upon setting a great depth, it is possible to reproduce the point cloud information to a more precise level, but an amount of data for representing the nodes and leaves increases. Upon setting a small depth, however, the amount of data decreases, but some information that the point cloud information originally held is lost, since pieces of point cloud information including different positions and different colors are now considered as pieces of point cloud information including the same position and the same color.

Figure 42:
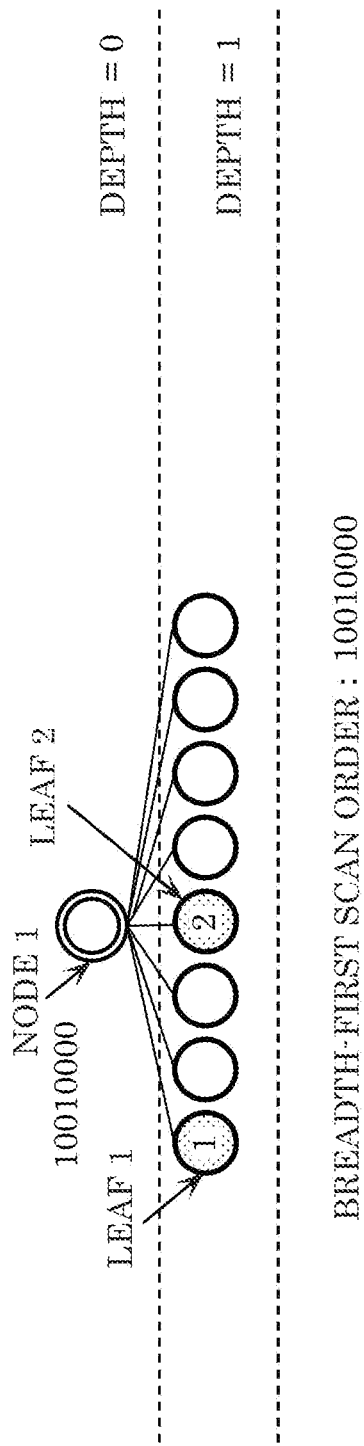
FIG. 42 is a diagram showing an example of an octree representation of a volume according to Embodiment 7.

For example, FIG. 42 is a diagram showing an example in which the octree with a depth of 2 shown in FIG. 40 is represented with a depth of 1. The octree shown in FIG. 42 has a lower amount of data than the octree shown in FIG. 40. In other words, the binarized octree shown in FIG. 42 has a lower bit count than the octree shown in FIG. 40. Leaf 1 and leaf 2 shown in FIG. 40 are represented by leaf 1 shown in FIG. 41. In other words, the information on leaf 1 and leaf 2 being in different positions is lost.

Figure 43:
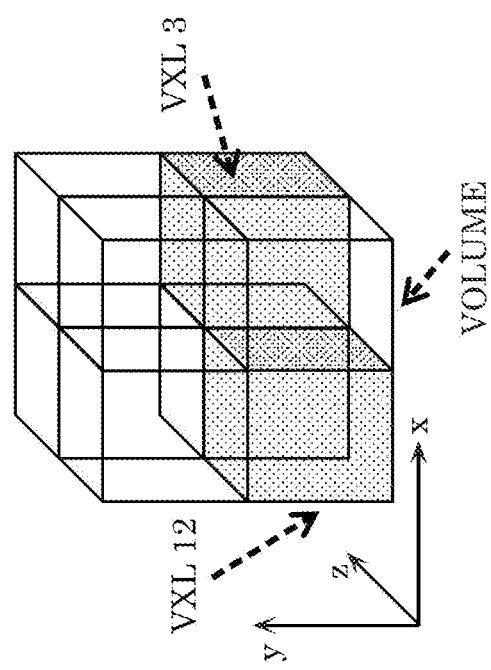
FIG. 43 is a diagram showing an example of the volume according to Embodiment 7.

FIG. 43 is a diagram showing a volume corresponding to the octree shown in FIG. 42. VXL 1 and VXL 2 shown in FIG. 39 correspond to VXL 12 shown in FIG. 43. In this case, three-dimensional data encoding device 1300 generates color information of VXL 12 shown in FIG. 43 using color information of VXL 1 and VXL 2 shown in FIG. 39. For example, three-dimensional data encoding device 1300 calculates an average value, a median, a weighted average value, or the like of the color information of VXL 1 and VXL 2 as the color information of VXL 12. In this manner, three-dimensional data encoding device 1300 may control a reduction of the amount of data by changing the depth of the octree.

Three-dimensional data encoding device 1300 may set the depth information of the octree to units of worlds, units of spaces, or units of volumes. In this case, three-dimensional data encoding device 1300 may append the depth information to header information of the world, header information of the space, or header information of the volume. In all worlds, spaces, and volumes associated with different times, the same value may be used as the depth information. In this case, three-dimensional data encoding device 1300 may append the depth information to header information managing the worlds associated with all times.

When the color information is included in the voxels, transformer 1303 applies frequency transformation, e.g. orthogonal transformation, to a prediction residual of the color information of the voxels in the volume. For example, transformer 1303 creates a one-dimensional array by scanning the prediction residual in a certain scan order. Subsequently, transformer 1303 transforms the one-dimensional array to a frequency domain by applying one-dimensional orthogonal transformation to the created one-dimensional array. With this, when a value of the prediction residual in the volume is similar, a value of a low-frequency component increases and a value of a high-frequency component decreases. As such, it is possible to more efficiently reduce a code amount in quantizer 1304.

Transformer 1303 does not need to use orthogonal transformation in one dimension, but may also use orthogonal transformation in two or more dimensions. For example, transformer 1303 maps the prediction residual to a two-dimensional array in a certain scan order, and applies two-dimensional orthogonal transformation to the obtained two-dimensional array. Transformer 1303 may select an orthogonal transformation method to be used from a plurality of orthogonal transformation methods. In this case, three-dimensional data encoding device 1300 appends, to the bitstream, information indicating which orthogonal transformation method is used. Transformer 1303 may select an orthogonal transformation method to be used from a plurality of orthogonal transformation methods in different dimensions. In this case, three-dimensional data encoding device 1300 appends, to the bitstream, in how many dimensions the orthogonal transformation method is used.

For example, transformer 1303 matches the scan order of the prediction residual to a scan order (breadth-first, depth-first, or the like) in the octree in the volume. This makes it possible to reduce overhead, since information indicating the scan order of the prediction residual does not need to be appended to the bitstream. Transformer 1303 may apply a scan order different from the scan order of the octree. In this case, three-dimensional data encoding device 1300 appends, to the bitstream, information indicating the scan order of the prediction residual. This enables three-dimensional data encoding device 1300 to efficiently encode the prediction residual. Three-dimensional data encoding device 1300 may append, to the bitstream, information (flag, etc.) indicating whether to apply the scan order of the octree, and may also append, to the bitstream, information indicating the scan order of the prediction residual when the scan order of the octree is not applied.

Transformer 1303 does not only transform the prediction residual of the color information, and may also transform other attribute information included in the voxels. For example, transformer 1303 may transform and encode information, such as reflectance information, obtained when obtaining a point cloud through LiDAR and the like.

Transformer 1303 may skip these processes when the spaces do not include attribute information such as color information. Three-dimensional data encoding device 1300 may append, to the bitstream, information (flag) indicating whether to skip the processes of transformer 1303.

Quantizer 1304 generates a quantized coefficient by performing quantization using a quantization control parameter on a frequency component of the prediction residual generated by transformer 1303. With this, the amount of information is further reduced. The generated quantized coefficient is outputted to entropy encoder 1313. Quantizer 1304 may control the quantization control parameter in units of worlds, units of spaces, or units of volumes. In this case, three-dimensional data encoding device 1300 appends the quantization control parameter to each header information and the like. Quantizer 1304 may perform quantization control by changing a weight per frequency component of the prediction residual. For example, quantizer 1304 may precisely quantize a low-frequency component and roughly quantize a high-frequency component. In this case, three-dimensional data encoding device 1300 may append, to a header, a parameter expressing a weight of each frequency component.

Quantizer 1304 may skip these processes when the spaces do not include attribute information such as color information. Three-dimensional data encoding device 1300 may append, to the bitstream, information (flag) indicating whether to skip the processes of quantizer 1304.

Inverse quantizer 1305 generates an inverse quantized coefficient of the prediction residual by performing inverse quantization on the quantized coefficient generated by quantizer 1304 using the quantization control parameter, and outputs the generated inverse quantized coefficient to inverse transformer 1306.

Inverse transformer 1306 generates an inverse transformation-applied prediction residual by applying inverse transformation on the inverse quantized coefficient generated by inverse quantizer 1305. This inverse transformation-applied prediction residual does not need to completely coincide with the prediction residual outputted by transformer 1303, since the inverse transformation-applied prediction residual is a prediction residual that is generated after the quantization.

Adder 1307 adds, to generate a reconstructed volume, (i) the inverse transformation-applied prediction residual generated by inverse transformer 1306 to (ii) a predicted volume that is generated through intra prediction or intra prediction, which will be described later, and is used to generate a pre-quantized prediction residual. This reconstructed volume is stored in reference volume memory 1308 or reference space memory 1310.

Intra predictor 1309 generates a predicted volume of an encoding target volume using attribute information of a neighboring volume stored in reference volume memory 1308. The attribute information includes color information or a reflectance of the voxels. Intra predictor 1309 generates a predicted value of color information or a reflectance of the encoding target volume.

Figure 44:
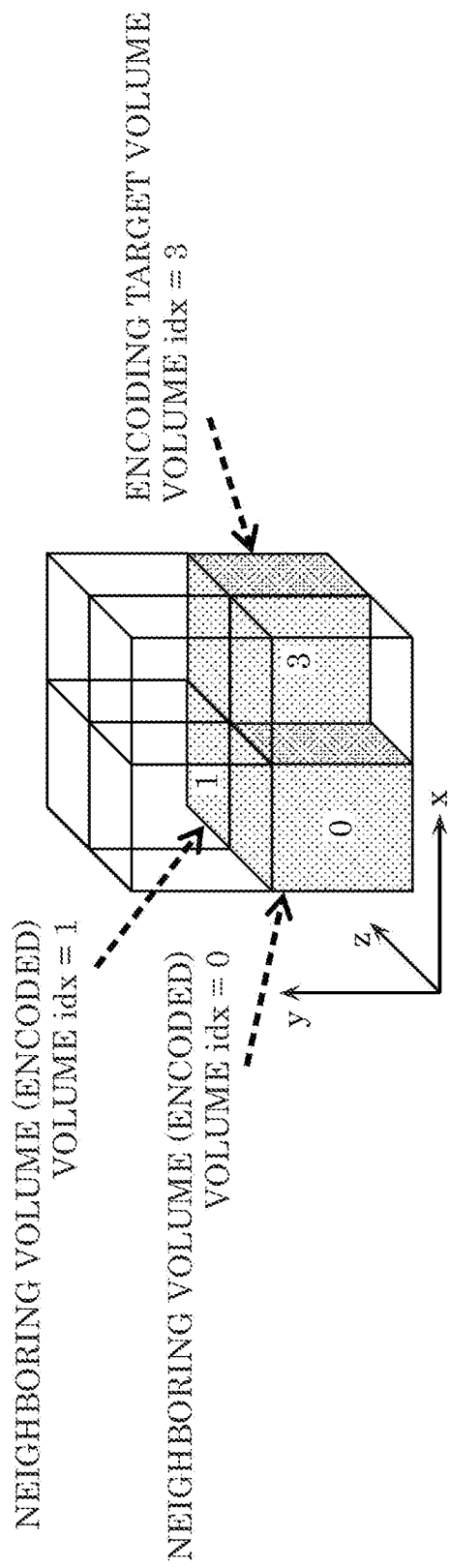
FIG. 44 is a diagram for describing an intra prediction process according to Embodiment 7.

FIG. 44 is a diagram for describing an operation of intra predictor 1309. For example, intra predictor 1309 generates the predicted volume of the encoding target volume (volume idx=3) shown in FIG. 44, using a neighboring volume (volume idx=0). Volume idx here is identifier information that is appended to a volume in a space, and a different value is assigned to each volume. An order of assigning volume idx may be the same as an encoding order, and may also be different from the encoding order. For example, intra predictor 1309 uses an average value of color information of voxels included in volume idx=0, which is a neighboring volume, as the predicted value of the color information of the encoding target volume shown in FIG. 44. In this case, a prediction residual is generated by deducting the predicted value of the color information from the color information of each voxel included in the encoding target volume. The following processes are performed by transformer 1303 and subsequent processors with respect to this prediction residual. In this case, three-dimensional data encoding device 1300 appends, to the bitstream, neighboring volume information and prediction mode information. The neighboring volume information here is information indicating a neighboring volume used in the prediction, and indicates, for example, volume idx of the neighboring volume used in the prediction. The prediction mode information here indicates a mode used to generate the predicted volume. The mode is, for example, an average value mode in which the predicted value is generated using an average value of the voxels in the neighboring volume, or a median mode in which the predicted value is generated using the median of the voxels in the neighboring volume.

Intra predictor 1309 may generate the predicted volume using a plurality of neighboring volumes. For example, in the structure shown in FIG. 44, intra predictor 1309 generates predicted volume 0 using a volume with volume idx=0, and generates predicted volume 1 using a volume with volume idx=1. Intra predictor 1309 then generates an average of predicted volume 0 and predicted volume 1 as a final predicted volume. In this case, three-dimensional data encoding device 1300 may append, to the bitstream, a plurality of volumes idx of a plurality of volumes used to generate the predicted volume.

Figure 45:
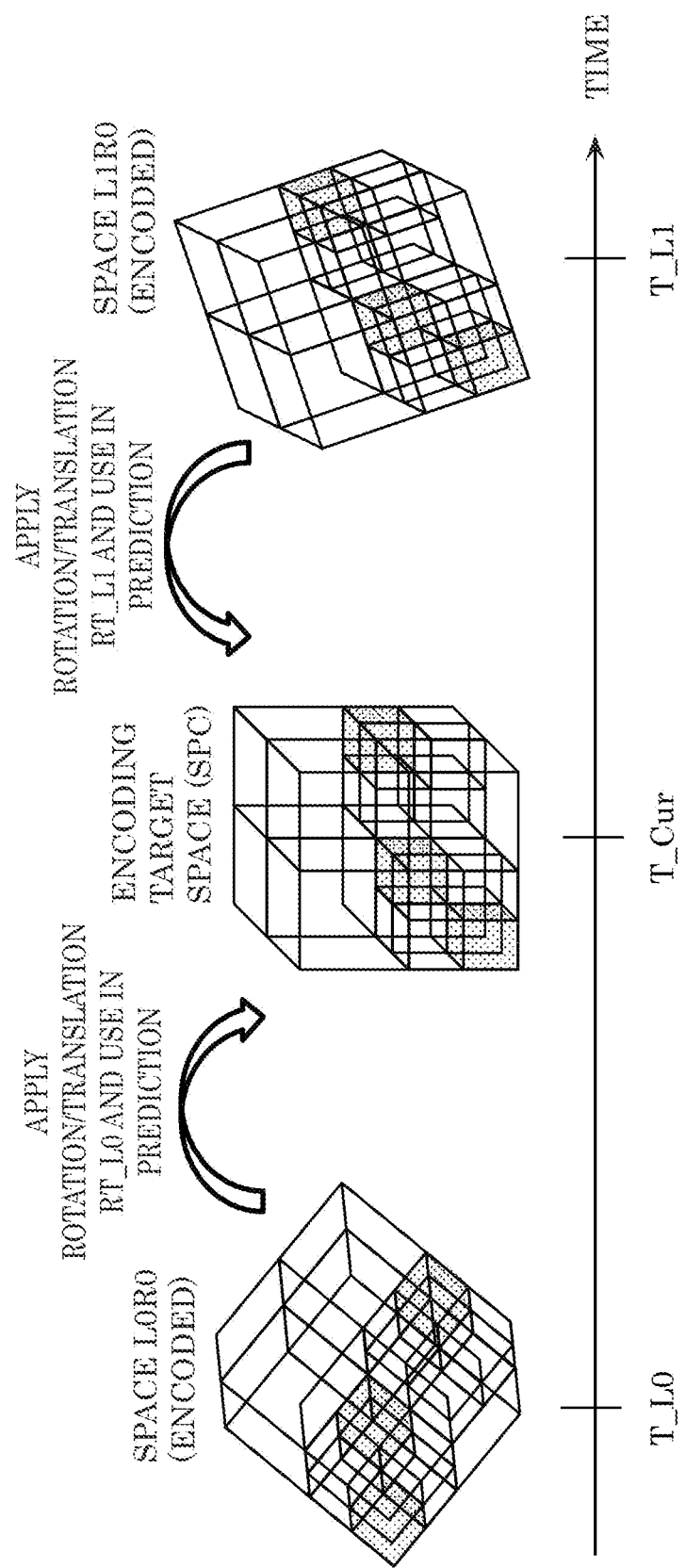
FIG. 45 is a diagram for describing a rotation and translation process according to Embodiment 7.

FIG. 45 is a diagram schematically showing the inter prediction process according to the present embodiment. Inter predictor 1311 encodes (inter predicts) a space (SPC) associated with certain time T_Cur using an encoded space associated with different time T_LX. In this case, inter predictor 1311 performs an encoding process by applying a rotation and translation process to the encoded space associated with different time T_LX.

Three-dimensional data encoding device 1300 appends, to the bitstream, RT information relating to a rotation and translation process suited to the space associated with different time T_LX. Different time T_LX is, for example, time T_L0 before certain time T_Cur. At this point, three-dimensional data encoding device 1300 may append, to the bitstream, RT information RT_L0 relating to a rotation and translation process suited to a space associated with time T_L0.

Alternatively, different time T_LX is, for example, time T_L1 after certain time T_Cur. At this point, three-dimensional data encoding device 1300 may append, to the bitstream, RT information RT_L1 relating to a rotation and translation process suited to a space associated with time T_L1.

Alternatively, inter predictor 1311 encodes (bidirectional prediction) with reference to the spaces associated with time T_L0 and time T_L1 that differ from each other. In this case, three-dimensional data encoding device 1300 may append, to the bitstream, both RT information RT_L0 and RT information RT_L1 relating to the rotation and translation process suited to the spaces thereof.

Note that T_L0 has been described as being before T_Cur and T_L1 as being after T_Cur, but are not necessarily limited thereto. For example, T_L0 and T_L1 may both be before T_Cur. T_L0 and T_L1 may also both be after T_Cur.

Three-dimensional data encoding device 1300 may append, to the bitstream, RT information relating to a rotation and translation process suited to spaces associated with different times, when encoding with reference to each of the spaces. For example, three-dimensional data encoding device 1300 manages a plurality of encoded spaces to be referred to, using two reference lists (list L0 and list L). When a first reference space in list L0 is L0R0, a second reference space in list L0 is L0R1, a first reference space in list L1 is L1R0, and a second reference space in list L1 is L1R1, three-dimensional data encoding device 1300 appends, to the bitstream, RT information RT_L0R0 of L0R0, RT information RT_L0R1 of L0R1, RT information RT_L1R0 of L1R0, and RT information RT_L1R1 of L1R1. For example, three-dimensional data encoding device 1300 appends these pieces of RT information to a header and the like of the bitstream.

Three-dimensional data encoding device 1300 determines whether to apply rotation and translation per reference space, when encoding with reference to reference spaces associated with different times. In this case, three-dimensional data encoding device 1300 may append, to header information and the like of the bitstream, information (RT flag, etc.) indicating whether rotation and translation are applied per reference space. For example, three-dimensional data encoding device 1300 calculates the RT information and an Iterative Closest Point (ICP) error value, using an ICP algorithm per reference space to be referred to from the encoding target space. Three-dimensional data encoding device 1300 determines that rotation and translation do not need to be performed and sets the RT flag to OFF, when the ICP error value is lower than or equal to a predetermined fixed value. In contrast, three-dimensional data encoding device 1300 sets the RT flag to ON and appends the RT information to the bitstream, when the ICP error value exceeds the above fixed value.

FIG. 46 is a diagram showing an example syntax to be appended to a header of the RT information and the RT flag. Note that a bit count assigned to each syntax may be decided based on a range of this syntax. For example, when eight reference spaces are included in reference list L0, 3 bits may be assigned to MaxRefSpc_l0. The bit count to be assigned may be variable in accordance with a value each syntax can be, and may also be fixed regardless of the value each syntax can be. When the bit count to be assigned is fixed, three-dimensional data encoding device 1300 may append this fixed bit count to other header information.

MaxRefSpc_l0 shown in FIG. 46 indicates a number of reference spaces included in reference list L0. RT_flag_l0[i] is an RT flag of reference space i in reference list L0. When RT_flag_l0[i] is 1, rotation and translation are applied to reference space i. When RT_flag_l0[i] is 0, rotation and translation are not applied to reference space i.

R_l0[i] and T_l0[i] are RT information of reference space i in reference list L0. R_l0[i] is rotation information of reference space i in reference list L0. The rotation information indicates contents of the applied rotation process, and is, for example, a rotation matrix or a quaternion. T_l0[i] is translation information of reference space i in reference list L0. The translation information indicates contents of the applied translation process, and is, for example, a translation vector.

MaxRefSpc_l1 indicates a number of reference spaces included in reference list L1. RT_flag_l1[i] is an RT flag of reference space i in reference list L1. When RT_flag_l1[i] is 1, rotation and translation are applied to reference space i. When RT_flag_l1[i] is 0, rotation and translation are not applied to reference space i.

R_l1[i] and T_l1[i] are RT information of reference space i in reference list L1. R_l1[i] is rotation information of reference space i in reference list L1. The rotation information indicates contents of the applied rotation process, and is, for example, a rotation matrix or a quaternion. T_l1[i] is translation information of reference space i in reference list L1. The translation information indicates contents of the applied translation process, and is, for example, a translation vector.

Inter predictor 1311 generates the predicted volume of the encoding target volume using information on an encoded reference space stored in reference space memory 1310. As stated above, before generating the predicted volume of the encoding target volume, inter predictor 1311 calculates RT information at an encoding target space and a reference space using an ICP algorithm, in order to approach an overall positional relationship between the encoding target space and the reference space. Inter predictor 1311 then obtains reference space B by applying a rotation and translation process to the reference space using the calculated RT information. Subsequently inter predictor 1311 generates the predicted volume of the encoding target volume in the encoding target space using information in reference space B. Three-dimensional data encoding device 1300 appends, to header information and the like of the encoding target space, the RT information used to obtain reference space B.

In this manner, inter predictor 1311 is capable of improving precision of the predicted volume by generating the predicted volume using the information of the reference space, after approaching the overall positional relationship between the encoding target space and the reference space, by applying a rotation and translation process to the reference space. It is possible to reduce the code amount since it is possible to limit the prediction residual. Note that an example has been described in which ICP is performed using the encoding target space and the reference space, but is not necessarily limited thereto. For example, inter predictor 1311 may calculate the RT information by performing ICP using at least one of (i) an encoding target space in which a voxel or point cloud count is pruned, or (ii) a reference space in which a voxel or point cloud count is pruned, in order to reduce the processing amount.

When the ICP error value obtained as a result of the ICP is smaller than a predetermined first threshold, i.e., when for example the positional relationship between the encoding target space and the reference space is similar, inter predictor 1311 determines that a rotation and translation process is not necessary, and the rotation and translation process does not need to be performed. In this case, three-dimensional data encoding device 1300 may control the overhead by not appending the RT information to the bitstream.

When the ICP error value is greater than a predetermined second threshold, inter predictor 1311 determines that a shape change between the spaces is large, and intra prediction may be applied on all volumes of the encoding target space. Hereinafter, spaces to which intra prediction is applied will be referred to as intra spaces. The second threshold is greater than the above first threshold. The present embodiment is not limited to ICP, and any type of method may be used as long as the method calculates the RT information using two voxel sets or two point cloud sets.

Figure 47:
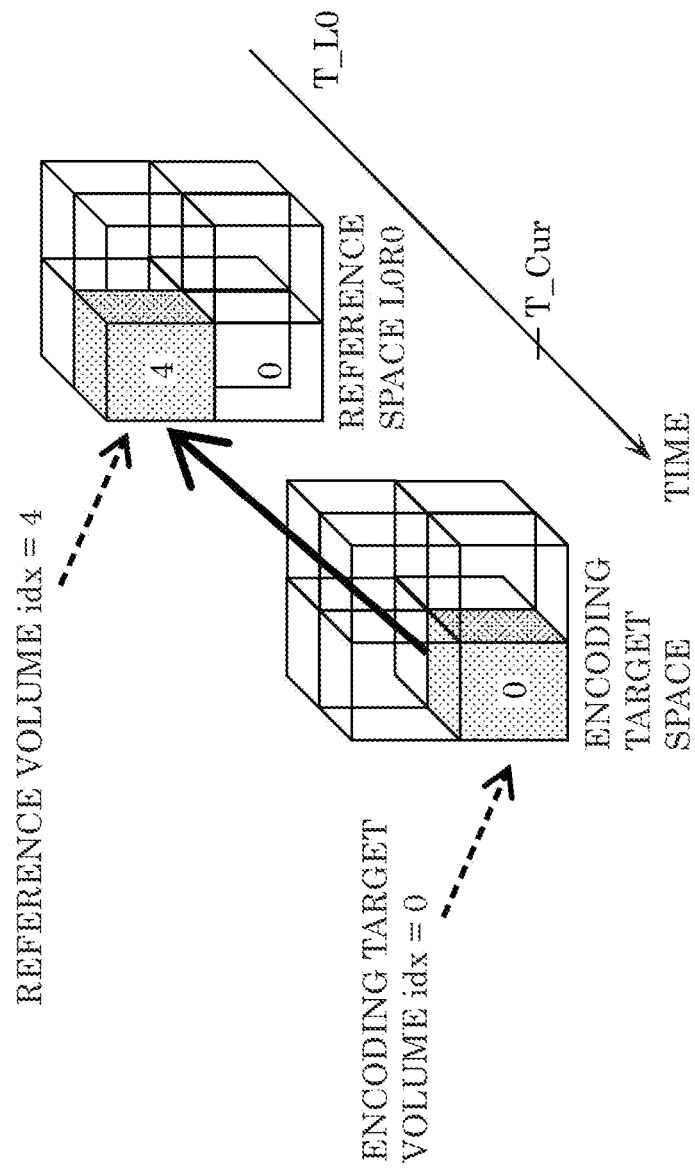
FIG. 47 is a diagram for describing an inter prediction process according to Embodiment 7.

When attribute information, e.g. shape or color information, is included in the three-dimensional data, inter predictor 1311 searches, for example, a volume whose attribute information, e.g. shape or color information, is the most similar to the encoding target volume in the reference space, as the predicted volume of the encoding target volume in the encoding target space. This reference space is, for example, a reference space on which the above rotation and translation process has been performed. Inter predictor 1311 generates the predicted volume using the volume (reference volume) obtained through the search. FIG. 47 is a diagram for describing a generating operation of the predicted volume. When encoding the encoding target volume (volume idx=0) shown in FIG. 47 using inter prediction, inter predictor 1311 searches a volume with a smallest prediction residual, which is the difference between the encoding target volume and the reference volume, while sequentially scanning the reference volume in the reference space. Inter predictor 1311 selects the volume with the smallest prediction residual as the predicted volume. The prediction residuals of the encoding target volume and the predicted volume are encoded through the processes performed by transformer 1303 and subsequent processors. The prediction residual here is a difference between the attribute information of the encoding target volume and the attribute information of the predicted volume. Three-dimensional data encoding device 1300 appends, to the header and the like of the bitstream, volume idx of the reference volume in the reference space, as the predicted volume.

In the example shown in FIG. 47, the reference volume with volume idx=4 of reference space L0R0 is selected as the predicted volume of the encoding target volume. The prediction residuals of the encoding target volume and the reference volume, and reference volume idx=4 are then encoded and appended to the bitstream.

Note that an example has been described in which the predicted volume of the attribute information is generated, but the same process may be applied to the predicted volume of the position information.

Prediction controller 1312 controls whether to encode the encoding target volume using intra prediction or inter prediction. A mode including intra prediction and inter prediction is referred to here as a prediction mode. For example, prediction controller 1312 calculates the prediction residual when the encoding target volume is predicted using intra prediction and the prediction residual when the encoding target volume is predicted using inter prediction as evaluation values, and selects the prediction mode whose evaluation value is smaller. Note that prediction controller 1312 may calculate an actual code amount by applying orthogonal transformation, quantization, and entropy encoding to the prediction residual of the intra prediction and the prediction residual of the inter prediction, and select a prediction mode using the calculated code amount as the evaluation value. Overhead information (reference volume idx information, etc.) aside from the prediction residual may be added to the evaluation value. Prediction controller 1312 may continuously select intra prediction when it has been decided in advance to encode the encoding target space using intra space.

Entropy encoder 1313 generates an encoded signal (encoded bitstream) by variable-length encoding the quantized coefficient, which is an input from quantizer 1304. To be specific, entropy encoder 1313, for example, binarizes the quantized coefficient and arithmetically encodes the obtained binary signal.

Figure 48:
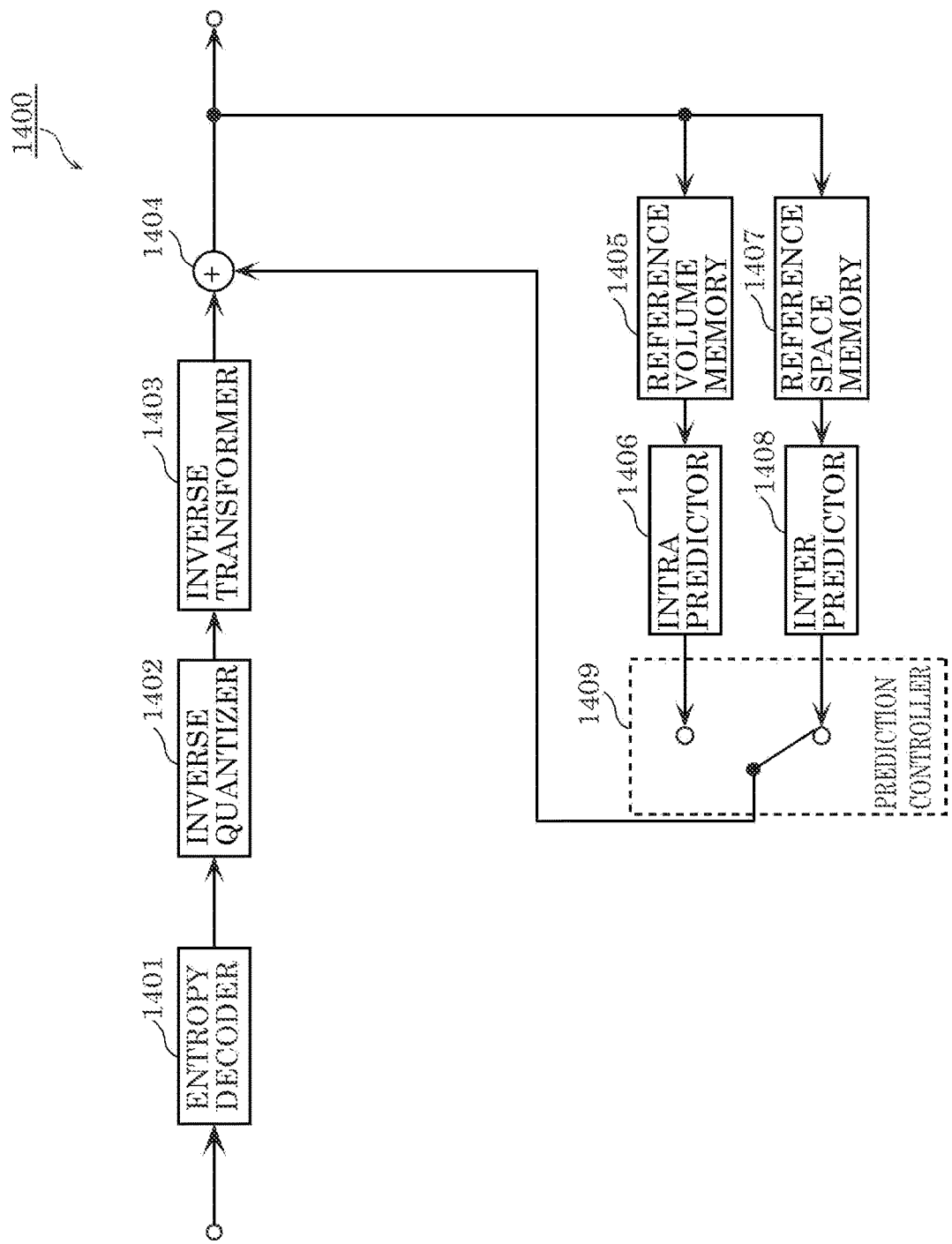
FIG. 48 is a block diagram of a three-dimensional data decoding device according to Embodiment 7.

A three-dimensional data decoding device that decodes the encoded signal generated by three-dimensional data encoding device 1300 will be described next. FIG. 48 is a block diagram of three-dimensional data decoding device 1400 according to the present embodiment. This three-dimensional data decoding device 1400 includes entropy decoder 1401, inverse quantizer 1402, inverse transformer 1403, adder 1404, reference volume memory 1405, intra predictor 1406, reference space memory 1407, inter predictor 1408, and prediction controller 1409.

Entropy decoder 1401 variable-length decodes the encoded signal (encoded bitstream). For example, entropy decoder 1401 generates a binary signal by arithmetically decoding the encoded signal, and generates a quantized coefficient using the generated binary signal.

Inverse quantizer 1402 generates an inverse quantized coefficient by inverse quantizing the quantized coefficient inputted from entropy decoder 1401, using a quantization parameter appended to the bitstream and the like.

Inverse transformer 1403 generates a prediction residual by inverse transforming the inverse quantized coefficient inputted from inverse quantizer 1402. For example, inverse transformer 1403 generates the prediction residual by inverse orthogonally transforming the inverse quantized coefficient, based on information appended to the bitstream.

Adder 1404 adds, to generate a reconstructed volume, (i) the prediction residual generated by inverse transformer 1403 to (ii) a predicted volume generated through intra prediction or intra prediction. This reconstructed volume is outputted as decoded three-dimensional data and is stored in reference volume memory 1405 or reference space memory 1407.

Intra predictor 1406 generates a predicted volume through intra prediction using a reference volume in reference volume memory 1405 and information appended to the bitstream. To be specific, intra predictor 1406 obtains neighboring volume information (e.g. volume idx) appended to the bitstream and prediction mode information, and generates the predicted volume through a mode indicated by the prediction mode information, using a neighboring volume indicated in the neighboring volume information. Note that the specifics of these processes are the same as the above-mentioned processes performed by intra predictor 1309, except for which information appended to the bitstream is used.

Inter predictor 1408 generates a predicted volume through inter prediction using a reference space in reference space memory 1407 and information appended to the bitstream. To be specific, inter predictor 1408 applies a rotation and translation process to the reference space using the RT information per reference space appended to the bitstream, and generates the predicted volume using the rotated and translated reference space. Note that when an RT flag is present in the bitstream per reference space, inter predictor 1408 applies a rotation and translation process to the reference space in accordance with the RT flag. Note that the specifics of these processes are the same as the above-mentioned processes performed by inter predictor 1311, except for which information appended to the bitstream is used.

Prediction controller 1409 controls whether to decode a decoding target volume using intra prediction or inter prediction. For example, prediction controller 1409 selects intra prediction or inter prediction in accordance with information that is appended to the bitstream and indicates the prediction mode to be used. Note that prediction controller 1409 may continuously select intra prediction when it has been decided in advance to decode the decoding target space using intra space.

Hereinafter, variations of the present embodiment will be described. In the present embodiment, an example has been described in which rotation and translation is applied in units of spaces, but rotation and translation may also be applied in smaller units. For example, three-dimensional data encoding device 1300 may divide a space into subspaces, and apply rotation and translation in units of subspaces. In this case, three-dimensional data encoding device 1300 generates RT information per subspace, and appends the generated RT information to a header and the like of the bitstream. Three-dimensional data encoding device 1300 may apply rotation and translation in units of volumes, which is an encoding unit. In this case, three-dimensional data encoding device 1300 generates RT information in units of encoded volumes, and appends the generated RT information to a header and the like of the bitstream. The above may also be combined. In other words, three-dimensional data encoding device 1300 may apply rotation and translation in large units and subsequently apply rotation and translation in small units. For example, three-dimensional data encoding device 1300 may apply rotation and translation in units of spaces, and may also apply different rotations and translations to each of a plurality of volumes included in the obtained spaces.

In the present embodiment, an example has been described in which rotation and translation is applied to the reference space, but is not necessarily limited thereto. For example, three-dimensional data encoding device 1300 may apply a scaling process and change a size of the three-dimensional data. Three-dimensional data encoding device 1300 may also apply one or two of the rotation, translation, and scaling. When applying the processes in multiple stages and different units as stated above, a type of the processes applied in each unit may differ. For example, rotation and translation may be applied in units of spaces, and translation may be applied in units of volumes.

Note that these variations are also applicable to three-dimensional data decoding device 1400.

As stated above, three-dimensional data encoding device 1300 according to the present embodiment performs the following processes. FIG. 48 is a flowchart of the inter prediction process performed by three-dimensional data encoding device 1300.

Three-dimensional data encoding device 1300 generates predicted position information (e.g. predicted volume) using position information on three-dimensional points included in three-dimensional reference data (e.g. reference space) associated with a time different from a time associated with current three-dimensional data (e.g. encoding target space) (S1301). To be specific, three-dimensional data encoding device 1300 generates the predicted position information by applying a rotation and translation process to the position information on the three-dimensional points included in the three-dimensional reference data.

Note that three-dimensional data encoding device 1300 may perform a rotation and translation process using a first unit (e.g. spaces), and may perform the generating of the predicted position information using a second unit (e.g. volumes) that is smaller than the first unit. For example, three-dimensional data encoding device 1300 searches a volume among a plurality of volumes included in the rotated and translated reference space, whose position information differs the least from the position information of the encoding target volume included in the encoding target space. Note that three-dimensional data encoding device 1300 may perform the rotation and translation process, and the generating of the predicted position information in the same unit.

Three-dimensional data encoding device 1300 may generate the predicted position information by applying (i) a first rotation and translation process to the position information on the three-dimensional points included in the three-dimensional reference data, and (ii) a second rotation and translation process to the position information on the three-dimensional points obtained through the first rotation and translation process, the first rotation and translation process using a first unit (e.g. spaces) and the second rotation and translation process using a second unit (e.g. volumes) that is smaller than the first unit.

For example, as illustrated in FIG. 41, the position information on the three-dimensional points and the predicted position information is represented using an octree structure. For example, the position information on the three-dimensional points and the predicted position information is expressed in a scan order that prioritizes a breadth over a depth in the octree structure. For example, the position information on the three-dimensional points and the predicted position information is expressed in a scan order that prioritizes a depth over a breadth in the octree structure.

As illustrated in FIG. 46, three-dimensional data encoding device 1300 encodes an RT flag that indicates whether to apply the rotation and translation process to the position information on the three-dimensional points included in the three-dimensional reference data. In other words, three-dimensional data encoding device 1300 generates the encoded signal (encoded bitstream) including the RT flag. Three-dimensional data encoding device 1300 encodes RT information that indicates contents of the rotation and translation process. In other words, three-dimensional data encoding device 1300 generates the encoded signal (encoded bitstream) including the RT information. Note that three-dimensional data encoding device 1300 may encode the RT information when the RT flag indicates to apply the rotation and translation process, and does not need to encode the RT information when the RT flag indicates not to apply the rotation and translation process.

The three-dimensional data includes, for example, the position information on the three-dimensional points and the attribute information (color information, etc.) of each three-dimensional point. Three-dimensional data encoding device 1300 generates predicted attribute information using the attribute information of the three-dimensional points included in the three-dimensional reference data (S1302).

Three-dimensional data encoding device 1300 next encodes the position information on the three-dimensional points included in the current three-dimensional data, using the predicted position information. For example, as illustrated in FIG. 38, three-dimensional data encoding device 1300 calculates differential position information, the differential position information being a difference between the predicted position information and the position information on the three-dimensional points included in the current three-dimensional data (S1303).

Three-dimensional data encoding device 1300 encodes the attribute information of the three-dimensional points included in the current three-dimensional data, using the predicted attribute information. For example, three-dimensional data encoding device 1300 calculates differential attribute information, the differential attribute information being a difference between the predicted attribute information and the attribute information on the three-dimensional points included in the current three-dimensional data (S1304). Three-dimensional data encoding device 1300 next performs transformation and quantization on the calculated differential attribute information (S1305).

Lastly three-dimensional data encoding device 1300 encodes (e.g. entropy encodes) the differential position information and the quantized differential attribute information (S1036). In other words, three-dimensional data encoding device 1300 generates the encoded signal (encoded bitstream) including the differential position information and the differential attribute information.

Note that when the attribute information is not included in the three-dimensional data, three-dimensional data encoding device 1300 does not need to perform steps S1302, S1304, and S1305. Three-dimensional data encoding device 1300 may also perform only one of the encoding of the position information on the three-dimensional points and the encoding of the attribute information of the three-dimensional points.

Figure 49:
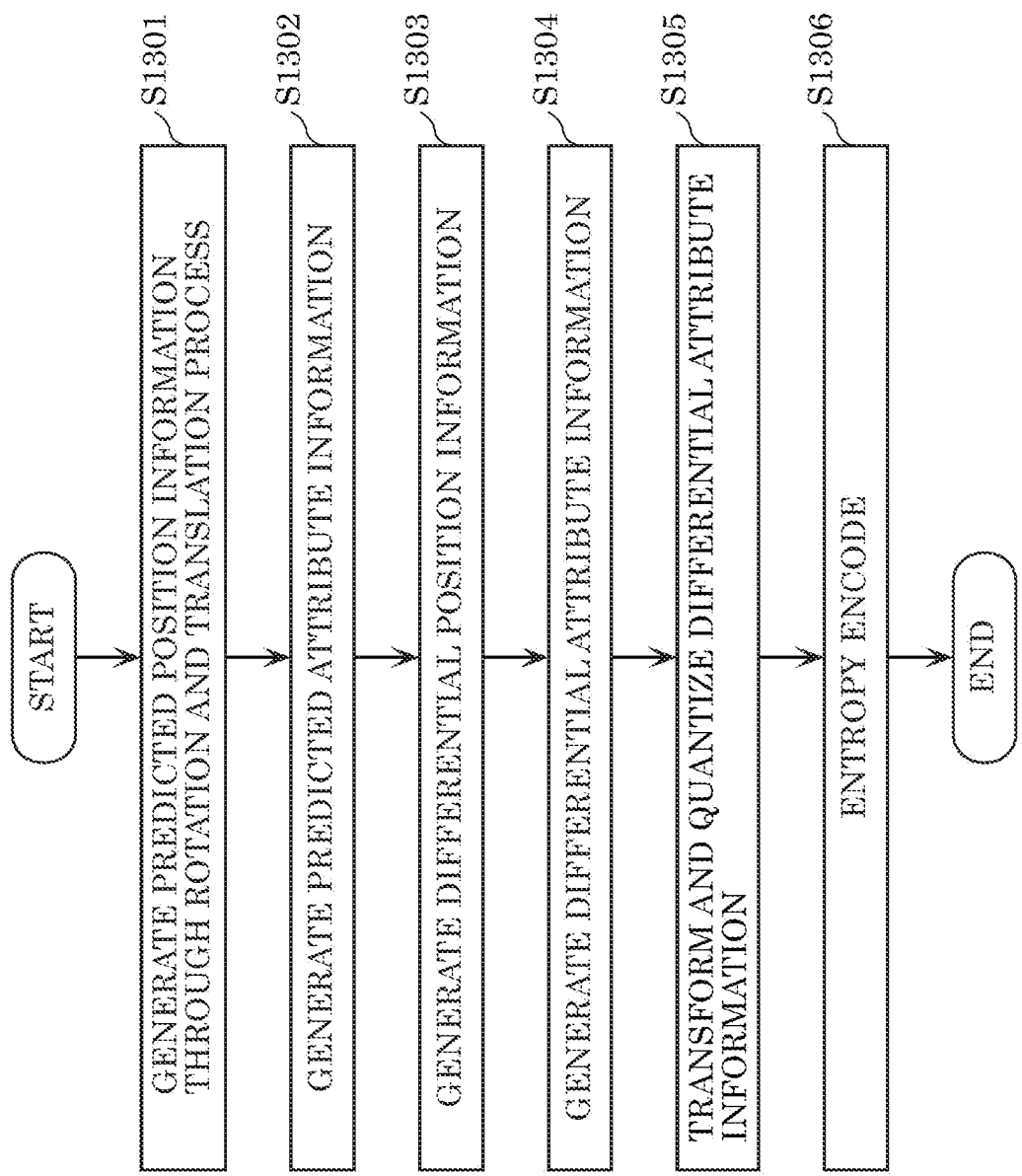
FIG. 49 is a flowchart of a three-dimensional data encoding process performed by the three-dimensional data encoding device according to Embodiment 7.

An order of the processes shown in FIG. 49 is merely an example and is not limited thereto. For example, since the processes with respect to the position information (S1301 and S1303) and the processes with respect to the attribute information (S1302, S1304, and S1305) are separate from one another, they may be performed in an order of choice, and a portion thereof may also be performed in parallel.

With the above, three-dimensional data encoding device 1300 according to the present embodiment generates predicted position information using position information on three-dimensional points included in three-dimensional reference data associated with a time different from a time associated with current three-dimensional data; and encodes differential position information, which is a difference between the predicted position information and the position information on the three-dimensional points included in the current three-dimensional data. This makes it possible to improve encoding efficiency since it is possible to reduce the amount of data of the encoded signal.

Three-dimensional data encoding device 1300 according to the present embodiment generates predicted attribute information using attribute information on three-dimensional points included in three-dimensional reference data; and encodes differential attribute information, which is a difference between the predicted attribute information and the attribute information on the three-dimensional points included in the current three-dimensional data. This makes it possible to improve encoding efficiency since it is possible to reduce the amount of data of the encoded signal.

For example, three-dimensional data encoding device 1300 includes a processor and memory. The processor uses the memory to perform the above processes.

FIG. 48 is a flowchart of the inter prediction process performed by three-dimensional data decoding device 1400.

Three-dimensional data decoding device 1400 decodes (e.g. entropy decodes) the differential position information and the differential attribute information from the encoded signal (encoded bitstream) (1401).

Three-dimensional data decoding device 1400 decodes, from the encoded signal, an RT flag that indicates whether to apply the rotation and translation process to the position information on the three-dimensional points included in the three-dimensional reference data. Three-dimensional data decoding device 1400 encodes RT information that indicates contents of the rotation and translation process. Note that three-dimensional data decoding device 1400 may decode the RT information when the RT flag indicates to apply the rotation and translation process, and does not need to decode the RT information when the RT flag indicates not to apply the rotation and translation process.

Three-dimensional data decoding device 1400 next performs inverse transformation and inverse quantization on the decoded differential attribute information (S1402).

Three-dimensional data decoding device 1400 next generates predicted position information (e.g. predicted volume) using the position information on the three-dimensional points included in the three-dimensional reference data (e.g. reference space) associated with a time different from a time associated with the current three-dimensional data (e.g. decoding target space) (S1403). To be specific, three-dimensional data decoding device 1400 generates the predicted position information by applying a rotation and translation process to the position information on the three-dimensional points included in the three-dimensional reference data.

More specifically, when the RT flag indicates to apply the rotation and translation process, three-dimensional data decoding device 1400 applies the rotation and translation process on the position information on the three-dimensional points included in the three-dimensional reference data indicated in the RT information. In contrast, when the RT flag indicates not to apply the rotation and translation process, three-dimensional data decoding device 1400 does not apply the rotation and translation process on the position information on the three-dimensional points included in the three-dimensional reference data.

Note that three-dimensional data decoding device 1400 may perform the rotation and translation process using a first unit (e.g. spaces), and may perform the generating of the predicted position information using a second unit (e.g. volumes) that is smaller than the first unit. Note that three-dimensional data decoding device 1400 may perform the rotation and translation process, and the generating of the predicted position information in the same unit.

Three-dimensional data decoding device 1400 may generate the predicted position information by applying (i) a first rotation and translation process to the position information on the three-dimensional points included in the three-dimensional reference data, and (ii) a second rotation and translation process to the position information on the three-dimensional points obtained through the first rotation and translation process, the first rotation and translation process using a first unit (e.g. spaces) and the second rotation and translation process using a second unit (e.g. volumes) that is smaller than the first unit.

For example, as illustrated in FIG. 41, the position information on the three-dimensional points and the predicted position information is represented using an octree structure. For example, the position information on the three-dimensional points and the predicted position information is expressed in a scan order that prioritizes a breadth over a depth in the octree structure. For example, the position information on the three-dimensional points and the predicted position information is expressed in a scan order that prioritizes a depth over a breadth in the octree structure.

Three-dimensional data decoding device 1400 generates predicted attribute information using the attribute information of the three-dimensional points included in the three-dimensional reference data (S1404).

Three-dimensional data decoding device 1400 next restores the position information on the three-dimensional points included in the current three-dimensional data, by decoding encoded position information included in an encoded signal, using the predicted position information. The encoded position information here is the differential position information. Three-dimensional data decoding device 1400 restores the position information on the three-dimensional points included in the current three-dimensional data, by adding the differential position information to the predicted position information (S1405).

Three-dimensional data decoding device 1400 restores the attribute information of the three-dimensional points included in the current three-dimensional data, by decoding encoded attribute information included in an encoded signal, using the predicted attribute information. The encoded attribute information here is the differential position information. Three-dimensional data decoding device 1400 restores the attribute information on the three-dimensional points included in the current three-dimensional data, by adding the differential attribute information to the predicted attribute information (S1406).

Note that when the attribute information is not included in the three-dimensional data, three-dimensional data decoding device 1400 does not need to perform steps S1402, S1404, and S1406. Three-dimensional data decoding device 1400 may also perform only one of the decoding of the position information on the three-dimensional points and the decoding of the attribute information of the three-dimensional points.

Figure 50:
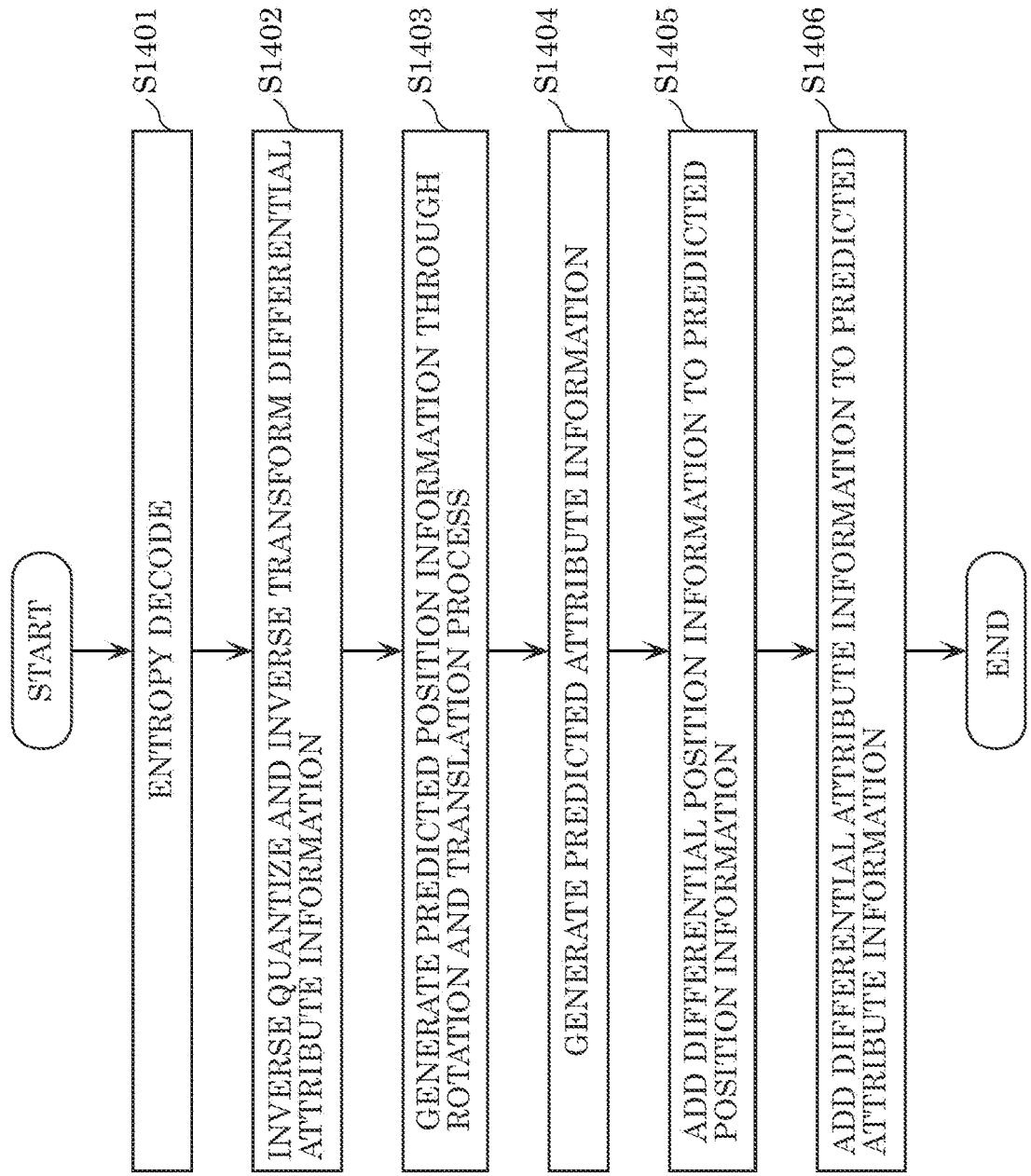
FIG. 50 is a flowchart of a three-dimensional data decoding process performed by the three-dimensional data decoding device according to Embodiment 7.

An order of the processes shown in FIG. 50 is merely an example and is not limited thereto. For example, since the processes with respect to the position information (S1403 and S1405) and the processes with respect to the attribute information (S1402, S1404, and S1406) are separate from one another, they may be performed in an order of choice, and a portion thereof may also be performed in parallel.

Embodiment 8

In the present embodiment, a three-dimensional data encoding device separates an inputted three-dimensional point cloud into two or more three-dimensional point sub-clouds, and encodes each of the three-dimensional point sub-clouds so that the three-dimensional point sub-clouds have no dependency relationship with each other. Accordingly, the three-dimensional data encoding device can encode the three-dimensional point sub-clouds in parallel. For example, the three-dimensional data encoding device separates an inputted three-dimensional point cloud into three-dimensional point sub-cloud A and three-dimensional point sub-cloud B, and encodes three-dimensional point sub-cloud A and three-dimensional point sub-cloud B in parallel.

It should be noted that when, for example, the three-dimensional data encoding device performs encoding using an octree structure, the three-dimensional data encoding device encodes, in parallel, eight child nodes resulting from octree division performed as a method of separation. For example, the three-dimensional data encoding device encodes, in parallel, tree structures each having a corresponding one of child nodes as a root.

It should be noted that the three-dimensional data encoding device need not always encode three-dimensional point sub-clouds in parallel, and may encode three-dimensional point sub-clouds sequentially so that the three-dimensional point sub-clouds have no dependency relationship with each other. Moreover, the method of the present embodiment may be applied not only to an octree but also to an N-ary tree such as a quadtree or a hexadecatree, where N is an integer greater than or equal to 2. In addition, the three-dimensional data encoding device may perform division using attribute information such as a color, degree of reflection, or normal vector of a point cloud. Additionally the three-dimensional data encoding device may perform division based on a difference in density of point clouds.

The three-dimensional data encoding device may also combine encoded data of encoded three-dimensional point sub-clouds with a bitstream. At this time, the three-dimensional data encoding device may include, in the header etc. of the bitstream, the start position of each encoded data of a corresponding one of the encoded three-dimensional point sub-clouds. For example, the three-dimensional data encoding device may include, in the header etc., addresses (bit positions or byte counts etc.) from the head of the bitstream. As a result, a three-dimensional data decoding device can identify the start position of each encoded data of the corresponding one of the three-dimensional point sub-clouds by decoding the head of the bitstream. Additionally, since the three-dimensional data decoding device can decode the encoded data of the three-dimensional point sub-clouds in parallel, the three-dimensional data decoding device can reduce the processing time.

It should be noted that the three-dimensional data encoding device may append, to the header of a bitstream, a flag indicating that three-dimensional point sub-clouds have been encoded so that the three-dimensional point sub-clouds have no dependency relationship with each other or that three-dimensional point sub-clouds have been encoded in parallel. In consequence, the three-dimensional data decoding device can determine whether encoded data of the three-dimensional point clouds are decodable in parallel, by decoding the header.

Here, that three-dimensional point sub-clouds have no dependency relationship with each other means, for example, that coding tables (probability tables etc. to be used for entropy encoding) for encoding occupancy codes or leaf information etc. of nodes of three-dimensional point sub-clouds are held independently of the three-dimensional point sub-clouds. For example, the three-dimensional data encoding device uses a different coding table for each of three-dimensional point sub-cloud A and three-dimensional point sub-cloud B so that three-dimensional point sub-cloud A and three-dimensional point sub-cloud B have no dependency relationship with each other. Alternatively, when the three-dimensional data encoding device processes three-dimensional point sub-cloud A and three-dimensional point sub-cloud B sequentially, the three-dimensional data encoding device initializes coding tables after encoding three-dimensional point sub-cloud A and before encoding three-dimensional point sub-cloud B so that three-dimensional point sub-cloud A and three-dimensional point sub-cloud B have no dependency relationship with each other. As stated above, by holding the coding tables for the three-dimensional point sub-clouds independently of each other or initializing the coding tables before encoding, the three-dimensional data encoding device can encode the three-dimensional point sub-clouds so that the three-dimensional point sub-clouds have no dependency relationship with each other. In addition, by holding coding tables (decoding tables) for three-dimensional point sub-clouds independently of each other or initializing the coding tables before decoding the three-dimensional point sub-clouds, the three-dimensional data decoding device can decode the three-dimensional point sub-clouds appropriately in a similar manner.

Moreover, that three-dimensional point sub-clouds have no dependency relationship with each other means, for example, that reference between three-dimensional point sub-clouds is prohibited when occupancy codes or leaf information etc. of nodes of the three-dimensional point sub-clouds are encoded. For example, when the three-dimensional data encoding device encodes an occupancy code of a current node to be encoded, the three-dimensional data encoding device performs encoding using information of a neighboring node in an octree. In this case, when the neighboring node is included in another three-dimensional point sub-cloud, the three-dimensional data encoding device encodes the current node without referring to the neighboring node. Specifically, the three-dimensional data encoding device may perform encoding assuming that the neighboring node is not present, or the three-dimensional data encoding device may encode the current node under the condition that although the neighboring node is present, the neighboring node is included in the other three-dimensional point sub-cloud.

Likewise, for example, when the three-dimensional data decoding device decodes occupancy codes or leaf information etc. of nodes of three-dimensional point sub-clouds, the three-dimensional data decoding device prohibits reference between the three-dimensional point sub-clouds. For example, when the three-dimensional data decoding device decodes an occupancy code of a current node to be decoded, the three-dimensional data decoding device performs decoding using information of a neighboring node in an octree. In this case, when the neighboring node is included in another three-dimensional point sub-cloud, the three-dimensional data decoding device decodes the current node without referring to the neighboring node. Specifically, the three-dimensional data decoding device may perform decoding assuming that the neighboring node is not present, or the three-dimensional data decoding device may decode the current node under the condition that although the neighboring node is present, the neighboring node is included in the other three-dimensional point sub-cloud.

Furthermore, when the three-dimensional data encoding device encodes pieces of three-dimensional position information and pieces of attribute information (e.g., a color, a degree of reflection, or a normal vector) of three-dimensional point sub-clouds, the three-dimensional data encoding device may encode one of the pieces of three-dimensional position information and the pieces of attribute information so that the one of the pieces of three-dimensional position information and the pieces of attribute information have no dependency relationship with each other, and may encode the other of the pieces of three-dimensional position information and the pieces of attribute information so that the other of the pieces of three-dimensional position information and the pieces of attribute information have a dependency relationship with each other. For example, the three-dimensional data encoding device may encode pieces of three-dimensional position information so that the pieces of three-dimensional position information have no dependency relationship with each other, and may encode pieces of attribute information so that the pieces of attribute information have a dependency relationship with each other. Accordingly, the three-dimensional data encoding device reduces the processing time by encoding the pieces of three-dimensional position information in parallel, and reduces the code amount by encoding the pieces of attribute information sequentially. It should be noted that the three-dimensional data encoding device may append, to a header, both information indicating whether the pieces of three-dimensional position information have been encoded so that the pieces of three-dimensional position information have no dependency relationship with each other, and information indicating whether the pieces of attribute information have been encoded so that the pieces of attribute information have no dependency relationship with each other. As a result, by decoding the header, the three-dimensional data decoding device can determine whether the pieces of three-dimensional position information are decodable so that the pieces of three-dimensional position information have no dependency relationship with each other and whether the pieces of attribute information are decodable so that the pieces of attribute information have no dependency relationship with each other. For this reason, when there is no dependency relationship, the three-dimensional data decoding device can perform parallel decoding. For example, when pieces of three-dimensional position information are encoded so that the pieces of three-dimensional position information have no dependency relationship with each other, and pieces of attribute information are encoded so that the pieces of attribute information have a dependency relationship with each other, the three-dimensional data decoding device reduces the processing time by decoding the pieces of three-dimensional position information in parallel, and decodes the pieces of attribute information sequentially.

Figure 51:
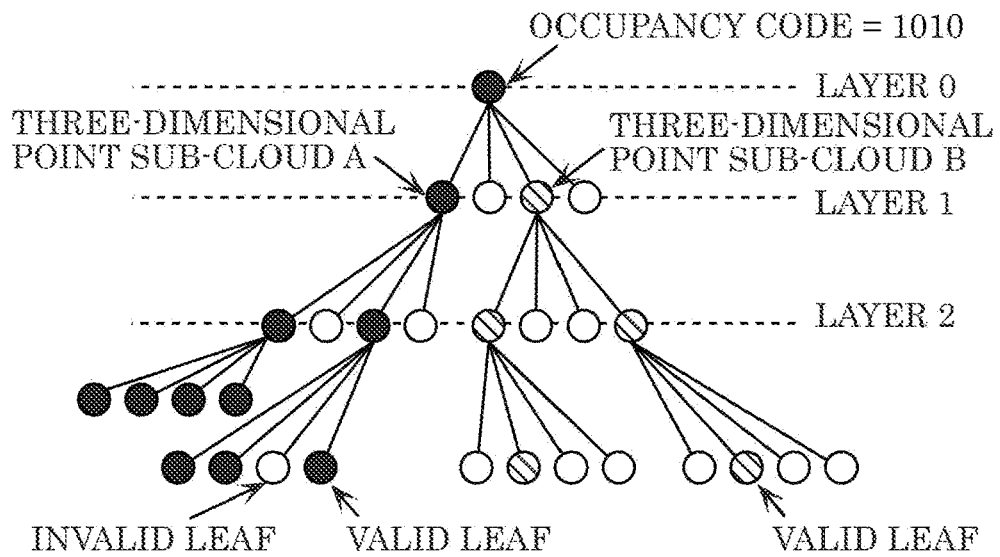
FIG. 51 is a diagram illustrating an example of a tree structure according to Embodiment 8.
Figure 52:
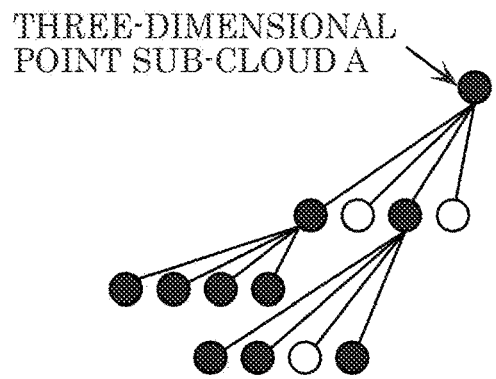
FIG. 52 is a diagram illustrating an example of a three-dimensional point sub-cloud according to Embodiment 8.
Figure 53:
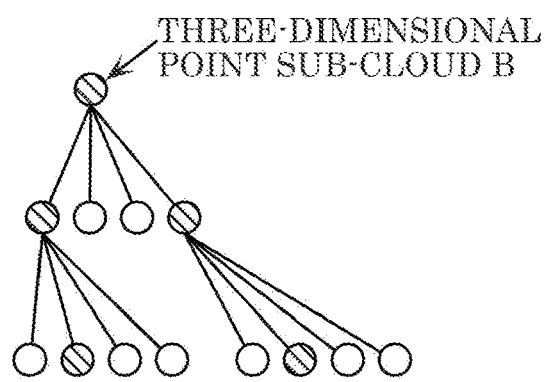
FIG. 53 is a diagram illustrating an example of a three-dimensional point sub-cloud according to Embodiment 8.

FIG. 51 is a diagram illustrating an example of a tree structure. It should be noted that although FIG. 51 shows an example of a quadtree, other tree structures such as an octree may be used. The three-dimensional data encoding device divides the tree structure shown in FIG. 51 into, for example, three-dimensional point sub-cloud A shown in FIG. 52 and three-dimensional point sub-cloud B shown in FIG. 53. It should be noted that in this example, division is performed at valid nodes in layer 1. In other words, at most four three-dimensional point sub-clouds are generated for the quadtree, and at most eight three-dimensional point sub-clouds are generated for the octree. The three-dimensional data encoding device may also perform division using attribute information or information such as point cloud density.

The three-dimensional data encoding device performs encoding so that three-dimensional point sub-cloud A and three-dimensional point sub-cloud B have no dependency relationship with each other. For example, the three-dimensional data encoding device selects, for each three-dimensional point sub-cloud, a coding table to be used for entropy encoding an occupancy code. Alternatively, the three-dimensional data encoding device initializes coding tables before encoding each of three-dimensional point sub-clouds. Alternatively, when a neighboring node is included in a different three-dimensional point sub-cloud, the three-dimensional data encoding device prohibits reference to the neighboring node at the time of calculating neighboring information of a node.

Figure 54:
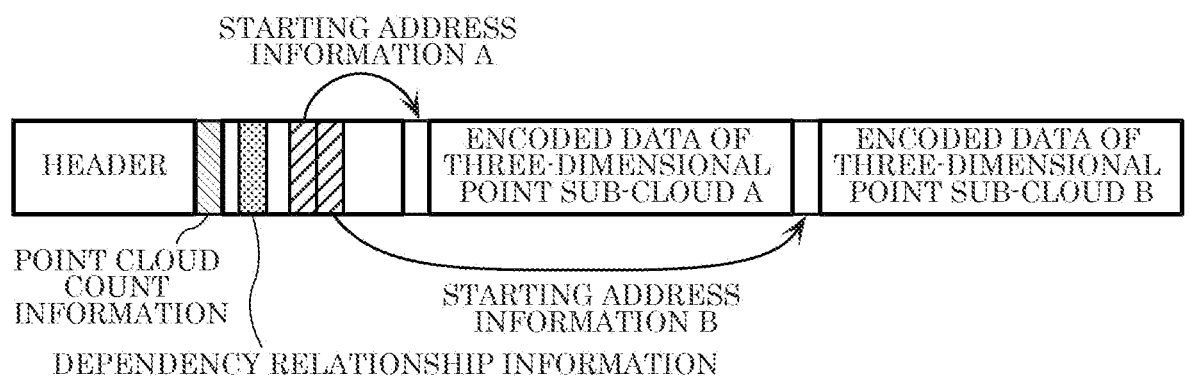
FIG. 54 is a diagram illustrating a structural example of a bitstream according to Embodiment 8.

FIG. 54 is a diagram illustrating a structural example of a bitstream according to the present embodiment. As illustrated in FIG. 54, the bitstream includes a header, encoded data of three-dimensional point sub-cloud A. and encoded data of three-dimensional point sub-cloud B. The header includes point cloud count information, dependency relationship information, starting address information A. and starting address information B.

The point cloud count information indicates the number of three-dimensional point sub-clouds included in the bitstream. It should be noted that an occupancy code may indicate, as point cloud count information, the number of three-dimensional point sub-clouds. For example, in the example shown in FIG. 51, the occupancy code "1010" in layer 0 is used, and the number of "1" included in the occupancy code indicates the number of three-dimensional point sub-clouds.

The dependency relationship information indicates whether the three-dimensional point sub-clouds have been encoded so that the three-dimensional point sub-clouds have no dependency relationship with each other. For example, the three-dimensional data decoding device determines whether to decode the three-dimensional point sub-clouds in parallel, based on the dependency relationship information.

Starting address information A indicates the starting address of the encoded data of three-dimensional point sub-cloud A. Starting address information B indicates the starting address of the encoded data of three-dimensional point sub-cloud B.

Hereinafter, the effect of parallel encoding will be described. It is possible to reduce a processing time by dividing geometry information (three-dimensional position information) or attribute information in octree data of a three-dimensional point cloud (a point cloud) and performing parallel encoding. It is possible to achieve parallel encoding when a node is independent of other nodes in a layer of a parent node. In other words, there is a need not to refer to a neighboring parent node. There is a need to satisfy this condition for all of child nodes and grandchild nodes.

Figure 55:
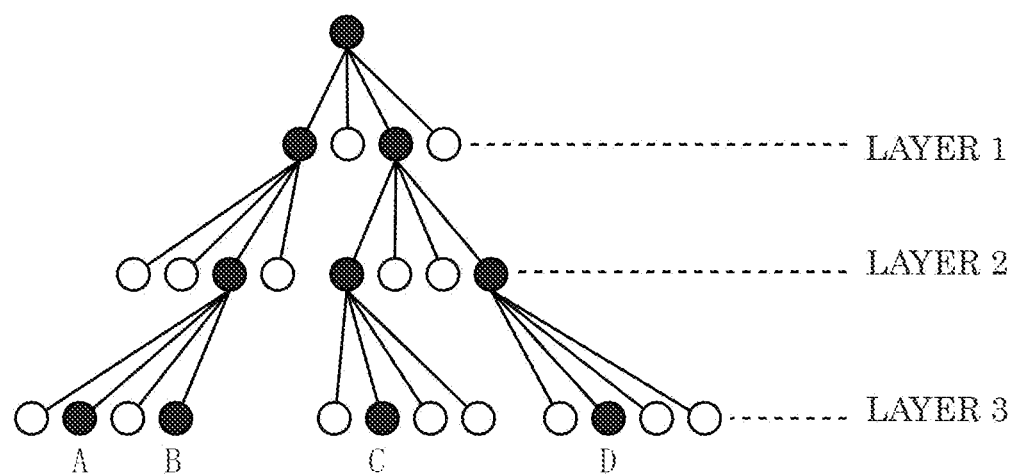
FIG. 55 is a diagram illustrating an example of a tree structure according to Embodiment 8.

FIG. 55 is a diagram illustrating an example of a tree structure. In the example shown in FIG. 55, when depth-first encoding is performed, node A is independent of node C in layer 1. Node C is independent of node D in layer 2. Node A is independent of node B in layer 3.

The three-dimensional data encoding device selects a parallel encoding method from two types of parallel encoding methods, using independent information of each node, based on a type of hardware, user settings, algorithm, or data adaptability, etc.

The two types are full parallel encoding and incremental parallel encoding.

To begin with, full parallel encoding will be described. In parallel processing or parallel programming, since it is necessary to process lots of data simultaneously, processing is very slow.

The number of nodes processable in parallel is determined using the number of processing units (PUs) included in a graphics processing unit (CPU), the number of cores included in a CPU, or the number of threads in software implementation.

Here, the number of nodes included in an octree is generally greater than the number of available PUs. The three-dimensional data encoding device determines whether the number of nodes included in a layer is an optimal number corresponding to the number of available PUs, using information indicating the number of encoded nodes included in the layer; and starts full parallel encoding immediately when the number of the nodes included in the layer reaches the optimal number. It should be noted that a breadth-first or depth-first process can be used in parallel processing.

The three-dimensional data encoding device may store, in the header of a bitstream, information indicating nodes (a layer) for which a parallel encoding process has been started. As a result, the three-dimensional data decoding device can perform a parallel decoding process if necessary, using the information. It should be noted that information indicating nodes for which a parallel encoding process has been started may be in any format, and location encoding may be used, for example.

Moreover, the three-dimensional data encoding device prepares a coding table (a probability table) for each of nodes (three-dimensional point sub-clouds) on which parallel encoding is to be performed. This coding table is initialized to an initial value or a value different for each node. For example, a value different for each node is a value based on an occupancy code of a parent node. Full parallel encoding has the advantage of only having to initialize the GPU once.

Figure 56:
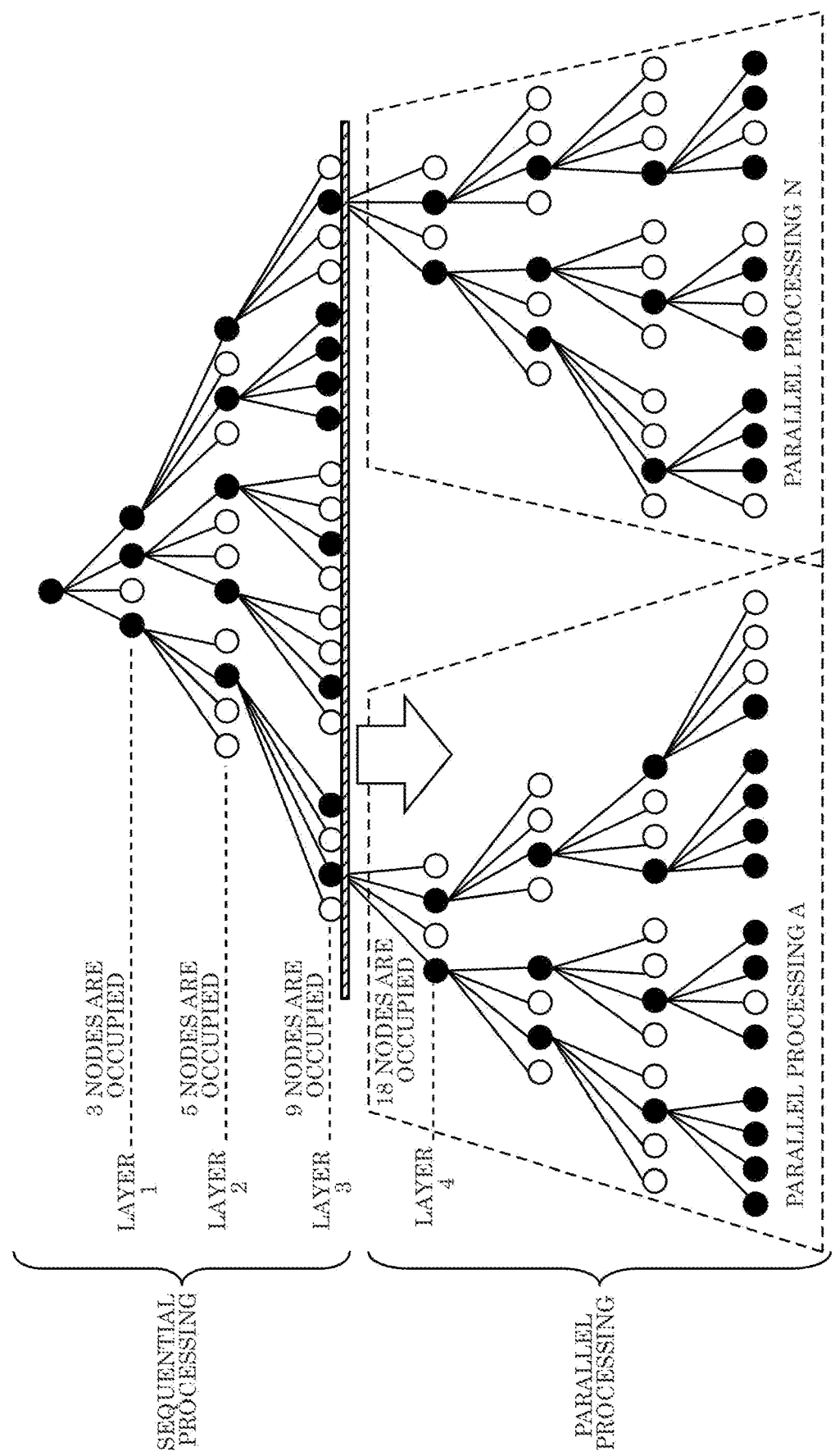
FIG. 56 is a diagram for illustrating full parallel encoding according to Embodiment 8 and shows an example of a tree structure.
Figure 57:
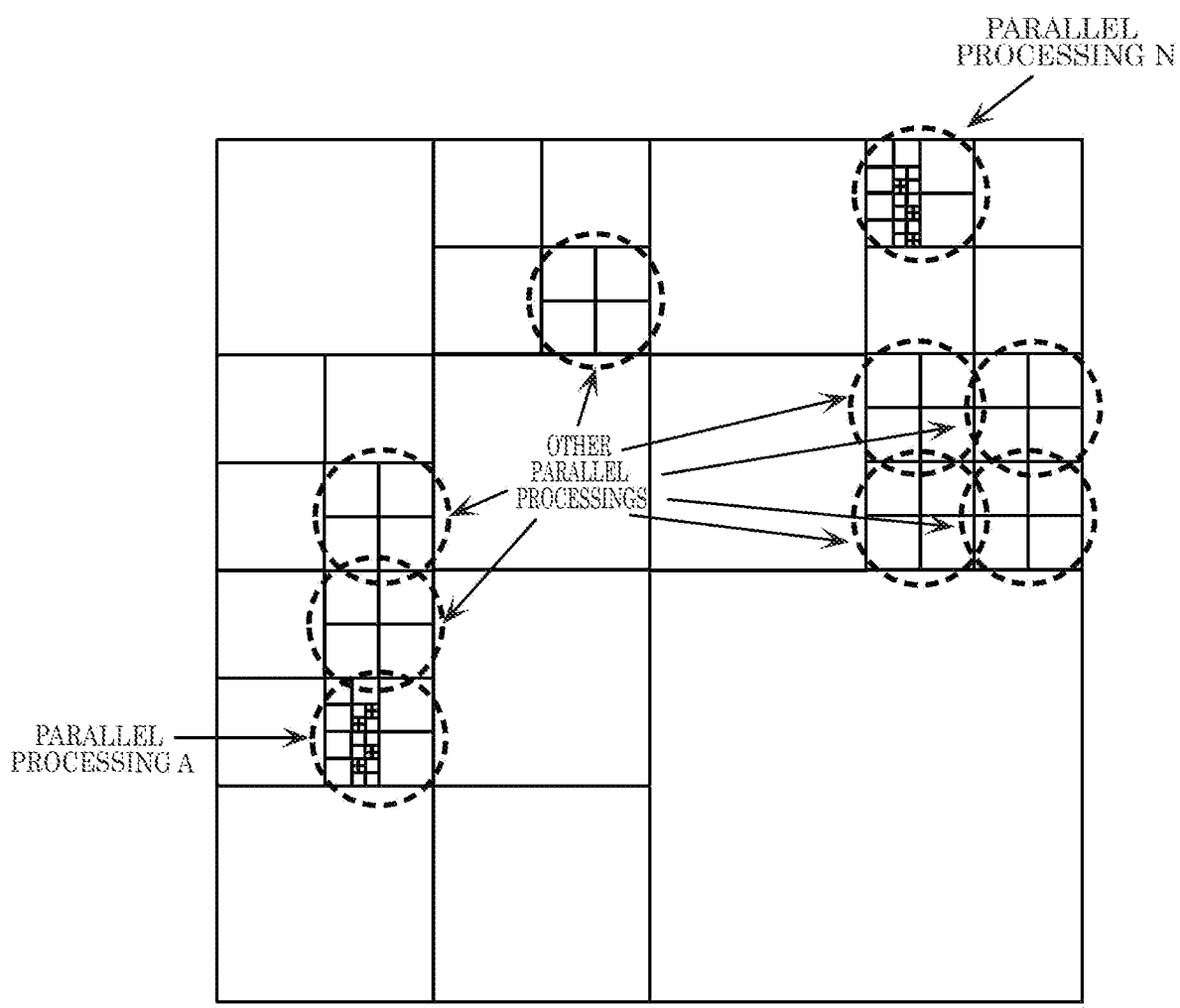
FIG. 57 is a diagram spatially illustrating three-dimensional point sub-clouds to be processed in parallel according to Embodiment 8.

FIG. 56 is a diagram for illustrating full parallel encoding and shows an example of a tree structure. FIG. 57 is a diagram spatially illustrating three-dimensional point sub-clouds to be processed in parallel. The three-dimensional data encoding device starts parallel processing immediately when the number of nodes correlated with the number of PUs or threads reaches an optimal number.

In the example shown in FIG. 56, in layer 3, the number of occupied nodes included in the layer is 9 and exceeds an optimal number. Accordingly, the three-dimensional data encoding device divides three-dimensional points (nodes) in layers below layer 3 into three-dimensional point sub-clouds each having a corresponding one of the occupied nodes in layer 3 as a root, and processes the three-dimensional point sub-clouds in parallel. For example, nine three-dimensional point sub-clouds are generated in the example shown in FIG. 56.

The three-dimensional data encoding device may encode layer information indicating a layer in which parallel processing has been started. The three-dimensional data encoding device may also encode information indicating the number of occupied nodes (9 in the example shown in FIG. 56) when parallel processing is started.

Moreover, for example, the three-dimensional data encoding device may perform encoding while prohibiting three-dimensional point sub-clouds from referring to each other. Furthermore, for example, the three-dimensional data encoding device initializes coding tables (probability tables etc.) to be used for entropy encoding before the three-dimensional data encoding device encodes three-dimensional point sub-clouds.

Figure 58:
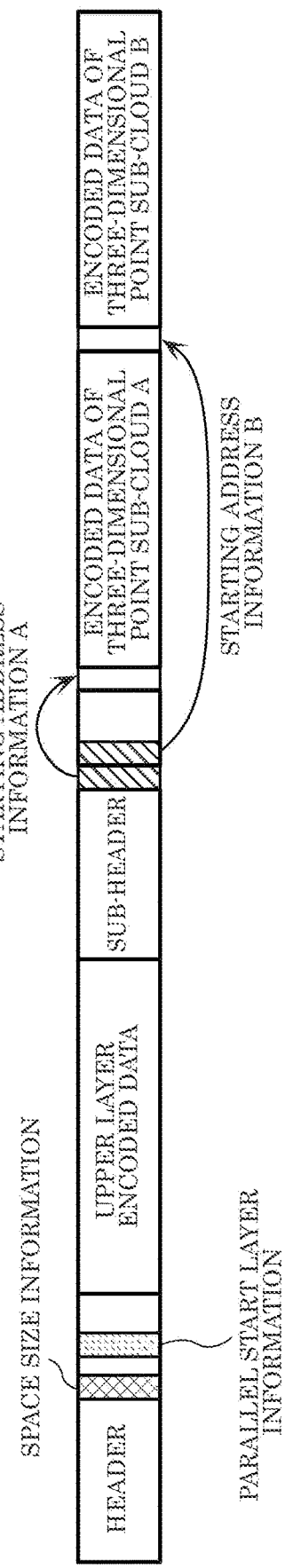
FIG. 58 is a diagram illustrating a structural example of a bitstream according to Embodiment 8.

FIG. 58 is a diagram illustrating a structural example of a bitstream according to the present embodiment. As illustrated in FIG. 58, the bitstream includes a header, upper layer encoded data, a sub-header, encoded data of three-dimensional point sub-cloud A, and encoded data of three-dimensional point sub-cloud B.

The header includes space size information and parallel start layer information. The space size information indicates the first three-dimensional space obtained by dividing a three-dimensional point cloud into an octree. For example, the space size information indicates the maximum coordinates (x, y, z) of the first three-dimensional space.

The parallel start layer information indicates a parallel start layer that is a layer in which parallel processing can be started. Here, the parallel start layer information indicates, for example, layer N.

The upper layer encoded data is encoded data up to layer N before parallel processing is started, and is node information up to layer N. For example, the upper layer encoded data includes occupancy codes of nodes up to layer N.

The sub-header includes information required to decode any layer following layer N. For example, the sub-header indicates the starting address etc. of encoded data of each three-dimensional point sub-cloud. In the example shown in FIG. 58, the sub-header includes starting address information A and starting address information B. Starting address information A indicates the starting address of the encoded data of three-dimensional point sub-cloud A. Starting address information B indicates the starting address of the encoded data of three-dimensional point sub-cloud B.

It should be noted that the three-dimensional data encoding device may store starting address information A and starting address information B into the header. As a result, the three-dimensional data decoding device can decode the encoded data of the three-dimensional point sub-clouds in parallel before the upper layer encoded data. In this case, the sub-header may include information indicating a space of each three-dimensional point sub-cloud. This information indicates the maximum coordinates (x, y, z) of the space of the three-dimensional point sub-cloud.

Figure 59:
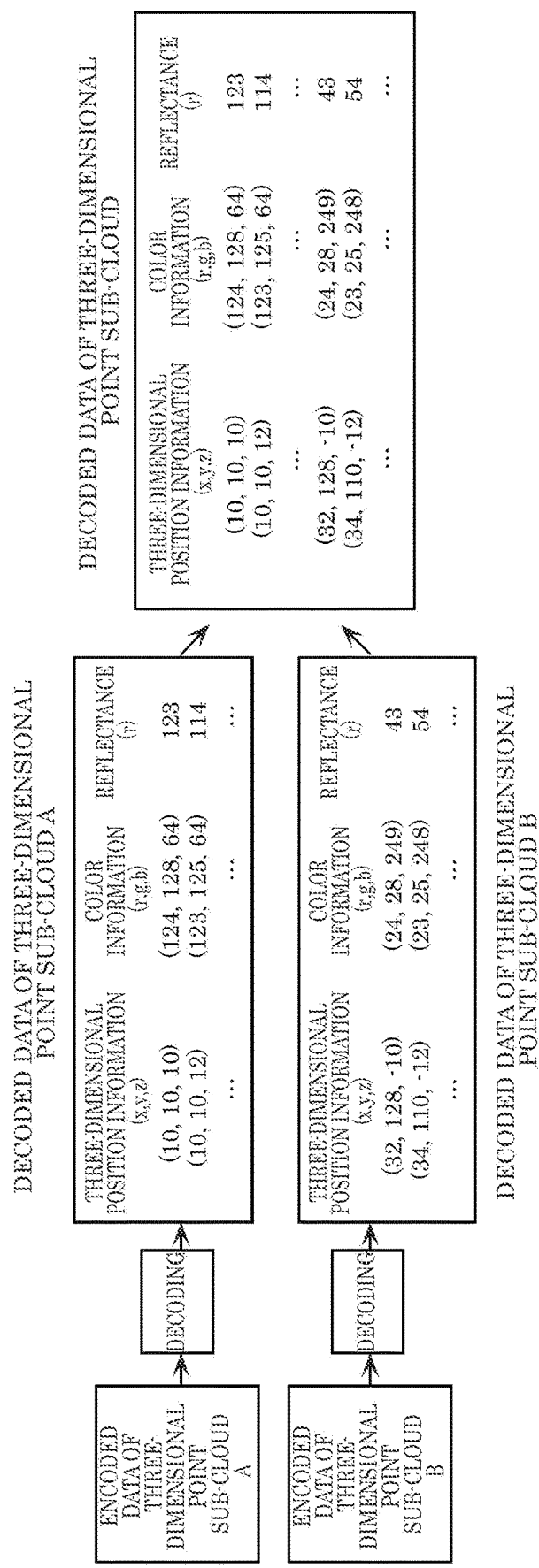
FIG. 59 is a diagram for illustrating a parallel decoding process according to Embodiment 8.

FIG. 59 is a diagram for illustrating a parallel decoding process. As illustrated in FIG. 59, the three-dimensional data decoding device decodes encoded data of three-dimensional point sub-cloud A and encoded data of three-dimensional point sub-cloud B in parallel, and generates decoded data of three-dimensional point sub-cloud A and decoded data of three-dimensional point sub-cloud B. Next, the three-dimensional data decoding device integrates the generated decoded data of three-dimensional point sub-cloud A and the generated decoded data of three-dimensional point sub-cloud B, and generates decoded data of a three-dimensional point cloud. In this manner, the three-dimensional data decoding device integrates pieces of three-dimensional position information and attribute information (color information, a degree of reflection, etc.) included in decoded data of three-dimensional point sub-clouds. In addition, the three-dimensional data decoding device may output integrated data as one file.

It should be noted that the three-dimensional data decoding device need not always decode all three-dimensional point sub-clouds, and may decode necessary three-dimensional point sub-clouds selectively. For example, when the three-dimensional data decoding device is a mobile device such as an in-vehicle device, the three-dimensional data decoding device may decode, among three-dimensional point sub-clouds, three-dimensional point sub-clouds in an area close to the current position obtained by a GPS etc.

Moreover, the three-dimensional data encoding device may store, into a sub-header, information indicating the priority order of three-dimensional point sub-clouds. In this case, the three-dimensional data decoding device performs parallel decoding while preferentially giving computing resources such as a CPU to three-dimensional point sub-clouds having a higher priority, according to the priority order indicated by the information included in the sub-header. Accordingly, the three-dimensional data decoding device can efficiently decode three-dimensional point sub-clouds including an area important for the three-dimensional data decoding device.

Figure 60:
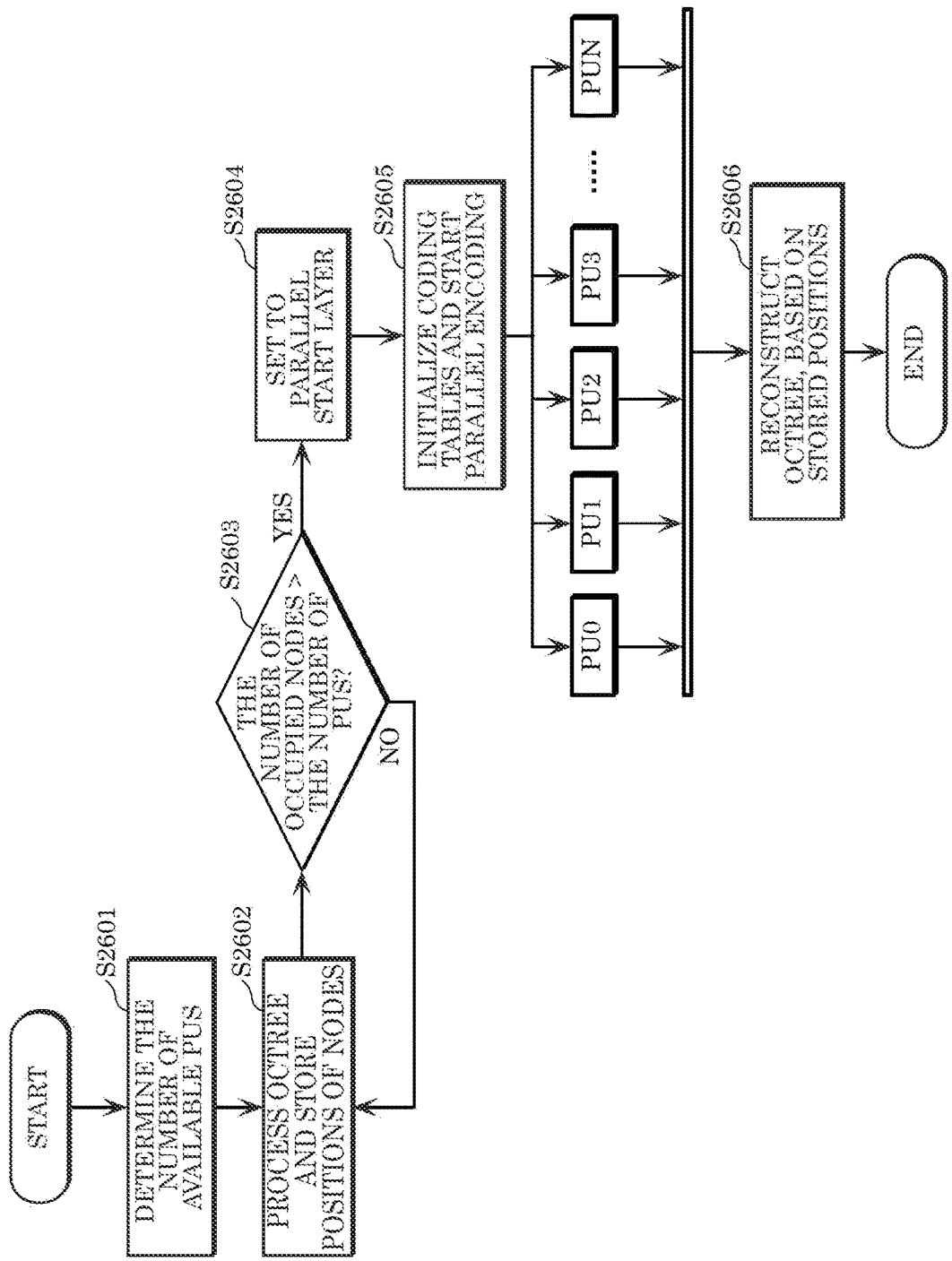
FIG. 60 is a diagram schematically illustrating a procedure of a full parallel encoding process according to Embodiment 8.

FIG. 60 is a diagram schematically illustrating a procedure of a full parallel encoding process. First, the three-dimensional data encoding device determines the number of available PUs (S2601). Next, the three-dimensional data encoding device processes an octree and stores positions of nodes (S2602). Then, the three-dimensional data encoding device determines whether the number of occupied nodes is greater than the number of PUs (S2603).

When the number of the occupied nodes is less than the number of the PUs (NO in S2603), the three-dimensional data encoding device performs step S2602 on the next node. When the number of the occupied nodes is greater than the number of the PUs (YES in S2603), the three-dimensional data encoding device sets a current layer to a parallel start layer that is a layer in which parallel processing is to be started (S2604).

After that, the three-dimensional data encoding device initializes coding tables and starts parallel encoding (S2605). After the completion of parallel encoding, the three-dimensional data encoding device reconstructs an octree, based on the positions stored in step S2602 (S2606).

It should be noted that the three-dimensional data encoding device may append, to the header of the bitstream, parallel start layer information indicating a parallel start layer in which parallel encoding is to be started. As a result, by decoding the header, the three-dimensional data decoding device can determine from which layer parallel decoding is possible.

It should be noted that from which layer parallel processing is to be started may be predetermined. Moreover, parallel start layer information indicating a layer in which parallel processing is to be started is not appended to a bitstream, and a layer in which parallel processing is to be started may be specified by standards etc. For example, the three-dimensional data encoding device appends a flag indicating whether to perform parallel processing to a bitstream. When the flag is ON, the three-dimensional data decoding device may start parallel processing from the first layer; and when the flag is OFF, the three-dimensional data decoding device may perform sequential processing.

Figure 61:
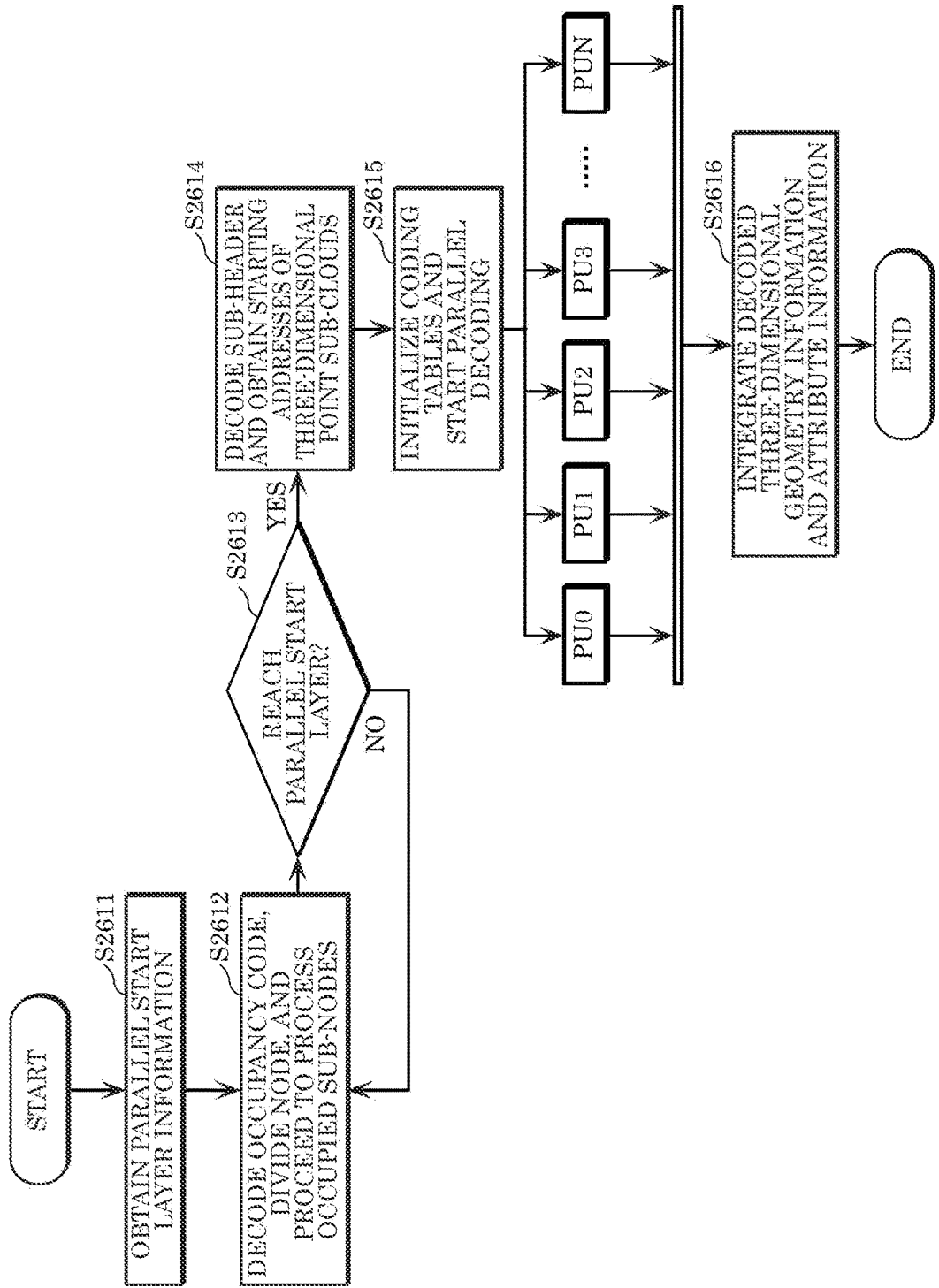
FIG. 61 is a diagram schematically illustrating a procedure of a full parallel decoding process according to Embodiment 8.

FIG. 61 is a diagram schematically illustrating a procedure of a full parallel decoding process. First, by decoding a header, the three-dimensional data decoding device obtains parallel start layer information indicating layer N that is processable in parallel (S2611). Next, the three-dimensional data decoding device decodes an occupancy code, divides a current node into eight, and proceeds to process sub-nodes in an occupancy state (S2612).

Then, the three-dimensional data decoding device determines whether a current layer has reached parallel start layer N (S2613). When the current layer has not reached parallel start layer N (NO in S2613), the three-dimensional data decoding device performs step S2612 on the next node. When the current layer has reached parallel start layer N (YES in S2613), the three-dimensional data decoding device decodes a sub-header and obtains starting addresses of three-dimensional point sub-clouds (S2614).

After that, the three-dimensional data decoding device initializes coding tables and starts parallel decoding of the three-dimensional point sub-clouds (S2615). After the completion of parallel decoding, the three-dimensional data decoding device integrates pieces of three-dimensional position information and attribute information of the decoded three-dimensional point sub-clouds (S2616).

For example, the three-dimensional data decoding device decodes parallel start layer information from the header of a bitstream. Accordingly, the three-dimensional data decoding device can determine from which layer parallel decoding is possible.

It should be noted that parallel start layer information indicating a layer in which parallel processing is to be started is not appended to a bitstream, and a layer in which parallel processing is to be started may be specified by standards etc. For example, the three-dimensional data encoding device appends a flag indicating whether to perform parallel processing to a bitstream. When the flag is ON, the three-dimensional data decoding device may start parallel processing from the first layer; and when the flag is OFF, the three-dimensional data decoding device may perform sequential processing.

Figure 62:
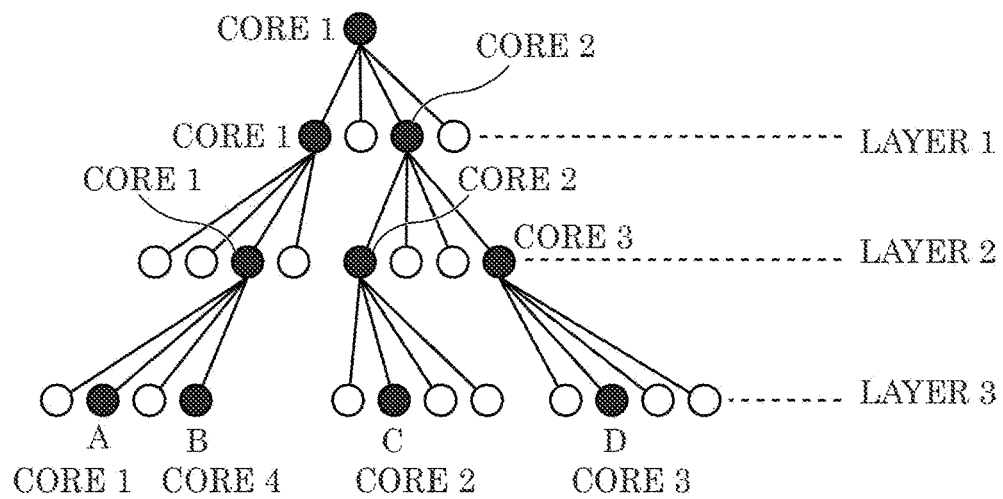
FIG. 62 is a diagram for illustrating incremental parallel encoding according to Embodiment 8 and shows an example of a tree structure.
Figure 63:
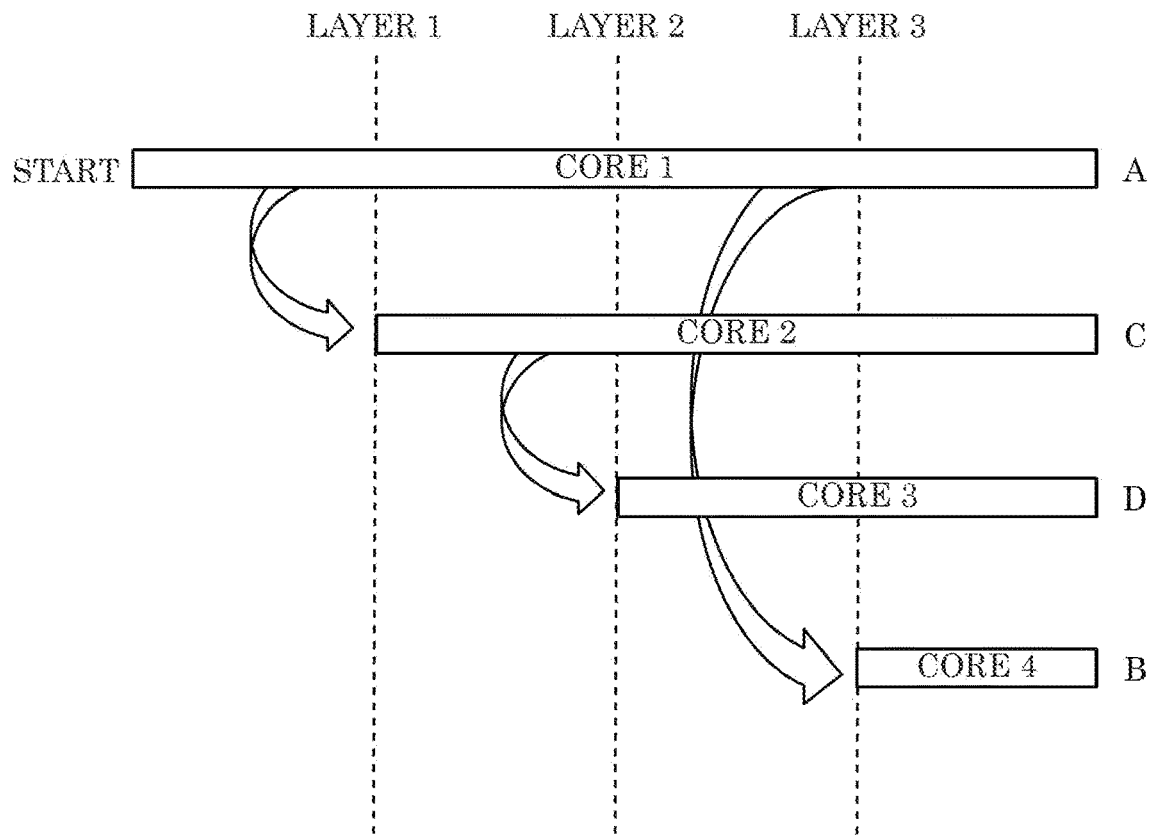
FIG. 63 is a diagram indicating operations of cores in incremental parallel encoding according to Embodiment 8.

The following describes incremental parallel encoding. FIG. 62 and FIG. 63 each are a diagram for illustrating incremental parallel encoding. FIG. 62 is a diagram illustrating parallel processing in a tree structure, and FIG. 63 is a diagram illustrating time-series changes in parallel processing.

In incremental parallel encoding, when there is an available PU in the case where a parent node is divided into one or more child nodes, the number of parallel processes is sequentially increased. In addition, each time a new node requiring an additional PU is found, a coding table is set to a predetermined table.

In an example shown in FIG. 62, core 1 starts processing in the top (root). In layer 1, core 2 is used for processing the right node and core 1 processes the left node. In layer 2, core 1 continues to process the left node. In layer 3, core 1 processes node A and core 4 processes newly found core B. Moreover, core 2 continues to process the left node in layer 2 after processing the right node in layer 1, and processes node C in layer 3. Furthermore, core 3 is added and processes the right node and node D in layer 3.

It should be noted that the three-dimensional data encoding device may add a flag indicating whether it is necessary to initialize a coding table for entropy encoding in each node. As a result, the three-dimensional data decoding device can determine that next child nodes of a node for which the flag indicates the necessity of initialization are processable in parallel.

Figure 64:
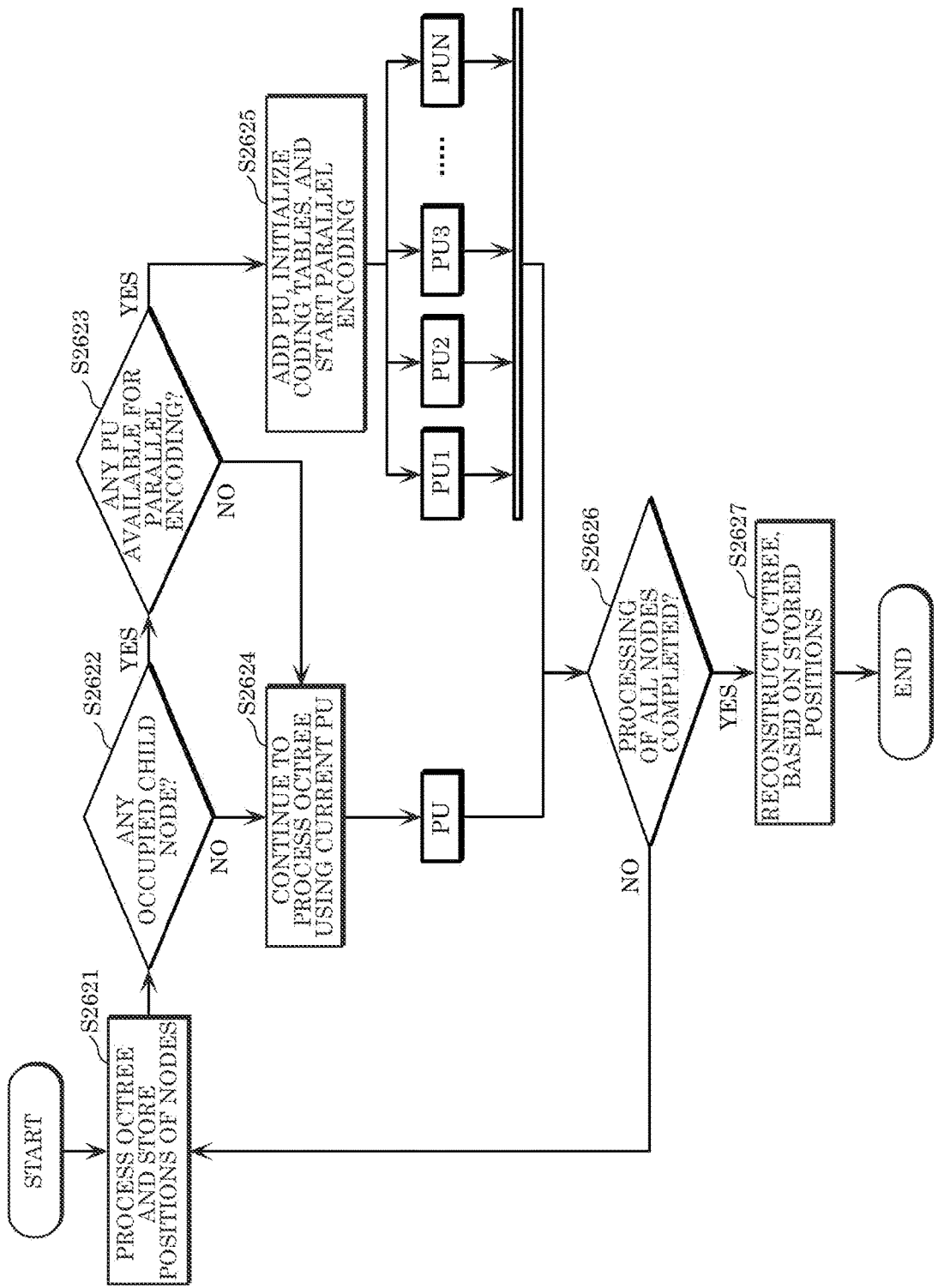
FIG. 64 is a diagram schematically illustrating a procedure of an incremental parallel encoding process according to Embodiment 8.

FIG. 64 is a diagram schematically illustrating a procedure of an incremental parallel encoding process. First, the three-dimensional data encoding device processes an octree and stores positions of nodes (S2621). Next, the three-dimensional data encoding device determines whether a current node includes occupied child nodes that are child nodes in an occupancy state (S2622). When the current node includes the occupied child nodes (YES in S2613), the three-dimensional data encoding device determines whether there is a PU available for parallel encoding (S2623).

When the current node includes no occupied child nodes (NO in S2613) or there is no PU available for parallel encoding (NO in S2623), the three-dimensional data encoding device continues to process the octree using a PU currently in use (S2624). For example, in an initial state, the three-dimensional data encoding device continues processing using one PU in an initial state. Moreover, the expression "when the current node includes no occupied child nodes" includes a case in which the current node does not include any occupied node and a case in which the current node includes one occupied child node.

In contrast, when there is a PU available for parallel encoding (YES in S2623), the three-dimensional data encoding device adds a new PU to PUs to be used, initializes coding tables, and starts parallel processing (S2625).

When processing of all nodes is not completed (NO in S2626), the three-dimensional data encoding device performs step S2621 on the next node. When processing of all nodes is completed (YES in S2626), the three-dimensional data encoding device reconstructs an octree, based on the positions stored in step S2602 (S2627).

In such incremental parallel encoding, when the current node includes occupied nodes and there is an available PU, parallel processing is started immediately. Accordingly, since a PU can be assigned to the next processing when the PU completes processing in a short time, ideal processing load balancing is achievable.

On the other hand, each time parallel processing is requested, initialization is required. Additionally, since PUs do not always complete processing by the next processing in an up-down or left-right processing order, a mechanism for synchronizing all of nodes and child nodes in each layer is required so as to write back data. In other words, since above-mentioned full parallel encoding requires no such processing, full parallel encoding produces the effect of reducing the amount of processing.

As stated above, in the present embodiment, original three-dimensional points are divided into branches processable in parallel. In an octree, for example, eight branches processable in parallel are generated for nodes. In addition, a new parameter indicating from which layer of the octree a branch processable in parallel starts is defined.

When a transition to processing of the next branch processable in parallel is made, a coding table for entropy encoding is reset. Alternatively, a different coding table is used for each of branches processable in parallel.

For example, reference to nodes included in different branches processable in parallel, such as information of neighboring nodes, is prohibited.

Modes relating to parallel processing are defined. For example, mode 0 is a mode for performing no parallel processing. Mode 1 is a mode for performing parallel processing of geometry information (structure information). In this mode, regarding attribute information, reference to other branches processable in parallel is permitted. Mode 2 is a mode for performing parallel processing of geometry information and attribute information. In other words, regarding both the geometry information and the attribute information, reference to other branches processable in parallel is prohibited.

The starting address of data of each of branches processable in parallel is encoded into a header such as a slice header.

The three-dimensional data decoding device may process, in parallel, all branches processable in parallel or may process, in parallel, part of branches processable in parallel.

Figure 65:
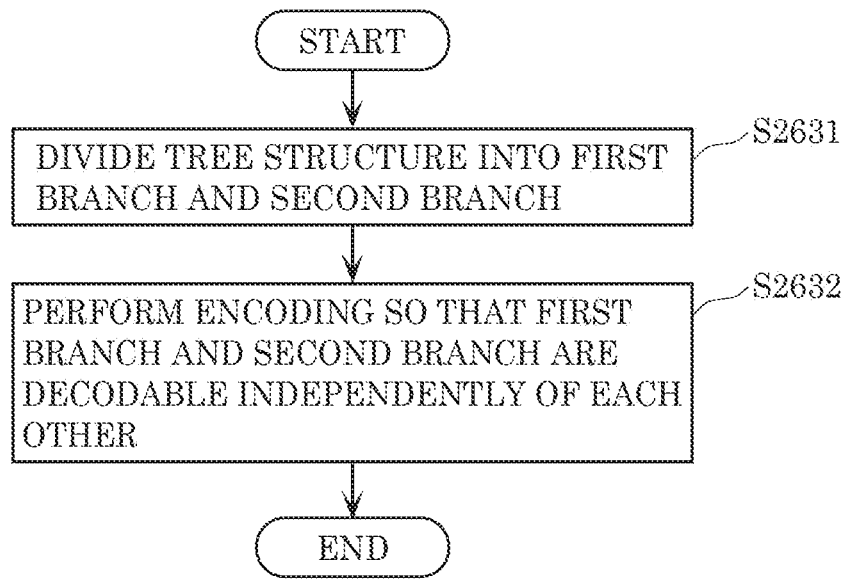
FIG. 65 is a flowchart of a three-dimensional data encoding process according to Embodiment 8.

As described above, the three-dimensional data encoding device according to this embodiment performs the process illustrated in FIG. 65. First, the three-dimensional data encoding device divides an N-ary tree structure (N being an integer greater than or equal to 2) of three-dimensional points included in three-dimensional data, into a first branch (first three-dimensional point sub-cloud) and a second branch (second three-dimensional point sub-cloud) (S2631). Next, the three-dimensional data encoding device encodes the first branch and the second branch so that the first branch and the second branch are decodable independently of each other (S2632). Stated differently, the three-dimensional data encoding device encodes the first branch and the second branch so that the first branch and the second branch have no dependency relationship with each other. For example, the three-dimensional data encoding device encodes the first branch and the second branch in parallel.

For example, the root of the first branch is a first node included in a first layer in the N-ary tree structure, and the root of the second branch is a second node included in the first layer and different from the first node. In other words, the first branch and the second branch belong to the same layer.

For example, the three-dimensional data encoding device encodes information (parallel start layer information) indicating the first layer. Specifically, the three-dimensional data encoding device generates a bitstream including information (parallel start layer information) indicating the first layer.

For example, the three-dimensional data encoding device entropy encodes the first branch and the second branch using different coding tables.

For example, after entropy encoding the first branch, the three-dimensional data encoding device initializes the coding table before entropy encoding the second branch.

For example, the three-dimensional data encoding device prohibits reference to the second branch in the encoding of the first branch, and prohibits reference to the first branch in the encoding of the second branch.

For example, the three-dimensional data encoding device encodes pieces of geometry information of first three-dimensional points included in the first branch and pieces of geometry information of second three-dimensional points included in the second branch so that the pieces of geometry information of the first three-dimensional points and the pieces of geometry information of the second three-dimensional points are decodable independently of each other, and encodes pieces of attribute information of the first three-dimensional points and pieces of attribute information of the second three-dimensional points so that the pieces of attribute information of the first three-dimensional points and the pieces of attribute information of the second three-dimensional points are decodable independently of each other. In other words, the three-dimensional data encoding device encodes both the pieces of geometry information and the pieces of attribute information so that the pieces of geometry information have no dependency relationship with each other and the pieces of attribute information have no dependency relationship with each other.

For example, the three-dimensional data encoding device encodes one of (1) pieces of geometry information of first three-dimensional points included in the first branch and pieces of geometry information of second three-dimensional points included in the second branch and (2) pieces of attribute information of the first three-dimensional points and pieces of attribute information of the second three-dimensional points so that the one of (1) the pieces of geometry information of the first three-dimensional points and the pieces of geometry information of the second three-dimensional points and (2) the pieces of attribute information of the first three-dimensional points and the pieces of attribute information of the second three-dimensional points are decodable independently of each other, and encodes the other of (1) the pieces of geometry information of the first three-dimensional points and the pieces of geometry information of the second three-dimensional points and (2) the pieces of attribute information of the first three-dimensional points and the pieces of attribute information of the second three-dimensional points so that the other of (1) the pieces of geometry information of the first three-dimensional points and the pieces of geometry information of the second three-dimensional points and (2) the pieces of attribute information of the first three-dimensional points and the pieces of attribute information of the second three-dimensional points have a dependency relationship with each other. In other words, the three-dimensional data encoding device encodes one of the pieces of geometry information and the pieces of attribute information so that the one of the pieces of geometry information and the pieces of attribute information have no dependency relationship with each other; and encodes the other of the pieces of geometry information and the pieces of attribute information so that the other of the pieces of geometry information and the pieces of attribute information have a dependency relationship with each other. It should be noted that the expression "have a dependency relationship with each other" means, for example, entropy encoding the first branch and the second branch using the same coding table, not initializing the coding table before the second branch is entropy encoded after the first branch is entropy encoded, permitting reference to the second branch in the encoding of the first branch, or permitting reference to the first branch in the encoding of the second branch.

For example, the three-dimensional data encoding device encodes a flag indicating whether the first branch and the second branch have been encoded so that the first branch and the second branch are decodable independently of each other. In other words, the three-dimensional data encoding device generates a bitstream including the flag indicating whether the first branch and the second branch have been encoded so that the first branch and the second branch are decodable independently of each other.

For example, the three-dimensional data encoding device includes a processor and memory, and the processor performs the above process using the memory.

Figure 66:
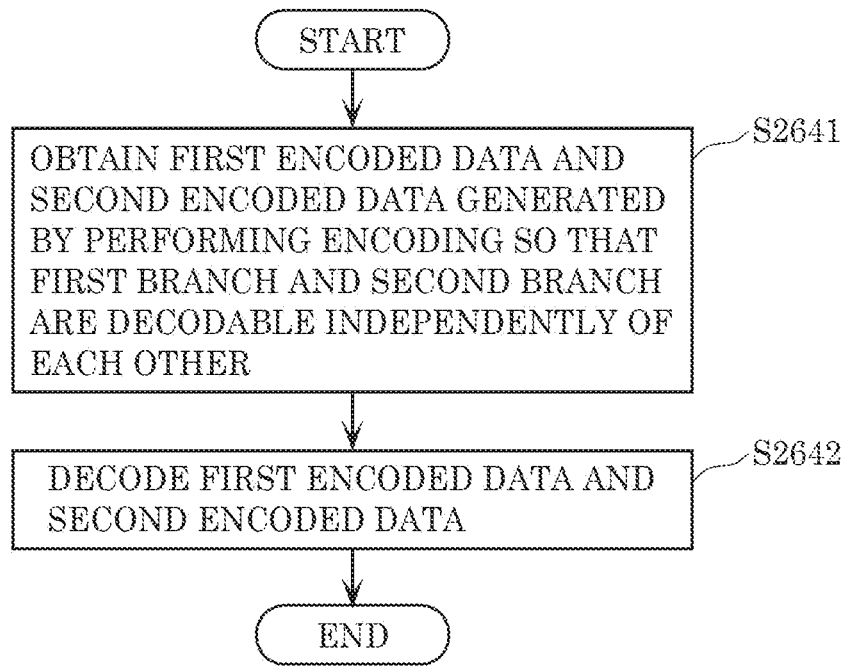
FIG. 66 is a flowchart of a three-dimensional data decoding process according to Embodiment 8.

The three-dimensional data decoding device according to this embodiment performs the process illustrated in FIG. 66. First, the three-dimensional data decoding device obtains first encoded data and second encoded data generated by encoding a first branch and a second branch included in an N-ary tree structure (N being an integer greater than or equal to 2) of three-dimensional points included in three-dimensional data, so that the first branch and the second branch are decodable independently of each other (S2641). For example, the three-dimensional data decoding device obtains first encoded data and second encoded data from a bitstream. Next, the three-dimensional decoding device decodes the first branch and the second branch by decoding each of the first encoded data and the second encoded data (S2642). For example, the three-dimensional data decoding device decodes first encoded data and second encoded data in parallel.

For example, the root of the first branch is a first node included in a first layer in the N-ary tree structure, and the root of the second branch is a second node included in the first layer and different from the first node. In other words, the first branch and the second branch belong to the same layer.

For example, the three-dimensional data decoding device decodes information (parallel start layer information) indicating the first layer. For example, the three-dimensional data decoding device obtains the information (parallel start layer information) indicating the first layer from the bitstream.

For example, the three-dimensional data decoding device entropy decodes the first branch and the second branch using different tables.

For example, after entropy decoding the first branch, the three-dimensional data decoding device initializes the coding table before entropy decoding the second branch.

For example, the three-dimensional data decoding device does not refer to the second branch in the decoding of the first branch, and does not refer to the first branch in the decoding of the second branch.

For example, the first encoded data includes first encoded geometry data and first encoded attribute data, the first encoded geometry data being generated by encoding pieces of geometry information of first three-dimensional points included in the first branch, the first encoded attribute data being generated by encoding pieces of attribute information of the first three-dimensional points. The second encoded data includes second encoded geometry data and second encoded attribute data, the second encoded geometry data being generated by encoding pieces of geometry information of second three-dimensional points included in the second branch, the second encoded attribute data being generated by encoding pieces of attribute information of the second three-dimensional points. The first encoded geometry data and the second encoded geometry data are generated so that the first encoded geometry data and the second encoded geometry data are decodable independently of each other, and the first encoded attribute data and the second encoded attribute data are generated so that the first encoded attribute data and the second encoded attribute data are decodable independently of each other. In other words, the three-dimensional data encoding device generates the first encoded data and the second encoded data by encoding both the pieces of geometry information and the pieces of attribute information so that the pieces of geometry information have no dependency relationship with each other and the piece of attribute information have no dependency relationship with each other.

For example, the first encoded data and the second encoded data are generated by encoding one of (1) pieces of geometry information of first three-dimensional points included in the first branch and pieces of geometry information of second three-dimensional points included in the second branch and (2) pieces of attribute information of the first three-dimensional points included in the first branch and pieces of attribute information of the second three-dimensional points included in the second branch so that the one of (1) the pieces of geometry information of the first three-dimensional points included in the first branch and the pieces of geometry information of the second three-dimensional points included in the second branch and (2) the pieces of attribute information of the first three-dimensional points included in the first branch and the pieces of attribute information of the second three-dimensional points included in the second branch are decodable independently of each other. The three-dimensional data decoding device restores, by decoding the first encoded data and the second encoded data, the one of (1) the pieces of geometry information of the first three-dimensional points included in the first branch and the pieces of geometry information of the second three-dimensional points included in the second branch and (2) the pieces of attribute information of the first three-dimensional points included in the first branch and the pieces of attribute information of the second three-dimensional points included in the second branch. The three-dimensional data decoding device further obtains third encoded data and fourth encoded data generated by encoding the other of (1) the pieces of geometry information of the first three-dimensional points included in the first branch and the pieces of geometry information of the second three-dimensional points included in the second branch and (2) the pieces of attribute information of the first three-dimensional points included in the first branch and the pieces of attribute information of the second three-dimensional points included in the second branch so that the other of (1) the pieces of geometry information of the first three-dimensional points included in the first branch and the pieces of geometry information of the second three-dimensional points included in the second branch and (2) the pieces of attribute information of the first three-dimensional points included in the first branch and the pieces of attribute information of the second three-dimensional points included in the second branch have a dependency relationship with each other. The three-dimensional data decoding device restores, by decoding the third encoded data and the fourth encoded data, the other of (1) the pieces of geometry information of the first three-dimensional points included in the first branch and the pieces of geometry information of the second three-dimensional points included in the second branch and (2) the pieces of attribute information of the first three-dimensional points included in the first branch and the pieces of attribute information of the second three-dimensional points included in the second branch. In other words, the three-dimensional data encoding device encodes one of the pieces of geometry information and the pieces of attribute information so that the one of the pieces of geometry information and the pieces of attribute information have no dependency relationship with each other; and encodes the other of the pieces of geometry information and the pieces of attribute information so that the other of the pieces of geometry information and the pieces of attribute information have a dependency relationship with each other. For example, when two encoded data have a dependency relationship with each other, the three-dimensional data decoding device entropy decodes the two encoded data using the same coding table, does not initialize the coding table after entropy decoding one of the two encoded data and before entropy decoding the other of the two encoded data, or refers to the other of the two encoded data in decoding of the one of the two encoded data.

For example, the three-dimensional data decoding device decodes a flag indicating whether the first branch and the second branch have been encoded so that the first branch and the second branch are decodable independently of each other. For example, the three-dimensional data decoding device obtains, from a bitstream, the flag indicating whether the first branch and the second branch have been encoded so that the first branch and the second branch are decodable independently of each other. For example, when the flag indicates that the first branch and the second branch have been encoded so that the first branch and the second branch are decodable independently of each other, the three-dimensional data decoding device decodes the first encoded data and the second encoded data in parallel; and when the flag does not indicate that the first branch and the second branch have been encoded so that the first branch and the second branch are decodable independently of each other, the three-dimensional data decoding device decodes the first encoded data and the second encoded data sequentially.

For example, the three-dimensional data decoding device includes a processor and memory, and the processor performs the above-described process using the memory.

Embodiment 9

A bitstream of encoded three-dimensional points (point cloud) requires a large-capacity storage or cache because its data size becomes big. Furthermore, since the bitstream becomes complex, high-performance hardware becomes necessary. Furthermore, by dispersion of a bitstream, a plurality of point cloud compression (PCC) bitstreams are required.

On the other hand, a user does not necessarily need all the information of the bitstream of three-dimensional points at all times, and there are instances where some PCC bitstreams or a combined bitstream including a plurality of components of bitstreams are required. Therefore, a method of obtaining information of three-dimensional points effectively and in parallel is desired.

Figure 67:
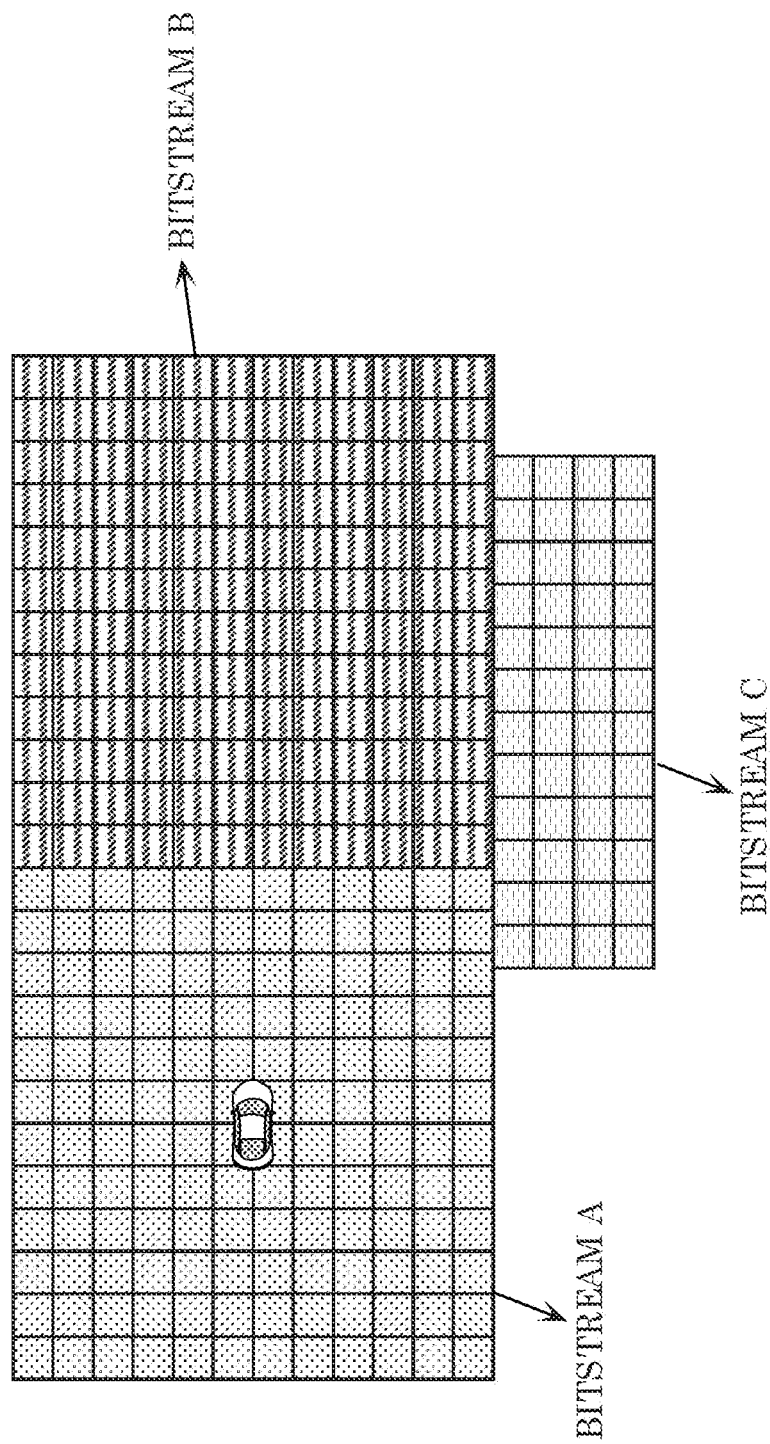
FIG. 67 is a diagram schematically illustrating an operation in which a car accesses bitstreams according to Embodiment 9.

FIG. 67 is a diagram schematically illustrating an operation in the case where a car having GPS coordinates accesses bitstreams of three-dimensional points in order to obtain plan view map information. For example, as illustrated in FIG. 67, bitstream A is a PCC bitstream of three-dimensional points of regions in the surroundings the vehicle, and bitstream B and bitstream C are PCC bitstreams of three-dimensional points of neighboring regions. Furthermore, each bitstream indicates a plan view state in block form.

In this embodiment, tile division is used as a method of dividing a bitstream of three-dimensional points into small regions. Tiles are divided regions obtained by dividing a bitstream of three-dimensional points into different block regions, based on user description.

Tiles have multiple levels from a root node. Furthermore, tiles having different levels may have different sizes that are variable. Furthermore, tiles may be independent of each other.

The three-dimensional data encoding device may encode one or a plurality of tile levels, and the three-dimensional data decoding device may decode one or more tile levels needed in an application, from among the one or a plurality of tile levels.

Figure 68:
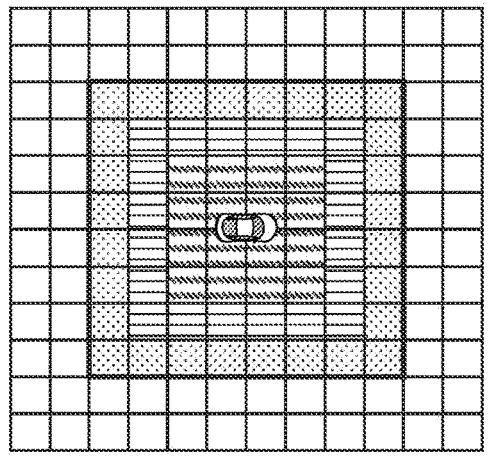
FIG. 68 is a diagram illustrating an example of tile division according to Embodiment 9.
Figure 69:
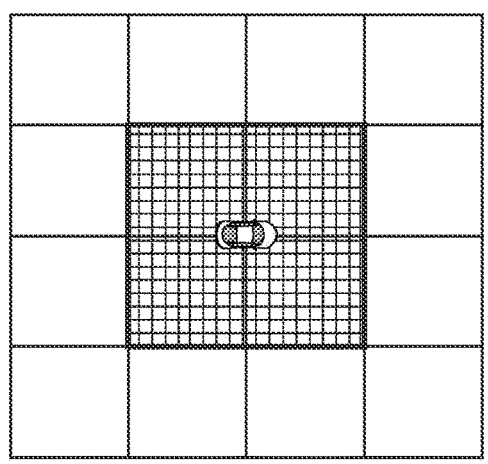
FIG. 69 is a diagram illustrating an example of tile division according to Embodiment 9.
Figure 80:
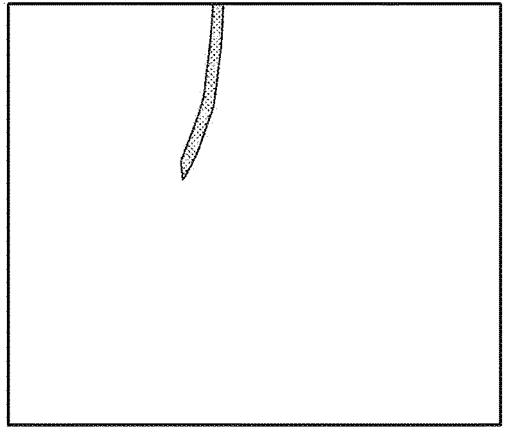
FIG. 80 is a diagram illustrating an example of data of a slice according to Embodiment 9.

FIG. 68 is a diagram illustrating in plan view a single PCC bitstream that is divided into small tiles. FIG. 69 is a diagram illustrating in plan view a single PCC bitstream that is divided into large tiles. FIG. 80 is a diagram illustrating in plan view a single PCC bitstream that is divided into tiles of multiple sizes.

In this manner, the three-dimensional data encoding device may encode the same region using small tile division (FIG. 68) and using large tile division (FIG. 69). For example, the three-dimensional data encoding device switches between transmitting a result of small tile division and a result of large tile division, one a per region basis, according to a request from the three-dimensional data decoding device. Alternatively, the three-dimensional data encoding device may transmit both results to the three-dimensional data decoding device, and the three-dimensional data decoding device may switch which between the result of small tile division and the result of large tile division to use, according to the car's state (for example, speed or place, etc.), and so on.

Hereinafter, complex tile division which uses multiple tile sizes will be described. The three-dimensional data encoding device may encode tiles of multiple sizes into a bitstream. For example, in the example illustrated in FIG. 70, when the car is traveling, the surrounding conditions change at different speeds. For example, the change in a region that is far from the car or a region ahead or behind the car is slower than a change in a region to the side of the car. In this manner, encoding efficiency can be improved by applying a large tile size for a region in which change is slow.

Figure 71:
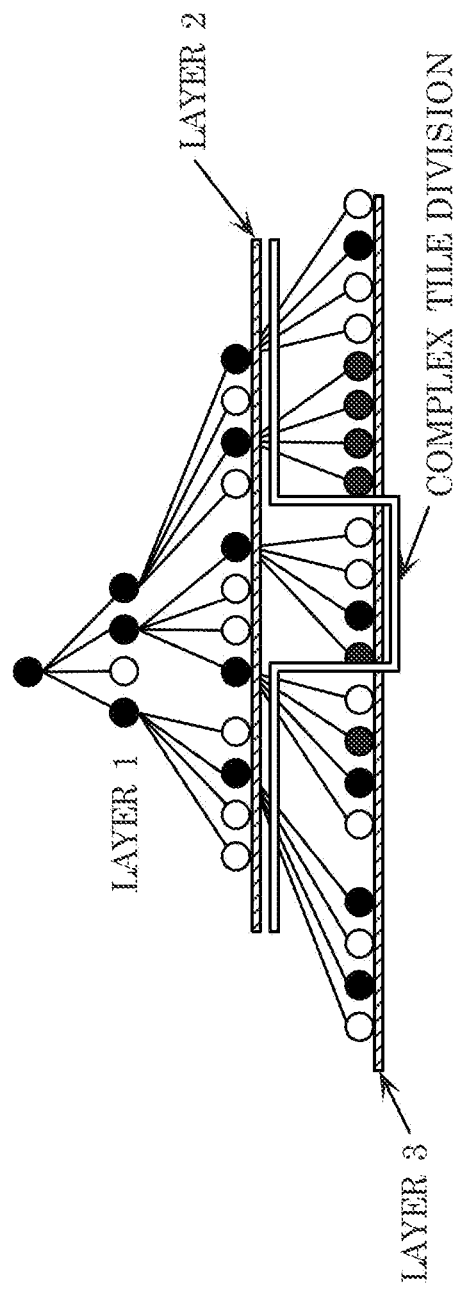
FIG. 71 is a diagram illustrating an example of tile division in a tree structure according to Embodiment 9.

FIG. 71 is a diagram illustrating an example of tile division in a quadtree. In the example illustrated in FIG. 71, a part of the tiles is of a layer 2 level and another part of the tiles are of a layer 3 level.

Figure 72:
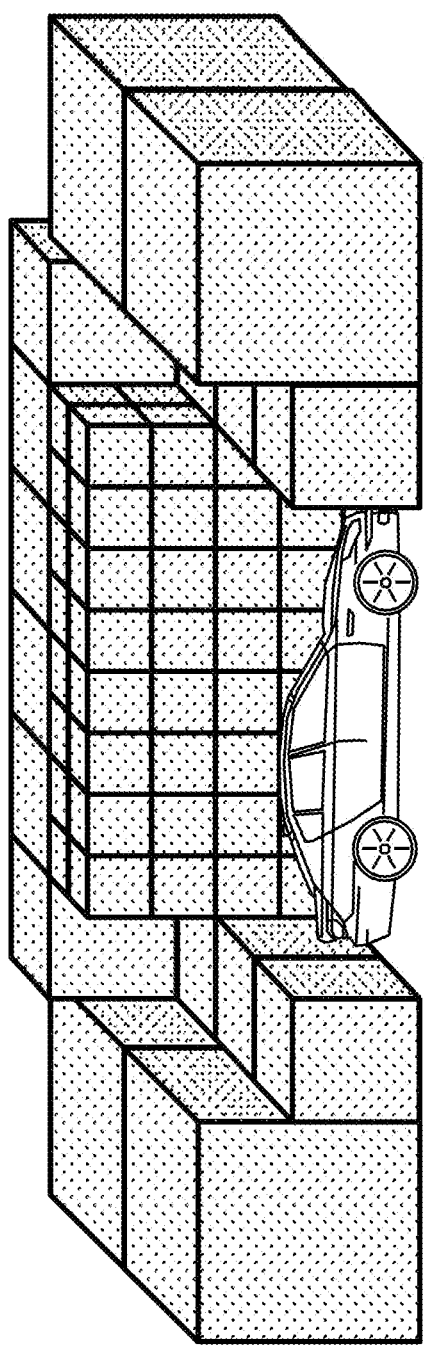
FIG. 72 is a diagram illustrating an example of three-dimensional tile division according to Embodiment 9.

It should be noted that although two-dimensional (plan view) tile division is described above, the same method can also be applied to three-dimensional tile division. FIG. 72 is a diagram illustrating an example of three-dimensional tile division. It should be noted that in FIG. 72, only a part of the tiles is shown for the sake of simplicity.

Tiles that are ahead and far from the car which is the traveling direction of the car are set to a large size because the probability that reading will be needed is high. Tiles to the side of the car are set to a small size because the probability that the car will go in that direction is low.

Furthermore, in the same manner as the examples illustrated in FIG. 68 and FIG. 69, tiles of a fixed size may also be used in three-dimensional tile division.

Furthermore, for the same region on the map, encoded data generated using tiles of a large size and encoded data generated using tiles of a small size may be stored in a server or an external storage device. If the car is traveling to that region, data of large tiles is transmitted to the car since the data of that region will be required anyway. Furthermore, for a region in a direction that is not the traveling direction of the car, data of small tiles is transmitted to the car since the car will need only part of the data of that region.

Furthermore, by using tiles, spatial random accessibility can be improved. The three-dimensional data decoding device (provided in the car, for example) can decode the read (loaded) tiles in parallel depending on the encoding scheme thereof. Furthermore, the three-dimensional data decoding device can control and keep the required memory size (for example, 3×3 tiles) during travel.

Figure 73:
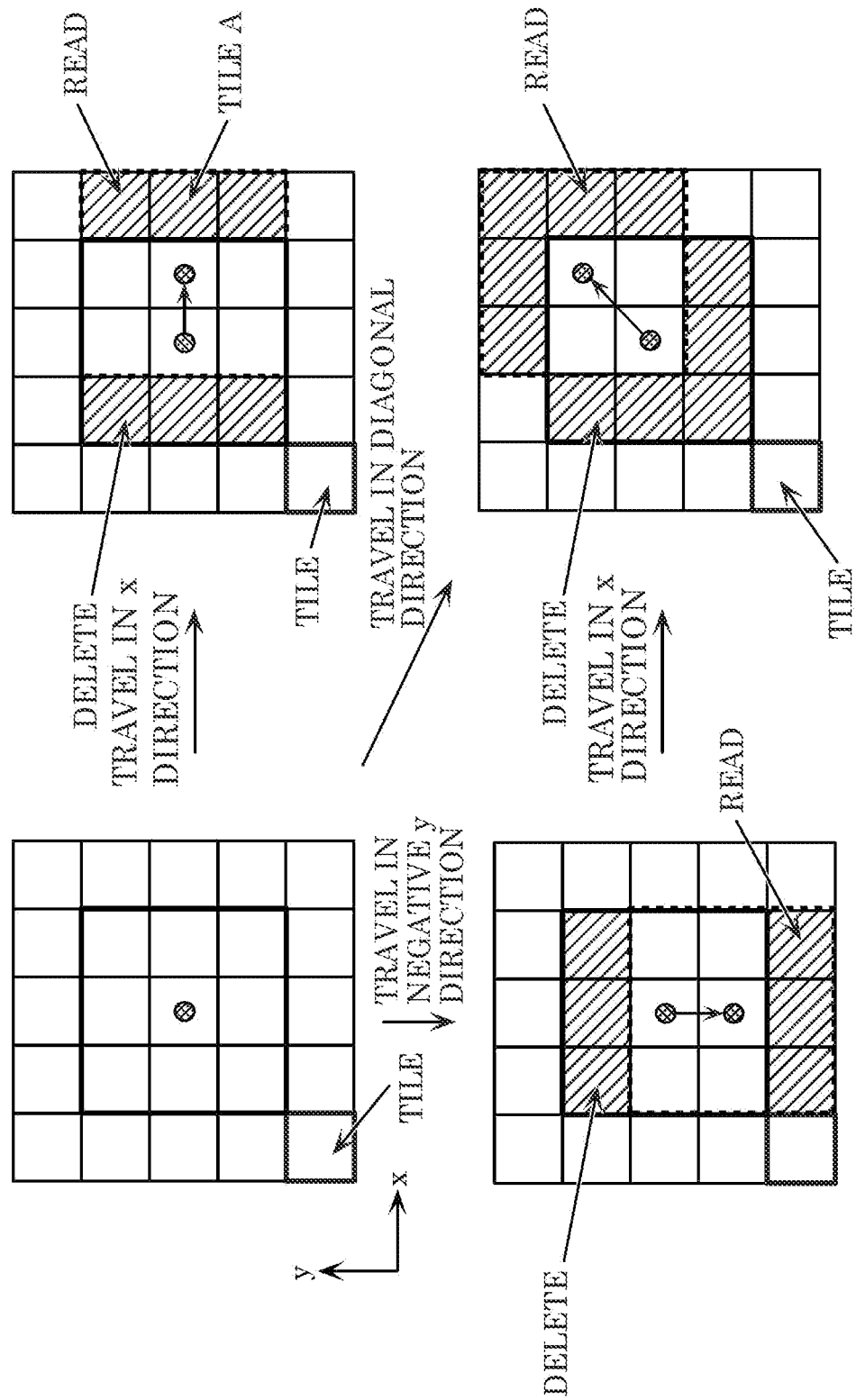
FIG. 73 is a diagram illustrating tiles read during travelling of the car according to Embodiment 9.

FIG. 73 is a diagram illustrating an example of tiles that are read during traveling of the car. As illustrated in FIG. 73, when the car is traveling in the x direction, the car reads (loads) into the memory the data of three tiles in the traveling direction (x direction), and deletes from the memory the data of three tiles in the direction opposite to the traveling direction (i.e., the negative x direction).

It should be noted that the three-dimensional data decoding device may decode the read tiles in parallel. Furthermore, the three-dimensional data decoding device may determine a priority for the read tiles, and decode the tiles in the order of priority. For example, the three-dimensional data decoding device may preferentially decode a tile (for example tile A illustrated in FIG. 73) of a region that is near in the traveling direction of the car.

In the same manner, when the car is traveling in the negative y direction, the car reads (loads) into the memory the data of three tiles in the traveling direction (i.e., the negative y direction), and deletes from the memory the data of three tiles in the direction opposite to the traveling direction (i.e., the y direction).

Furthermore, when the car is traveling in a diagonal direction (i.e., the oblique right-upward direction in the figure), the car again reads (loads) into the memory the data of five tiles in the traveling direction, and deletes from the memory the data of five times in the direction opposite to the traveling direction.

In this manner, data of 3×3 tiles is stored in the memory at all times, and thus the memory size can be limited to data of 3×3 tiles.

Figure 74:
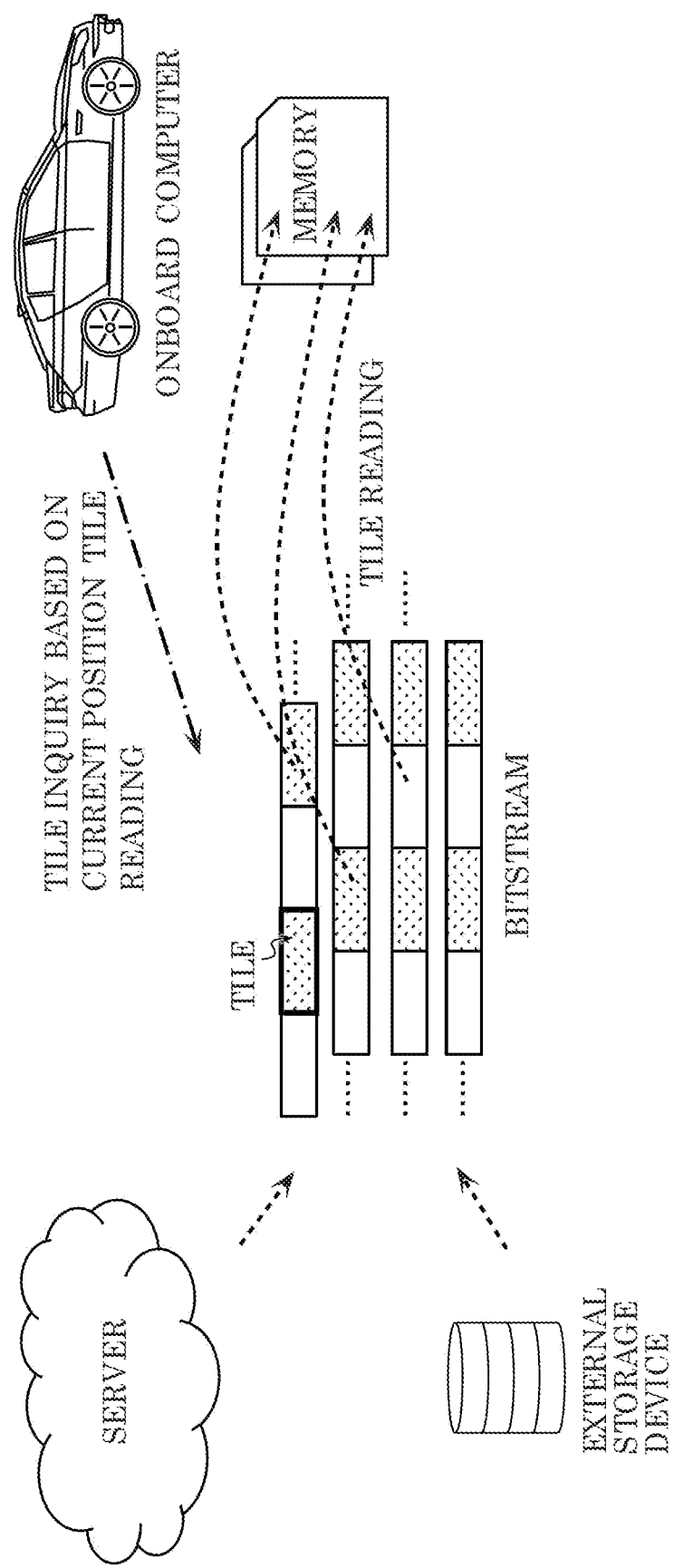
FIG. 74 is a diagram illustrating a configuration example of a system according to Embodiment 9.

FIG. 74 is a diagram illustrating a configuration example of the system according to this embodiment. The system includes a server or external storage device (the three-dimensional data encoding device) and an onboard computer (the three-dimensional data decoding device) provided in a car or the like.

The server or external storage device stores the whole three-dimensional map. According to a request from the onboard computer, the desired tiles are is read into the memory included in the onboard computer and decoded. For example, the onboard computer requests the server or external storage device for tiles of a region that is in accordance with the current position of the car.

Figure 75:
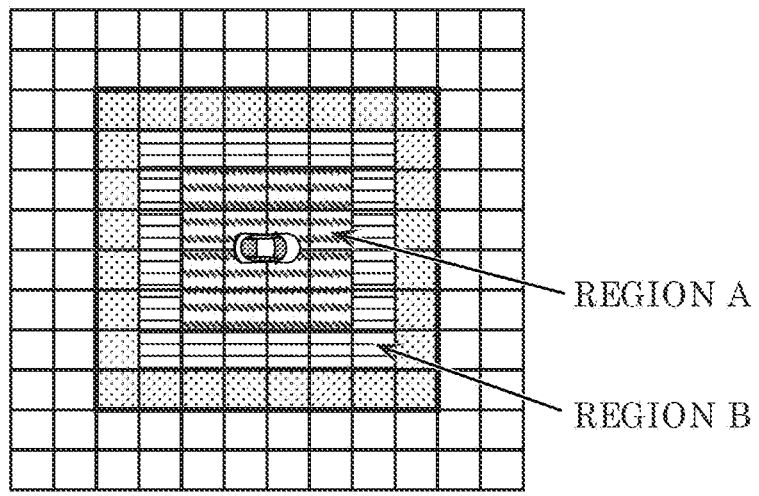
FIG. 75 is a diagram illustrating tile regions to be obtained by the car according to Embodiment 9.
Figure 76:
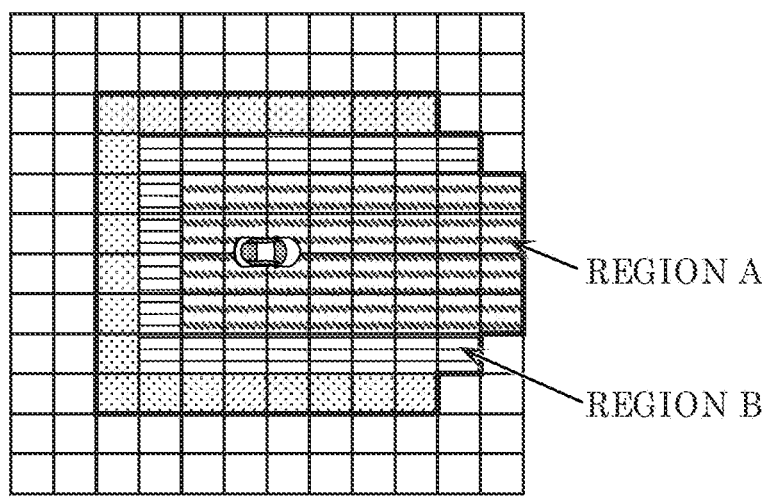
FIG. 76 is a diagram illustrating tile regions to be obtained by the car according to Embodiment 9.

Next, an example of the use of a tile will be described. FIG. 75 and FIG. 76 are diagrams showing examples of the regions of tiles to be obtained by the car. For example, when the car is traveling on an expressway, traveling speed is fast, and thus information of tiles in front needs to be decoded quickly. Therefore, obtaining the needed information with less amount of data is desirable. For this reason, for example, the car obtains the tiles of region A.

On the other hand, when the car is traveling in a city area, the car obtains the information of both region A and region B so that the driver can get more information on surrounding conditions. Furthermore, when the car is traveling off-road or on a road that is unfamiliar to the driver, the car may obtain data of a wider range such as 8×8 tiles, for example, in order to obtain more data.

Furthermore, as another example, in order that the processing load of the decoding process does not become too great, the tiles to be decoded may be selected according to the traveling speed of the car. For example, when the car is traveling at high speed on an expressway, information of tiles in front needs to be refreshed quickly. On the other hand, regions to the side of the car are of low importance. Therefore, the car selects and decodes the tiles in the rectangular region ahead. On the other hand, when the car is traveling at low speed, fewer front tiles are required. Therefore, the region of the front tiles that is obtained becomes narrower compared to during high speed travel.

Furthermore, when the car stops at an intersection, or the like, the surrounding tiles in all directions are of equal importance. Therefore, the car obtains tiles in all directions.

Furthermore, as described using FIG. 72, the size of the tiles in region A and region B may be changed according to the traveling direction and speed of the car.

Next, slices will be described. Tiles are classified into slices to utilize the semantic information in the three-dimensional spaces. A slice is a group into which tiles are classified based on semantic information (attribute information) in the three-dimensional spaces. In other words, each tile belongs to any one of a plurality of slices. The information of the slice to which a tile belongs is encoded in the header or sub-header of the encoded bitstream of three-dimensional points.

For example, for a car that is currently traveling, the route to a destination is almost fixed, and thus some roads on the map will not be used. Therefore, these roads are negligible. Furthermore, the appearance of trees changes day by day. Therefore, compared to buildings and roads, the importance of trees is low.

Figure 77:
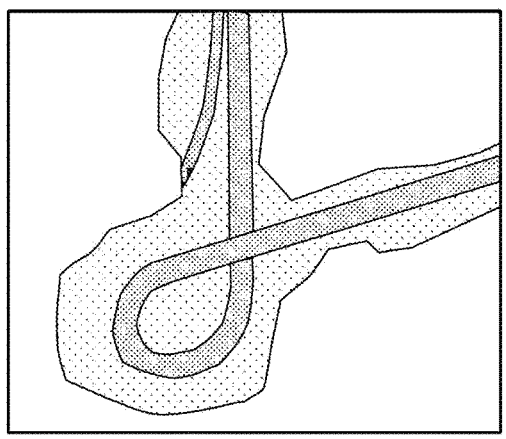
FIG. 77 is a diagram illustrating an example of three-dimensional data according to Embodiment 9.
Figure 78:
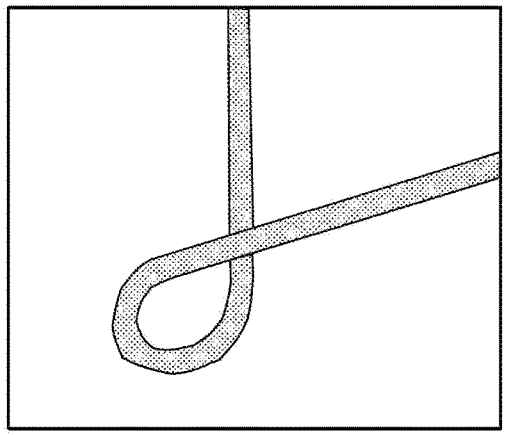
FIG. 78 is a diagram illustrating an example of data of a slice according to Embodiment 9.
Figure 79:
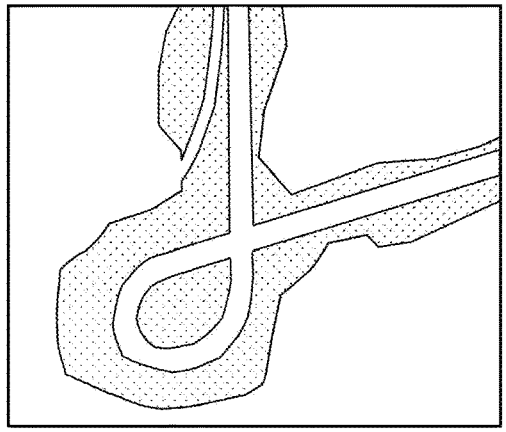
FIG. 79 is a diagram illustrating an example of data of a slice according to Embodiment 9.

FIG. 77 is a diagram illustrating one example of three-dimensional data (three-dimensional points). FIG. 78 to FIG. 80 are diagrams illustrating an example of data of three slices obtained by dividing the three-dimensional data illustrated in FIG. 77. The slice illustrated in FIG. 78 contains three-dimensional data of an expressway. The slice illustrated in FIG. 79 contains three-dimensional data of trees. The slice illustrated in FIG. 80 contains three-dimensional data of minor roads.

Furthermore, as a slice dividing method, it is possible to use attributes (color, reflectance, normal vector, or a related object), and so on, of a tile or point cloud included in a tile. Furthermore, slices may be set for each of targeted applications such as classifying a tile including a point cloud used in self-location estimation by a vehicle as slice A, classifying a tile including a point cloud to be displayed on a navigation screen as slice B, and so on. Furthermore, when setting slices according to the intended use in a three-dimensional map, slices may be set based on region information (in Japan, prefecture, municipality, etc.) to which the point cloud or tile belongs.

Figure 81:
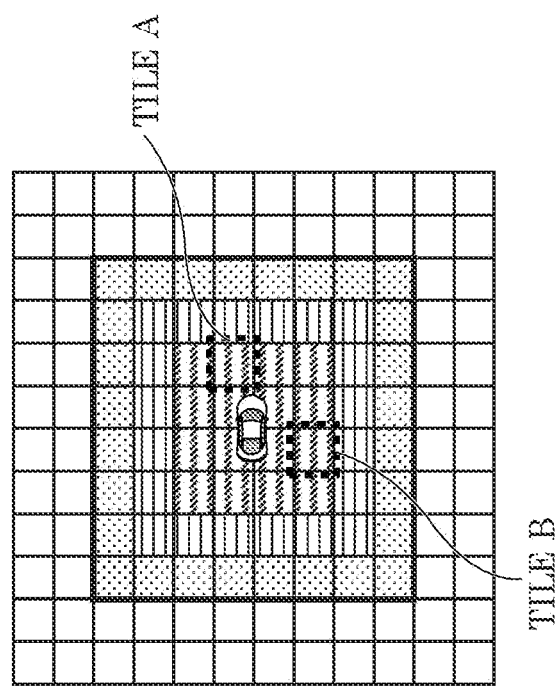
FIG. 81 is a diagram illustrating an example of tiles according to Embodiment 9.
Figure 82:
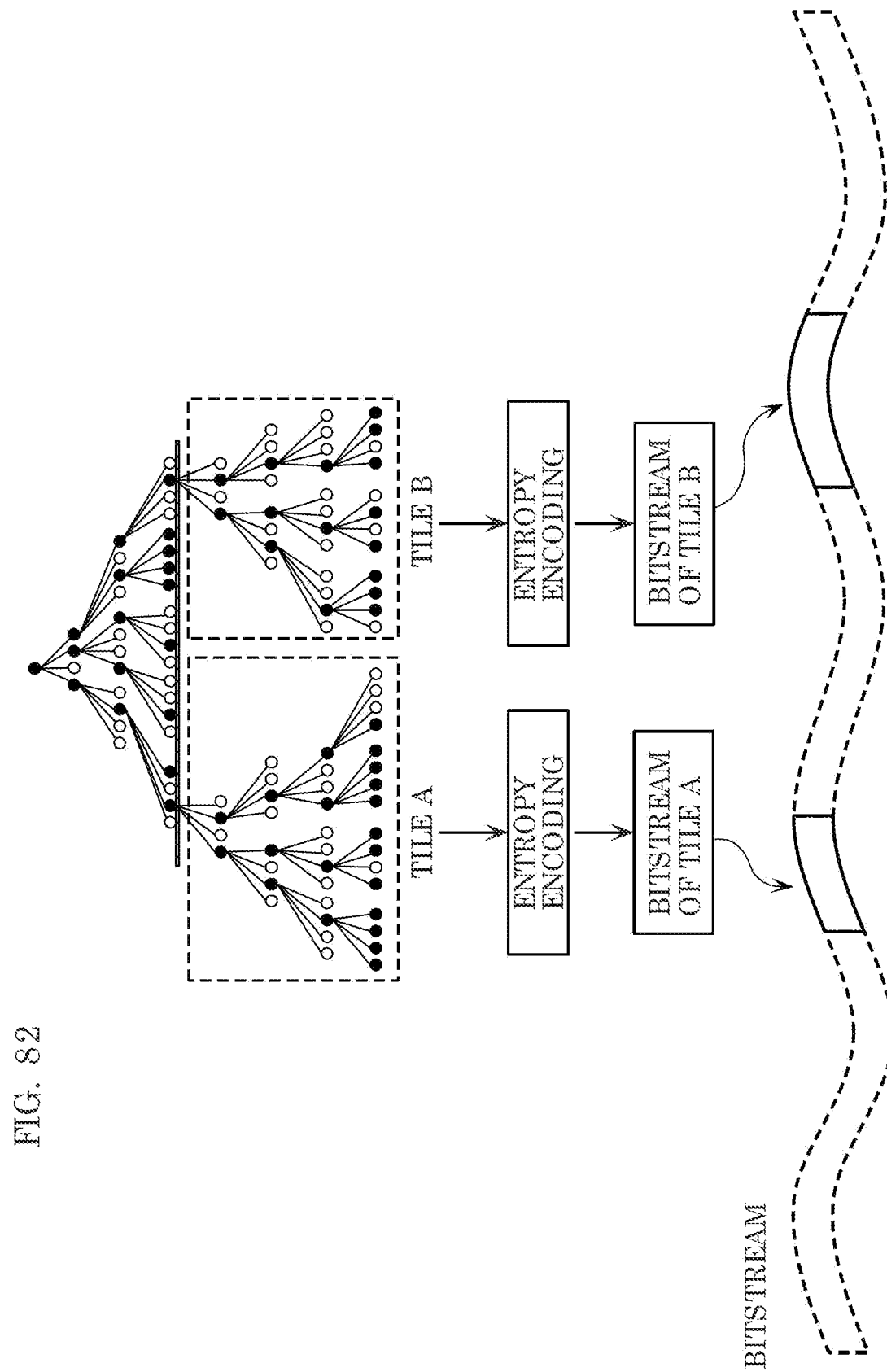
FIG. 82 is a diagram illustrating an example of tiles of an octree according to Embodiment 9.

Next, an example of tiles in an octree will be described. FIG. 81 is a diagram illustrating an example of tiles. FIG. 82 is a diagram illustrating an example of tiles from an octree.

For example, each tile and each slice can be encoded independently and decoded independently. In the encoding and the decoding, each tile and each slice contain a sub-octree, in relation to the full octree. For example, the three-dimensional data encoding device and the three-dimensional data decoding device initialize a coding table on a per tile basis.

Furthermore, decoded tiles or slices may be used immediately in an application without waiting for other tiles or slices to be decoded.

Furthermore, the data of tiles or slices are located in a bitstream in a certain order. For example, the order could indicate the priority of data in an application.

For example, as illustrated in FIG. 82, each of tile A and tile B is entropy encoded, and the bitstream of tile A and the bitstream of tile B that are generated are included in the entire bitstream.

Figure 83:
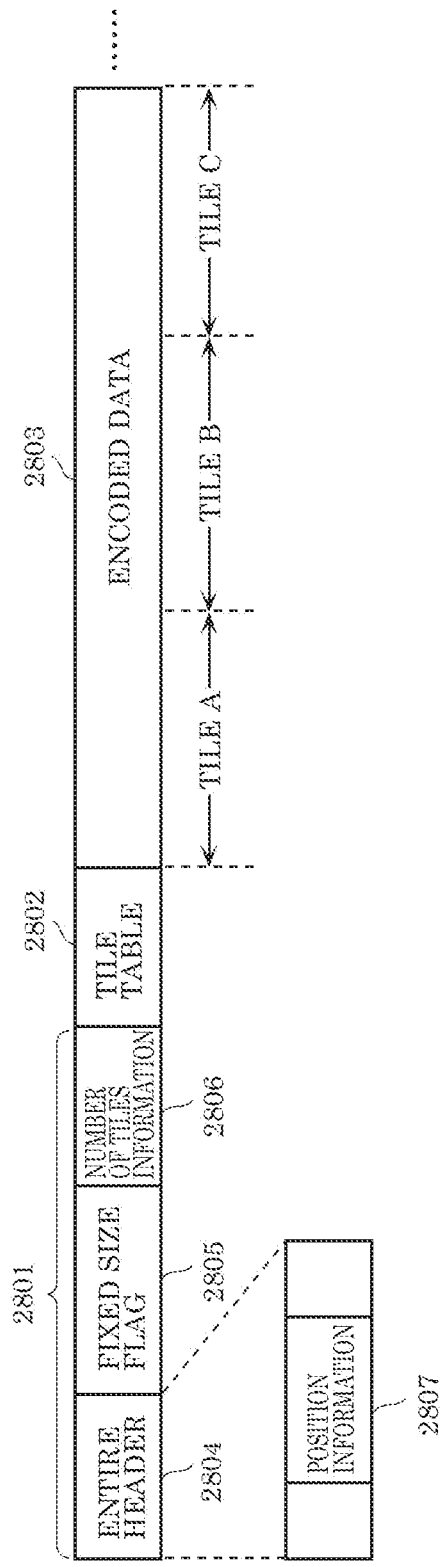
FIG. 83 is a diagram illustrating an example of a bitstream according to Embodiment 9.

Hereinafter, a configuration example of a bitstream according to this embodiment will be described. FIG. 83 is a diagram illustrating an example of a bitstream obtained by entropy encoding a plurality of tiles. As illustrated in FIG. 83, the bitstream includes common header 2801 which is header information (a first header) common to the tiles, tile table 2802, and encoded data 2803.

Common header 2801 includes entire header 2804, fixed size flag 2805, and number of tiles information 2806. Entire header 2804 is a header for the full tree structure and includes location information 2807 indicating the location of the full tree structure. Specifically, location information 2807 is information which identifies the location of the full tree structure or the location of a three-dimensional space (bounding box) corresponding to the tree structure. For example, location information 2807 indicates a location (for example, coordinates) of an arbitrary node in the full tree structure or an arbitrary point included in the three-dimensional space corresponding to the tree structure. For example, location information 2807 indicates the location of a root of a tree structure. For example, location information 2807 may indicate coordinates of the root of the tree structure which have a reference point based on world coordinates. Furthermore, the entire header may include information indicating the number of three-dimensional points included in the full tree structure, etc.

Fixed size flag 2805 is a flag indicating whether the size of a tile is to be made fixed. Specifically, fixed size flag 2805 indicates whether to make the sizes of the plurality of tiles the same. For example, Fixed size flag=0 indicates that the tile size is not to be made fixed, Fixed size flag=1 indicates that the tile size is to be made fixed.

Number of tiles information 2806 is information indicating the number of tiles, and is to be used in analyzing tile table 2802. It should be noted that number of tiles information 2806 may be included in tile table 2802. Tile table 2802 includes information of the plurality of tiles.

Encoded table 2803 includes encoded data of the respective tiles. The encoded data of the respective tiles are, for example, independent.

Figure 84:
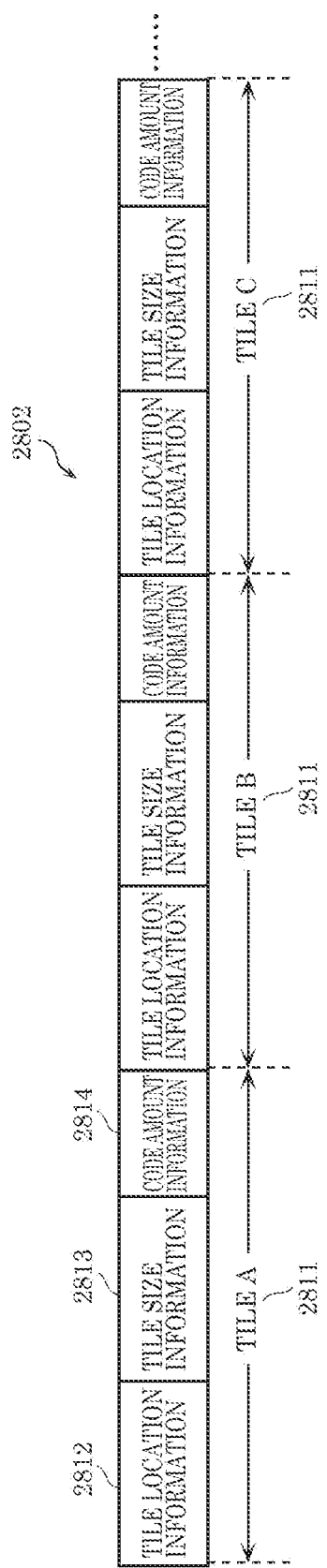
FIG. 84 is a diagram illustrating an example of a tile table according to Embodiment 9.

FIG. 84 is a diagram indicating a configuration example of tile table 2802 in the case where Fixed size flag=0 (not to be made fixed). Tile table 2802 includes tile information 2811 which is header information (second header) for each tile. Specifically, a plurality of tile information 2811 correspond on a one-to-on basis to the plurality of tiles.

Tile information 2811 includes tile location information 2812, tile size information 2813, and code amount information 2814. Tile location information 2812 indicates the location of a tile. For example, tile location information 2812 indicates the location of a root of the tile. For example, tile location information 2812 may indicate coordinates having a reference point based on world coordinates. It should be noted that in this case, since the three-dimensional data decoding device can use the coordinates of decoded three-dimensional points as is, the processing amount can be reduced. Alternatively tile location information 2812 may indicate the error between the location (coordinates) of the full tree structure indicated by location information 2807 and the location (coordinates) of the tile.

Tile size information 2813 indicates the size of the tile. It should be noted that the size of the tile may be indicated by the size in each of the x, y, and z directions, for example, or may be indicated by the size of one side under the premise that the sizes of x, y, and z are equal. Furthermore, the size of the tile corresponds to a layer (level) of the tree structure as previously described. Therefore, the size of the tile may be represented by the layer (level).

Code amount information 2814 indicates the code amount (bit size) of the encoded data of the corresponding tile.

Furthermore, the three-dimensional data decoding device may calculate the starting position (start bit) of encoded data of each tile in the bitstream, by referring to code amount information 2814 of each tile included in tile table 2802. For example, the three-dimensional data decoding device calculates the starting position of tile C illustrated in FIG. 83, by adding the code amount of tile A and the code amount of tile B. Furthermore, the starting position of the encoded data of each tile in the bitstream may be stored in tile table 2802. Accordingly, the three-dimensional data decoding device can know the starting position of the encoded data of each tile in the bitstream by referring to tile table 2802, and thus can obtain and quickly decode the encoded data of a required tile. It should be noted that code amount information 2814 may indicate the ending position of the encoded data in the bitstream.

Figure 85:
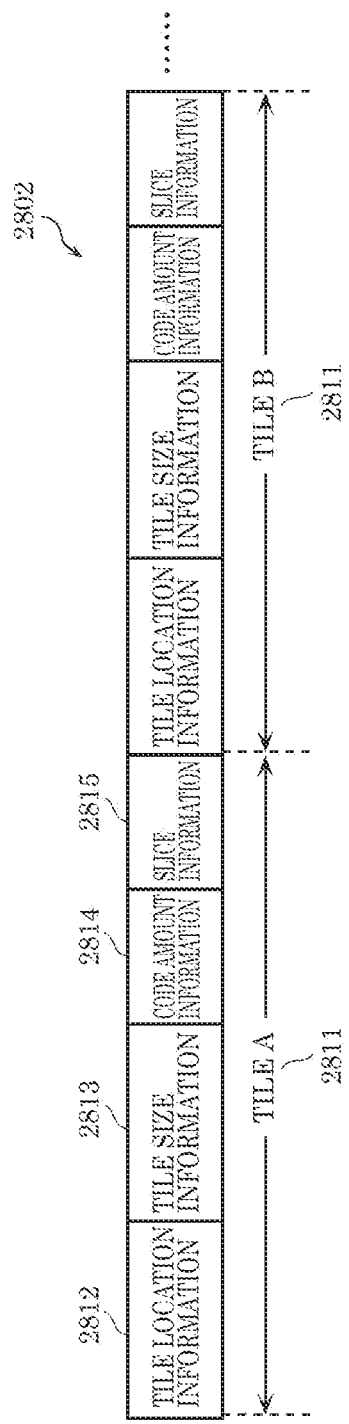
FIG. 85 is a diagram illustrating an example of a tile table according to Embodiment 9.

FIG. 85 is a diagram indicating another configuration example of tile table 2802 in the case where Fixed size flag=0 (not to be made fixed). Tile information 2811 illustrated in FIG. 85 includes slice information 2815 in addition to tile information 2811 illustrated in FIG. 84. Slice information 2815 indicates information (semantic information) of the slice related to the tile. Specifically, slice information 2815 indicates the slice to which the tile belongs. This information, although dependent on the application used, indicates, for example, color, an object attribute, the distance to the vehicle, the three-dimensional point density, and so on.

Figure 86:
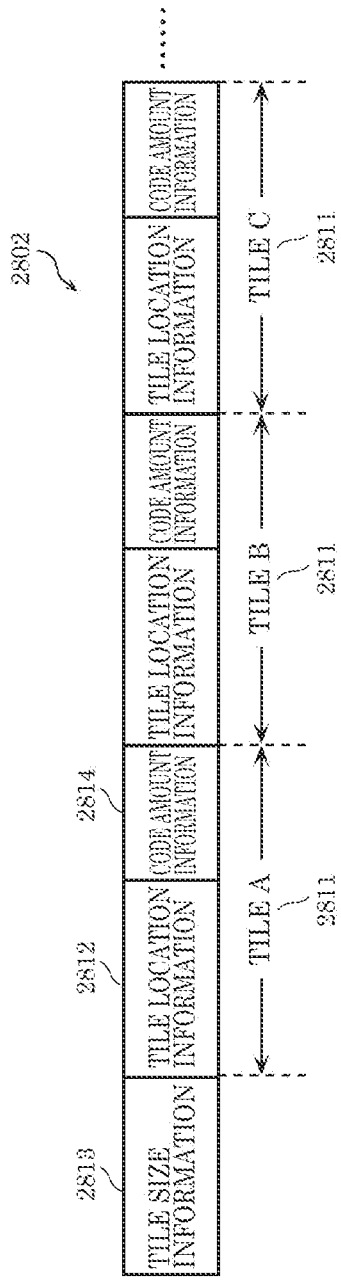
FIG. 86 is a diagram illustrating an example of a tile table according to Embodiment 9.

FIG. 86 is a diagram illustrating a configuration example of tile table 2802 in the case where Fixed size flag=1 (to be made fixed). In this case, tile size information 2813 is included, not in tile information 2811 of each tile, but in tile table 2802 as information common to the plurality of tiles. In other words, tiles size information 2813 is included in the first header that is common to the plurality of tiles.

Figure 87:
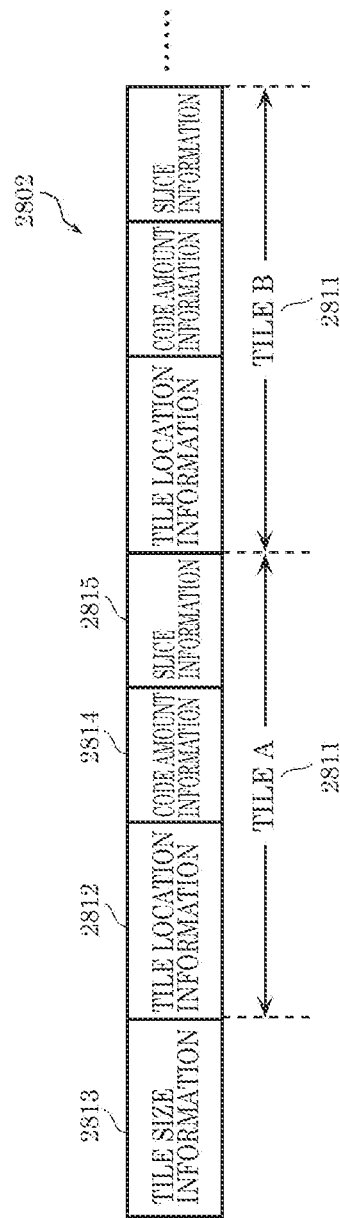
FIG. 87 is a diagram illustrating an example of a tile table according to Embodiment 9.

FIG. 87 is a diagram illustrating another configuration example of tile table 2802 in the case where Fixed size flag=1 (to be made fixed). In the same manner as the example illustrated in FIG. 85, tile information 2811 may be included in slice information 2815.

Hereinafter, the operation of the three-dimensional data decoding device will be described. When the car that includes the three-dimensional data decoding device is connected to a map server, the following operation is performed. The car that includes the three-dimensional data decoding device transmits a tile transmission request to the map server, according to the current rough location of the car and a request from an application. The map server refers to the tile table, selects tiles that match the request, generates a new bitstream that includes encoded data of the selected tiles, and transmits the bitstream to the car. The car refers to a tile table included in the received bitstream, and obtains information of the respective tiles. The car restores three-dimensional points by decoding the bitstreams of the tiles using the three-dimensional location of the root of each tile indicated in the information.

It should be noted that the car may be offline and an external storage device may be used in place of the map server. In this case, the following operation is performed. The car determines the best tiles from a local tile table, according to the current rough location of the car and application requirements. The car refers to the tile table included in a bitstream, and obtains information of the respective tiles. The car restores three-dimensional points by decoding the bitstreams of the plurality of tiles using the three-dimensional location of the root of each tile indicated in the information.

It should be noted that the three-dimensional data encoding device may store the identification number (slice_id) of the slice in slice information 2815. Accordingly the three-dimensional data decoding device can obtain the information of the tile having the required slice_id from tile table 2802, and perform processing such as decoding the tile having the required slice_id, etc.

The three-dimensional data encoding device may encode common header 2801 (or entire header 2804), tile table 2802, and encoded data 2803 of the respective tiles as separate network abstraction layer (NAL) units. Specifically the three-dimensional data encoding device may generate a stream including the plurality of second headers of the plurality of tiles, as a stream that is independent of the encoded data of the plurality of tiles. Accordingly, for example, the server (the three-dimensional data encoding device) transmits the NAL unit of tile table 2802 to the client (the three-dimensional data decoding device) first. The client decodes tile table 2802 and determines the required tile, and makes a transmission request for the required tile to the server. The server transmits the NAL unit of the requested tile to the client, according to the request by the client.

For example, tile location information 2812 may indicate coordinates having a reference point based on certain world coordinates. Accordingly the three-dimensional data encoding device can quickly know which location's three-dimensional information, having a reference point based on world coordinates, the point cloud included in each tile is. Furthermore, tile location information 2812 may indicate relative coordinates from coordinates indicated by location information 2807 included in entire header 2804. In this case, the three-dimensional data decoding device may calculate the coordinates having reference points based on world coordinates of each tile, by adding the relative coordinates indicated by tile location information 2812 to the coordinates indicated by location information 2807. Accordingly, since the size of the value of tile location information 2812 can be suppressed, the size of tile table 2802 can be reduced.

Figure 88:
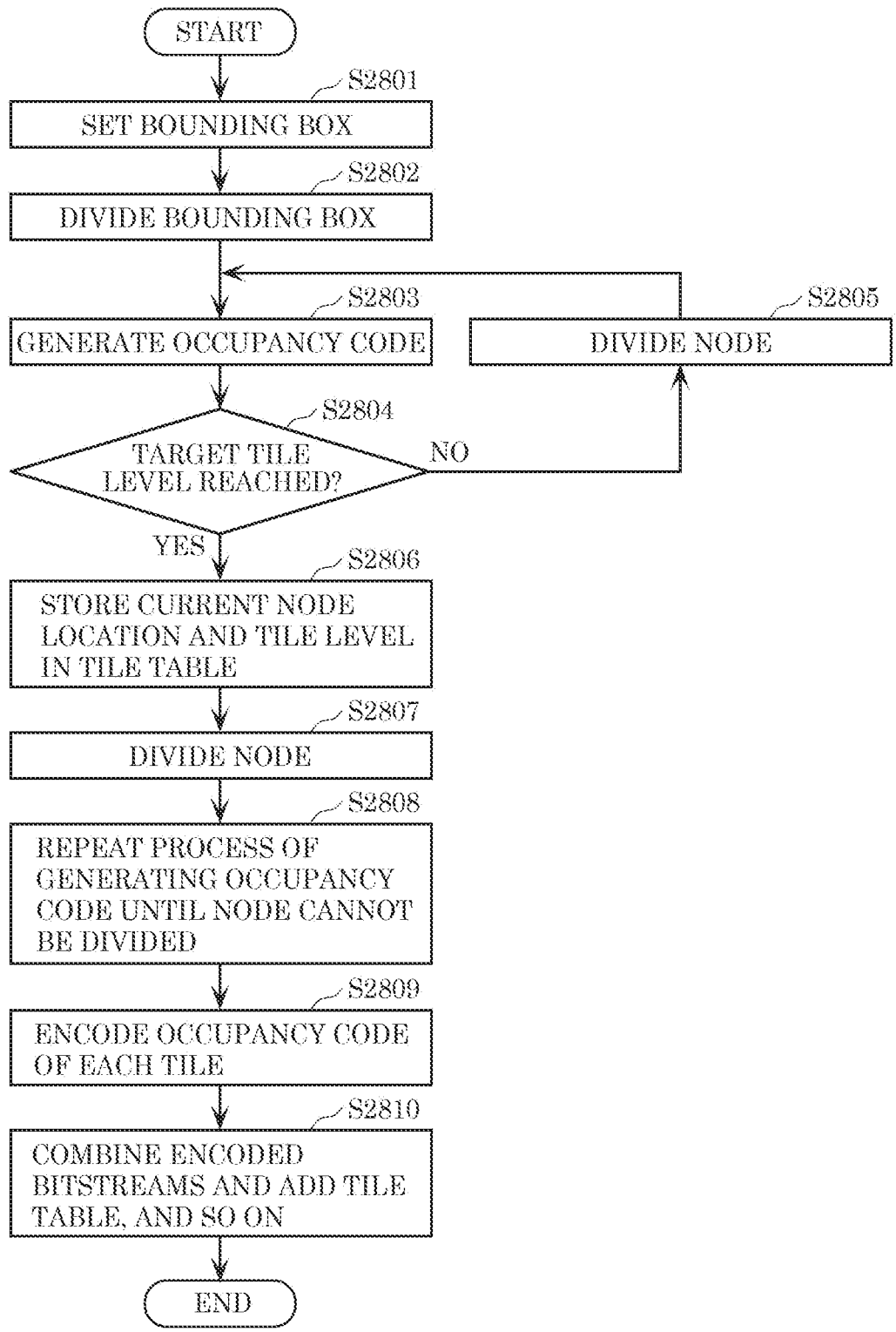
FIG. 88 is a flowchart of a three-dimensional data encoding process according to Embodiment 9.

Hereinafter, the operation of the three-dimensional data encoding device and the operation of the three-dimensional data decoding device will be described. FIG. 88 is a flowchart of the three-dimensional data encoding process by the three-dimensional data encoding device according to this embodiment.

First, the three-dimensional data encoding device sets the bounding box including the input three-dimensional points (S2801). Next, the three-dimensional data encoding device divides the bounding box into eight child nodes (S2802).

Next, the three-dimensional data encoding device generates the occupancy code of each child node that includes a three-dimensional point, among the eight child nodes (S2803). Next, the three-dimensional data encoding device determines whether the level (tree structure layer) of the current node has reached the target tile level (S2804). Here, the target tile level is the level (tree structure layer) at which tile division is to be performed.

When the level of the current node has not reached the target tile level (No in S2804), the three-dimensional data encoding device divides each of the child nodes into eight grandchild nodes (S2805), and performs the processing from step S2803 onward on each of the grandchild nodes.

When the level of the current node has reached the target tile level (Yes in S2804), the three-dimensional data encoding device stores the current node location and tile level (tile size) in the tile table (S2806).

Next, the three-dimensional data encoding device divides each of the child nodes into eight grandchild nodes (S2807). Next, the three-dimensional data encoding device repeats the process of generating an occupancy code until nodes cannot be divided (S2808). Next, the three-dimensional data encoding device encodes the occupancy code of each tile (S2809).

Lastly, the three-dimensional data encoding device combines the generated encoded bitstreams (encoded data) of the tiles (S2810). Furthermore, the three-dimensional data encoding device adds the tile table, and so on, to the header information of the bitstream.

Here, the tile size (tile level) is stored in tile table 2802. Therefore, the three-dimensional data decoding device can obtain the size of the bounding box of the subtree of each tile, using this tile size. Furthermore, the three-dimensional data decoding device can calculate the size of the bounding box of the full tree structure, using the size of the bounding box of the subtree.

It should be noted that the three-dimensional data encoding device may store the size of the bounding box of each tile in tile table 2802. Accordingly, the three-dimensional data decoding device can obtain the size of the bounding box of each tile by referring to tile table 2802.

Figure 89:
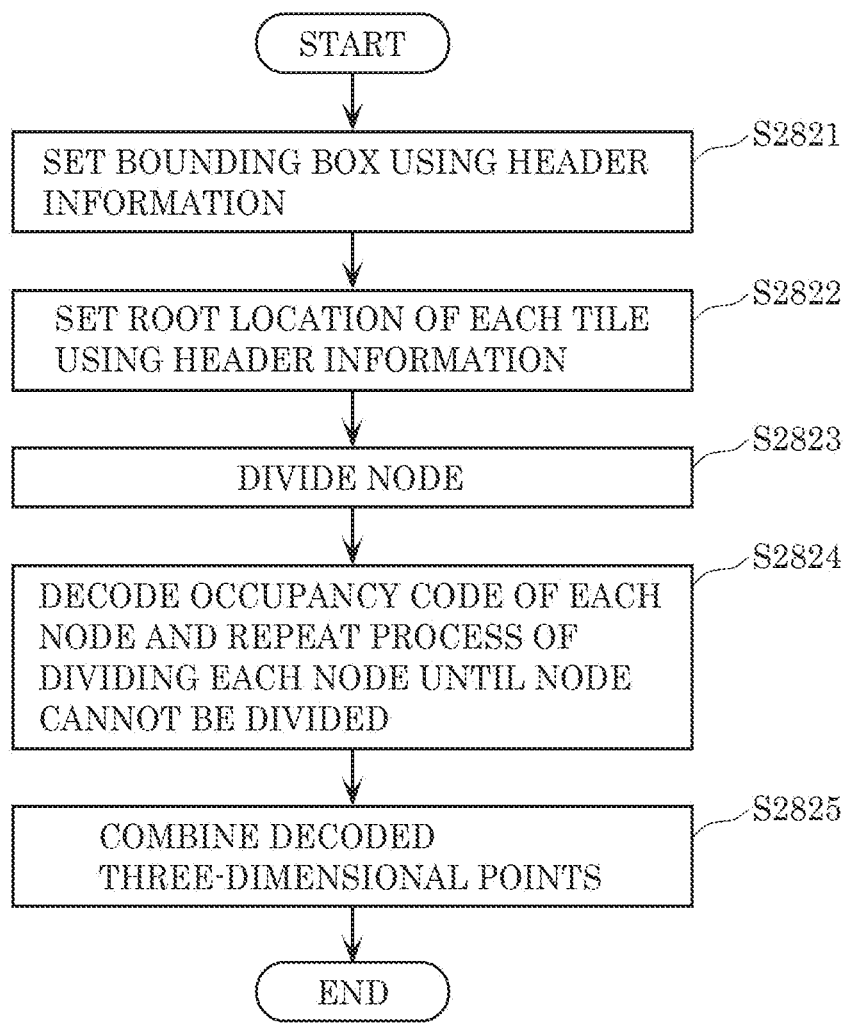
FIG. 89 is a flowchart of a three-dimensional data decoding process according to Embodiment 9.

FIG. 89 is a flowchart of the three-dimensional data decoding process by the three-dimensional data decoding device according to this embodiment.

First, the three-dimensional data decoding device sets the bounding box including the three-dimensional points to be output, using the header information included in the bitstream (S2821). Next, the three-dimensional data decoding device sets the root location of each tile (subtree) using the header information included in the bitstream (S2822).

Next, the three-dimensional data decoding device divides the bounding box into eight child nodes (S2823). Next, the three-dimensional data decoding device decodes the occupancy code of each node, and divides the node into eight child nodes based on the decoded occupancy code. Furthermore, the three-dimensional data decoding device repeats this process until the node of each tile (subtree) cannot be divided (S2824).

Lastly the three-dimensional data decoding device combines the decoded three-dimensional points of the tiles (S2825).

Figure 90:
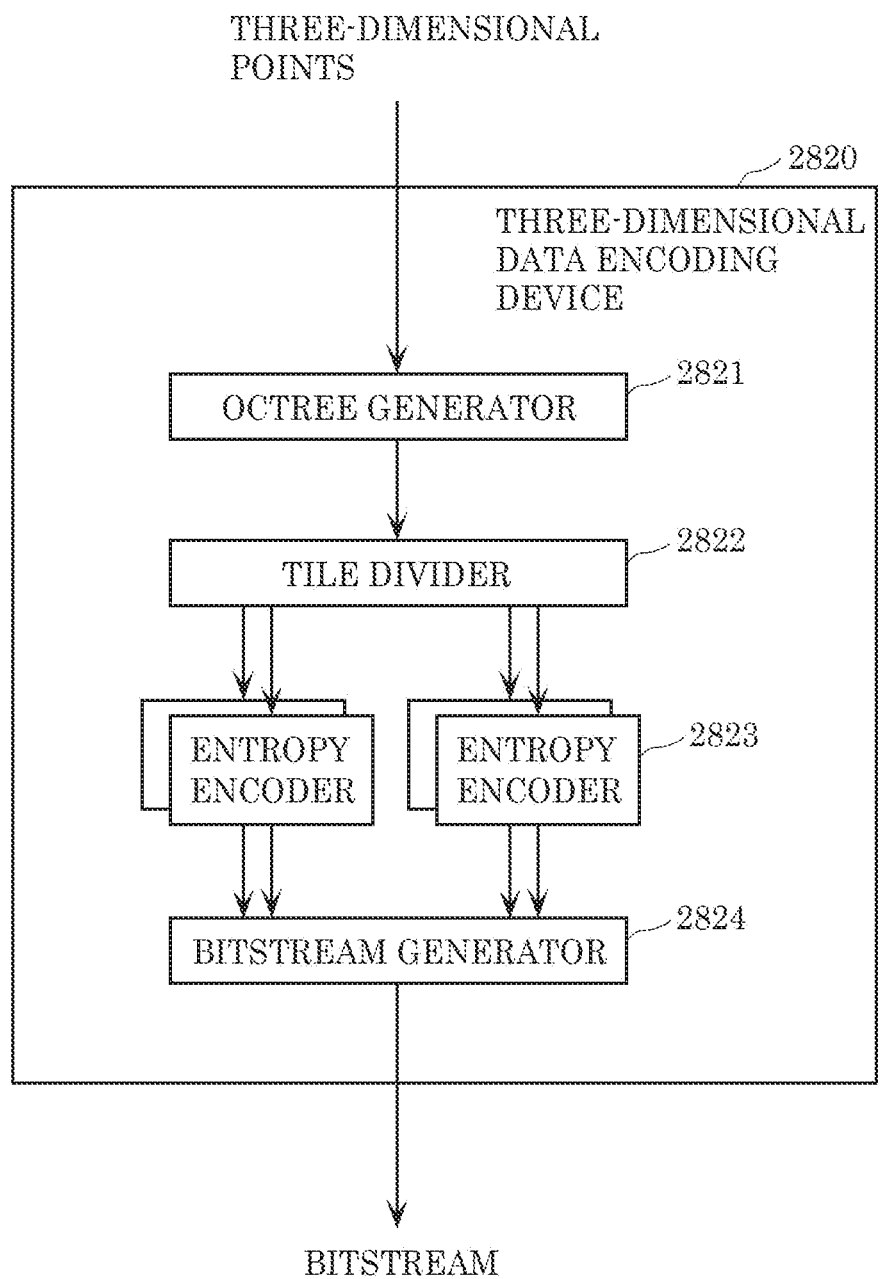
FIG. 90 is a block diagram of a three-dimensional data encoding device according to Embodiment 9.

FIG. 90 is a block diagram illustrating the structure of three-dimensional data encoding device 2820 according to this embodiment. Three-dimensional data encoding device 2820 includes octree generator 2821, tile divider 2822, a plurality of entropy encoders 2823, and bitstream generator 2824.

The target tile level is input to three-dimensional data encoding device 2820. Three-dimensional data encoding device 2820 stores the occupancy code of each tile after the processing has reached the target tile level, and generates the encoded data of each tile by separately encoding the occupancy codes of the tiles.

Octree generator 2821 sets the bounding box, and divides the bounding box into eight child nodes. Furthermore, octree generator 2821 repeats this division process until the processing reaches the target tile level.

Tile divider 2822 sets the tile. Specifically when the above-described processing has reached the target tile level, tile divider 2822 sets the plurality of tiles having the level as a root.

Entropy encoders 2823 separately encode the tiles. Bitstream generator 2824 generates a bitstream by combining the encoded data obtained by encoding the tiles.

Figure 91:
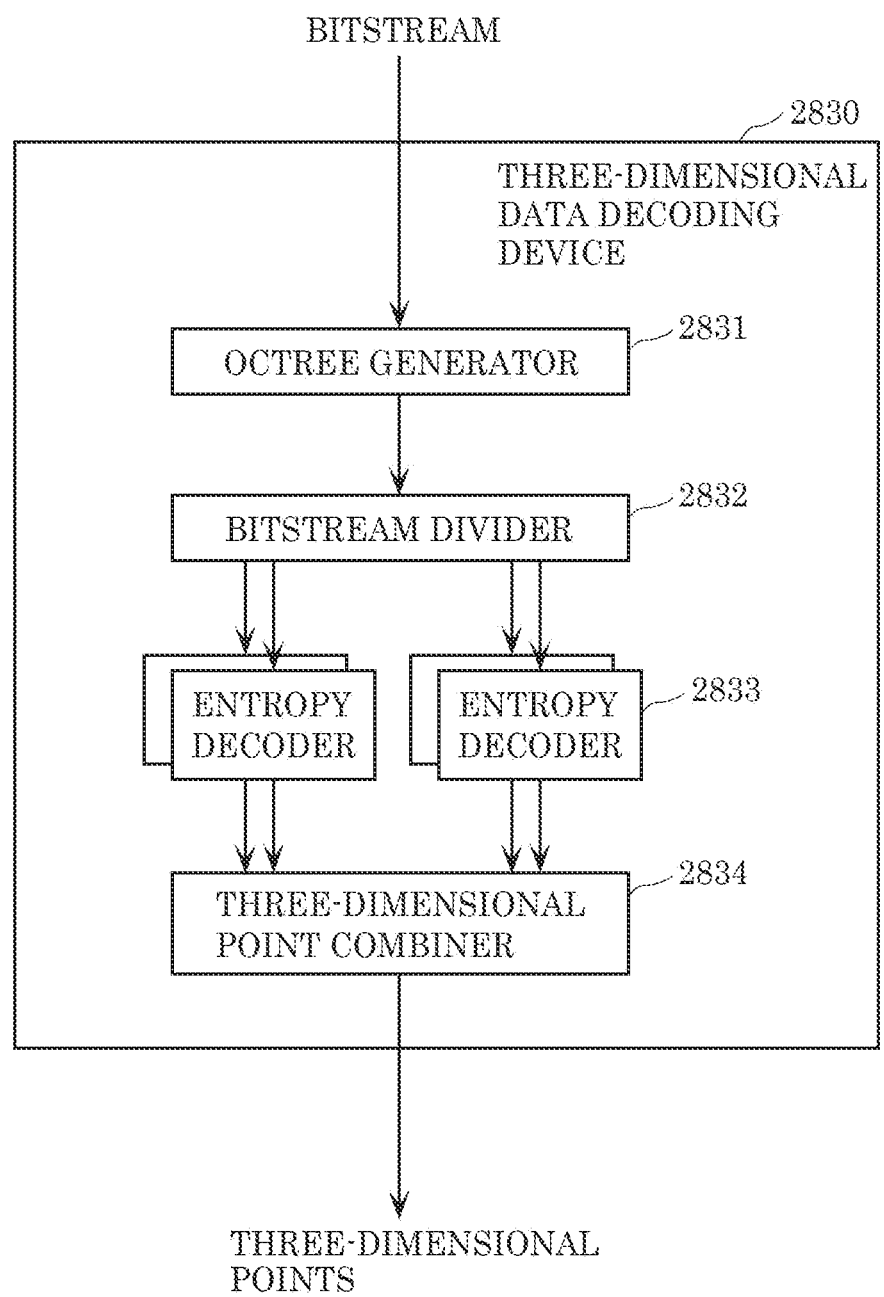
FIG. 91 is a block diagram of a three-dimensional data decoding device according to Embodiment 9.

FIG. 91 is a block diagram illustrating the structure of three-dimensional data decoding device 2830 according to this embodiment. Three-dimensional data decoding device 2830 includes octree generator 2831, bitstream divider 2832, a plurality of entropy decoders 2833, and three-dimensional point combiner 2834.

Octree generator 2831 sets the bounding box, and divides the bounding box into eight child nodes. Furthermore, octree generator 2831 repeats this division process until the processing reaches the target tile level.

Bitstream divider 2832 divides the bitstream into the encoded data of each tile, using the header information included in the bitstream.

Entropy decoders 2833 separately decode the plurality of tiles. Three-dimensional point combiner 2834 combines the decoded three-dimensional points of the plurality of tiles. It should be noted that there are instances where decoded three-dimensional points are used directly in an application. In such a case, this combining process is skipped.

Figure 92:
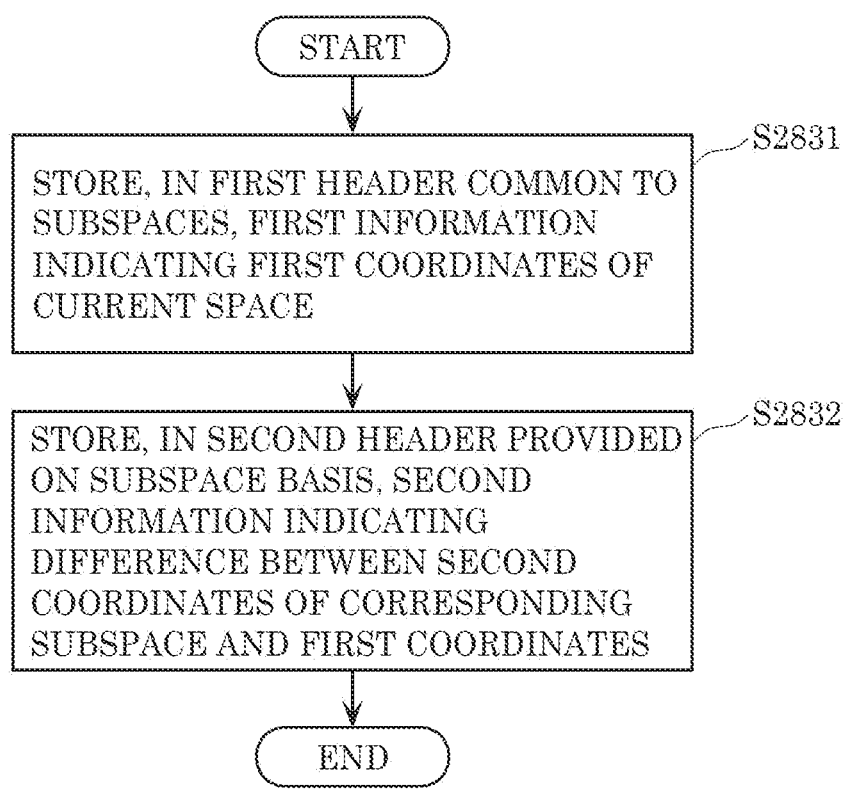
FIG. 92 is a flowchart of a three-dimensional data encoding process according to Embodiment 9.

As described above, the three-dimensional data encoding device according to this embodiment performs the process illustrated in FIG. 92. The three-dimensional data encoding device generates a bitstream by encoding subspaces (for example, tiles) included in a current space (for example, a bounding box) including three-dimensional points. In the generating of the bitstream, the three-dimensional data encoding device stores, in a first header (for example, common header 2801 or entire header 2804) which is common to the subspaces and included in the bitstream (S2831), first information (for example, location information 2807) indicating first coordinates which are coordinates of the current space, and stores, in a second header (for example, tile information 2811) which is provided on a subspace basis and included in the bitstream, second information (for example, tile location information 2812) indicating a difference between second coordinates which are coordinates of the corresponding subspace and the first coordinates (S2832).

Accordingly, since information indicating the difference between the first coordinates and the second coordinates is stored as second information, the code amount of the bitstream can be reduced.

It should be noted that at least part of the first header and the second headers may be included in a single header (syntax). For example, as illustrated in FIG. 86, tile size information 2913 (first header) which is information common to the subspaces and tile information 2811 (second header) which is information provided on a subspace basis may be stored in tile table 2802. Furthermore, the first header may include at least part of common header 2801 and part of tile table 2802.

Figure 70:
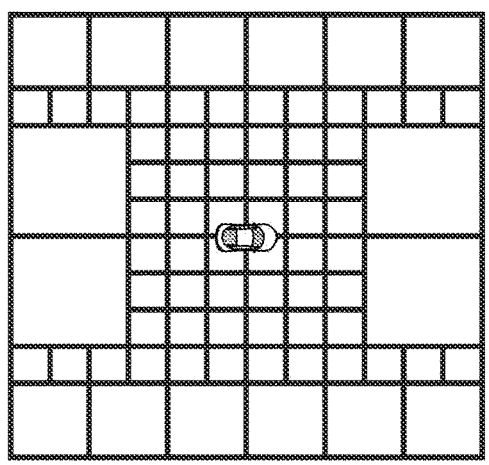
FIG. 70 is a diagram illustrating an example of tile division according to Embodiment 9.

For example, part of a first subspace and part of a second subspace included in the subspaces may overlap. For example, as illustrated in FIG. 68, FIG. 69, and FIG. 70, different tile division may be used on the same region.

For example, in the generating of the bitstream, the three-dimensional data encoding device stores third information (for example, tile size information 2813 in FIG. 84) indicating the size of the corresponding subspace in the second header (for example, tile information 2811 in FIG. 84).

For example, in the generating of the bitstream, the three-dimensional data encoding device stores third information (tile information 2813 in FIG. 86) indicating sizes of the subspaces, in the first header.

For example, in the generating of the bitstream, the three-dimensional data encoding device stores fourth information (number of tiles information 2806) indicating the number of the subspaces, in the first header (for example, common header 2801 or tile table 2802).

For example, in the generating of the bitstream, the three-dimensional data encoding device generates a stream including the second headers of the subspaces as a stream that is independent of the encoded data of the subspaces. For example, the second headers of the subspaces and the encoded data of the subspaces are encoded as separate NAL units.

Accordingly, for example, the three-dimensional data decoding device can determine a required subspace by referring to the stream including the second headers, and selectively obtain the encoded data of the required subspace.

For example, the three-dimensional data encoding device includes a processor and memory, and the processor performs the above described process using the memory.

Figure 93:
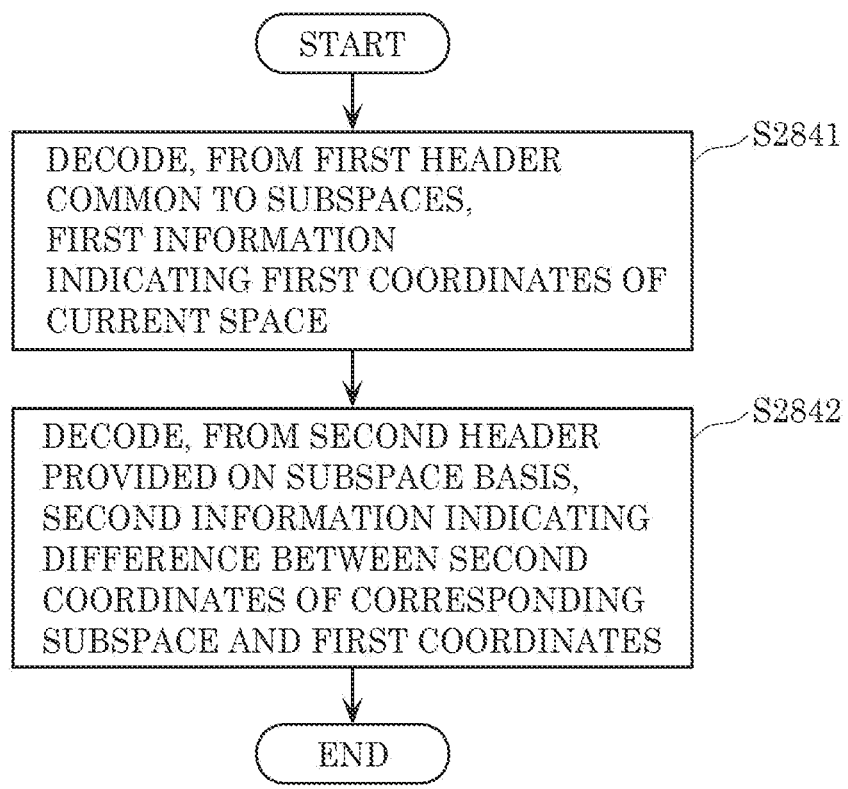
FIG. 93 is a flowchart of a three-dimensional data decoding process according to Embodiment 9.

Furthermore, the three-dimensional data decoding device according to this embodiment performs the process illustrated in FIG. 93. The three-dimensional data decoding device decodes a bitstream obtained by encoding subspaces included in a current space including three-dimensional points. In the decoding of the bitstream, the three-dimensional data decoding device decodes, from a first header (for example, common header 2801 or entire header 2804) which is common to the subspaces and included in the bitstream (S2841), first information (for example, location information 2807) indicating first coordinates which are coordinates of the current space, and decodes, from a second header (for example, tile information 2811) which is provided on a subspace basis and included in the bitstream, second information (for example, tile location information 2812) indicating a difference between second coordinates which are coordinates of the corresponding subspace and the first coordinates (S2842). For example, the three-dimensional data decoding device calculates the second coordinates by adding the error indicated in the second information to the first coordinates indicated in the first information.

Accordingly, since information indicating the difference between the first coordinates and the second coordinates is stored as second information, the code amount of the bitstream can be reduced.

For example, a first subspace and a second subspace included in the subspaces may partially overlap. For example, as illustrated in FIG. 68, FIG. 69, and FIG. 70, different tile division may be used on the same region.

For example, in the decoding of the bitstream, the three-dimensional data decoding device decodes third information (for example, tile size information 2813 in FIG. 84) indicating the size of the corresponding subspace, from the second header (for example, tile information 2811 in FIG. 84).

For example, in the decoding of the bitstream, the three-dimensional data decoding device decodes third information (tile size information 2813 in FIG. 86) indicating sizes of the subspaces, from the first header.

For example, in the decoding of the bitstream, the three-dimensional data decoding device decodes fourth information (number of tiles information 2806) indicating the number of the subspaces, from the first header (for example, common header 2801).

For example, a stream including the second headers of the subspaces is generated as a stream that is independent of the encoded data of the subspaces. For example, the second headers of the subspaces and the encoded data of the subspaces are encoded as separate NAL units. For example, the three-dimensional data decoding device determine a required subspace by referring to the stream including the second headers, and selectively obtains the encoded data of the required subspace.

For example, the three-dimensional data decoding device includes a processor and memory, and the processor performs the above-described process using the memory.

Embodiment 10

A three-dimensional (3D) point cloud map can be used in a self-localization process for a vehicle or drone to localize itself in global coordinates where the vehicle or drone traverses. In order to provide global coordinates, geo-referencing (position matching using coordinates) should be performed on the 3D point cloud map.

In the context of autonomous vehicle application, a geo-referenced 3D point cloud map is necessary for autonomous vehicle operation with geo-fencing. The geo-fencing is a technique to set a virtual perimeter (geo-fence) in a real-world geographic area. In the autonomous vehicle operation, for example, autonomous vehicles are restricted to operate in a specific geographic area (geo-fence) for safety and security purposes.

In a geo-referenced 3D point cloud map, the internal coordinate (local coordinate) system of a three-dimensional point cloud can be related to geographic coordinates.

In this embodiment, global coordinates and local coordinates are used. The global coordinates are coordinates with which a global position can be uniquely specified and expressed, for example, by latitude, longitude, and altitude. The local coordinates are coordinates based on, for example, the location of a sensor that generates point cloud data (or a moving body (e.g. a vehicle equipped with such a sensor)). The origin of the local coordinates is, for example, the location of the sensor or the vehicle. In other words, the global coordinates do not depend on the location of a sensor (or vehicle) and indicate the same coordinates irrespective of the location of the sensor. In contrast, the local coordinates vary according to the location of the sensor.

In addition, the global coordinates are expressed either by latitude and longitude coordinates (spherical coordinates) expressed by latitude, longitude, and altitude, or by Cartesian coordinates expressed by X, Y, and Z. The local coordinates are expressed, for example, by Cartesian coordinates. A method for expressing coordinates is not limited to these and any publicly known method may be used.

In the following description, global coordinates expressed by the latitude and longitude coordinates are referred to as geographic coordinates, global coordinates expressed by Cartesian coordinates are referred to as world coordinates, and local coordinates expressed by Cartesian coordinates are referred to as geometric coordinates.

The term "coordinates" used herein may be information directly indicating coordinates or information indirectly indicating coordinates or a position.

Figure 94:
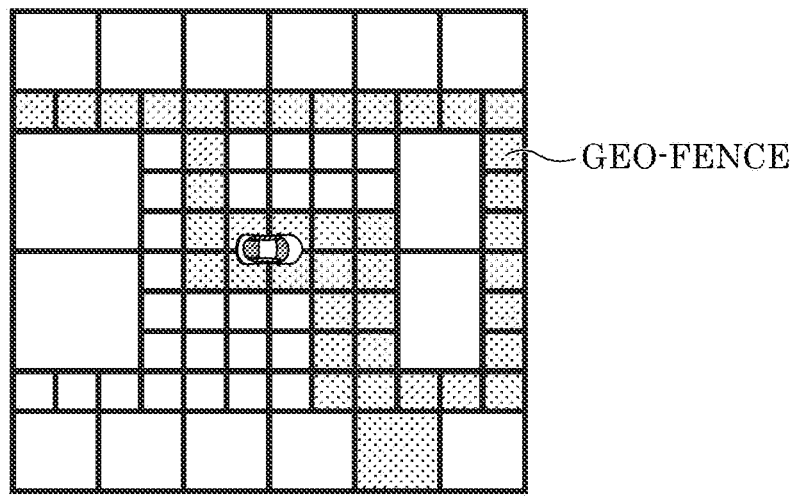
FIG. 94 is a diagram illustrating an example of a three-dimensional point cloud map including a geo-fence according to Embodiment 10.

FIG. 94 is a diagram illustrating an example of a 3D point cloud map including a geo-fence in the case of using a geo-fence to restrict operation. For example, the operation of an autonomous vehicle is restricted in the geo-fence illustrated in FIG. 94.

Figure 95:
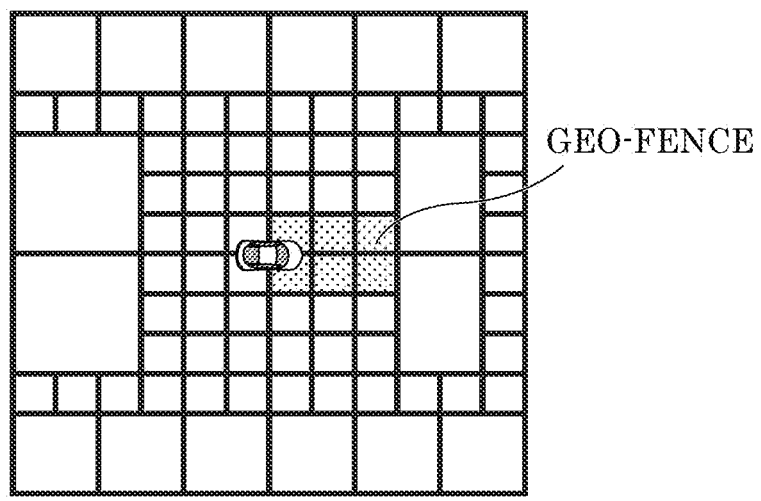
FIG. 95 is a diagram illustrating a three-dimensional point cloud map including a geo-fence according to Embodiment 10.

FIG. 95 is a diagram illustrating an example of a 3D point cloud map used for enabling services or additional functions in a geo-fence. Some services or functions are enabled, for example, when an autonomous vehicle enters the geo-fence illustrated in FIG. 95.

In some applications, vehicles are required to upload a three-dimensional point cloud together with geographic coordinates.

Figure 96:
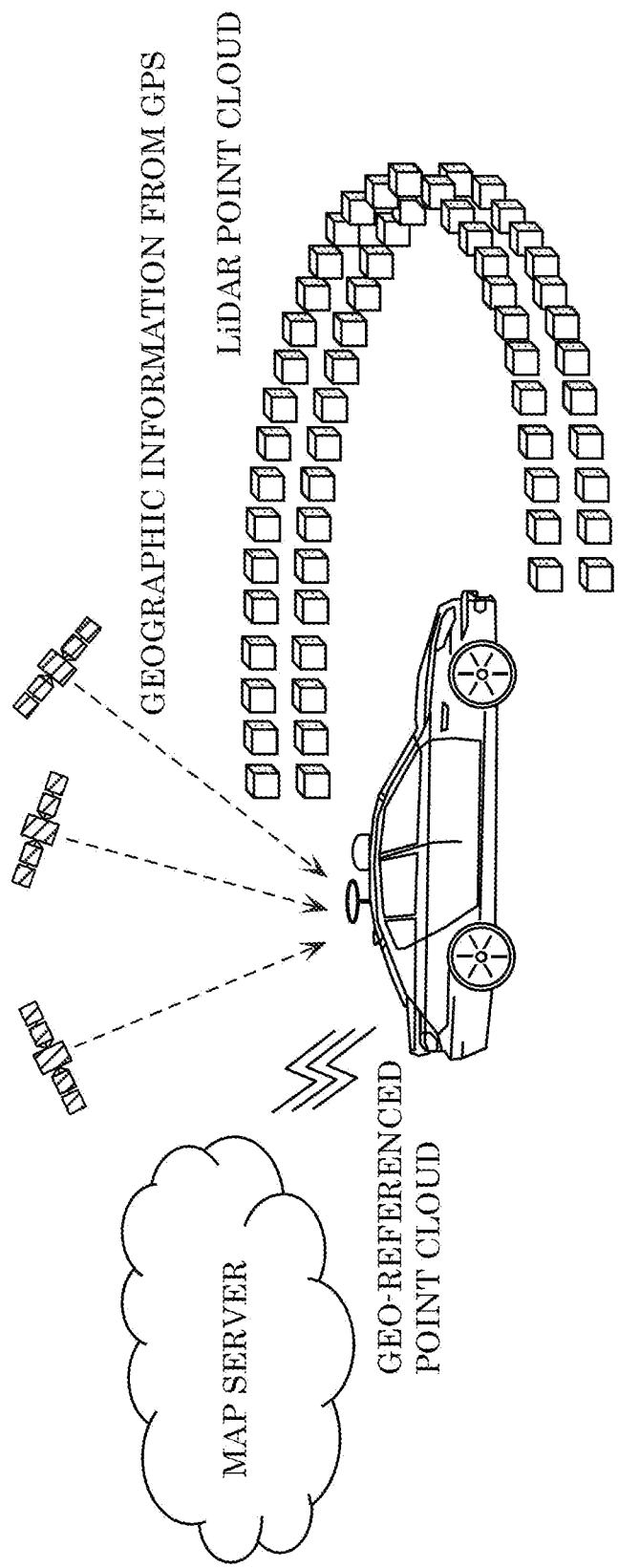
FIG. 96 is a diagram schematically illustrating a process of updating a geo-referenced point cloud according to Embodiment 10.

FIG. 96 is a diagram schematically illustrating a process of updating a geo-referenced three-dimensional (3D) point cloud (hereinafter referred to as "geo-referenced point cloud"). A vehicle updates a geo-referenced point cloud to a server during mapping, map updating, or updating. The vehicle generates a geo-referenced point cloud using, for example, a point cloud obtained by a sensor for LiDAR or the like and geographic information obtained from a GPS or the like.

It is to be noted that a case where the vehicle down-loads a geo-referenced point cloud from a server based on the geographic information (global coordinates) may be assumed as a use case. The vehicle may obtain the geographic information of the vehicle with a GPS sensor mounted on the vehicle. Alternatively, the vehicle may estimate future geographic information of the vehicle and down-load a geo-referenced point cloud from a server based on the information. The vehicle may estimate the future geographic information of the vehicle from a destination designated by the user using a car navigation system or the like. Alternatively, the vehicle may estimate the future geographic information from the control information (e.g., speed or acceleration) or surrounding state (e.g., traffic jam information or traffic accident information) of the vehicle.

Figure 97:
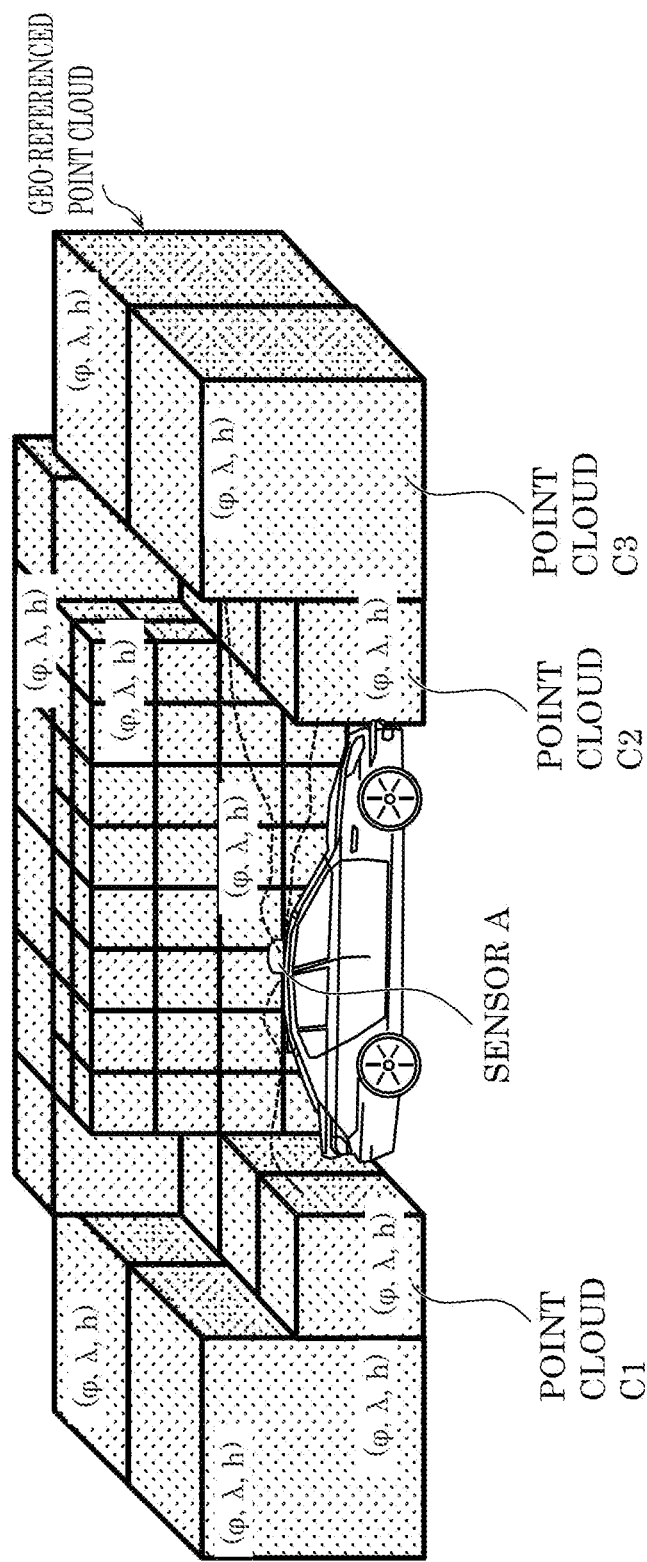
FIG. 97 is a diagram illustrating an example of a three-dimensional position in a geo-referenced point cloud according to Embodiment 10.

The following describes the control of three-dimensional localization using geo-referenced point clouds. FIG. 97 is a diagram illustrating an example of three-dimensional localization in a geo-referenced point cloud. In FIG. 97, geographic coordinates are expressed by $\varphi$, $\lambda$, and h (latitude, longitude, and altitude).

A three-dimensional point cloud has subdivisions of the same volume (special unit) or different volumes. In each volume, the local coordinates (X, Y, Z) of one or more three-dimensional points are associated with geographic coordinates ($\varphi$, $\lambda$, h). In the same volume, all of three-dimensional points have the same or different geographic coordinates.

A vehicle is equipped with sensor A which is used for localization. Sensor A may or may not include a global positioning system (GPS) for obtaining the geographical position of the vehicle. When GPS information is not available or of low accuracy the vehicle may specify the global coordinates of the vehicle using information obtained by sensor A (e.g., information indicating point clouds C1, C2, and C3) and a 3D point cloud map. The 3D point cloud map includes the global coordinates of point clouds C1, C2, and C3.

There are three following cases regarding a situation of the geographic coordinates of a single three-dimensional point (target three-dimensional point). The first case is that the geographic coordinates are obtained from the GPS. The second case is that the geographic coordinates are obtained by interpolating neighboring three-dimensional points having geographic coordinates obtained from the GPS. The third case is that there is no such information indicating the geographic coordinates.

The situation of the geographic coordinates of a three-dimensional point is determined by application in the actual scenario. The geographic coordinates of three-dimensional points should be different because the three-dimensional points are different points in a three-dimensional space.

When sensor A is a LiDAR sensor, for example, the vehicle estimates, using data of point clouds around the vehicle obtained by the LiDAR sensor and a three-dimensional point cloud map obtained from a server or the like, its self-location (global coordinates) in the three-dimensional point cloud map. When each of the point clouds in the three-dimensional point cloud map is assigned with global coordinates, the vehicle may calculate global coordinates of the vehicle based on the global coordinates of the point cloud. This enables the vehicle to obtain absolute geographic information (e.g., latitude, longitude, and altitude) on the earth. The vehicle is thus capable of receiving services, etc. utilizing the aforementioned geo-fencing.

Figure 98:
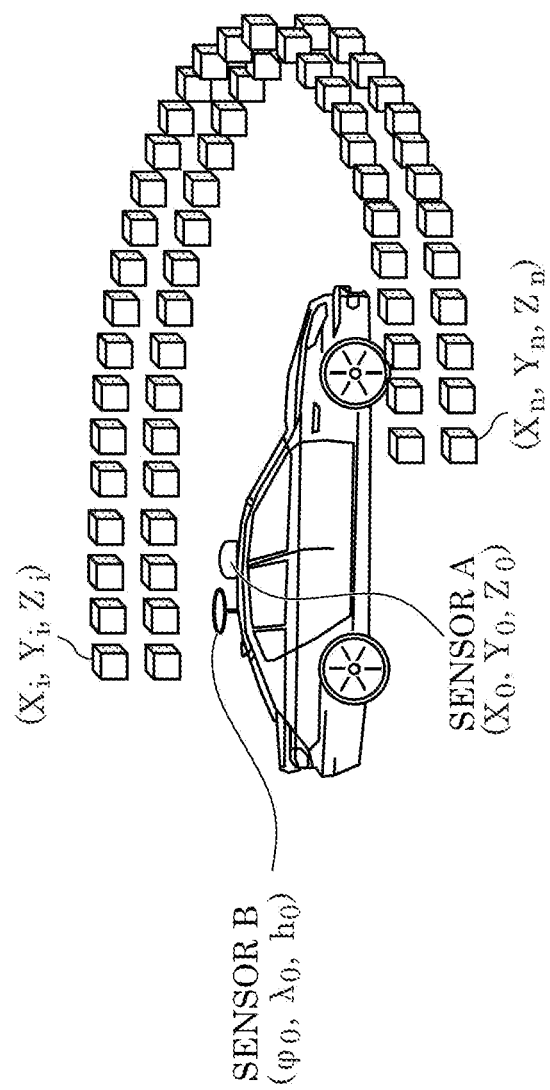
FIG. 98 is a diagram for explaining a method of obtaining a geo-referenced point cloud according to Embodiment 10.

The following describes a method for obtaining a geo-referenced point cloud. FIG. 98 is a diagram for explaining the method.

A geo-referenced point cloud is obtained by the following method. A vehicle is equipped with sensor A and sensor B. Sensor A obtains the local coordinates (e.g., $(X_i, Y_i, Z_i) \ldots (X_n, Y_n, Z_n)$) of each of three-dimensional point clouds in the surrounding environment of the vehicle. Sensor B obtains, for example, the geographic coordinates ($\varphi_0$, $\lambda_0$, $h_0$) of the vehicle. The local coordinates $(X_0, Y_0, Z_0)$ of the vehicle are also obtained and associated with the geographic coordinates ($\varphi_0$, $\lambda_0$, $h_0$). The geographic coordinate system of Sensor B is defined, for example, based on the World Geodetic System of 1984 (WGS84).

Given the geographic coordinates ($\varphi$, $\lambda$, h), the Cartesian coordinates (X, Y, Z) of a three-dimensional point are calculated using Equations 2 through 6 which are to be described later. In contrast, given the Cartesian coordinates (X, Y, Z) of the three-dimensional point, the geographic coordinates ($\varphi$, $\lambda$, h) can be derived using Equations 7 through 10 which are to be described later. It should be noted that other conversion method may be used.

In some cases, the vehicle is unable to obtain the geographic information of the vehicle. In such a case, the vehicle obtains the geographic information by weighted interpolation using available geographic information from past or future positions.

Figure 99:
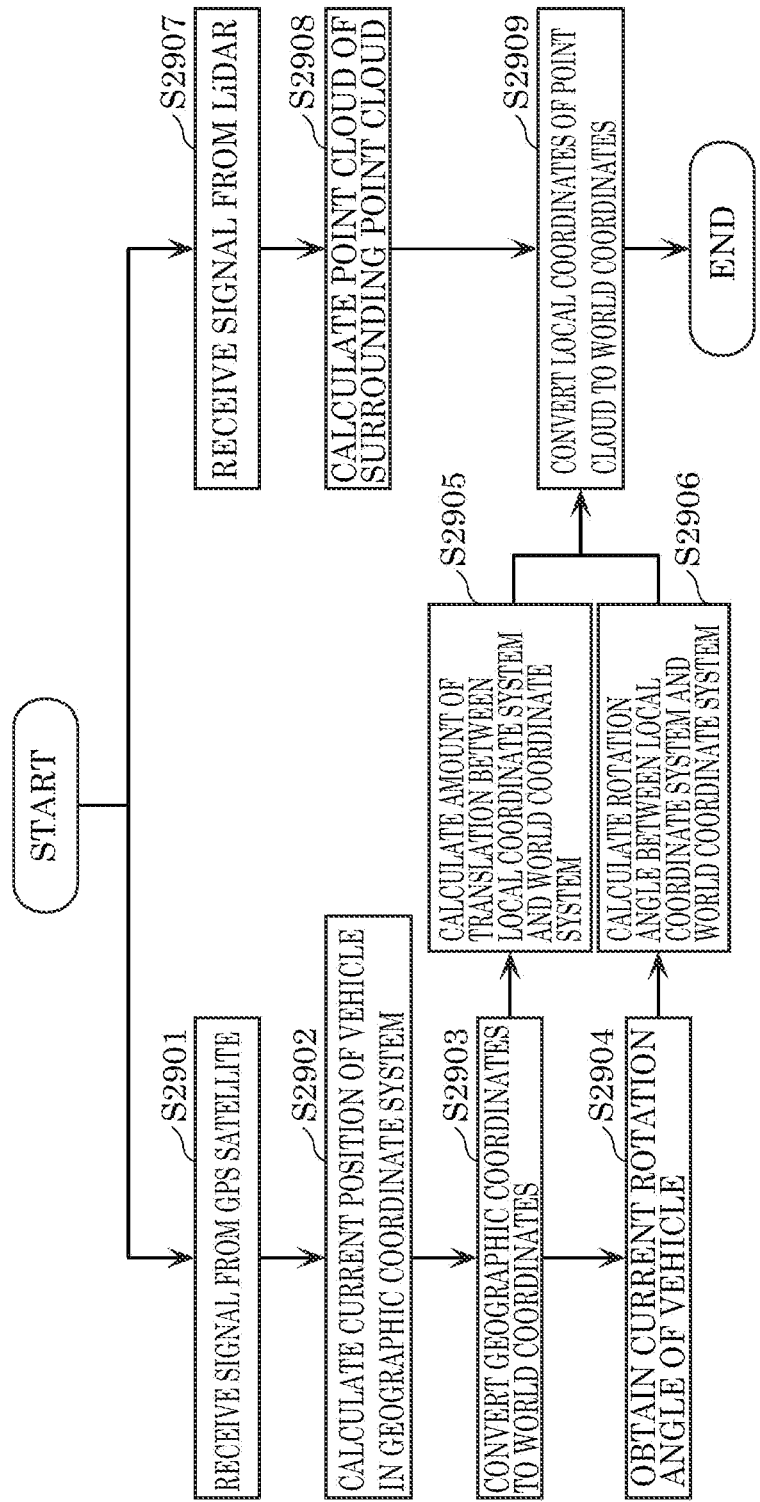
FIG. 99 is a diagram illustrating a flow of a process of obtaining a geo-referenced point cloud according to Embodiment 10.

FIG. 99 is a diagram illustrating a flow of the process of obtaining a geo-referenced point cloud. First, a vehicle receives a signal from a GPS satellite (S2901). The vehicle then calculates the current position of the vehicle in a geographic coordinate system, based on the received signal (S2902). Subsequently, the vehicle converts the current position in the geographic coordinate system to Cartesian coordinates (world coordinates) (S2903). The conversion is performed using Equations 2 through 6 which are to be described later.

Figure 100:
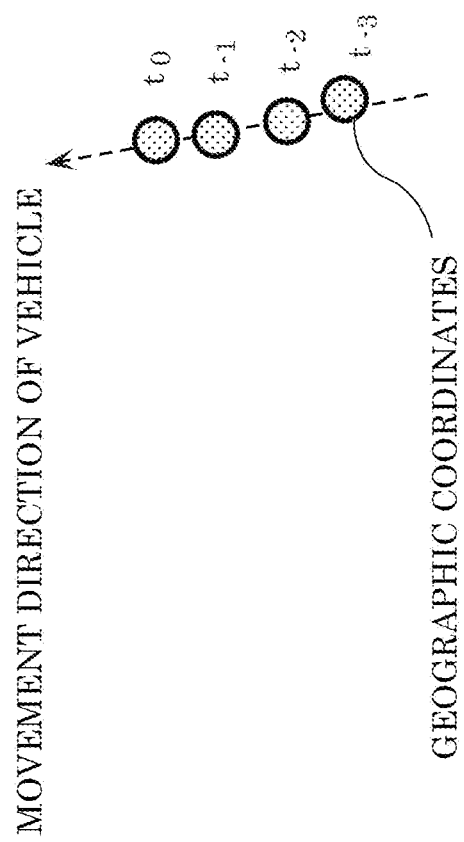
FIG. 100 is a diagram for explaining a process of estimating a moving direction according to Embodiment 10.

Subsequently, the vehicle obtains the current rotation angle of the vehicle with respect to the world coordinates (S2904). The vehicle obtains the current rotation angle, for example, by estimating the current moving direction of the vehicle using geographic coordinates within a short period of time. The vehicle estimates the moving direction of the vehicle using, for example, geographic coordinates at plural points in time (from $t_3$ to $t_0$), as illustrated in FIG. 100.

The vehicle also calculates the amount of translation (e.g., differences in x, y, and z directions) between a local coordinate system and a world coordinate system (S2905). In addition, the vehicle calculates a rotation angle between the local coordinate system and the world coordinate system (S2906). The local coordinate system is, for example, a Cartesian coordinate system having the location of a vehicle as the origin of the system.

Alternatively, the vehicle receives a signal from LiDAR (S2907). The vehicle then calculates the position (local coordinates) of each of the neighboring point clouds, using the received signal (S2908).

Lastly, the vehicle converts the local coordinates of each of the point clouds to world coordinates, using information obtained in steps S2905 and S2906 (S2909). The vehicle converts the coordinates of each of the point clouds from local coordinates to world coordinates using, for example, Equation 1 below.

$$X_{new} = RX + t \qquad \text{(Equation 1)}$$

Here, R denotes a rotation matrix between the local coordinate system and the world coordinate system, and t denotes a translation matrix between the local coordinate system and the world coordinate system. X denotes the coordinates of a point cloud in the local coordinate system and $X_{new}$ denotes the coordinates of the point cloud in the world coordinate system.

Coordinates $X_{new}$ in the world coordinate system can be converted to geographic coordinates using, for example, Equations 7 through 10 which are to be described later.

Figure 101:
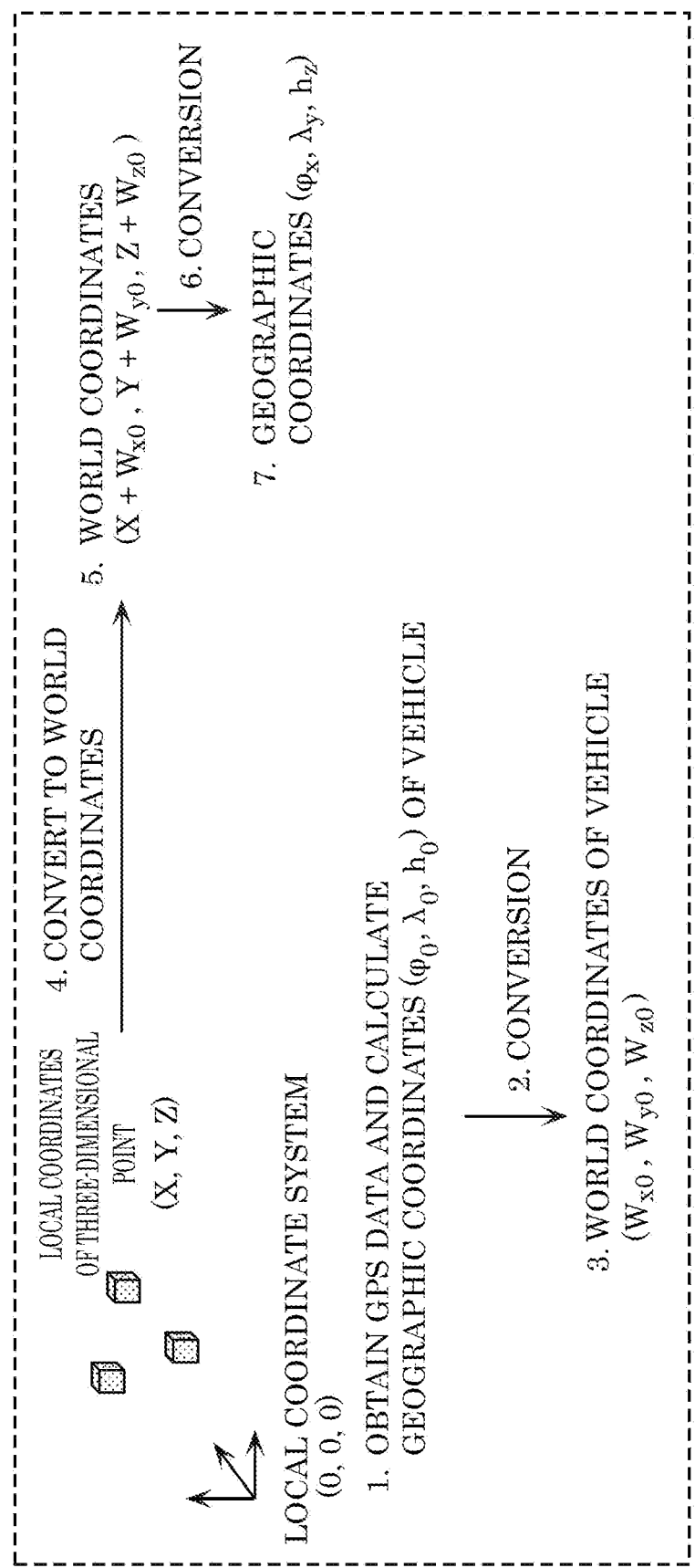
FIG. 101 is a diagram schematically illustrating a flow of a coordinates conversion process according to Embodiment 10.

FIG. 101 is a diagram schematically illustrating a flow of the above-described process. First, the vehicle obtains GPS data and calculates the geographic coordinates $(\varphi_0, \lambda_0, h_0)$ of the vehicle using the obtained GPS data, as illustrated in FIG. 101. The vehicle then converts the geographic coordinates $(\varphi_0, \lambda_0, h_0)$ to world coordinates $(W_{xo}, W_{yo}, W_{zo})$ using, for example, Equations 2 through 6 which are to be described later.

Subsequently, the vehicle converts the coordinates (X, Y, Z) of a point cloud in the local coordinate system to world coordinates $(X+W_{xo}, Y+W_{yo}, Z+W_{zo})$. Here, a rotation matrix between the local coordinate system and the world coordinate system is also used, as described above.

Subsequently, the vehicle converts the world coordinates $(X+W_{xo}, Y+W_{yo}, Z+W_{zo})$ to geographic coordinates $(\varphi_x, \lambda_y, h_z)$ using Equations 7 through 10 which are to be described later.

The following describes a bitstream generated by a three-dimensional data encoding device and an operation performed by a three-dimensional data decoding device to obtain the geographic coordinates of a point cloud in cases A and B.

In case A, each three-dimensional point cloud data included in a bitstream generated by the three-dimensional data encoding device includes both local coordinates (X, Y, Z) and geographic coordinates $(\varphi_x, \lambda_y, h_z)$. In this case, the three-dimensional data decoding device decodes the local coordinates (X, Y, Z) and the geographic coordinates $(\varphi_x, \lambda_y, h_z)$ of each of three-dimensional point clouds. In case A, since the three-dimensional data decoding device does not need to perform the process of converting the coordinates of a point cloud, it is possible to reduce the processing load of the three-dimensional data decoding device.

In case B, each three-dimensional point cloud data included in a bitstream generated by the three-dimensional data encoding device includes local coordinates (X, Y Z), geographic coordinates $(\varphi_0, \lambda_0, h_0)$ of the origin of the local coordinate system, conversion parameters for converting geographic coordinates to world coordinates, and conversion parameters for converting world coordinates to geographic coordinates. In this case, since the geographic coordinates of each of three-dimensional point clouds are not encoded, it is possible to reduce the data amount of the bitstream compared to case A.

In this case, the three-dimensional data decoding device decodes the local coordinates (X, Y Z) of each three-dimensional point cloud. The three-dimensional data decoding device then converts the geographic coordinates $(\beta_0, \lambda_0, h_0)$ of the origin to world coordinates $(W_{xo}, W_{yo}, W_{zo})$, and converts the local coordinates of each three-dimensional point cloud to world coordinates $(X+W_{xo}, Y+W_{yo}, Z+W_{zo})$ using the world coordinates $(W_{xo}, W_{yo}, W_{zo})$. Subsequently, the three-dimensional data decoding device converts the world coordinates $(X+W_{xo}, Y+W_{yo}, Z+W_{zo})$ of each three-dimensional point cloud to geographic coordinates $(\varphi_x, \lambda_y, h_z)$.

Figures 102, 103:
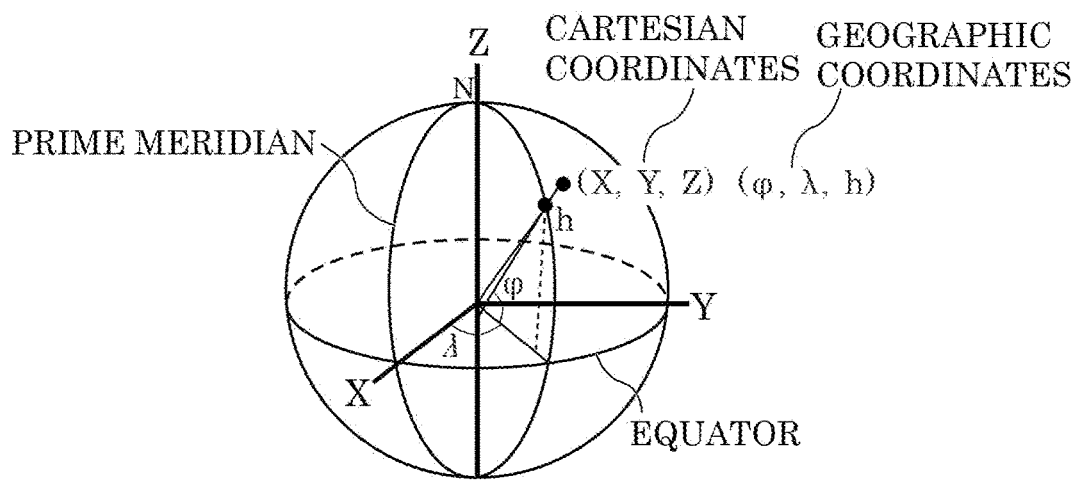
FIG. 102 is a diagram for explaining the coordinates conversion process according to Embodiment 10.
FIG. 103 is a diagram illustrating examples of the geometric parameters of an ellipsoid according to Embodiment 10.

The following describes conversion between Cartesian coordinates (world coordinates) and geographic coordinates. FIG. 102 is a diagram for explaining the conversion. The unit mil is used to present small angles. Here, 6400 mil=2 radians ($\pi$)=360 degrees. 1 rad=57.29578 degrees=57 degrees 17 minutes 44.8 seconds=3437.75 minutes=206264.8 seconds=1018.6 mil. 1 degree=0.0174533 rad, 1 minute=0.000291 rad=0.296 mil, and 1 second=0.00000485 rad. 1 mil=0.000982 rad=0.0563 degrees=3.37 minutes=202 seconds. FIG. 103 is a diagram illustrating examples of the geometric parameters of an ellipsoid.

For example, the following method is used for the conversion. Cartesian coordinates (world coordinates) (X, Y, Z) are computed from geographic coordinates $(\varphi, \lambda, b)$ using Equations 2 through 6.

[Math 1]

$$X = (\upsilon + h)\cos\phi\cos\lambda \qquad \text{(Equation 2)}$$

$$Y = (\upsilon + h)\cos\phi\sin\lambda \qquad \text{(Equation 3)}$$

$$Z = (\upsilon(1 - e^2) + h)\sin\phi \qquad \text{(Equation 4)}$$

$$\upsilon = \frac{a}{\sqrt{1 - e^2\sin^2\phi}} \qquad \text{(Equation 5)}$$

$$e^2 = f(2 - f) \qquad \text{(Equation 6)}$$

Here, $\upsilon$ denotes the radius of the curvature in a prime vertical plane. Note that a and f denote the geometric parameters of an ellipsoid.

Cartesian coordinates (world coordinates) (X, Y, Z) can be converted to geographic coordinates $(\varphi, \lambda, b)$ using, for example, Equations 7 through 10.

[Math 2]

$$\lambda = \tan^{-1}\frac{Y}{X} \qquad \text{(Equation 7)}$$

$$\phi = \tan^{-1}\frac{Z + \upsilon e^2 \sin\phi}{p} \qquad \text{(Equation 8)}$$

$$h = \frac{p}{\cos\phi} - \upsilon \qquad \text{(Equation 9)}$$

$$p = \sqrt{X^2 + Y^2} \qquad \text{(Equation 10)}$$

Here, p denotes a perpendicular distance.

The details of the conversion are described, for example, in Gerdan, G. P. and Deakin, R. E. "Transforming Cartesian Coordinates X, Y, Z to Geographic coordinates $\varphi, \lambda, h$", The Australian Surveyor, Vol. 44, No. 1, 1999, pp. 55-63 (Non-patent Literature (NPL) 1). Accordingly, the method described in NPL 1 may be used.

The following describes the projection of geographic coordinates. Geographic coordinates may be projected to two-dimensional map coordinates for visualization and display. Note that a geographic coordinate system may be based on a specific ellipsoid with a specific orientation and an origin at a specific location. The origin and the ellipsoid vary from location to location or country to country. Information indicating such origin and ellipsoid is called "spatial reference". For example, spatial reference (SR) used for Singapore is EPSG: 3414 shown in FIG. 104 and SR used for Japan is EPSG: 4947 shown in FIG. 105. Note that the European Petroleum Survey Group (EPSG) is an organization involved in best practices for surveying and applied geodesy.

Figures 106, 107:
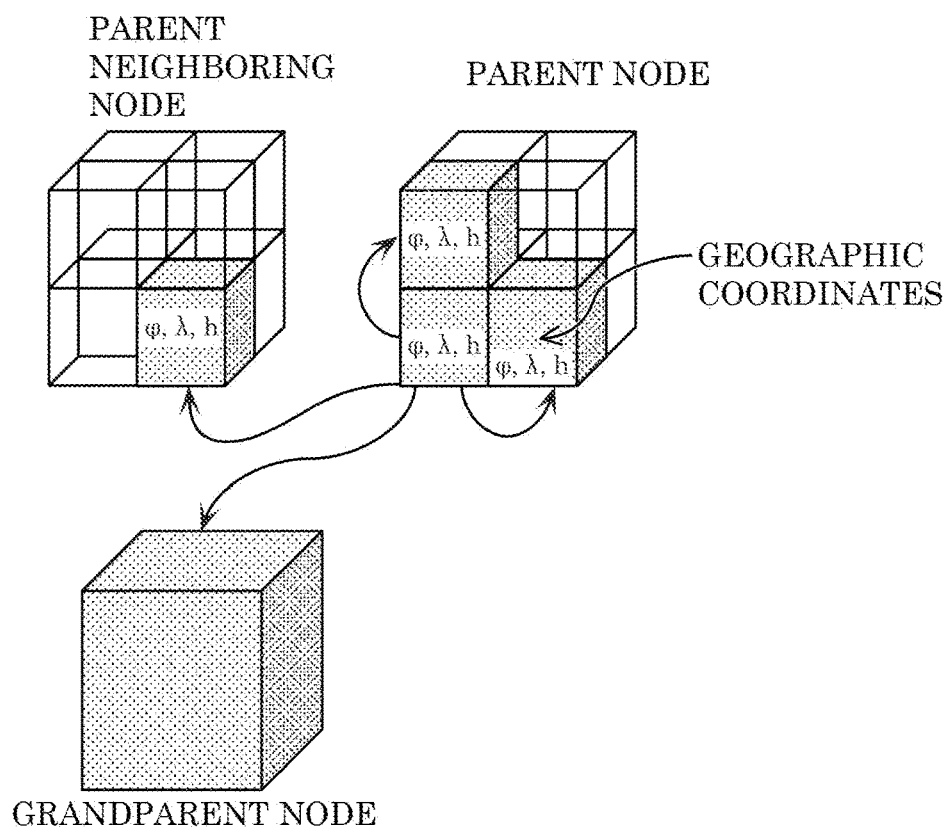
FIG. 106 is a diagram illustrating an example of a structure of encoded data in a first mode according to Embodiment 10.
FIG. 107 is a diagram illustrating an example of a structure of a point cloud in the first mode according to Embodiment 10.

The following describes a first mode for encoding a geo-referenced point cloud. FIG. 106 is a diagram illustrating an example of a structure of encoded data in the first mode. Geometric coordinates (X, Y, Z) which are the local coordinates of each point cloud are associated with geographic coordinates (φ, λ, h), as illustrated in FIG. 106.

Figure 108:
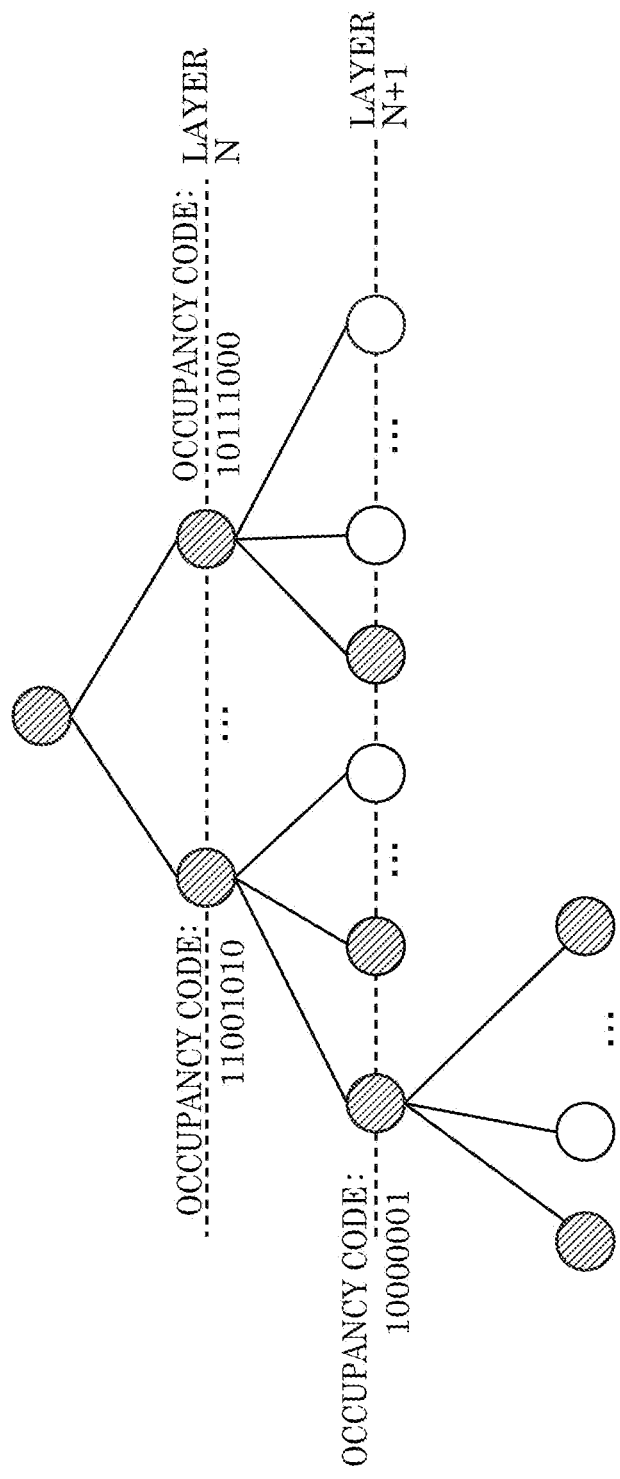
FIG. 108 is a diagram illustrating an example of a tree structure of a point cloud according to Embodiment 10.

FIG. 107 is a diagram illustrating an example of a structure of a point cloud in the first mode. FIG. 108 is a diagram illustrating an example of a tree structure representing a point cloud. In the first mode, each of three-dimensional point clouds is associated with geographic coordinates. For example, sets of geographic coordinates are separately encoded using attributed coding or octree coding. For example, the octree structure illustrated in FIG. 108 may be used, for example, for encoding geographic information. In this case, the three-dimensional data encoding device may encode the geographic information using information about neighboring nodes, as illustrated in FIG. 107. Alternatively, the three-dimensional data encoding device may regard geographic coordinates as the attribute information of geometric coordinates and apply attribute coding to the geographic coordinates.

The geometric information (geometric coordinates (X, Y, Z)) of a three-dimensional point is, for example, data obtained using LiDAR. The geographic information (geographic coordinates) is, for example, data obtained from the GPS. The purpose of encoding geographic information is to handle LiDAR data as the coordinates of a vehicle. In this case, there is no information indicating the location of the vehicle. It is, however, possible to specify the current location of the vehicle in the global coordinate system, using geographic information. The specified location can be used for applications that need vehicle location.

Figure 109:
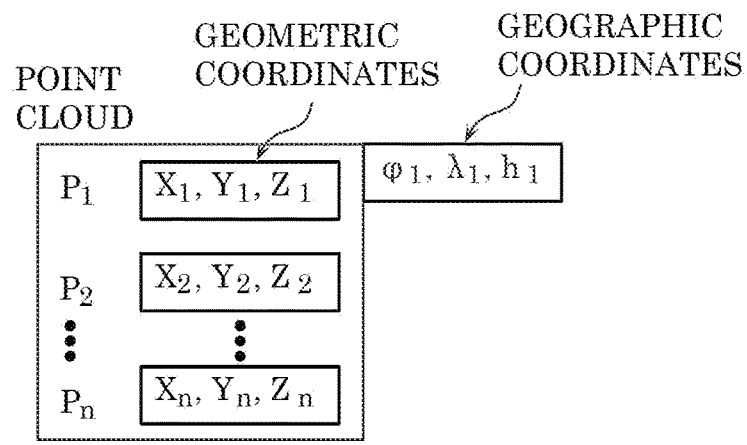
FIG. 109 is a diagram illustrating an example of a structure of encoded data in a second mode according to Embodiment 10.

Next, a second mode for encoding a geo-referenced point cloud will be described. FIG. 109 is a diagram illustrating an example of a structure of encoded data in the second mode. In the second mode, a set of three-dimensional point clouds is associated with a single set of geographic coordinates (φ, λ, h), as illustrated in FIG. 109.

Figure 110:
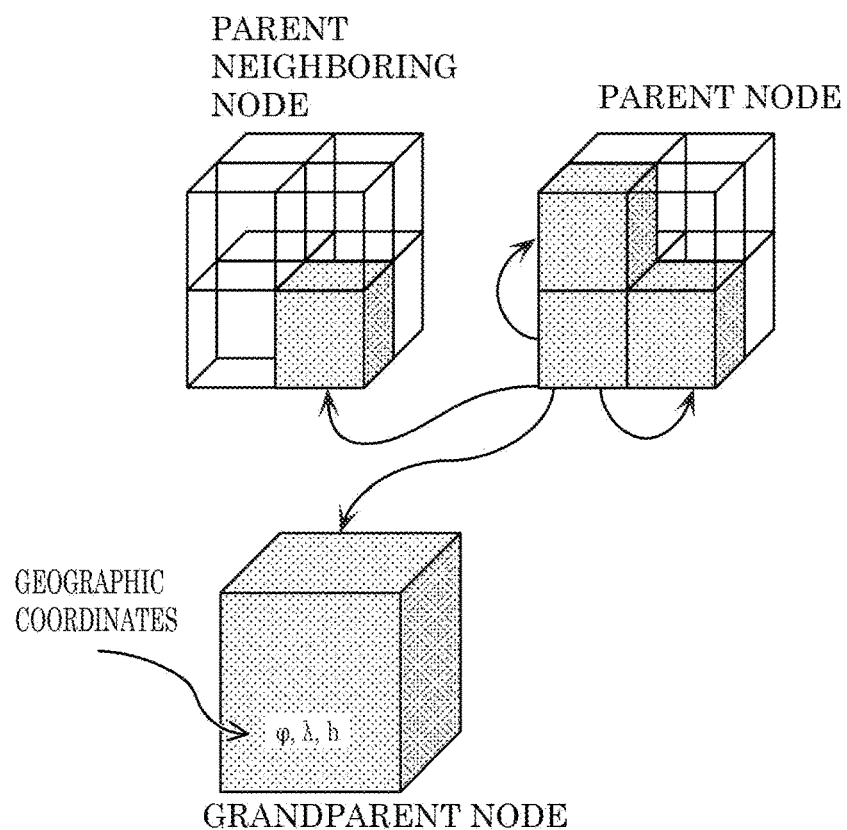
FIG. 110 is an example of a structure of a point cloud in the second mode according to Embodiment 10.

FIG. 110 is a diagram illustrating an example of a structure of a point cloud in the second mode. In the second mode, a set of three-dimensional point clouds is associated with a single piece of geographic information (geographic coordinates). For example, plural pieces of geographic information are separately encoded using attributed coding or octree coding. The octree structure illustrated in FIG. 108, for example, can be used for encoding the geographic information.

In the second mode, the same geographic coordinates are assigned to point clouds. In other words, decoded point clouds have the same geographic coordinates. For example, geographic information is added per unit which is small enough to have a single set of geographic coordinates and is a complete coding unit. Such unit is, for example, a tile or a slice.

In the example illustrated in FIG. 109, for example, the geographic coordinates $(\varphi_1, \lambda_1, h_1)$ of point cloud $P_1$ is added to a set of point clouds $P_1$ through $P_n$. In this case, the three-dimensional data decoding device may calculate the geographic coordinates of other point clouds $P_2$ through $P_n$ using geographic coordinates $(\varphi_1, \lambda_1, h_1)$ of point cloud $P_1$ and the geometric coordinates of point clouds $P_1$ through $P_n$. The three-dimensional data decoding device is capable of calculating the geographic coordinates of point cloud $P_2$ based on, for example, the geographic coordinates $(\varphi_1, \lambda_1, h_1)$ of point cloud $P_1$ and a difference between the geometric coordinates $(X_1, Y_1, Z_1)$ of point cloud $P_1$ and the geometric coordinates $(X_2, Y_2, Z_2)$ of point cloud $P_2$.

Note that the geographic coordinates to be added may be the geographic coordinates of any one of point clouds $P_1$ through $P_n$ or the geographic coordinates of a grandparent node. The geographic coordinates of a node are, for example, the geographic coordinates of a predetermined position (e.g., center, edge, etc.) in the node.

Moreover, which point of geographic information is to be added may be variable or determined in advance. In the case where which point of geographic information is to be added is variable, information indicating the point of geographic information that is added may be added to a bitstream. In the first mode, a bitstream does not need to include geometric coordinates.

Figure 111:
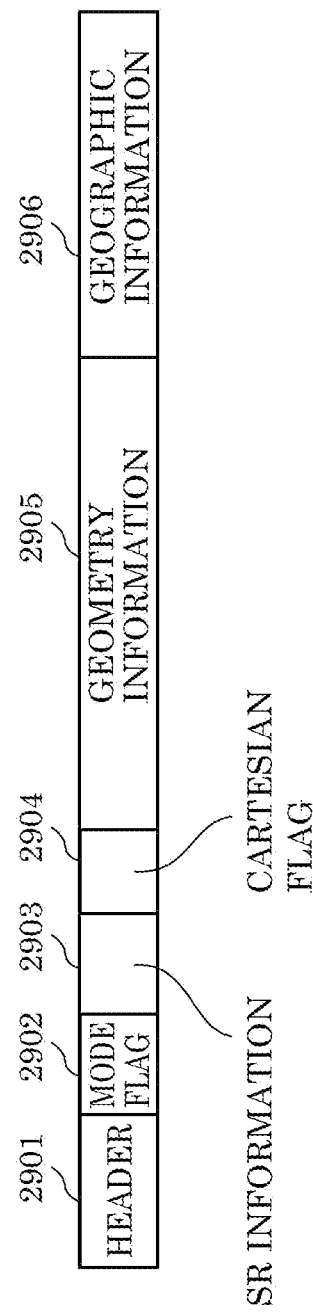
FIG. 111 is a diagram illustrating an example of a structure of a bitstream in the first mode according to Embodiment 10.

The following describes an example of a structure of a bitstream according to this embodiment. FIG. 111 is a diagram illustrating an example of a structure of a bitstream according to the first mode. A bitstream includes header 2901, mode flag 2902, SR information 2903, Cartesian flag 2904, geometric information 2905, and geographic information 2906, as illustrated in FIG. 111.

Geometric information 2905 indicates the local coordinates (geometric coordinates) of each of three-dimensional points.

Geographic information 2906 indicates the global coordinates of each three-dimensional point. It should be noted that the global coordinates may be geographic coordinates (latitude and longitude coordinates) or world coordinates (Cartesian coordinates).

Header 2901 is a header of an entire tree structure and includes information indicating the root location (e.g., coordinates) of the tree structure, information indicating the scale of the tree structure, and information indicating the number of three-dimensional points included in the entire tree structure. Mode flag 2902 indicates the mode (the aforementioned first or second mode) of geographic information. In the example illustrated in FIG. 111, mode flag 2902 indicates the first mode.

SR information 2903 is information indicating a spatial reference. As described above, the spatial reference is information necessary for coordinates conversion and projection. The spatial reference specifies reference coordinates, a reference ellipsoid, an origin, geometric parameters, etc. Such SR information 2903 varies from location to location or country to country, as described above.

Cartesian flag 2904 indicates whether global coordinates included in geographic information are Cartesian coordinates. In other words, Cartesian flag 2904 indicates whether global coordinates included in geographic information are geographic coordinates (latitude and longitude coordinates) or world coordinates (Cartesian coordinates).

Figure 112:
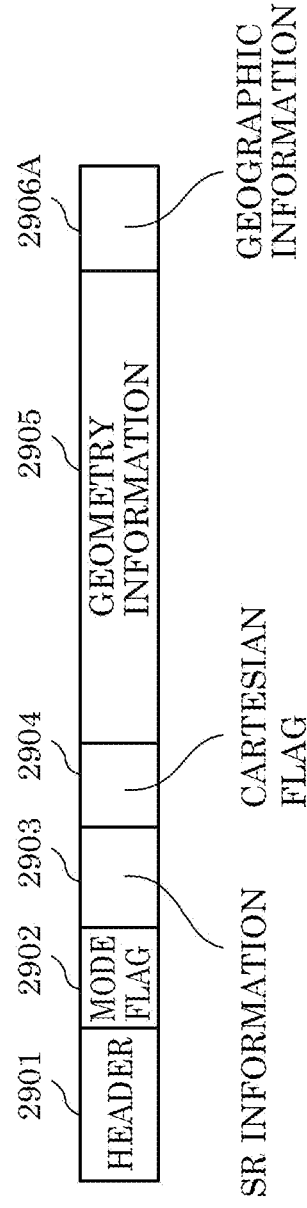
FIG. 112 is a diagram illustrating an example of a structure of a bitstream in the second mode according to Embodiment 10.

FIG. 112 is a diagram illustrating an example of a structure of a bitstream in the second mode. Geographic information 2906A indicates global coordinates associated with a set of three-dimensional points. The global coordinates may be geographic coordinates (latitude and longitude coordinates) or world coordinates (Cartesian coordinates). In the example illustrated in FIG. 112, mode flag 2902 indicates the second mode.

As illustrated in FIG. 112, it is possible to reduce the data amount of geographic information 2906A more than the data amount of geographic information 2906 in the first mode illustrated in FIG. 111.

Note that the location of geographic information 2906 (2906A) may be ahead of the location of geometric information 2905. Alternatively, in the second mode, geographic information 2906A may be stored in header 2901.

Figure 113:
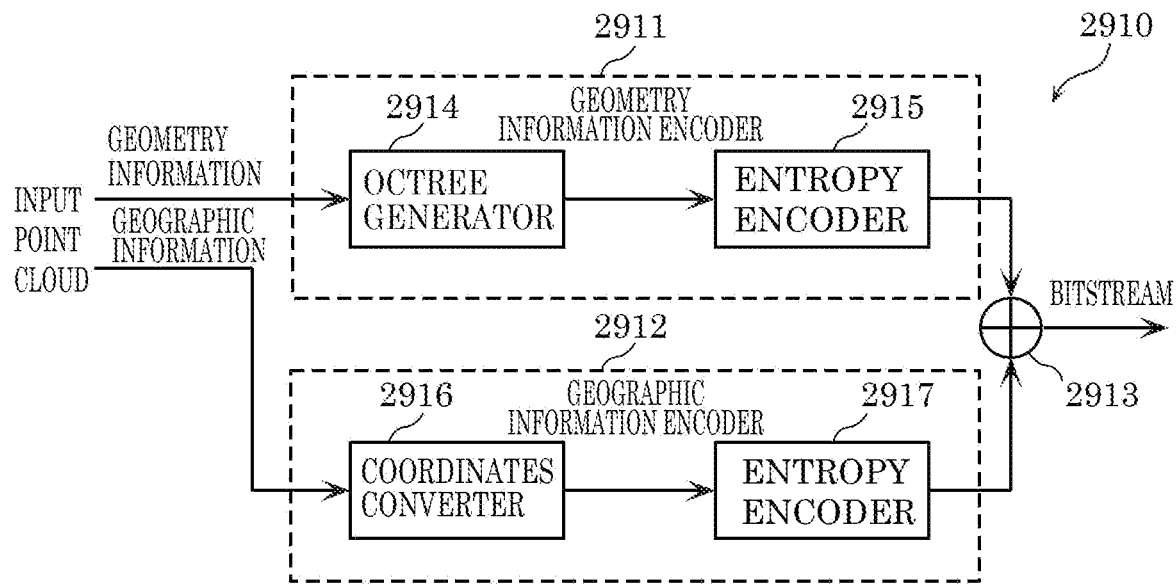
FIG. 113 is a diagram illustrating a configuration of a three-dimensional data encoder according to Embodiment 10.

The following describes a configuration for encoding a geo-referenced point cloud. FIG. 113 is a diagram illustrating a configuration of three-dimensional data encoding device 2910 according to this embodiment. This configuration is applied when coordinates conversion is required. Three-dimensional data encoding device 2910 includes geometric information encoder 2911, geographic information encoder 2912, and bitstream generator 2913. Geometric information encoder 2911 includes octree builder 2914 and entropy encoder 2915. Geographic information encoder 2912 includes coordinates converter 2916, and entropy encoder 2917.

Octree builder 2914 builds an octree using geometric information (geometric coordinates) included in an input point cloud. Octree builder 2914 also generates an occupancy code of each node of the octree. The geometric information is, for example, data obtained using LiDAR.

Here, entropy encoder 2915 entropy encodes geometric information (e.g., occupancy codes generated by octree builder 2914) to generate a bitstream (encoded data) of the geometric information. Entropy encoder 2915 entropy encodes the geometric information using a coding table different from the one used for entropy encoding geographic information (geographic coordinates).

Coordinates converter 2916 converts geographic information (latitude, longitude, and altitude) of a vehicle, which is obtained from a satellite (e.g., a GPS satellite), to world coordinates (e.g., a coordinate system with respect to a reference point in a country) or local coordinates (e.g., a coordinate system using a vehicle location as a reference). In the aforementioned first mode, coordinates converter 2916 converts the geometric coordinates of three-dimensional points to world coordinates using the world coordinates of the vehicle which are generated through the conversion, and then converts the obtained world coordinates of the three-dimensional points to geographic coordinates.

Entropy encoder 2917 entropy encodes the geographic coordinates generated by coordinates converter 2916 to generate a bitstream (encoded data) of the geographic information. Here, entropy encoder 2917 entropy encodes the geographic information using a coding table different from the one used for entropy encoding the geometric information.

Bitstream generator 2913 generates a bitstream including the bitstream of geometric information and the bitstream of geographic information.

Note that when geographic coordinates (latitude, longitude, altitude) are added to an input point cloud, coordinates converter 2916 may convert the geographic coordinates to world coordinates and entropy encoder 2917 may encode the world coordinates obtained through the conversion.

Figure 114:
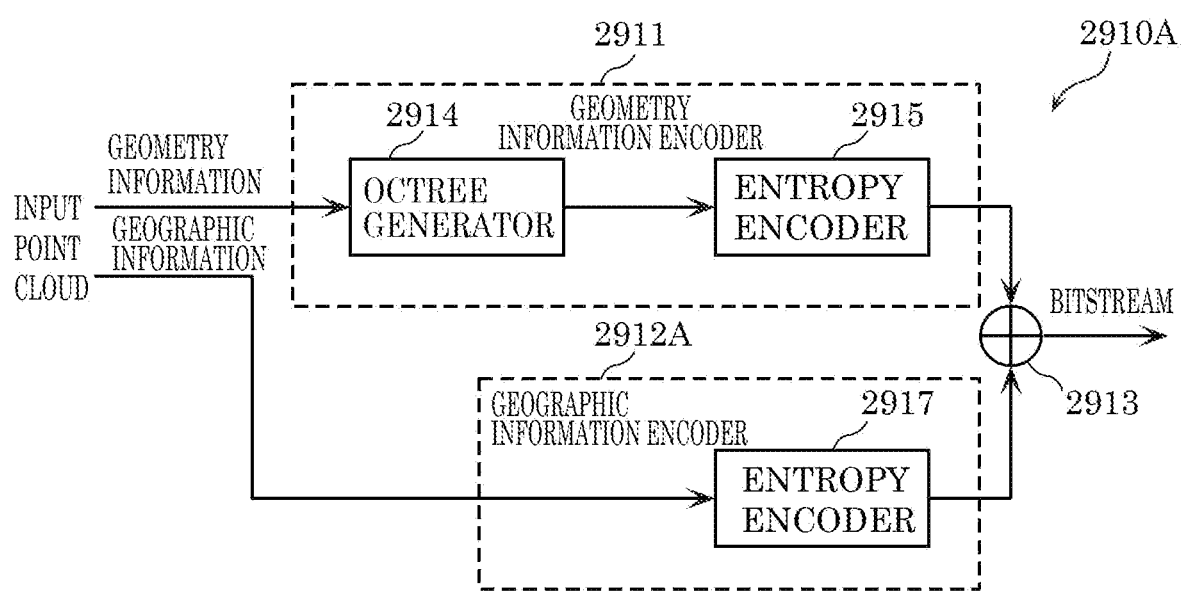
FIG. 114 is a diagram illustrating a configuration of the three-dimensional data encoding device when coordinates conversion is not performed, according to Embodiment 10.

FIG. 114 is a diagram illustrating a configuration of three-dimensional data encoding device 2910A when coordinates conversion is not required. Three-dimensional data encoding device 2910A illustrated in FIG. 114 is different from three-dimensional data encoding device 2910 illustrated in FIG. 113 in that geographic information encoder 2912A does not include coordinates converter 2916. Entropy encoder 2917 encodes geographic information included in information about an input point cloud to generate a bitstream (encoded data) of the geographic information. In the above-described case B, for example, the geographic information of a vehicle is entropy encoded.

Figure 115:
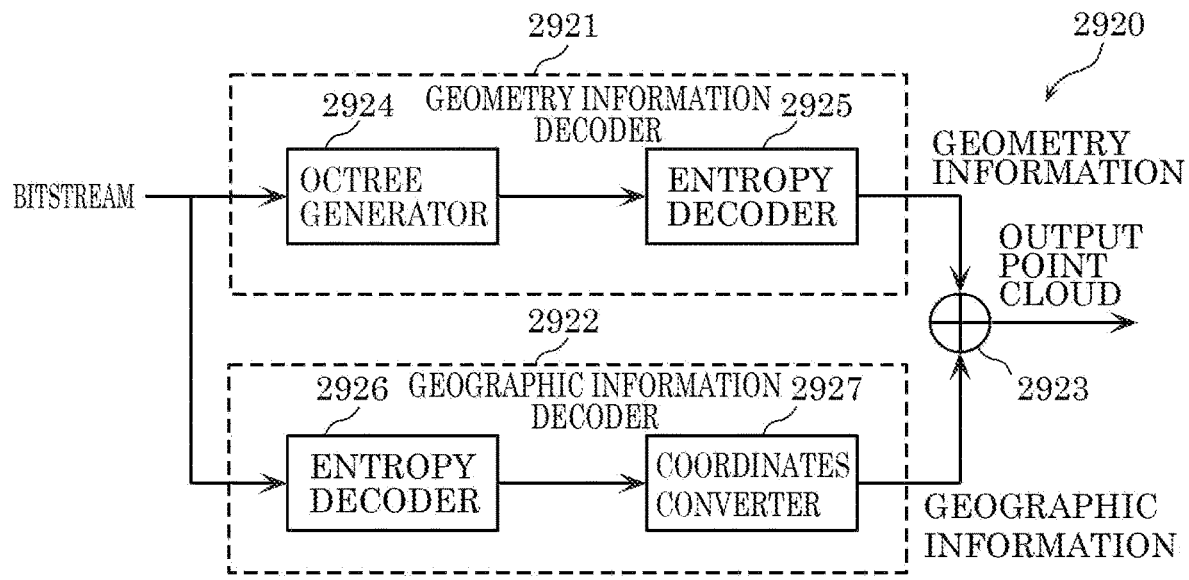
FIG. 115 is a diagram illustrating a configuration of a three-dimensional data decoding device according to Embodiment 10.

The following describes a configuration for decoding a geo-referenced point cloud. FIG. 115 is a diagram illustrating a configuration of three-dimensional data decoding device 2920 according to this embodiment. This configuration is applied when coordinates conversion is required. Three-dimensional data decoding device 2920 includes geometric information decoder 2921, geographic information decoder 2922, and point cloud generator 2923. Geometric information decoder 2921 includes octree builder 2924 and entropy decoder 2925. Geographic information decoder 2922 includes entropy decoder 2926 and coordinates converter 2927.

Octree builder 2924 generates a target space using information included in a bitstream and divides the target space in eight to generate eight small spaces. This process runs iteratively until the bitstream is entirely decoded.

Entropy decoder 2925 entropy decodes the bitstream to obtain occupancy codes. Here, entropy decoder 2925 entropy decodes geometric information (occupancy codes) using a coding table different from the one used for entropy decoding geographic information.

Entropy decoder 2926 decodes the bitstream to obtain geographic information. Here, entropy decoder 2926 entropy decodes the geographic information using a coding table different from the one used for entropy decoding the geometric information.

Coordinates converter 2927 converts world coordinates or local coordinates to geographic coordinates using the decoded geographic information. In the above-described case B, for example, the geographic information of a vehicle is entropy decoded. Coordinates converter 2927 converts the decoded geographic information of the vehicle to world coordinates. Subsequently coordinates converter 2927 converts the geometric coordinates of three-dimensional points to world coordinates using the world coordinates of the vehicle which are generated through the conversion, and then converts the obtained world coordinates of the three-dimensional points to geographic coordinates.

Note that when a bitstream includes encoded world coordinates, entropy decoder 2925 may decode the bitstream to decode the world coordinates and coordinates converter 2927 may convert the world coordinates to geographic coordinates.

Point cloud generator 2923 adds geographic information (geographic coordinates) to the decoded geometric information.

Figure 116:
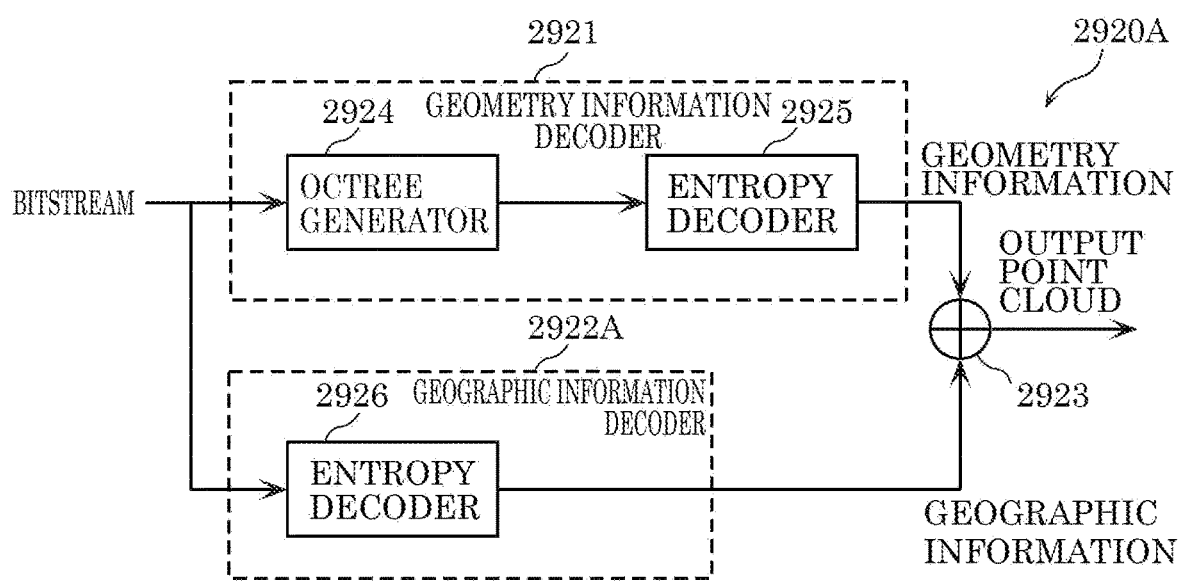
FIG. 116 is a diagram illustrating a configuration of the three-dimensional data decoding device when coordinates conversion is not required, according to Embodiment 10.

FIG. 116 is a diagram illustrating a configuration of three-dimensional data decoding device 2920A when coordinates conversion is not required. Three-dimensional data decoding device 2920A illustrated in FIG. 116 is different from three-dimensional data decoding device 2920 illustrated in FIG. 115 in that geographic information decoder 2922A does not include coordinates converter 2927.

In the aforementioned first mode, for example, entropy decoder 2926 decodes a bitstream to obtain the geographic coordinates of three-dimensional points.

Figure 117:
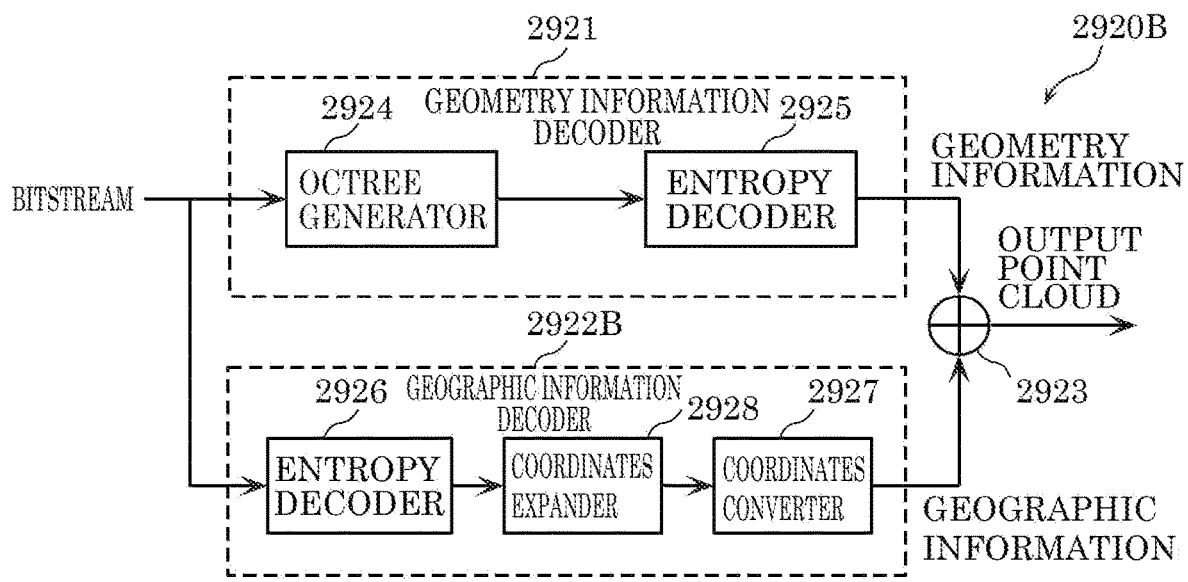
FIG. 117 is a diagram illustrating a configuration of the three-dimensional data decoding device when coordinates conversion and coordinates extension are both performed, according to Embodiment 10.

FIG. 117 is a diagram illustrating a configuration of three-dimensional data decoding device 2920B when coordinates conversion and coordinates expansion are both performed. Three-dimensional data decoding device 2920B illustrated in FIG. 117 is different from three-dimensional data decoding device 2920 illustrated in FIG. 115 in that geographic information decoder 2922A further includes coordinates expander 2928.

Coordinates expander 2928 expands, for example, the geographic coordinates ($\varphi$, $\lambda$, h) and world coordinates or local coordinates (X, Y, Z) of a vehicle to the coordinates of point clouds. For example, coordinates expander 2928 assigns the world coordinates or local coordinates of a vehicle or a set of three-dimensional points, as the world coordinates or local coordinates of three-dimensional points.

Figure 118:
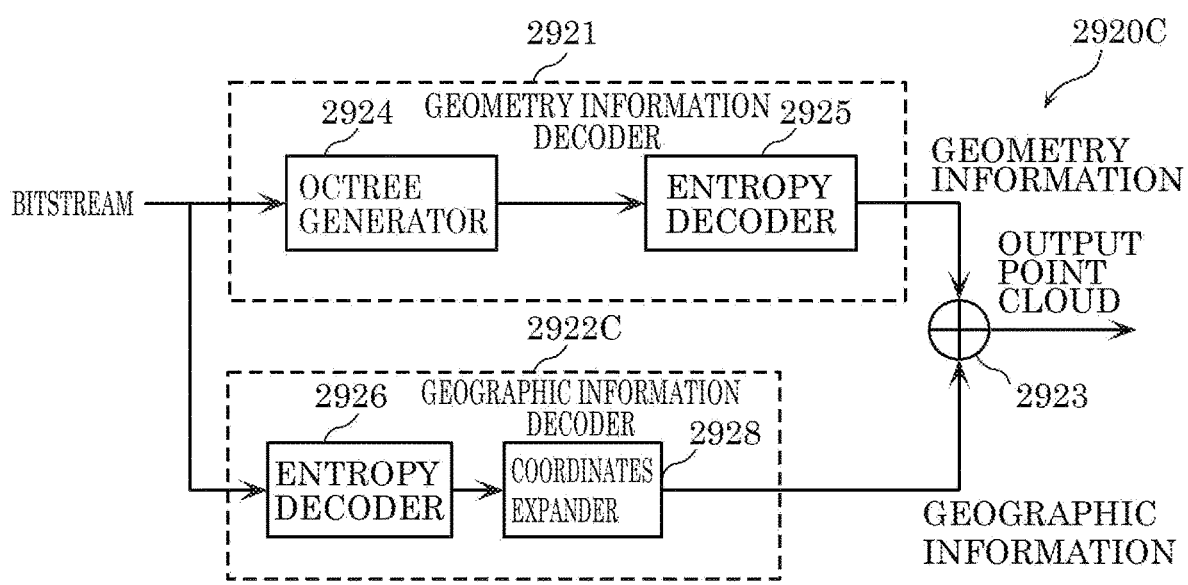
FIG. 118 is a diagram illustrating a configuration of the three-dimensional data decoding device when coordinates conversion is not performed but coordinates extension is performed, according to Embodiment 10.

FIG. 118 is a diagram illustrating a configuration of three-dimensional data decoding device 2920C when coordinates conversion is not performed but coordinates expansion is performed. Three-dimensional data decoding device 2920C illustrated in FIG. 118 is different from three-dimensional data decoding device 2920B illustrated in FIG. 117 in that geographic information decoder 2922C does not include coordinates converter 2927.

In the aforementioned second mode, for example, entropy decoder 2926 decodes a bitstream to obtain the geographic coordinates of a set of three-dimensional points. Coordinates expander 2928 assigns the geographic coordinates to the three-dimensional points included in the set. Alternatively, coordinates expander 2928 calculates the geographic coordinates of each of the three-dimensional points using the decoded geographic coordinates and the geometric coordinates of the three-dimensional points. Alternatively, in the aforementioned case B, entropy decoder 2926 decodes the geographic coordinates ($\varphi$, $\lambda$, h) of a vehicle. Coordinates expander 2928 assigns the geographic coordinates of the vehicle, as the geographic coordinates of three-dimensional points.

Figure 119:
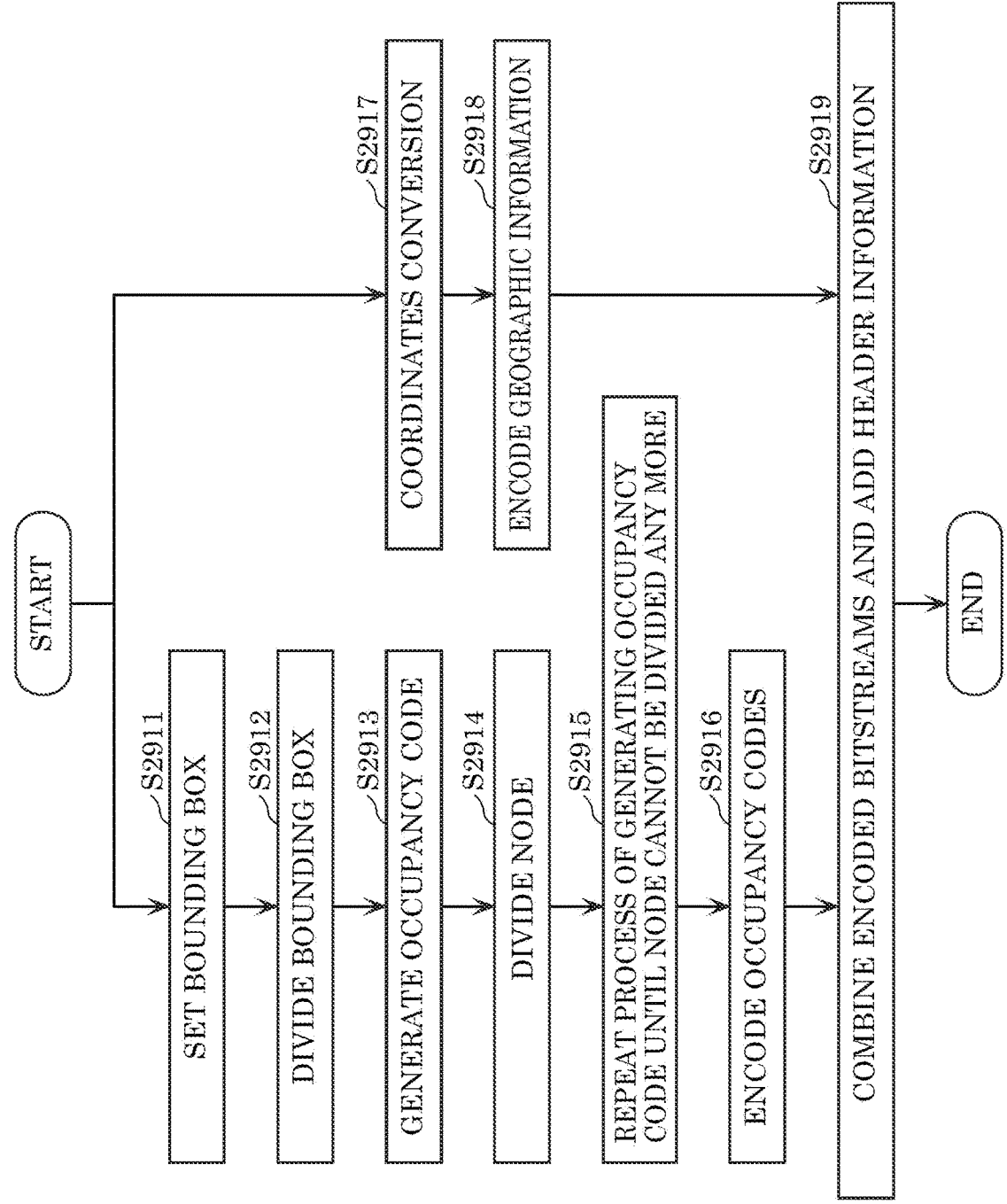

The following describes a flow of the process of encoding or decoding a geo-referenced point cloud. FIG. 119 is a flowchart illustrating a flow of the three-dimensional data encoding process performed by the three-dimensional data encoding device according to this embodiment.

First, the three-dimensional data encoding device sets a bounding box including an input point cloud (S2911). The three-dimensional data encoding device then divides the bounding box into eight child nodes (S2912).

Subsequently, the three-dimensional data encoding device generates an occupancy code of each of the child nodes, among the eight child nodes, which include three-dimensional points (S2913). The three-dimensional data encoding device then divides each child node into eight grandchild nodes (S2914). The three-dimensional data encoding device repeats the process of generating an occupancy code until a node cannot be divided any more (S2915). The three-dimensional data encoding device then encodes the occupancy codes (S2916).

Alternatively, the three-dimensional data encoding device converts geographic information ($\varphi$, $\lambda$, h) to world coordinates (X, Y, Z) (S2917). The three-dimensional data encoding device converts, for example, the geographic coordinates of a vehicle to world coordinates. In the aforementioned first mode, coordinates converter 2916 converts the geometric coordinates of three-dimensional points to world coordinates using the world coordinates of the vehicle which are generated through the conversion, and then converts the obtained world coordinates of the three-dimensional points to geographic coordinates. The three-dimensional data encoding device then encodes the geographic coordinates resulting from the conversion (S2918).

Note that the three-dimensional data encoding device may encode the world coordinates obtained through the conversion of the geometric coordinates, without the conversion from world coordinates to geographic coordinates.

When geographic coordinates are added to an input point cloud, the three-dimensional data encoding device may convert the geographic coordinates to world coordinates and encode the world coordinates obtained through the conversion.

Lastly, the three-dimensional data encoding device combines an encoded bitstream generated by encoding the geometric information and an encoded bitstream generated by encoding the geographic information, to generate a bitstream. The three-dimensional data encoding device also adds header information to the bitstream (S2919). When encoding geographic information for each point cloud, for example, the three-dimensional data encoding device sets the mode to 1, and when encoding a single piece of geographic information for all of point clouds, the three-dimensional data encoding device sets the mode to 2. The three-dimensional data encoding device may also add, to header information, parameters (e.g., SR information) for converting geographic coordinates to world coordinates. Alternatively, the three-dimensional data encoding device may add, to header information, information (Cartesian flag) indicating whether geographic information is Cartesian coordinates.

With such information added to header information, the three-dimensional data decoding device is capable of properly decoding a bitstream. The three-dimensional data decoding device is also capable of properly converting geographic coordinates and world coordinates.

Figure 120:
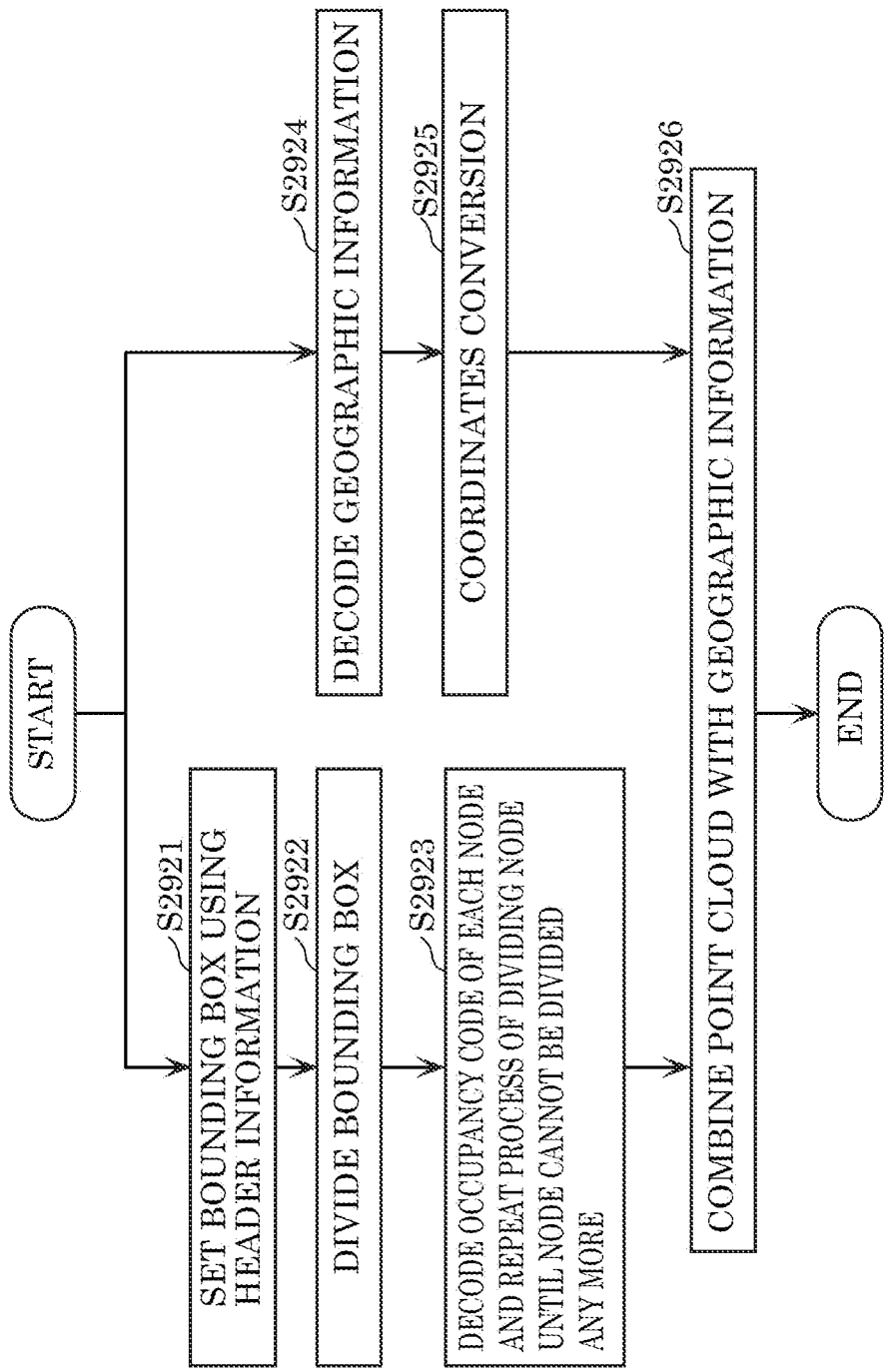

FIG. 120 is a flowchart illustrating the three-dimensional data decoding process performed by the three-dimensional data decoding device according to this embodiment.

First, the three-dimensional data decoding device sets a bounding box including an output point cloud, using header information included in a bitstream (S2921). The three-dimensional data decoding device then divides the bounding box into eight child nodes (S2922). Subsequently the three-dimensional data decoding device decodes an occupancy code of each node and divides the node into eight child nodes based on the decoded occupancy code. The three-dimensional data decoding device repeats this process until a node (subspace) cannot be divided any more (S2923).

Alternatively, the three-dimensional data decoding device decodes geographic information (S2924). The three-dimensional data decoding device then converts the geographic information from world coordinates (X, Y, Z) to geographic coordinates ($\varphi$, $\lambda$, h) (S2925). In the above-described case B, for example, the geographic information of a vehicle is decoded. The three-dimensional data decoding device converts the decoded geographic information of the vehicle to world coordinates. Subsequently, the three-dimensional data decoding device converts the geometric coordinates of each of three-dimensional points to world coordinates using the world coordinates of the vehicle which are generated through the conversion, and then converts the obtained world coordinates of the three-dimensional points to geographic coordinates. When the bitstream includes the geographic coordinates of the three-dimensional point clouds, the conversion (S2925) need not be performed.

Note that when a bitstream includes encoded world coordinates, the three-dimensional data decoding device may decode the bitstream to decode the world coordinates, and convert the world coordinates to geographic coordinates.

Lastly the three-dimensional data decoding device combines the decoded point cloud with the geographic information (S2926).

Figure 121:
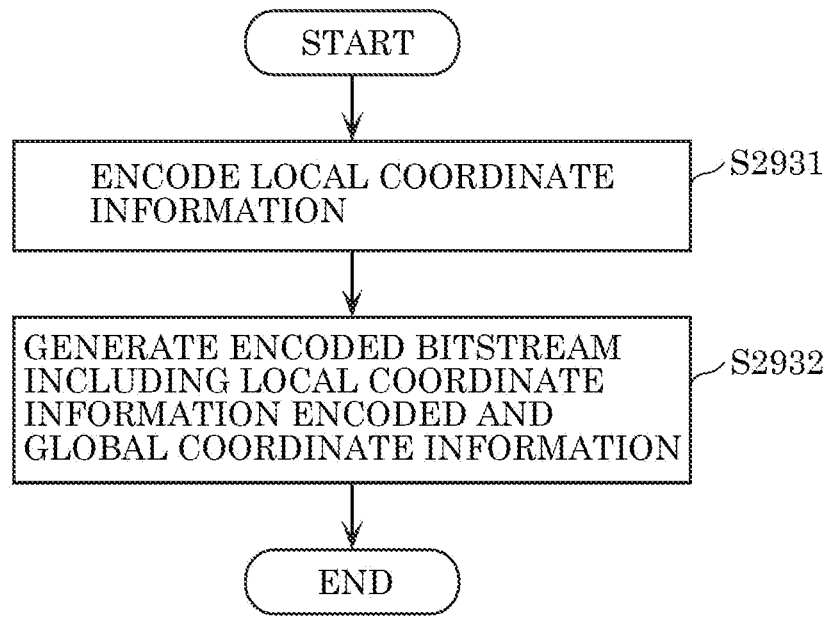

As described above, the three-dimensional data encoding device according to this embodiment performs the process illustrated in FIG. 121. The three-dimensional data encoding device encodes three-dimensional points obtained by a sensor. The three-dimensional data encoding device encodes local coordinate information indicating sets of local coordinates that are coordinates of the three-dimensional points and are dependent on the location of the sensor (S2931), and generates an encoded bitstream including the encoded local coordinate information (e.g. geometric information 2905) and global coordinate information (e.g., geographic information 2906 or 2906A) indicating global coordinates that are coordinates of a reference point or at least one of the three-dimensional points and are independent from the location of the sensor (S2932).

Accordingly, since there is no need for the three-dimensional data decoding device to calculate global coordinates, it is possible to reduce the amount of processing performed by the three-dimensional data decoding device.

The global coordinate information indicates, for example, the global coordinates of each of the three-dimensional points, as illustrated in FIG. 106. Accordingly, since there is no need for the three-dimensional data decoding device to calculate global coordinates, it is possible to reduce the amount of processing performed by the three-dimensional data decoding device.

The global coordinate information indicates, for example, a single set of global coordinates associated with the three-dimensional points, as illustrated in FIG. 109. Accordingly, since the data amount of the global coordinate information can be reduced, it possible to reduce the data amount of an encoded bitstream.

The global coordinate information indicates, for example, the global coordinates of an origin of a system of the local coordinates. Accordingly, since the data amount of the global coordinate information can be reduced, it possible to reduce the data amount of an encoded bitstream.

The global coordinates are expressed, for example, by latitude, longitude, and altitude. The global coordinates are expressed, for example, by Cartesian coordinates.

The encoded bitstream further includes, for example, information (Cartesian flag 2904) indicating whether the global coordinates are expressed by Cartesian coordinates.

The encoded bitstream further includes, for example, information (SR information 2903) indicating a spatial reference of the global coordinates.

The three-dimensional data encoding device includes, for example, a processor and memory, and the processor performs the above-described process using the memory.

Figure 122:
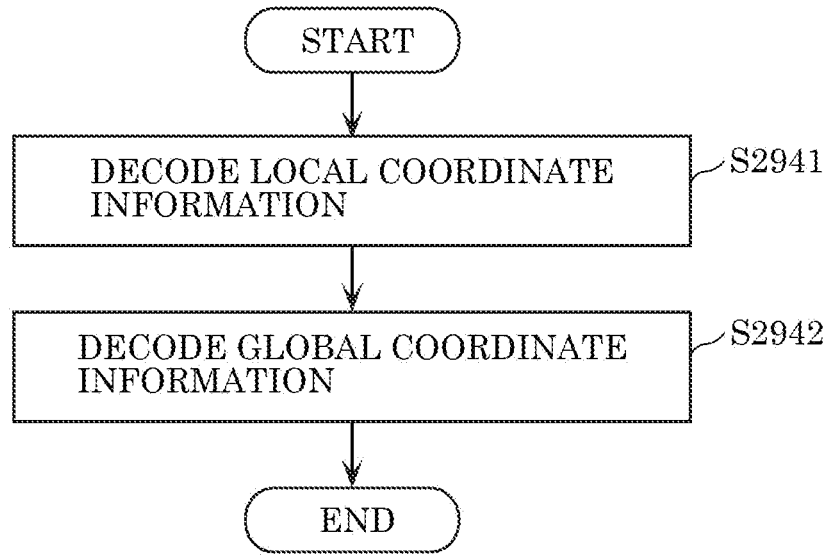

The three-dimensional data decoding device according to this embodiment performs the process illustrated in FIG. 122. The three-dimensional data decoding device decodes three-dimensional points obtained by a sensor. The three-dimensional data decoding device decodes, from an encoded bitstream, local coordinate information (e.g., geometric information 2905) indicating sets of local coordinates that are coordinates of the three-dimensional points and are dependent on the location of the sensor (S2941), and decodes (obtains), from the encoded bitstream, global coordinate information (e.g., geographic information 2906 or 2906A) indicating global coordinates that are coordinates of a reference point or at least one of the three-dimensional points and are independent from the location of the sensor.

Accordingly, since there is no need for the three-dimensional data decoding device to calculate global coordinates, it is possible to reduce the amount of processing performed by the three-dimensional data decoding device.

The global coordinate information indicates, for example, the global coordinates of each of the three-dimensional points, as illustrated in FIG. 106. Accordingly since there is no need for the three-dimensional data decoding device to calculate global coordinates, it is possible to reduce the amount of processing performed by the three-dimensional data decoding device.

The global coordinate information indicates, for example, a single set of global coordinates associated with the three-dimensional points, as illustrated in FIG. 109. Accordingly, since the data amount of the global coordinate information can be reduced, it possible to reduce the data amount of an encoded bitstream.

The global coordinate information indicates, for example, the global coordinates of an origin of a system of the local coordinates. Accordingly, since the data amount of the global coordinate information can be reduced, it possible to reduce the data amount of an encoded bitstream.

The global coordinates are expressed, for example, by latitude, longitude, and altitude. The global coordinates are expressed, for example, by Cartesian coordinates.

The encoded bitstream further decodes, from the encoded bitstream, information (Cartesian flag 2904) indicating whether the global coordinates are expressed by Cartesian coordinates.

The three-dimensional data decoding device further decodes, from the encoded bitstream, information (SR information 2903) indicating a spatial reference of the global coordinates.

The three-dimensional data decoding device includes, for example, a processor and memory, and the processor performs the above-described process using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

What is claimed is:

1. A three-dimensional data encoding method of encoding three-dimensional points, the three-dimensional encoding method comprising:
    encoding first coordinate information indicating coordinates where the three-dimensional points exist in a first coordinate system;
    encoding a first conversion parameter for converting the first coordinate information to second coordinate information indicating coordinates where the three-dimensional points exist in a second coordinate system;
    encoding a second conversion parameter for converting the second coordinate information to third coordinate information indicating coordinates where the three-dimensional points exist in a third coordinate system; and
    generating an encoded bitstream including the first coordinate information, the first conversion parameter and the second conversion parameter.

2. The three-dimensional data encoding method according to claim 1, wherein
    the first coordinate information indicates local coordinates, and
    the second coordinate information and the third coordinate information each indicate global coordinates.

3. The three-dimensional data encoding method according to claim 1, wherein
    the first conversion parameter indicates coordinates in the second coordinate system that indicate an origin of the first coordinate system.

4. The three-dimensional data encoding method according to claim 1, wherein
    the first conversion parameter includes information indicating coordinates of the third coordinate system that indicate an origin of the first coordinate system, and a parameter for converting the third coordinate system into the second coordinate system.

5. The three-dimensional data encoding method according to claim 1, wherein
    the first coordinate system and the second coordinate system are each an orthogonal coordinate system, and
    coordinates in the third coordinate system are expressed by latitude, longitude, and altitude.

6. The three-dimensional data encoding method according to claim 1, wherein
    the encoded bitstream further includes information indicating whether the coordinates in the third coordinate system are expressed by Cartesian coordinates.

7. The three-dimensional data encoding method according to claim 1, wherein
    the encoded bitstream further includes information indicating a spatial reference of the coordinates in the third coordinate system.

8. A three-dimensional data decoding method of decoding three-dimensional points, the three-dimensional data decoding method comprising:
    decoding, from an encoded bitstream, first coordinate information indicating coordinates where three-dimensional points exist in a first coordinate system; and
    decoding, from the encoded bitstream, second coordinate information indicating coordinates where the three-dimensional points exist in a second coordinate system; and
    decoding, from the encoded bitstream, third coordinate information indicating coordinates where the three-dimensional points exist in a third coordinate system,
    wherein the second coordinate information is converted from the first coordinate information using a first conversion parameter, and
    wherein the third coordinate information is converted from the second coordinate information using a second conversion parameter.

9. The three-dimensional data decoding method according to claim 8, wherein
    the first coordinate information indicates local coordinates, and
    the second coordinate information and the third coordinate information each indicate global coordinates.

10. The three-dimensional data decoding method according to claim 8, wherein
    the first conversion parameter indicates coordinates in the second coordinate system that indicate an origin of the first coordinate system.

11. The three-dimensional data decoding method according to claim 8, wherein
    the first conversion parameter includes information indicating coordinates of the third coordinate system that indicate an origin of the first coordinate system, and a parameter for converting the third coordinate system into the second coordinate system.

12. The three-dimensional data decoding method according to claim 8, wherein
    the first coordinate system and the second coordinate system are each an orthogonal coordinate system, and
    coordinates in the third coordinate system are expressed by latitude, longitude, and altitude.

13. The three-dimensional data decoding method according to claim 8, further comprising:
    decoding, from the encoded bitstream, information indicating whether the coordinates in the third coordinate system are expressed by Cartesian coordinates.

14. The three-dimensional data decoding method according to claim 8, further comprising:
    decoding, from the encoded bitstream, information indicating a spatial reference of the coordinates in the third coordinate system.

15. A three-dimensional data encoding device that encodes three-dimensional points, the three-dimensional data encoding device comprising:
    a processor; and
    memory, wherein
    using the memory, the processor:
        encodes first coordinate information indicating coordinates where the three-dimensional points exist in a first coordinate system;

encodes a first conversion parameter for converting the first coordinate information to second coordinate information indicating coordinates where the three-dimensional points exist in a second coordinate system;

encodes a second conversion parameter for converting the second coordinate information to third coordinate information indicating coordinates where the three-dimensional points exist in a third coordinate system; and generates an encoded bitstream including the first coordinate information, the first conversion parameter and the second conversion parameter.

16. A three-dimensional data decoding device that decodes three-dimensional points, the three-dimensional data decoding device comprising:

a processor; and memory, wherein using the memory, the processor:

decodes, from an encoded bitstream, first coordinate information indicating coordinates where the three-dimensional points exist in a first coordinate system; and decodes, from the encoded bitstream, second coordinate information indicating coordinates where the three-dimensional points exist in a second coordinate system; and decodes, from the encoded bitstream, third coordinate information indicating coordinates where the three-dimensional points exist in a third coordinate system, wherein the second coordinate information is converted from the first coordinate information using a first conversion parameter, and wherein the third coordinate information is converted from the second coordinate information using a second conversion parameter.

* * * * *